US012473492B2

(12) United States Patent
Takasaki et al.

(10) Patent No.: US 12,473,492 B2
(45) Date of Patent: Nov. 18, 2025

(54) COMPOUND, LIQUID CRYSTAL COMPOSITION, AND LIQUID CRYSTAL DISPLAY ELEMENT, SENSOR, LIQUID CRYSTAL LENS, OPTICAL COMMUNICATION DEVICE, AND ANTENNA USING LIQUID CRYSTAL COMPOSITION

(71) Applicant: DIC Corporation, Tokyo (JP)

(72) Inventors: Mika Takasaki, Saitama (JP); Takaya Ikeuchi, Saitama (JP); Megumi Uzawa, Saitama (JP); Noriyuki Sugiyama, Saitama (JP); Go Sudo, Saitama (JP); Masanao Hayashi, Saitama (JP); Shinichi Hirata, Saitama (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 18/578,710

(22) PCT Filed: Jul. 7, 2022

(86) PCT No.: PCT/JP2022/026898

§ 371 (c)(1),
(2) Date: Jan. 11, 2024

(87) PCT Pub. No.: WO2023/032466

PCT Pub. Date: Mar. 9, 2023

(65) Prior Publication Data

US 2024/0336843 A1 Oct. 10, 2024

(30) Foreign Application Priority Data

Sep. 2, 2021 (JP) ................................ 2021-143083

(51) Int. Cl.

*G02F 1/1333* (2006.01)
*C09K 19/18* (2006.01)
*C09K 19/34* (2006.01)

(52) U.S. Cl.

CPC .......... *C09K 19/18* (2013.01); *C09K 19/3491* (2013.01); *C09K 2019/181* (2013.01); *C09K 2019/183* (2013.01); *C09K 2219/11* (2013.01)

(58) Field of Classification Search

CPC .... C09K 19/18; C09K 19/181; C09K 19/183; C09K 19/3491; G02F 1/1333

See application file for complete search history.

(56) References Cited

U.S. PATENT DOCUMENTS 5,888,421 A 3/1999 Toyne et al.
9,593,279 B2 3/2017 Wittek et al.
10,711,197 B2 7/2020 Wittek et al.
2018/0171229 A1 6/2018 Ohishi et al.
2018/0371317 A1 12/2018 Kula et al.
2019/0352564 A1 11/2019 Klass et al.
2020/0299580 A1 9/2020 Brocke et al.
2021/0103190 A1 4/2021 Miyake
2021/0122977 A1 4/2021 Ushakov et al.
2023/0112953 A1* 4/2023 Yamamoto ......... C09K 19/3455 343/770
2024/0228878 A1* 7/2024 Hirata ...................... H01Q 3/46
2024/0336843 A1* 10/2024 Takasaki .................. H01Q 3/34

FOREIGN PATENT DOCUMENTS

CN 102660296 9/2012
CN 102786456 11/2012
CN 103254910 8/2013
CN 103725295 4/2014
CN 104263380 1/2015
CN 105985786 10/2016
CN 107338057 11/2017
CN 108865180 11/2018
CN 109852400 6/2019
CN 109943350 6/2019
CN 110760311 2/2020
CN 110938438 3/2020
CN 116286020 6/2023
EP 3681976 5/2021
JP H05507725 11/1993
JP 2015110532 6/2015
JP 2016037607 3/2016
JP 2018048341 3/2018

(Continued)

OTHER PUBLICATIONS

D. Dolfi et al., "Liquid Crystal Microwave Phase Shifter", Electronics Letters, May 13, 1993, pp. 926-928, vol. 29, No. 10.

*Primary Examiner* — Geraldina Visconti
(74) *Attorney, Agent, or Firm* — JCIPRNET

(57) ABSTRACT

A compound capable of providing a liquid crystal composition with high $T_{ni}$, large $\Delta n$, low $V_{th}$, large $\Delta\varepsilon_r$, small tan $\delta_{iso}$, and satisfactory storability at low temperatures, and a liquid crystal composition, as well as a liquid crystal display element, a sensor, a liquid crystal lens, an optical communication device, and an antenna using the liquid crystal composition. Specifically, a compound represented by general formula (i) having an alkynyl group and an isothiocyanate group (—NCS) and a liquid crystal composition containing one or two or more of such compounds.

18 Claims, No Drawings

(56) References Cited

FOREIGN PATENT DOCUMENTS

| | | | | |
|---|---|---|---|---|
| JP | 2019509356 | | 4/2019 | |
| JP | 2019206694 | | 12/2019 | |
| JP | 2020169161 | | 10/2020 | |
| JP | 2021091630 | | 6/2021 | |
| TW | 201920618 | | 6/2019 | |
| WO | 2018016398 | | 1/2018 | |
| WO | 2021037962 | | 3/2021 | |
| WO | 2021069535 | | 4/2021 | |
| WO | WO 2021/157188 | A1 * | 8/2021 | ............. C09K 19/24 |

* cited by examiner

COMPOUND, LIQUID CRYSTAL COMPOSITION, AND LIQUID CRYSTAL DISPLAY ELEMENT, SENSOR, LIQUID CRYSTAL LENS, OPTICAL COMMUNICATION DEVICE, AND ANTENNA USING LIQUID CRYSTAL COMPOSITION

CROSS-REFERENCE TO RELATED APPLICATION

This application is a 371 application of the international PCT application serial no. PCT/JP2022/026898, filed on Jul. 7, 2022, which claims the priority benefit of Japan application no. 2021-143083, filed on Sep. 2, 2021. The entirety of each of the above-mentioned patent applications is hereby incorporated by reference herein and made a part of this specification.

TECHNICAL FIELD

The present invention relates to a compound, a liquid crystal composition, and a liquid crystal display element, a sensor, a liquid crystal lens, an optical communication device, and an antenna using the liquid crystal composition.

BACKGROUND ART

Antennas formed of liquid crystals to transmit and receive radio waves between movable bodies such as automobiles and communications satellites are attracting attention as a new application for liquid crystals widely used for displays. Conventionally, satellite communications have used parabolic antennas. When used in a movable body such as an automobile, the parabolic antenna has to be pointed in the direction of a satellite as needed and requires a large moving part. An antenna formed of liquid crystals, however, can change the direction of radio wave transmission and reception by operating the liquid crystals inside the panel, so there is no need to move the antenna itself, and the shape of the antenna can be flat. Low earth orbit satellite constellations with a large number of low earth orbit satellites have been studied to implement global high-capacity and high-speed communications. To track low earth orbit satellites, which appear to be constantly moving from the ground, liquid crystal antennas that can easily change the direction of radio wave transmission and reception are useful.

In general, automatic driving of automobiles and other vehicles requires massive data downloads of high-precision 3D map information. However, an antenna formed of liquid crystals, when mounted on an automobile, enables massive data downloads from communications satellites without a mechanical moving part. The frequency band used for satellite communications is approximately 13 GHz, which is significantly different from the frequencies that have been used for liquid crystal display applications. The required physical properties of liquid crystals therefore are also significantly different. Specifically, Δn required for liquid crystals for antennas is approximately 0.4, and the operating temperature range is −20 to 120° C.

Infrared laser image recognition and ranging devices formed of liquid crystals are also attracting attention as sensors for automatic driving of movable bodies such as automobiles. The required Δn of liquid crystals for this application is 0.3 to 0.6, and the operating temperature range is 10 to 100° C.

Furthermore, it is known that many of the liquid crystalline compounds that constitute liquid crystal compositions that exhibit a high Δn of 0.2 or higher have low compatibility. Therefore, it is also important to select a liquid crystalline compound with high compatibility.

In this respect, examples of the technology of liquid crystals for antennas include PTL 1.

NPL 1 also proposes the use of liquid crystal materials as a component of high-frequency devices.

CITATION LIST

Patent Literature

PTL 1: Japanese Unexamined Patent Application Publication No. 2016-37607

Non Patent Literature

NPL 1: D. Dolfi, "Electronics Letters", (UK), 1993, Vol. 29, No. 10, pp. 926-927.

SUMMARY OF INVENTION

Technical Problem

The present invention provides a compound capable of providing a liquid crystal composition with high $T_{ni}$, large Δn, low $V_{th}$, large $\Delta\varepsilon_r$, small tan $\delta_{iso}$, and satisfactory storability at low temperatures, and a liquid crystal composition, as well as a liquid crystal display element, a sensor, a liquid crystal lens, an optical communication device, and an antenna using the liquid crystal composition.

Solution to Problem

The inventors of the present invention have conducted elaborate studies and found a liquid crystal composition containing one or two or more of compounds represented by general formula (i) having an alkynyl group and an isothiocyanate group (—NCS). This finding has led to completion of the present invention.

The configuration of the present invention is as follows.

A compound according to the present invention is represented by general formula (i) below:

[Chem. 1]

$$R^{i1}—A^{i1}—Z^{i1}—A^{i2}\left(Z^{i2}—A^{i3}\right)_{n^{i1}}NCS \qquad (i)$$

(in general formula (i), $R^{i1}$ represents an alkynyl group having 2 to 20 carbon atoms, wherein one or two or more —$CH_2$—'s in the alkynyl group are each independently optionally substituted with —O—, —S—, —CO—, and/or —CS—, one or two or more —$CH_2$—$CH_2$—'s in the alkynyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkynyl group are each independently optionally substituted with —O—CO—O—, and one or two or more hydrogen atoms in the alkynyl group are each independently optionally substituted with a halogen atom, where oxygen atoms are not directly bonded to each other, $A^{i1}$, $A^{i2}$, and $A^{i3}$ each independently represent a hydrocarbon ring having 3 to 16 carbon atoms or a hetero ring having 3 to 16 carbon atoms, wherein one or two or more hydrogen atoms in $A^{i1}$, $A^{i2}$, and $A^{i3}$ are each independently optionally substituted with a substituent $S^{i1}$, the substituent $S^{i1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, one or two or more —$CH_2$—'s in the alkyl group are each independently optionally substituted with —O—, —S—, and/or —CO—, one or two or more —$CH_2$—$CH_2$—'s in the alkyl group are each independently optionally substituted with —CH═CH—, —CF═CF—, —C≡C—, —CO—O—, —O—CO—, —CO—S—, —S—CO—, —CO—NH—, and/or —NH—CO—, one or two or more —$CH_2$—$CH_2$—$CH_2$—'s in the alkyl group are each independently optionally substituted with —O—CO—O—, one or two or more hydrogen atoms in the alkyl group are each independently optionally substituted with a halogen atom, where oxygen atoms are not directly bonded to each other, a plurality of substituents $S^{i1}$, if present, may be the same or different, $Z^{i1}$ and $Z^{i2}$ each independently represent a single bond or an alkylene group having 1 to 20 carbon atoms, wherein one or two or more —$CH_2$—'s in the alkylene group are each independently optionally substituted with —O—, —$CF_2$—, and/or —CO—, and one or two or more —$CH_2$—$CH_2$—'s in the alkylene group are each independently optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—, where oxygen atoms are not directly bonded to each other, and $n^{i1}$ represents an integer of 0 or 1).

A liquid crystal composition according to the present invention contains one or two or more of the compounds above.

A liquid crystal display element according to the present invention includes the above liquid crystal composition.

A sensor according to the present invention includes the above liquid crystal composition.

A liquid crystal lens according to the present invention includes the above liquid crystal composition.

An optical communication device according to the present invention includes the above liquid crystal composition.

An antenna according to the present invention includes the above liquid crystal composition.

Examples of the configuration of the invention are as follows.

Item 1. A liquid crystal composition containing one or two or more of compounds represented by general formula (i) below:

[Chem. 2]

$$R^{i1}—A^{i1}—Z^{i1}—A^{i2}\left(—Z^{i2}—A^{i3}—\right)_{n^{i1}}NCS \quad (i)$$

(in general formula (i), $R^{i1}$ represents an alkynyl group having 2 to 20 carbon atoms, wherein one or two or more —$CH_2$—'s in the alkynyl group are each independently optionally substituted with —O—, —S—, —CO—, and/or —CS—, one or two or more —$CH_2$—$CH_2$—'s in the alkynyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkynyl group are each independently optionally substituted with —O—CO—O—, and one or two or more hydrogen atoms in the alkynyl group are each independently optionally substituted with a halogen atom, where oxygen atoms are not directly bonded to each other, $A^{i1}$, $A^{i2}$, and $A^{i3}$ each independently represent a hydrocarbon ring having 3 to 16 carbon atoms or a hetero ring having 3 to 16 carbon atoms, wherein one or two or more hydrogen atoms in $A^{i1}$, $A^{i2}$, and $A^{i3}$ are each independently optionally substituted with a substituent $S^{i1}$, the substituent $S^{i1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, one or two or more —$CH_2$—'s in the alkyl group are each independently optionally substituted with —O—, —S—, and/or —CO—, one or two or more —$CH_2$—$CH_2$—'s in the alkyl group are each independently optionally substituted with —CH═CH—, —CF═CF—, —C≡C—, —CO—O—, —O—CO—, —CO—S—, —S—CO—, —CO—NH—, and/or —NH—CO—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, a plurality of substituents $S^{i1}$, if present, may be the same or different, $Z^{i1}$ and $Z^{i2}$ each independently represent a single bond or an alkylene group having 1 to 20 carbon atoms, wherein one or two or more —$CH_2$—'s in the alkylene group are each independently optionally substituted with —O—, —$CF_2$—, and/or —CO—, and one or two or more —$CH_2$—$CH_2$—'s in the alkylene group are each independently optionally substituted with —$CH_2$—$CH(CH_3)$—, —$CH(CH_3)$—$CH_2$—, —CH═CH—, —CF═CF—, —CH═$C(CH_3)$—, $—C(CH_3)═CH—$, $—CH═N—$, $—N═CH—$, $—N═N—$, $—C≡C—$, $—CO—O—$, and/or $—O—CO—$, where oxygen atoms are not directly bonded to each other, and $n^{i1}$ represents an integer of 0 or 1).

Item 2. The liquid crystal composition according to item 1, wherein a compound represented by general formula (i) is selected from the group consisting of compounds represented by general formulae (i-1) to (i-5) below:

[Chem. 3]

(i-1)

(i-2)

(i-3)

(i-4)

(i-5)

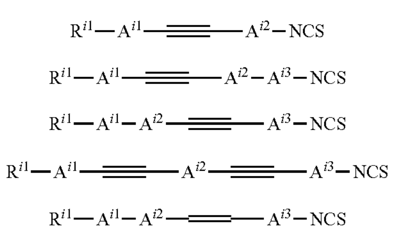

(in general formulae (i-1) to (i-5), $R^{i1}$, $A^{i1}$, $A^{i2}$, and $A^{i3}$ have the same meaning as $R^{i1}$, $A^{i1}$, $A^{i2}$, and $A^{i3}$, respectively, in general formula (i)).

Item 3. The liquid crystal composition according to item 1 or 2, further containing one or two or more of compounds represented by general formula (ii) below:

[Chem. 4]

(ii)

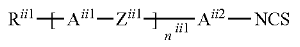

(in general formula (ii), $R^{ii1}$ represents an alkyl group having 1 to 20 carbon atoms, wherein one or two or more $—CH_2—$'s in the alkyl group are each independently optionally substituted with —O—, —S—, —CO—, and/or —CS—, one or two or more $—CH_2—CH_2—$'s in the alkyl group are each independently optionally substituted with —CH═CH—, —CO—O—, —O—CO—, —CO—S—, —S—CO—, —CO—NH—, —NH—CO—, —CF═CF—, and/or —C≡C—, one or two or more $—CH_2—CH_2—CH_2—$'s in the alkyl group are each independently optionally substituted with —O—CO—O—, and one or two or more hydrogen atoms in the alkyl group are each independently optionally substituted with a halogen atom, where oxygen atoms are not directly bonded to each other, and $A^{ii1}$ and $Ai^{i2}$ each independently represent a group selected from the group consisting of the following groups (a), (b), (c), and (d):

(a) a 1,4-cyclohexylene group (one $—CH_2—$ or two or more non-adjacent $—CH_2—$'s in this group are optionally substituted with —O— and/or —S—.);

(b) a 1,4-phenylene group (one —CH═ or two or more —CH═'s in this group are optionally substituted with —N═.);

(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N═.), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group (one —CH═ or two or more —CH═'s in this group are optionally substituted with —N═.), wherein one or two or more hydrogen atoms in $A^{ii1}$ and $A^{ii2}$ are each independently optionally substituted with a substituent $S^{ii1}$, the substituent $S^{ii1}$ represents a halogen atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, one or two or more $—CH_2—$'s in the alkyl group are each independently optionally substituted with —O—, —S—, —CO—, and/or —CS—, one or two or more $—CH_2—CH_2—$'s in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more $—CH_2—CH_2—CH_2—$'s in the alkyl group are each independently optionally substituted with —O—CO—O—, and one or two or more hydrogen atoms in the alkyl group are each independently optionally substituted with a halogen atom, where oxygen atoms are not directly bonded to each other, a plurality of substituents $S^{ii1}$, if present, may be the same or different, $Z^{ii1}$ represents a single bond or an alkylene group having 1 to 20 carbon atoms, one or two or more $—CH_2—$'s in the alkylene group are each independently optionally substituted with —O—, wherein one or two or more $—CH_2—CH_2—$'s in the alkylene group are each independently optionally substituted with $—CH_2—CH(CH_3)—$, $—CH(CH_3)—CH_2—$, —CH═CH—, —CF═CF—, $—CH═C(CH_3)—$, $—C(CH_3)═CH—$, —CH═N—, —N═CH—, —N═N—, —C≡C—, —CO—O—, and/or —O—CO— one or two or more $—CH_2—CH_2—CH_2—$'s in the alkylene group are each independently optionally substituted with —O—CO—O—, oxygen atoms are not directly bonded to each other, $n^{ii1}$ represents an integer of 1 to 4, and a plurality of $A^{ii1}$s and $Z^{ii1}$s, if present, may be the same or different from each other, where the compounds represented by general formula (i) are excluded).

Item 4. The liquid crystal composition according to any one of items 1 to 3, wherein a compound represented by general formula (ii) is selected from the group consisting of compounds represented by general formulae (ii-1) to (ii-7) below:

[Chem. 5]

$$R^{ii1}—A^{ii1}—A^{ii2}—NCS \quad \text{(ii-1)}$$

$$R^{ii1}—A^{ii1}—\equiv—A^{ii2}—NCS \quad \text{(ii-2)}$$

$$R^{ii1}—A^{ii1}—A^{ii1\text{-}2}—\equiv—A^{ii2}—NCS \quad \text{(ii-3)}$$

$$R^{ii1}—A^{ii1}—\equiv—A^{ii1\text{-}2}—\equiv—A^{ii2}—NCS \quad \text{(ii-4)}$$

$$R^{ii1}—A^{ii1}—A^{ii1\text{-}2}—A^{ii2}—NCS \quad \text{(ii-5)}$$

$$R^{ii1}—A^{ii1}—\equiv—A^{ii1\text{-}2}—A^{ii2}—NCS \quad \text{(ii-6)}$$

$$R^{ii1}—A^{ii1}—\equiv—A^{ii1\text{-}2}—\equiv—A^{ii2}—NCS \quad \text{(ii-7)}$$

(in general formulae (ii-1) to (ii-7), $R^{ii1}$, $A^{ii1}$, and $A^{ii2}$ have the same meaning as $R^{ii1}$, $A^{ii1}$, and $A^{ii2}$, respectively, in general formula (ii), and in general formulae (ii-3) to (ii-7), the definition of $A^{ii1\text{-}2}$ is the same as the definition of $A^{ii1}$ in general formula (ii)).

Item 5. The liquid crystal composition according to any one of items 1 to 4, further containing one or two or more of compounds represented by general formula (vi) below:

[Chem. 6]

$$R^{vi1}—A^{vi1}—\equiv—A^{vi2}\left[—Z^{vi1}—A^{vi3}—\right]_{n^{vi1}}R^{vi2} \quad \text{(vi)}$$

(in general formula (vi), $R^{vi1}$ represents a hydrogen atom or an alkyl group having 1 to 20 carbon atoms, wherein one or two or more —$CH_2$—'s in the alkyl group are each independently optionally substituted with —O—, —S—, —CO—, and/or —CS—, one or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, $R^{vi2}$ represents a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, or an alkyl group having 1 to 20 carbon atoms, wherein one or two or more —$CH_2$—'s in the alkyl group are each independently optionally substituted with —O—, —S—, —CO—, and/or —CS—, one or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, $A^{vi1}$, $A^{vi2}$, and $A^{vi3}$ each independently represent a hydrocarbon ring having 3 to 16 carbon atoms or a hetero ring having 3 to 16 carbon atoms, wherein one or two or more hydrogen atoms in $A^{vi1}$, $A^{vi2}$, and $A^{vi3}$ are each independently optionally substituted with a substituent $S^{vi1}$, the substituent $S^{vi1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, one or two or more —$CH_2$—'s in the alkyl group are each independently optionally substituted with —O—, —S—, and/or —CO—, one or two or more —$CH_2$—$CH_2$—'s in the alkyl group are each independently optionally substituted with —CH═CH—, —CF═CF—, —C≡C—, —CO—O—, —O—CO—, —CO—S—, —S—CO—, —CO—NH—, and/or —NH—CO—, one or two or more —$CH_2$—$CH_2$—$CH_2$—'s in the alkyl group are optionally substituted with —O—CO—O—, and one or two or more hydrogen atoms in the alkyl group are each independently optionally substituted with a halogen atom, where oxygen atoms are not directly bonded to each other, a plurality of substituents $S^{vi1}$, if present, may be the same or different, $Z^{vi1}$ each independently represents a single bond or an alkylene group having 1 to 20 carbon atoms, wherein one or two or more —$CH_2$—'s in the alkylene group are each independently optionally substituted with —O—, —$CF_2$—, and/or —CO—, one or two or more —$CH_2$—$CH_2$—'s in the alkylene group are each independently optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—, and one or two or more —$CH_2$—$CH_2$—$CH_2$—'s in the alkylene group are each independently optionally substituted with —O—CO—O—, where oxygen atoms are not directly bonded to each other, $n^{vi1}$ represents an integer of 1 to 3, and a plurality of $A^{vi1}$s and $Z^{vi1}$s, if present, may be the same or different from each other).

Item 6. The liquid crystal composition according to any one of items 1 to 5, further containing one or two or more of compounds represented by general formula (vii) below:

[Chem. 7]

$$R^{vii1}—A^{vii1}—C\equiv C—A^{vii2}—N=N—A^{vii3}—R^{vii2} \quad \text{(vii)}$$

(in general formula (vii), $R^{vii1}$ and $R^{vii2}$ each independently represent a halogen atom, a cyano group, or an alkyl group having 1 to 20 carbon atoms, wherein one or two or more —$CH_2$—'s in the alkyl group are each independently optionally substituted with —O—, —S—, —CO—, and/or —CS—, one or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, $A^{vii1}$, $A^{vii2}$, and $A^{vii3}$ each independently represent a group selected from the group consisting of the following groups (a), (b), and (c):

(a) a 1,4-cyclohexylene group (one —$CH_2$— or two or more non-adjacent —$CH_2$—'s in this group are optionally substituted with —O—.);

(b) a 1,4-phenylene group (one —CH═ or two or more —CH═'s in this group are optionally substituted with —N═.), and (c) a naphthalene-1,4-diyl group, a naphthalene-2,6-diyl group, a 1,2,3,4-tetrahydronaphthalene-2,6-diyl group, or a decahydronaphthalene-2,6-diyl group (one —CH═ or two or more —CH═'s in the naphthalene-1,4-diyl group, naphthalene-2,6-diyl group, or 1,2,3,4-tetrahydronaphthalene-2,6-diyl group are optionally substituted with —N═.), and wherein one or two or more hydrogen atoms in the above groups (a), (b), and (c) are each independently optionally substituted with a halogen atom, a cyano group, or an alkyl group having 1 to 6 carbon atoms).

Item 7. The liquid crystal composition according to any one of items 1 to 6, further containing one or two or more of compounds represented by general formula (v) below:

[Chem. 8]

$$R^{v1}—\left[A^{v1}—Z^{v1}\right]_{n^{v1}}—A^{v2}—CN \quad \text{(v)}$$

(in general formula (v), $R^{v1}$ represents an alkyl group having 1 to 20 carbon atoms, wherein one or two or more —$CH_2$—'s in the alkyl group are each independently optionally substituted with —O—, —S—, —CO— and/or —CS—, one or two or more —$CH_2$—$CH_2$—'s in the alkyl group are each independently optionally substituted with —CH═CH—, —CO—O—, —O—CO—, and/or —C≡C—, and one or two or more hydrogen atoms in the alkyl group are each independently optionally substituted with a halogen atom, where oxygen atoms are not directly bonded to each other, and $A^{v1}$ and $A^{v2}$ each independently represent a group selected from the group consisting of the following groups (a), (b), (c), and (d):

(a) a 1,4-cyclohexylene group (one —$CH_2$— or two or more non-adjacent —$CH_2$—'s in this group are optionally substituted with —O— and/or —S—.);

(b) a 1,4-phenylene group (one —CH═ or two or more —CH═'s in this group are optionally substituted with —N═.);

(c) a naphthalene-2,6-diyl group, a 1,2,3,4-tetrahydronaphthalene-2,6-diyl group, or a decahydronaphthalene-2,6-diyl group (one —CH═ or two or more —CH═'s in the naphthalene-2,6-diyl group or 1,2,3,4-tetrahydronaphthalene-2,6-diyl group are optionally substituted with —N═.), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH═ or two or more —CH═'s in this group are optionally substituted with —N═.), wherein one or two or more hydrogen atoms in $A^{v1}$ and $A^{v2}$ are each independently optionally substituted with a substituent $S^{v1}$, the substituent $S^{v1}$ represents a halogen atom, a cyano group, or an alkyl group having 1 to 6 carbon atoms, one or two or more —$CH_2$—'s in the alkyl group are each independently optionally substituted with —O—, —S—, —CO—, and/or —CS—, and one or two or more hydrogen atoms in the alkyl group are each independently optionally substituted with a halogen atom, where oxygen atoms are not directly bonded to each other, a plurality of substituents $S^{v1}$, if present, may be the same or different, and $Z^{v1}$ represents a single bond, —C≡C—, —CH═CH—, or —CF═CF—, where at least one of $Z^{v1}$s represents —C≡C—, $n^{v1}$ represents an integer of 1 or 2, and a plurality of $A^{v1}$s and $Z^{v1}$s, if present, may be the same or different from each other).

Item 8. The liquid crystal composition according to any one of items 1 to 7, further containing one or two or more of compounds represented by general formulae (np-1) to (np-3) below:

[Chem. 9]

(np-1)

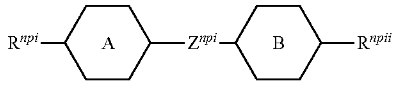

-continued (np-2)

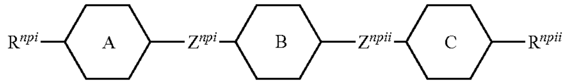

(np-3)

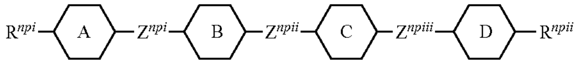

(in general formulae (np-1) to (np-3), $R^{npi}$ and $R^{npii}$ each independently represent an alkyl group having 1 to 20 carbon atoms or a halogen atom, wherein one or two or more —$CH_2$—'s in the alkyl group are each independently optionally substituted with —O—, —S—, —CO—, and/or —CS—, one or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, and rings A, B, C, and D each independently represent a group selected from the group consisting of the following groups (a), (b), (c), and (d):

(a) a 1,4-cyclohexylene group (one —$CH_2$— or two or more non-adjacent —$CH_2$—'s in this group are optionally substituted with —O—.);

(b) a 1,4-phenylene group (one —CH═ or two or more —CH═'s in this group are optionally substituted with —N═.);

(c) a naphthalene-2,6-diyl group, a 1,2,3,4-tetrahydronaphthalene-2,6-diyl group, or a decahydronaphthalene-2,6-diyl group (one —CH═ or two or more —CH═'s in the naphthalene-2,6-diyl group or 1,2,3,4-tetrahydronaphthalene-2,6-diyl group are optionally substituted with —N═.), and (d) a 1,4-cyclohexenylene group, a 1,3-dioxane-trans-2,5-diyl group, a pyrimidine-2,5-diyl group, or a pyridine-2,5-diyl group, wherein one or two or more hydrogen atoms in the rings A, B, C, and D are each independently optionally substituted with a substituent $S^{npi1}$, the substituent $S^{npi1}$ represents a halogen atom, a cyano group, or an alkyl group having 1 to 20 carbon atoms, one or two or more —$CH_2$—'s in the alkyl group are each independently optionally substituted with —O—, —S—, —CO—, and/or —CS—, one or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, a plurality of substituents $S^{npi1}$ if present, may be the same or different, and $Z^{npi}$, $Z^{npii}$, and $Z^{npiii}$ each independently represent a single bond or an alkylene group having 1 to 20 carbon atoms, wherein one or two or more —$CH_2$—'s in the alkylene group are each independently optionally substituted with —O—, one or two or more —$CH_2$—$CH_2$—'s in the alkylene group are each independently optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—, and one or two or more —$CH_2$—$CH_2$—$CH_2$—'s in the alkylene group are each independently optionally substituted with —O—CO—O—, where oxygen atoms are not directly bonded to each other).

Item 9. The liquid crystal composition according to any one of items 1 to 8, wherein Δn at 25° C. and 589 nm is 0.38 or larger.

Item 10. A liquid crystal display element using the liquid crystal composition according to any one of items 1 to 9.

Item 11. The liquid crystal display element according to item 10, wherein the liquid crystal display element is driven by an active matrix system or a passive matrix system.

Item 12. A liquid crystal display element, wherein a dielectric constant is reversely switched by reversely changing an orientation direction of liquid crystal molecules of the liquid crystal composition according to any one of items 1 to 9.

Item 13. A sensor using the liquid crystal composition according to any one of items 1 to 9.

Item 14. A liquid crystal lens using the liquid crystal composition according to any one of items 1 to 9.

Item 15. An optical communication device using the liquid crystal composition according to any one of items 1 to 9.

Item 16. An antenna using the liquid crystal composition according to any one of items 1 to 9.

Item 17. The antenna according to item 16, including:

a first substrate having a plurality of slots;

a second substrate facing the first substrate and having a power feed section;

a first dielectric layer provided between the first substrate and the second substrate;

a plurality of patch electrodes disposed corresponding to the slots;

a third substrate having the patch electrodes; and a liquid crystal layer provided between the first substrate and the third substrate, wherein the liquid crystal layer contains the liquid crystal composition according to any one of items 1 to 9.

Item 18. A compound represented by general formula (i) below:

[Chem. 10]

$$R^{i1}—A^{i1}—Z^{i1}—A^{i2}—(Z^{i2}—A^{i3})_{n^{i1}}—NCS \quad (i)$$

(in general formula (i), $R^{i1}$ represents an alkynyl group having 2 to 20 carbon atoms, wherein one or two or more —$CH_2$—'s in the alkynyl group are each independently optionally substituted with —O—, —S—, —CO—, and/or —CS—, one or two or more —$CH_2$—$CH_2$—'s in the alkynyl group are each independently optionally substituted with —CO—O—, —O—CO—, —CO—S—, —S—CO—, —CO—NH—, —NH—CO—, —CH═CH—, —CF═CF—, and/or —C≡C—, one or two or more —$CH_2$—$CH_2$—$CH_2$—'s in the alkynyl group are each independently optionally substituted with —O—CO—O—, and one or two or more hydrogen atoms in the alkynyl group are each independently optionally substituted with a halogen atom, where oxygen atoms are not directly bonded to each other, and $A^{i1}$, $A^{i2}$, and $A^{i3}$ each independently represent a hydrocarbon ring having 3 to 16 carbon atoms or a hetero ring having 3 to 16 carbon atoms, wherein one or two or more hydrogen atoms in $A^{i1}$, $A^{i2}$, and $A^{i3}$ are each independently optionally substituted with a substituent $S^{i1}$, the substituent $S^{i1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, one or two or more —$CH_2$—'s in the alkyl group are each independently optionally substituted with —O—, —S—, and/or —CO—, one or two or more —$CH_2$—$CH_2$—'s in the alkyl group are each independently optionally substituted with —CH═CH—, —CF═CF—, —C≡C—, —CO—O—, —O—CO—, —CO—S—, —S—CO—, —CO—NH—, and/or —NH—CO—, one or two or more —$CH_2$—$CH_2$—$CH_2$—'s in the alkyl group are each independently optionally substituted with —O—CO—O—, and one or two or more hydrogen atoms in the alkyl group are each independently optionally substituted with a halogen atom, where oxygen atoms are not directly bonded to each other, a plurality of substituents $S^{i1}$, if present, may be the same or different, $Z^{i1}$ and $Z^{i2}$ each independently represent a single bond or an alkylene group having 1 to 20 carbon atoms, one or two or more —$CH_2$—'s in the alkylene group are each independently optionally substituted with —O—, —$CF_2$—, and/or —CO—, and one or two or more —$CH_2$—$CH_2$—'s in the alkylene group are each independently optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—, where oxygen atoms are not directly bonded to each other, and $n^{i1}$ represents an integer of 0 or 1).

Advantageous Effects of Invention

The present invention provides the liquid crystal composition containing one or two or more of compounds represented by general formula (i) having an alkynyl group and an isothiocyanate group (—NCS) to obtain a liquid crystal composition with high $T_{ni}$, large $\Delta n$, low $V_{th}$, large $\Delta\varepsilon_r$, small tan $\delta_{iso}$, and satisfactory storability at low temperatures. The liquid crystal composition is useful for liquid crystal display elements, sensors, liquid crystal lenses, optical communication devices, and antennas.

DESCRIPTION OF EMBODIMENTS (Compounds Represented by General Formula (i))

A compound according to the present invention is represented by general formula (i) below having an alkynyl group and an isothiocyanate group (—NCS).

A liquid crystal composition according to the present invention contains one or two or more of compounds represented by general formula (i) having an alkynyl group and an isothiocyanate group (—NCS).

[Chem. 11]

$$R^{i1}—A^{i1}—Z^{i1}—A^{i2}—(Z^{i2}—A^{i3})_{n^{i1}}—NCS \quad (i)$$

In general formula (i), $R^{i1}$ represents an alkynyl group having 2 to 20 carbon atoms.

The alkynyl group having 2 to 20 carbon atoms is a linear, branched, or cyclic alkynyl group, and preferably a linear alkynyl group.

The number of carbon atoms in the alkynyl group having 2 to 20 carbon atoms is preferably 2 to 15, and preferably 3 to 10.

One or two or more —$CH_2$—'s in the alkynyl group are each independently optionally substituted with —O—, —S—, —CO—, and/or —CS—.

One or two or more —$CH_2$—$CH_2$—'s in the alkynyl group are each independently optionally substituted with —CO—O—, —O—CO—, —CO—S—, —S—CO—, —CO—NH—, —NH—CO—, —CH═CH—, —CF═CF—, and/or —C≡C—.

One or two or more —$CH_2$—$CH_2$—$CH_2$—'s in the alkynyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

The alkynyl group is preferably an alkynyl group represented by formula ($R^{i1}$-A) below, in terms of ease of synthesis and elongation of a conjugated system.

[Chem. 12]

($R^{i1}$-A)

In formula ($R^{i1}$-A), $R^{i1A}$ represents an alkyl group having 1 to 18 carbon atoms.

The alkyl group having 1 to 18 carbon atoms is a linear, branched, or cyclic alkyl group, and preferably a linear alkyl group.

The number of carbon atoms in the alkyl group having 1 to 18 carbon atoms is preferably 1 to 8.

One or two or more —$CH_2$—'s in the alkyl group are each independently optionally substituted with —O—, —S—, —CO—, and/or —CS—.

One or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—.

One or two or more —$CH_2$—$CH_2$—$CH_2$—'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

In formula ($R^{i1}$-A), the black dot represents a bond with $A^{i1}$.

Specific examples of the alkynyl group having 2 to 20 carbon atoms (including substituted ones) in $R^{i1}$ include groups represented by formulae ($R^{i1}$-1) to ($R^{i1}$-16).

[Chem. 13]

($R^{i1}$-1)

($R^{i1}$-2)

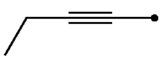

($R^{i1}$-3)

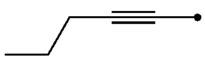

($R^{i1}$-4)

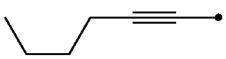

($R^{i1}$-5)

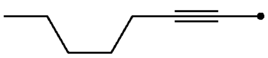

($R^{i1}$-6)

-continued

($R^{i1}$-7)

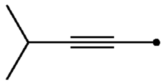

($R^{i1}$-8)

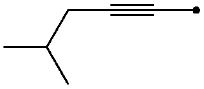

($R^{i1}$-9)

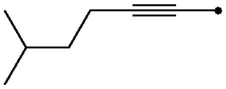

($R^{i1}$-10)

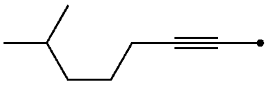

(R-$^{i1}$-11)

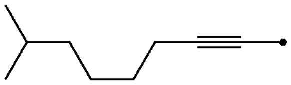

($R^{i1}$-12)

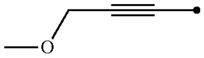

($R^{i1}$-13)

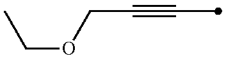

($R^{i1}$-14)

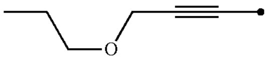

($R^{i1}$-15)

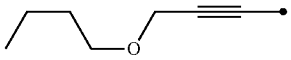

($R^{i1}$-16)

In formulae ($R^{i1}$-1) to ($R^{i1}$-16), the black dot represents a bond with $A^{i1}$.

$R^{i1}$ is preferably a linear alkynyl group having 2 to 8 carbon atoms, in terms of Δn and solubility.

In general formula (i), $A^{i1}$, $A^{i2}$, and $A^{i3}$ each independently represent a hydrocarbon ring having 3 to 16 carbon atoms or a hetero ring having 3 to 16 carbon atoms.

More specifically, the hydrocarbon ring having 3 to 16 carbon atoms or the hetero ring having 3 to 16 carbon atoms preferably represents a group selected from the group consisting of the following groups (a), (b), (c), and (d):

(a) a 1,4-cyclohexylene group (one —$CH_2$— or two or more non-adjacent —$CH_2$—'s in this group are optionally substituted with —O— and/or —S—.);

(b) a 1,4-phenylene group (one —CH═ or two or more —CH═'s in this group are optionally substituted with —N═.);

(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N=.), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group (one —CH= or two or more non-adjacent —CH='s in this group are optionally substituted with —N=.).

One or two or more hydrogen atoms in $A^{i1}$, $A^{i2}$, and $A^{i3}$ are each independently optionally substituted with a substituent $S^{i1}$.

The substituent $S^{i1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms.

The alkyl group is a linear, branched, or cyclic alkyl group, and preferably a linear alkyl group.

The number of carbon atoms in the alkyl group is preferably 1 to 10, and preferably 1 to 6.

One or two or more $—CH_2—$'s in the alkyl group are each independently optionally substituted with —O—, —S—, and/or —CO—.

One or two or more $—CH_2—CH_2—$'s in the alkyl group are each independently optionally substituted with —CH=CH—, —CF=CF—, —C≡C—, —CO—O—, —O—CO—, —CO—S—, —S—CO—, —CO—NH—, and/or —NH—CO—.

One or two or more $—CH_2—CH_2—CH_2—$'s in the alkyl group are optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

The substituent $S^{i1}$ is preferably a halogen atom or a linear alkyl group having 1 to 6 carbon atoms, and preferably a fluorine atom or a linear alkyl group having 1 to 3 carbon atoms.

At least one of $A^{i2}$ and $A^{i3}$ are preferably substituted with at least one substituent $S^{i1}$, preferably substituted with a halogen atom, and preferably substituted with a fluorine atom.

A plurality of substituents $S^{i1}$, if present, may be the same or different.

As the substitution position of the substituent $S^{i1}$ in $A^{i1}$, any of formulae ($A^{i1}$-SP-1) to ($A^{i1}$-SP-4) below is preferred.

[Chem. 14]

($A^{i1}$-SP-1)

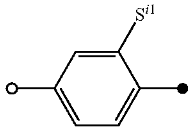

-continued ($A^{i1}$-SP-2)

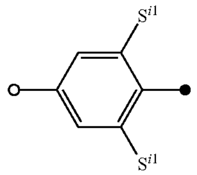

($A^{i1}$-SP-3)

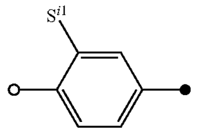

($A^{i1}$-SP-4)

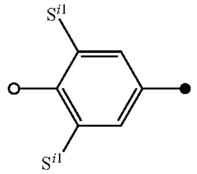

In formulae ($A^{i1}$-SP-1) to ($A^{i1}$-SP-4), a white dot represents a bond with $R^{i1}$, and a black dot represents a bond with $Z^{i1}$.

As the substitution position of the substituent $S^{i1}$ in $A^{i2}$, any of formulae ($A^{i2}$-SP-1) to ($A^{i2}$-SP-3) below is preferred.

[Chem. 15]

($A^{i2}$-SP-1)

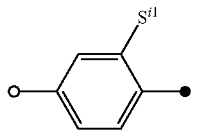

($A^{i2}$-SP-2)

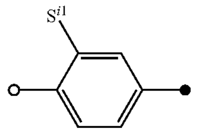

($A^{i2}$-SP-3)

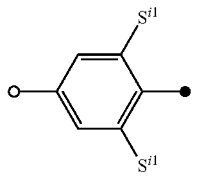

In formulae ($A^{i2}$-SP-1) to ($A^{i2}$-SP-3), a white dot represents a bond with $Z^{i1}$, and a black dot represents a bond with $Z^{i2}$ or the isothiocyanate group (—NCS).

As the substitution position of the substituent $S^{i1}$ in $A^{i3}$, any of formulae ($A^{i3}$-SP-1) to ($A^{i3}$-SP-2) below is preferred.

[Chem. 16]

($A^{i3}$-SP-1)

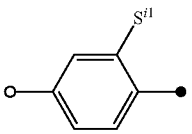

($A^{i3}$-SP-2)

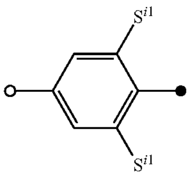

In formulae ($A^{i3}$-SP-1) to ($A^{i3}$-SP-2), a white dot represents a bond with $Z^{i2}$, and a black dot represents a bond with an isothiocyanate group (—NCS).

More specifically, $A^{i1}$ preferably represents any of formulae ($A^{i1}$-1) to ($A^{i1}$-15) below.

[Chem. 17]

($A^{i1}$-1)

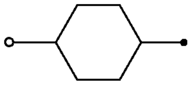

($A^{i1}$-2)

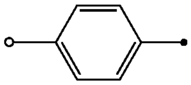

($A^{i1}$-3)

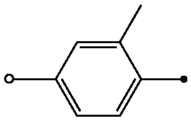

($A^{i1}$-4)

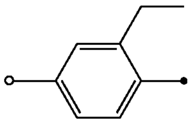

($A^{i1}$-5)

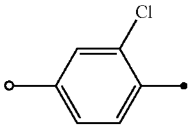

($A^{i1}$-6)

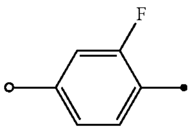

($A^{i1}$-7)

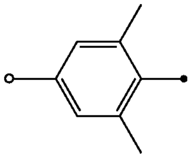

-continued ($A^{i1}$-8)

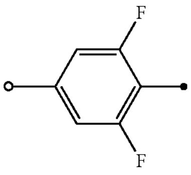

($A^{i1}$-9)

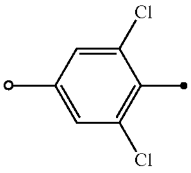

($A^{i1}$-10)

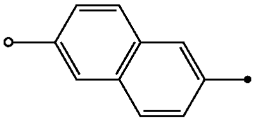

($A^{i1}$-11)

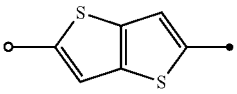

($A^{i1}$-12)

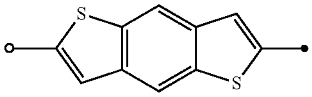

($A^{i1}$-13)

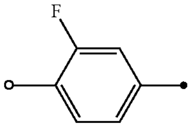

($A^{i1}$-14)

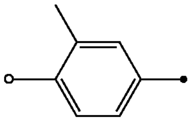

($A^{i1}$-15)

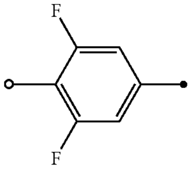

In formulae ($A^{i1}$-1) to ($A^{i1}$-15), a white dot represents a bond with $R^{i1}$, and a black dot represents a bond with $Z^{i1}$.

In terms of solubility, Δn and/or $\Delta\varepsilon_r$, $A^{i1}$ particularly preferably represents formula ($A^{i1}$-2), ($A^{i1}$-3), ($A^{i1}$-6), or ($A^{i1}$-8).

More specifically, $A^{i2}$ preferably represents any of formulae ($A^{i2}$-1) to ($A^{i2}$-15) below.

[Chem. 18]

($A^{i2}$-1)

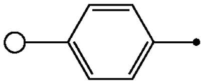

-continued ($A^{i2}$-2)

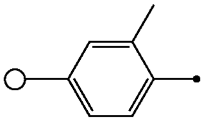

($A^{i2}$-3)

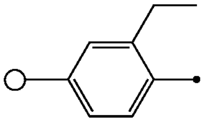

($A^{i2}$-4)

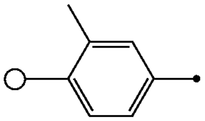

($A^{i2}$-5)

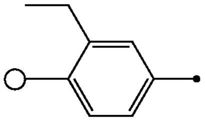

($A^{i2}$-6)

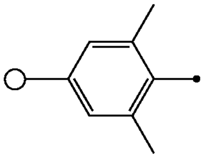

($A^{i2}$-7)

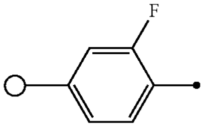

($A^{i2}$-8)

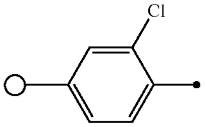

($A^{i2}$-9)

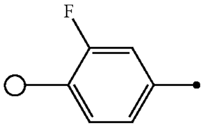

($A^{i2}$-10)

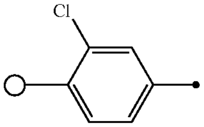

($A^{i2}$-11)

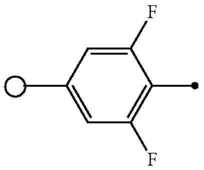

-continued ($A^{i2}$-12)

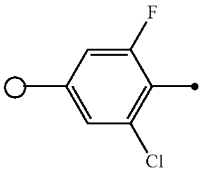

($A^{i2}$-13)

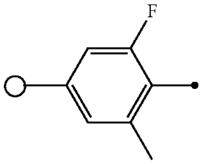

($A^{i2}$-14)

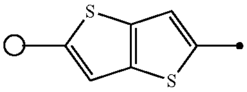

($A^{i2}$-15)

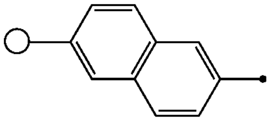

In formulae ($A^{i2}$-1) to ($A^{i2}$-15), a white dot represents a bond with $Z^{i1}$, and a black dot represents a bond with $Z^{i2}$ or the isothiocyanate group (—NCS).

In terms of Δn and/or $\Delta\varepsilon_r$, $A^{i2}$ even more preferably represents formula ($A^{i2}$-1), ($A^{i2}$-2), ($A^{i2}$-6), or ($A^{i2}$-13), and particularly preferably represents ($A^{i2}$-1) or ($A^{i2}$-13).

More specifically, $A^{i3}$ preferably represents any of formulae ($A^{i3}$-1) to ($A^{i3}$-5) below.

[Chem. 19]

($A^{i3}$-1)

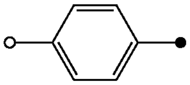

($A^{i3}$-2)

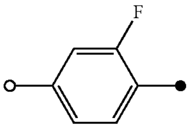

($A^{i3}$-3)

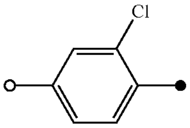

($A^{i3}$-4)

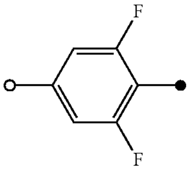

-continued ($A^{i3}$-5)

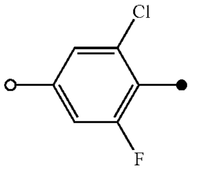

In formulae ($A^{i3}$-1) to ($A^{i3}$-5), a white dot represents a bond with $Z^{i2}$, and a black dot represents a bond with the isothiocyanate group (—NCS).

In terms of Δn and/or $\Delta\varepsilon_r$, $A^{i3}$ even more preferably represents formula ($A^{i3}$-1), ($A^{i3}$-2), or ($A^{i3}$-4), and particularly preferably represents ($A^{i3}$-4).

In general formula (i), $Z^{i1}$ and $Z^{i2}$ each independently represent a single bond or an alkylene group having 1 to 20 carbon atoms.

The alkylene group is a linear, branched, or cyclic alkylene group, and preferably a linear alkylene group.

The number of carbon atoms in the alkylene group is preferably 2 to 10, and preferably 2 to 6.

One or two or more $—CH_2—$'s in the alkylene group are each independently optionally substituted with —O—, $—CF_2—$, and/or —CO—.

One or two or more $—CH_2—CH_2—$'s in the alkylene group are each independently optionally substituted with $—CH_2—CH(CH_3)—$, $—CH(CH_3)—CH_2—$, —CH═CH—, —CF═CF—, $—CH═C(CH_3)—$, $—C(CH_3)═CH—$, —CH═N—, —N═CH—, —N═N—, —C≡C—, —CO—O—, and/or —O—CO—.

However, when the alkylene group is substituted with a predetermined group, oxygen atoms are not directly bonded to each other.

Specific examples of the alkylene group having 2 to 20 carbon atoms (including substituted ones) include groups represented by formulae ($Z^{i1/2}$-1) to ($Z^{i1/2}$-24).

[Chem. 20]

($Z^{i1/2}$-1)

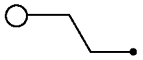

($Z^{i1/2}$-2)

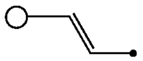

($Z^{i1/2}$-3)

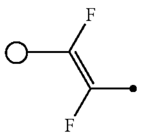

($Z^{i1/2}$-4)

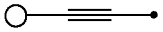

($Z^{i1/2}$-5)

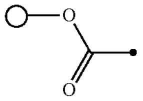

($Z^{i1/2}$-6)

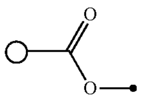

-continued ($Z^{i1/2}$-7)

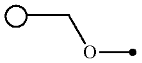

($Z^{i1/2}$-8)

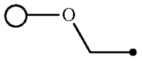

($Z^{i1/2}$-9)

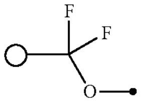

($Z^{i1/2}$-10)

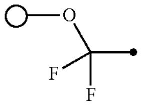

($Z^{i1/2}$-11)

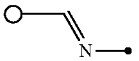

($Z^{i1/2}$-12)

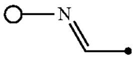

($Z^{i1/2}$-13)

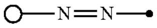

($Z^{i1/2}$-14)

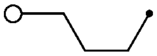

($Z^{i1/2}$-15)

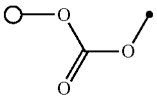

($Z^{i1/2}$-16)

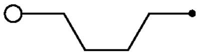

($Z^{i1/2}$-17)

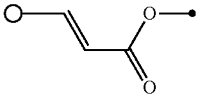

($Z^{i1/2}$-18)

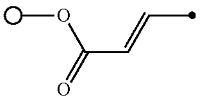

($Z^{i1/2}$-19)

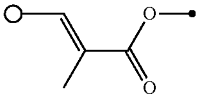

($Z^{i1/2}$-20)

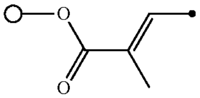

($Z^{i1/2}$-21)

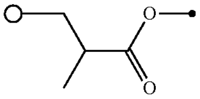

($Z^{i1/2}$-22)

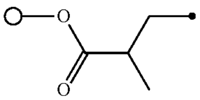

-continued

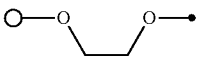

($Z^{i1/2}$-23)

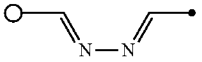

($Z^{i1/2}$-24)

In formulae ($Z^{i1/2}$-1) to ($Z^{i1/2}$-24), a white dot represents a bond with $A^{i1}$ or $A^{i2}$, and a black dot represents a bond with $A^{i2}$ or $A^{i3}$.

In terms of Δn and/or $\Delta\varepsilon_r$, $Z^{i1}$ and $Z^{i2}$ are preferably each independently a single bond or —C≡C—.

In terms of Δn and/or $\Delta\varepsilon_r$, at least one of $Z^{i1}$ and $Z^{i2}$ are preferably —C≡C—.

In general formula (i), $n^{i1}$ represents an integer of 0 or 1.

A compound represented by general formula (i) is preferably a compound represented by one of general formulae (i-1) to (i-5) below.

[Chem. 21]

$$R^{i1}-A^{i1}\equiv A^{i2}-NCS \quad \text{(i-1)}$$

$$R^{i1}-A^{i1}\equiv A^{i2}-A^{i3}-NCS \quad \text{(i-2)}$$

$$R^{i1}-A^{i1}-A^{i2}\equiv A^{i3}-NCS \quad \text{(i-3)}$$

$$R^{i1}-A^{i1}\equiv A^{i2}\equiv A^{i3}-NCS \quad \text{(i-4)}$$

$$R^{i1}-A^{i1}-A^{i2}\equiv A^{i3}-NCS \quad \text{(i-5)}$$

In general formulae (i-1) to (i-5), $R^{i1}$, $A^{i1}$, $A^{i2}$, and $A^{i3}$ have the same meaning as $R^{i1}$, $A^{i1}$, $A^{i2}$, and $A^{i3}$, respectively, in general formula (i), and preferable groups are also the same.

A compound represented by general formula (i-1) is preferably a compound represented by one of general formulae (i-1-1) to (i-1-7) below.

[Chem. 22]

(i-1-1)

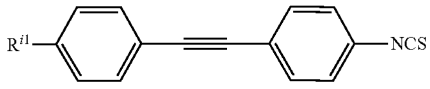

(i-1-2)

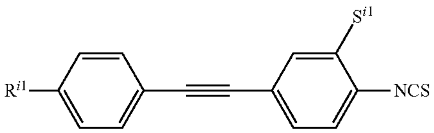

(i-1-3)

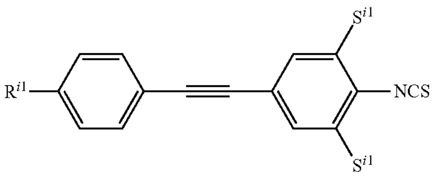

-continued (i-1-4)

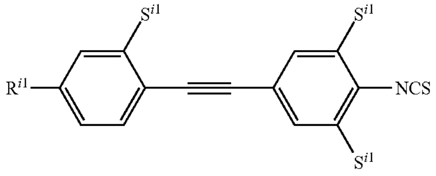

(i-1-5)

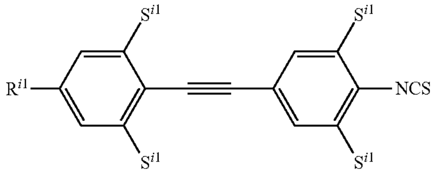

(i-1-6)

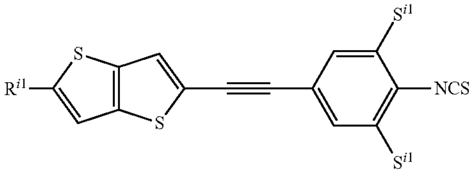

(i-1-7)

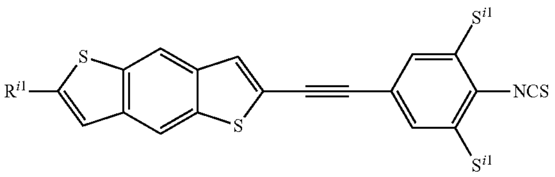

In general formulae (i-1-1) to (i-1-7), $R^{i1}$ and $S^{i1}$ each independently have the same meaning as $R^{i1}$ and $S^{i1}$ in general formula (i).

Specific examples of compounds represented by general formula (i-1-1) include compounds represented by structural formulae (i-1-1.1) to (i-1-1.4) below.

[Chem. 23]

(i-1-1.1)

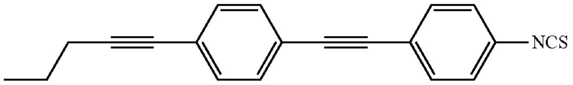

(i-1-1.2)

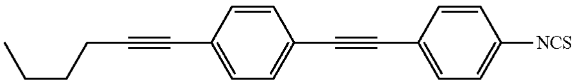

(i-1-1.3)

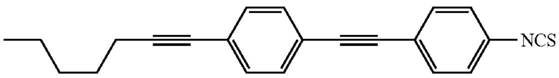

(i-1-1.4)

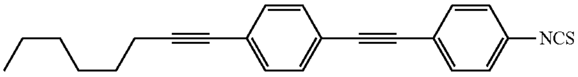

Specific examples of compounds represented by general formula (i-1-2) include compounds represented by structural formulae (i-1-2.1) to (i-1-2.5) below.

[Chem. 24]

(i-1-2.1)

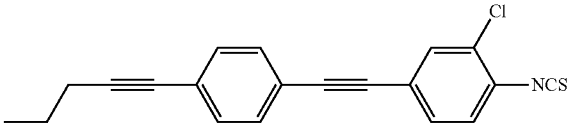

(i-1-2.2)

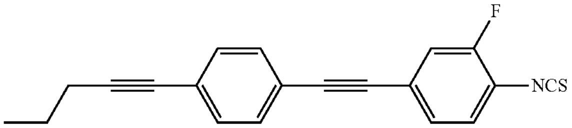

(i-1-2.3)

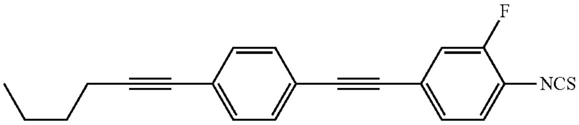

(i-1-2.4)

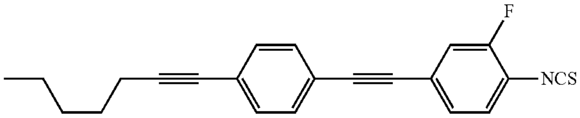

(i-1-2.5)

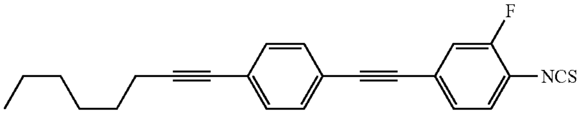

Specific examples of compounds represented by general formula (i-1-3) include compounds represented by structural formulae (i-1-3.1) to (i-1-3.4) below.

[Chem. 25]

(i-1-3.1)

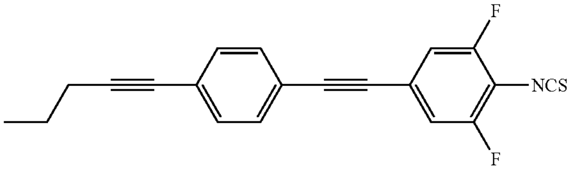

(i-1-3.2)

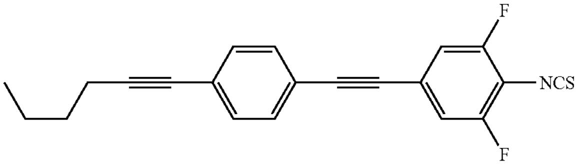

(i-1-3.3)

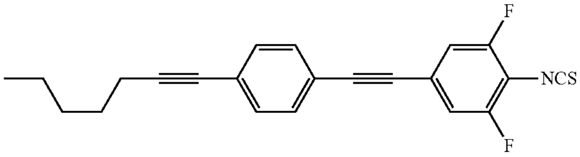

-continued (i-1-3.4)

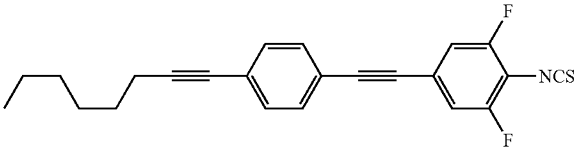

Specific examples of compounds represented by general formula (i-1-4) include compounds represented by structural formulae (i-1-4.1) to (i-1-4.4) below.

[Chem. 26]

(i-1-4.1)

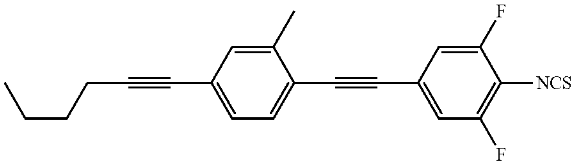

(i-1-4.2)

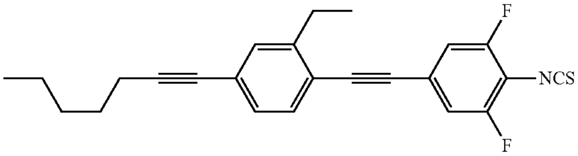

(i-1-4.3)

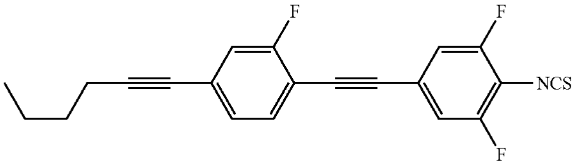

(i-1-4.4)

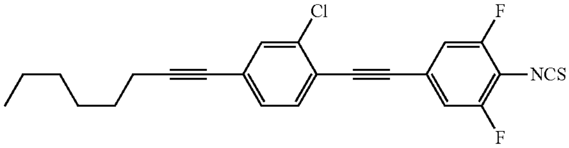

Specific examples of compounds represented by general formula (i-1-5) include compounds represented by structural formulae (i-1-5.1) to (i-1-5.4) below.

[Chem. 27]

(i-1-5.1)

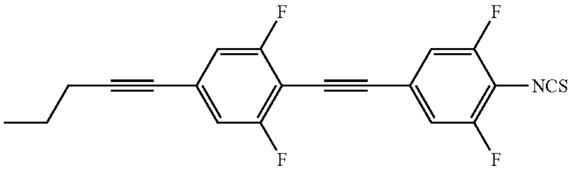

-continued
(i-1-5.2)
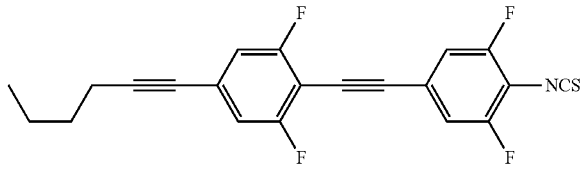
(i-1-5.3)
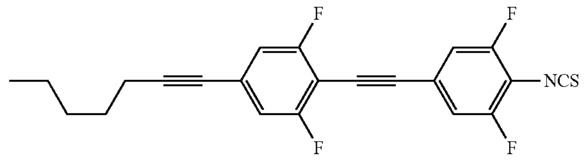
(i-1-5.4)
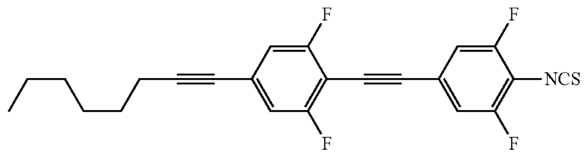
Specific examples of compounds represented by general formula (i-1-6) include compounds represented by structural formulae (i-1-6.1) to (i-1-6.4) below.
[Chem. 28]
(i-1-6.1)
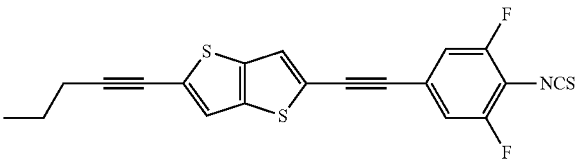
(i-1-6.2)
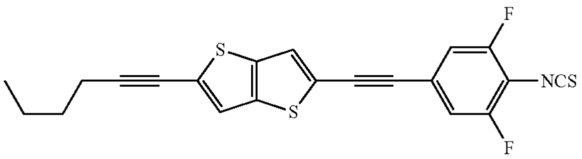
(i-1-6.3)
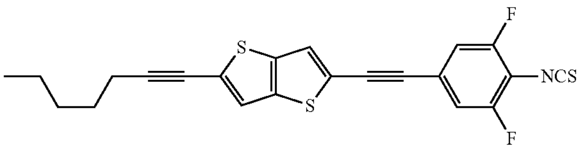
(i-1-6.4)
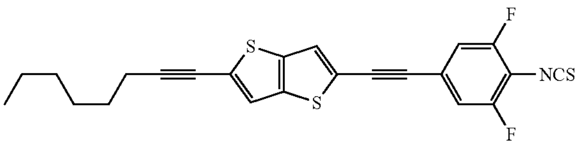
Specific examples of compounds represented by general formula (i-1-7) include compounds represented by structural formulae (i-1-7.1) to (i-1-7.4) below.
[Chem. 29]
(i-1-7.1)
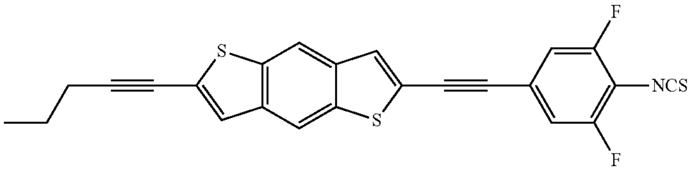
(i-1-7.2)
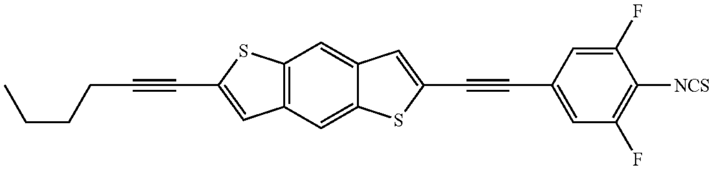
(i-1-7.3)
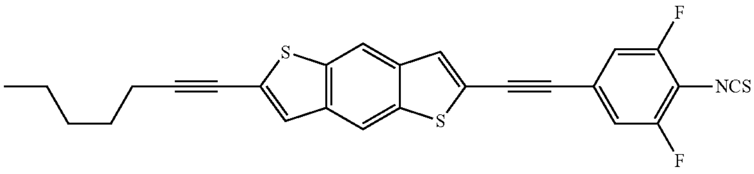

-continued
(i-1-7.4)
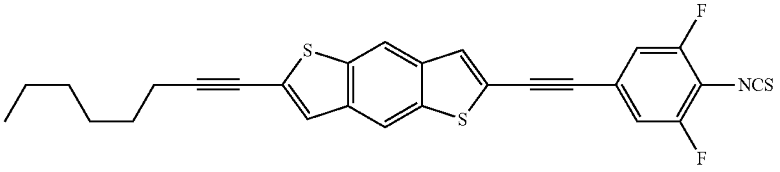
A compound represented by general formula (i-2) is preferably a compound represented by one of general formulae (i-2-1) to (i-2-15) below.
[Chem. 30]
(i-2-1)
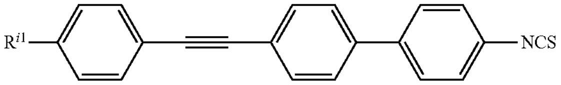
(i-2-2)
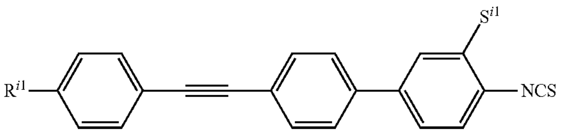
(i-2-3)
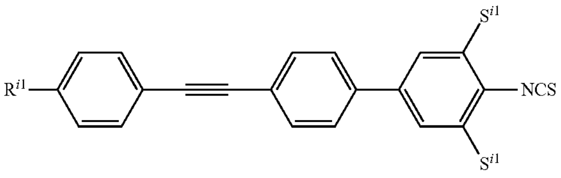
(i-2-4)
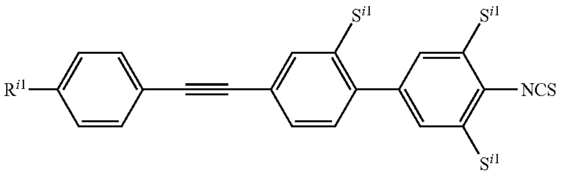
(i-2-5)
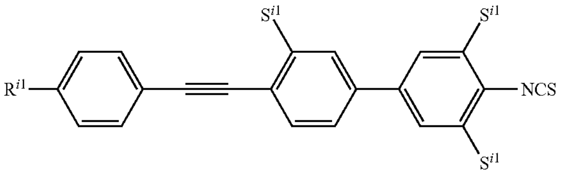
(i-2-6)
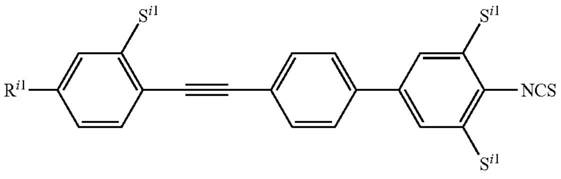
-continued
[Chem. 31]
(i-2-7)
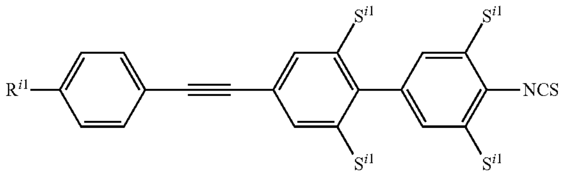
(i-2-8)
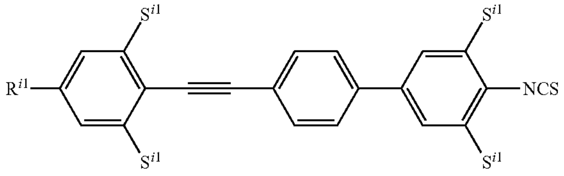
(i-2-9)
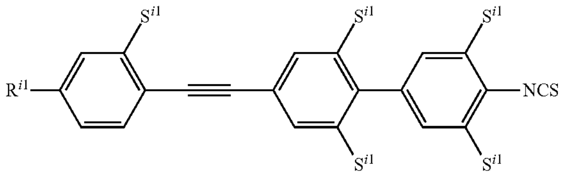
(i-2-10)
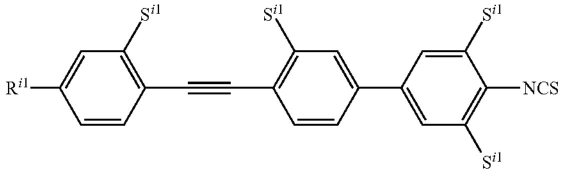
(i-2-11)
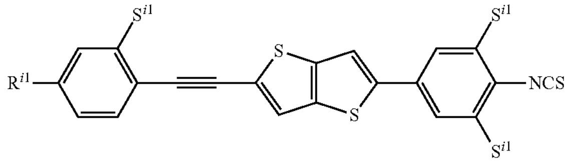
(i-2-12)
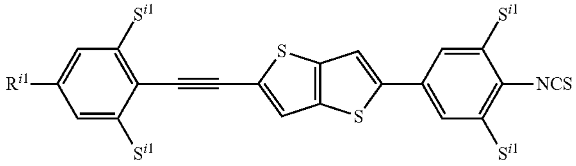

-continued

[Chem. 32]

(i-2-13)

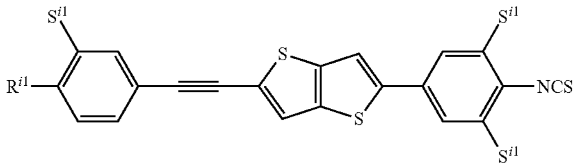

(i-2-14)

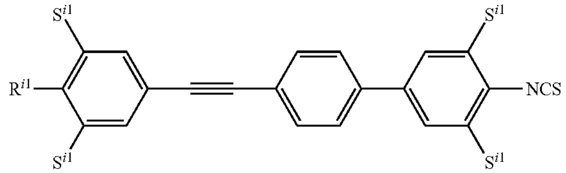

-continued (i-2-15)

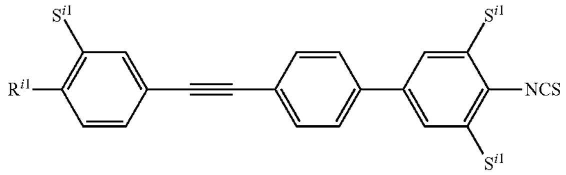

In general formulae (i-2-1) to (i-2-15), $R^{i1}$ and $S^{i1}$ each independently have the same meaning as $R^{i1}$ and $S^{i1}$ in general formula (i).

Specific examples of compounds represented by general formula (i-2-1) include compounds represented by structural formulae (i-2-1.1) to (i-2-1.4) below.

[Chem. 33]

(i-2-1.1)

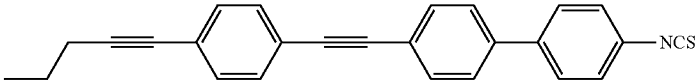

(i-2-1.2)

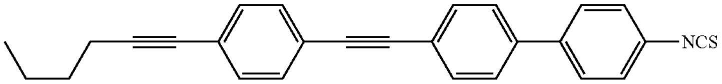

(i-2-1.3)

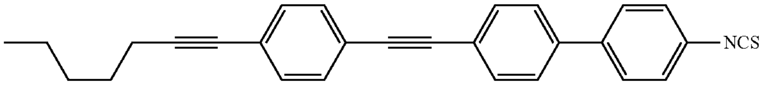

(i-2-1.4)

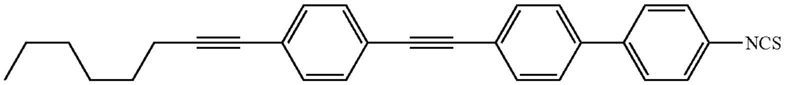

Specific examples of compounds represented by general formula (i-2-2) include compounds represented by structural formulae (i-2-2.1) to (i-2-2.5) below.

[Chem. 34]

(i-2-2.1)

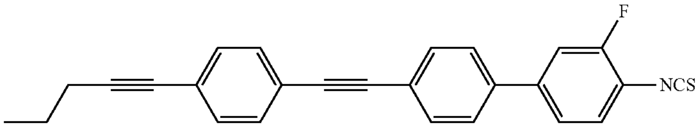

(i-2-2.2)

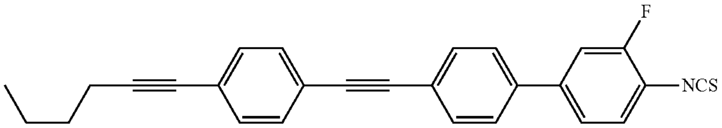

(i-2-2.3)

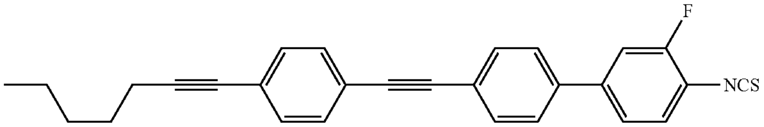

-continued
(i-2-2.4)
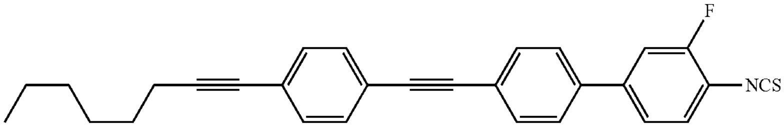
(i-2-2.5)
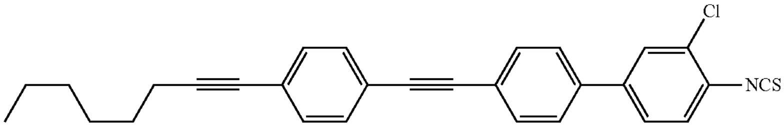
Specific examples of compounds represented by general formula (i-2-3) include compounds represented by structural formulae (i-2-3.1) to (i-2-3.4) below.
[Chem. 35]
(i-2-3.1)
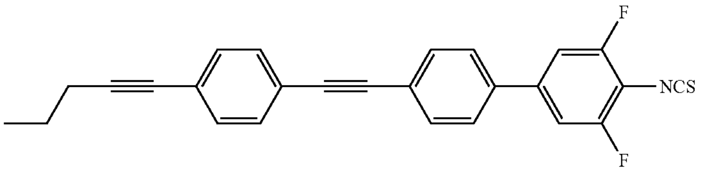
(i-2-3.2)
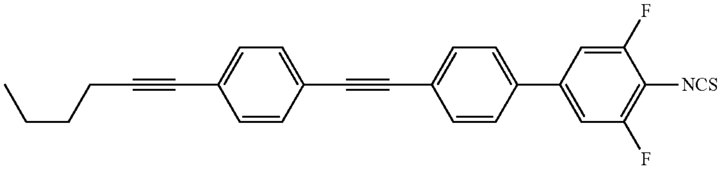
(i-2-3.3)
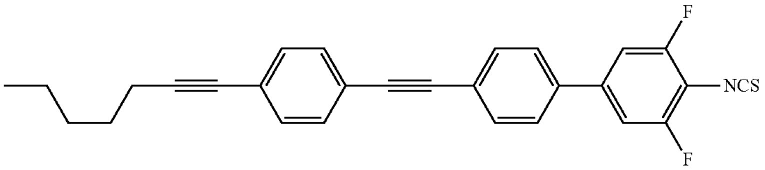
(i-2-3.4)
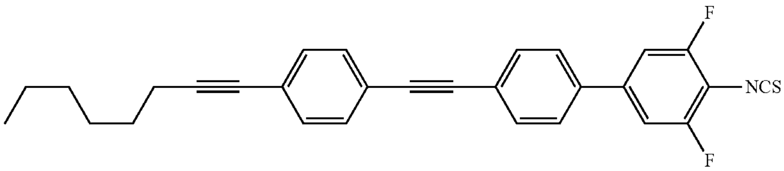
Specific examples of compounds represented by general formula (i-2-4) include compounds represented by structural formulae (i-2-4.1) to (i-2-4.9) below.
[Chem. 36]
(i-2-4.1)
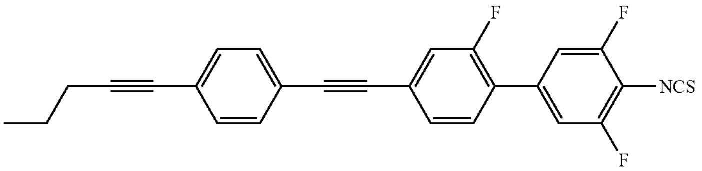

-continued
(i-2-4.2)
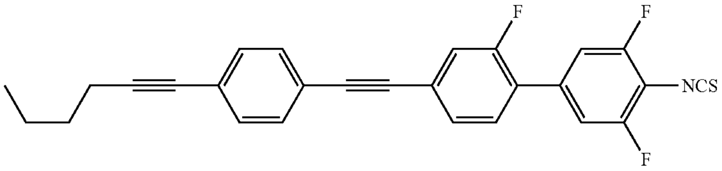
(i-2-4.3)
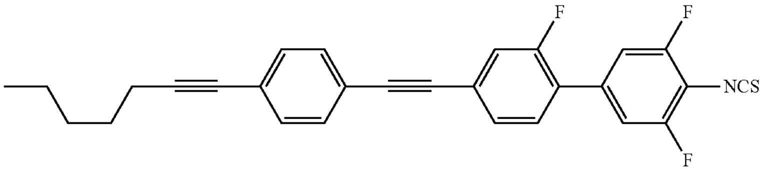
(i-2-4.4)
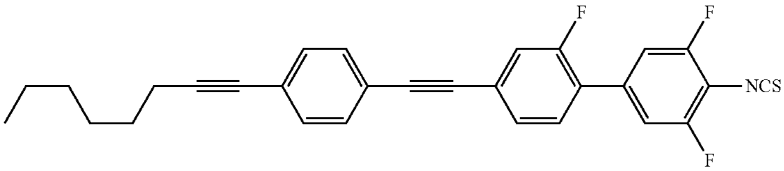
(i-2-4.5)
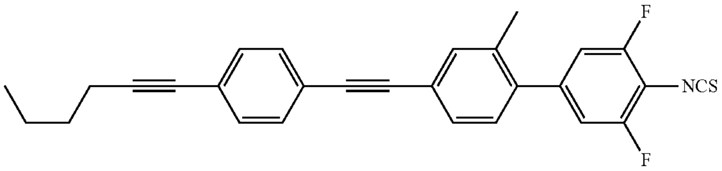
(i-2-4.6)
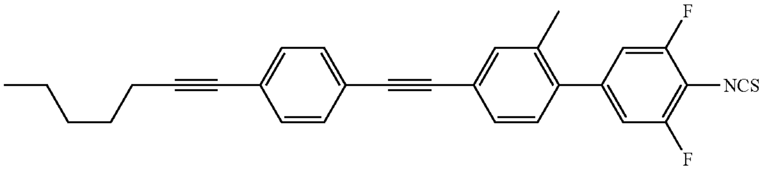
(i-2-4.7)
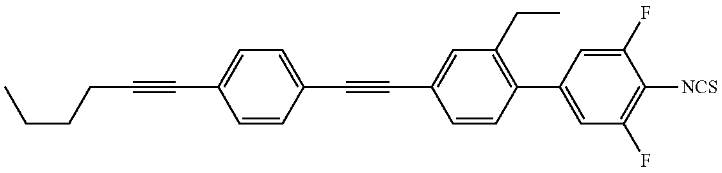
(i-2-4.8)
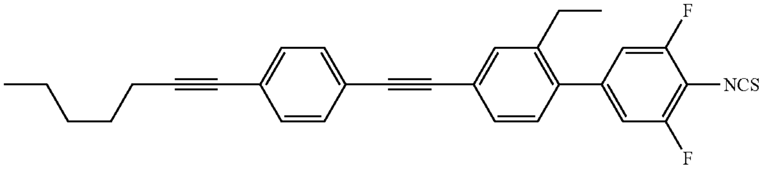
(i-2-4.9)
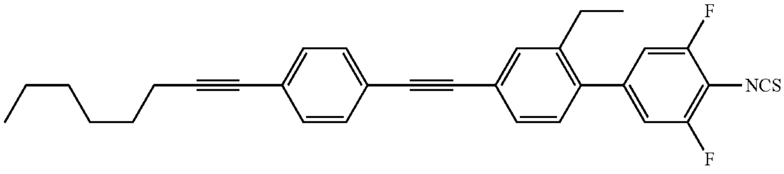

Specific examples of compounds represented by general formula (i-2-5) include compounds represented by structural formulae (i-2-5.1) to (i-2-5.6) below.
[Chem. 37]
(i-2-5.1)
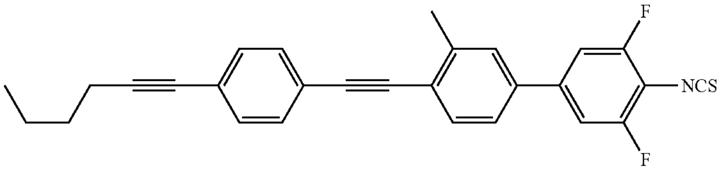
(i-2-5.2)
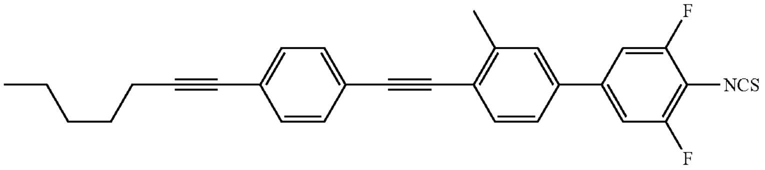
(i-2-5.3)
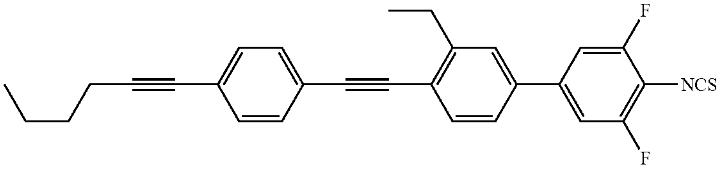
(i-2-5.4)
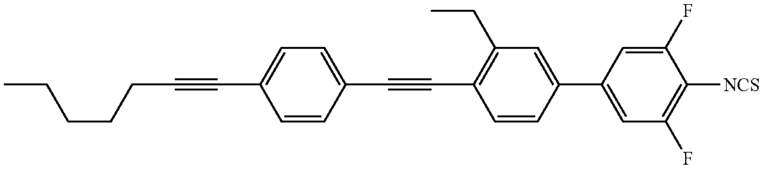
(i-2-5.5)
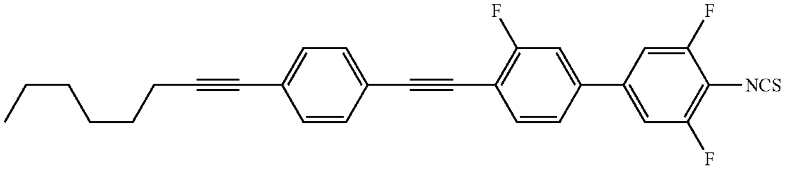
(i-2-5.6)
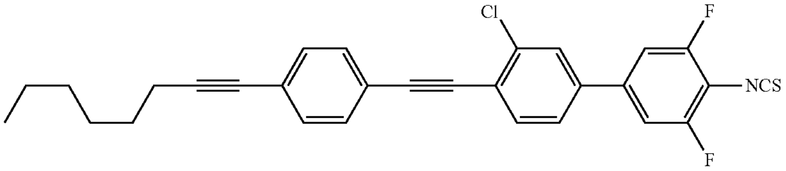
Specific examples of compounds represented by general formula (i-2-6) include compounds represented by structural formulae (i-2-6.1) to (i-2-6.6) below.
[Chem. 38]
(i-2-6.1)
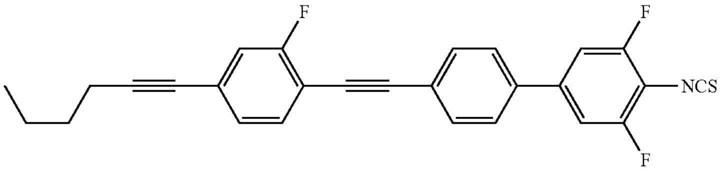

-continued
(i-2-6.2)
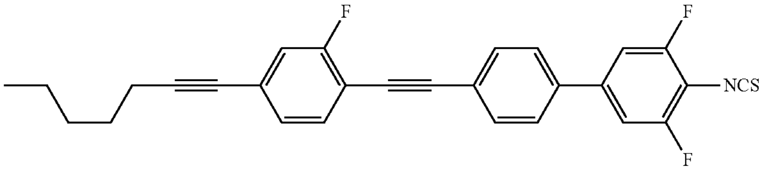
(i-2-6.3)
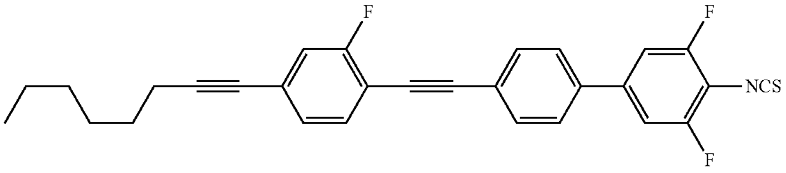
(i-2-6.4)
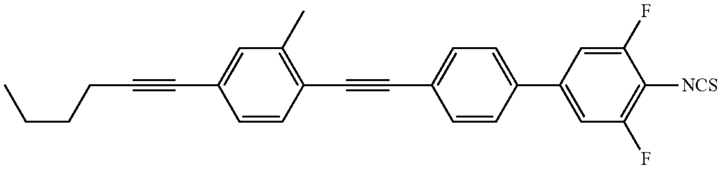
(i-2-6.5)
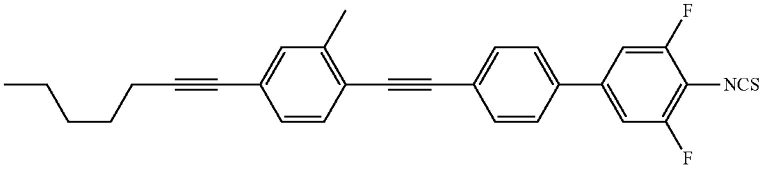
(i-2-6.6)
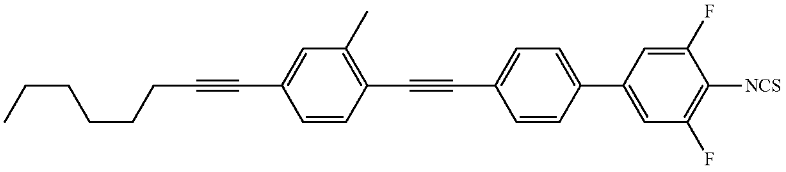
Specific examples of compounds represented by general formula (i-2-7) include compounds represented by structural formulae (i-2-7.1) to (i-2-7.3) below.
[Chem. 39]
(i-2-7.1)
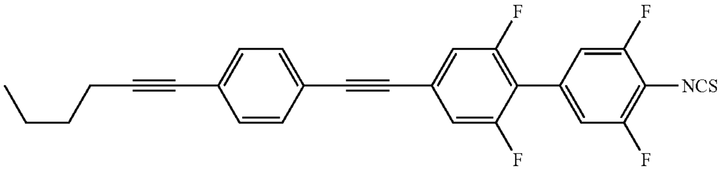
(i-2-7.2)
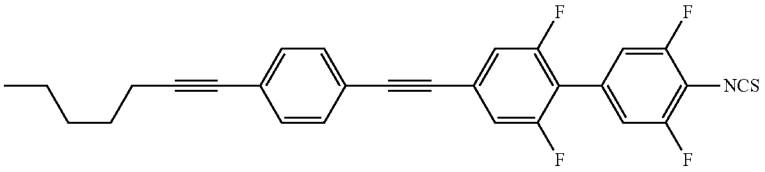

-continued
(i-2-7.3)
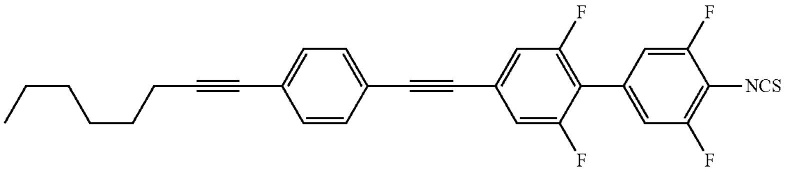
Specific examples of compounds represented by general formula (i-2-8) include compounds represented by structural formulae (i-2-8.1) to (i-2-8.4) below.
[Chem. 40]
(i-2-8.1)
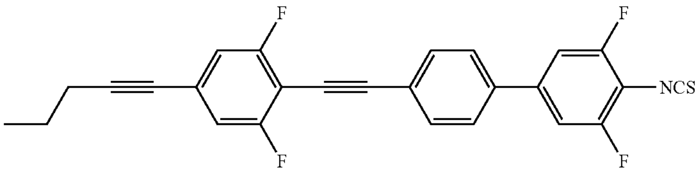
(i-2-8.2)
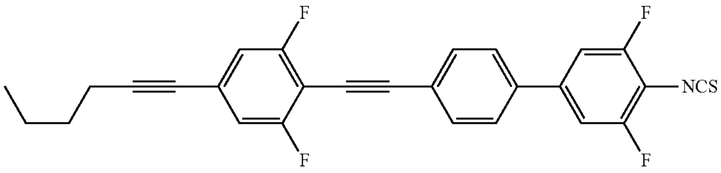
(i-2-8.3)
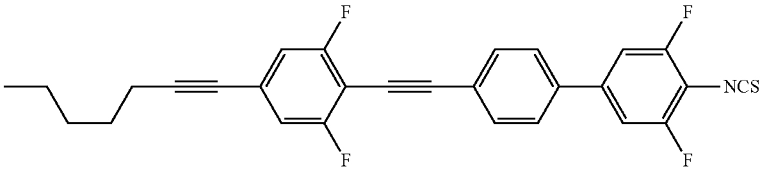
(i-2-8.4)
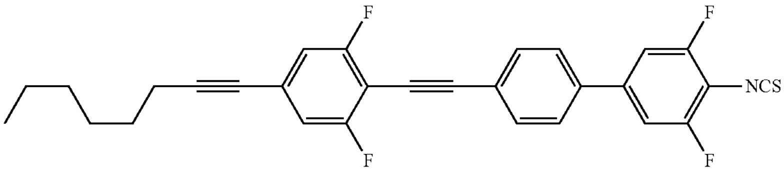
Specific examples of compounds represented by general formula (i-2-9) include compounds represented by structural formulae (i-2-9.1) to (i-2-9.4) below.
[Chem. 41]
(i-2-9.1)
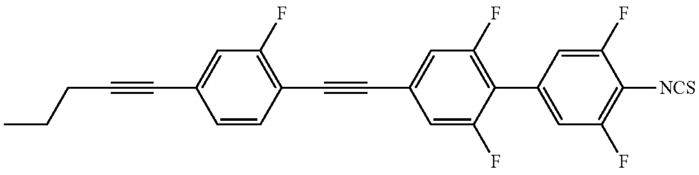

-continued
(i-2-9.2)
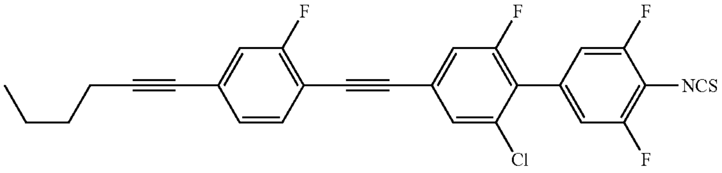
(i-2-9.3)
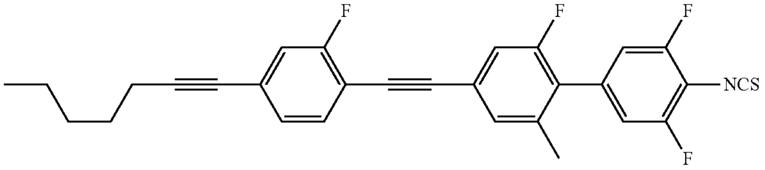
(i-2-9.4)
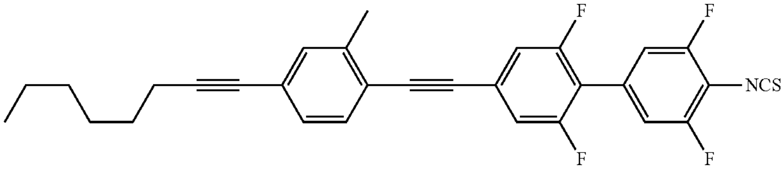
Specific examples of compounds represented by general formula (i-2-10) include compounds represented by structural formulae (i-2-10.1) to (i-2-10.4) below.
[Chem. 42]
(i-2-10.1)
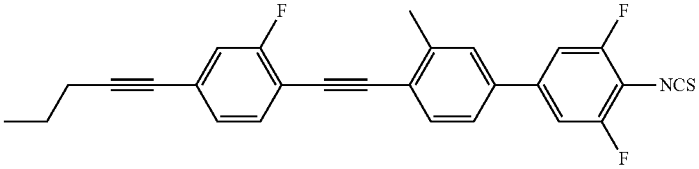
(i-2-10.2)
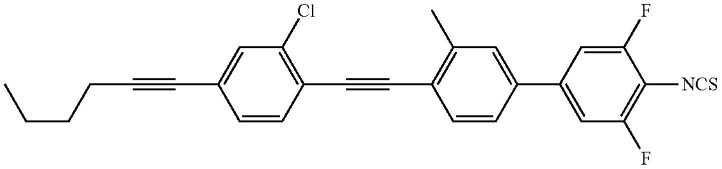
(i-2-10.3)
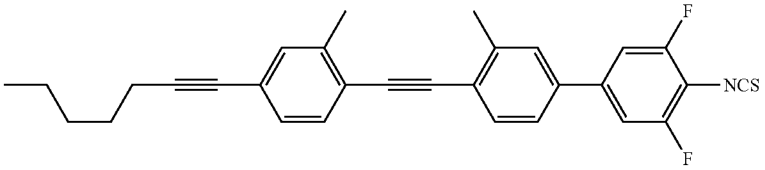
(i-2-10.4)
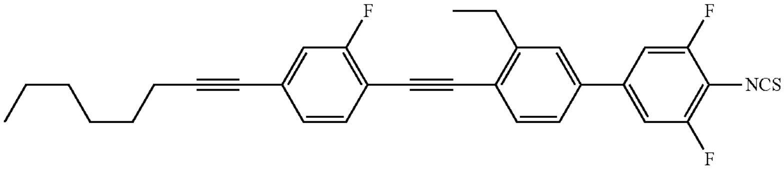

Specific examples of compounds represented by general formula (i-2-11) include compounds represented by structural formulae (i-2-11.1) to (i-2-11.5) below.
[Chem. 43]
(i-2-11.1)
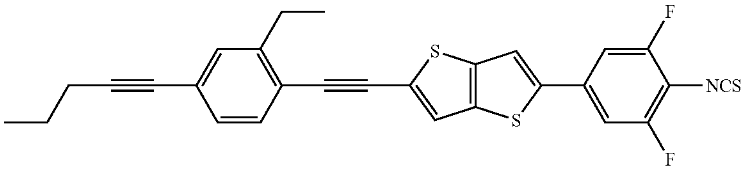
(i-2-11.2)
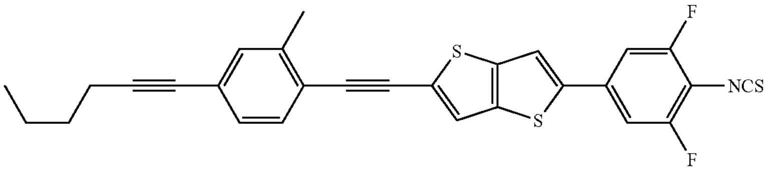
(i-2-11.3)
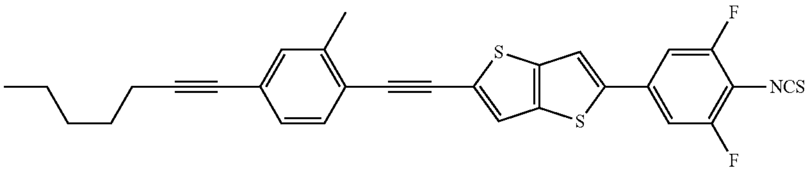
(i-2-11.4)
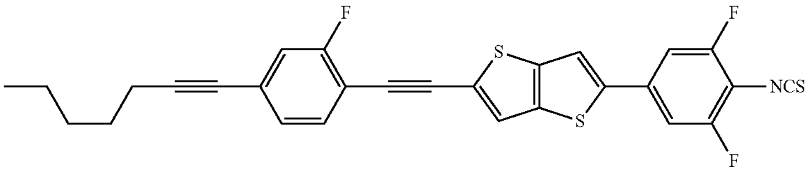
(i-2-11.5)
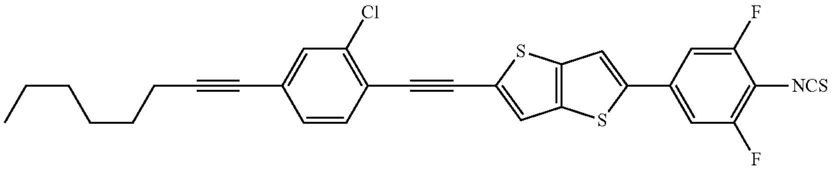
Specific examples of compounds represented by general formula (i-2-12) include compounds represented by structural formulae (i-2-12.1) to (i-2-12.4) below.
[Chem. 44]
(i-2-12.1)
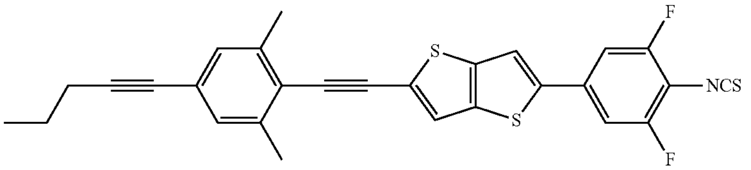
(i-2-12.2)
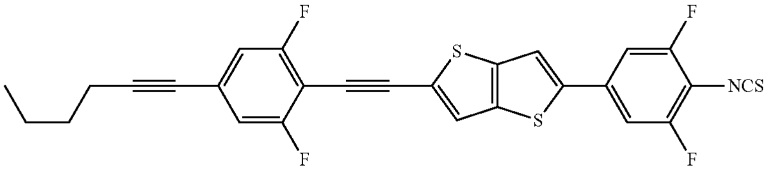

-continued
(i-2-12.3)
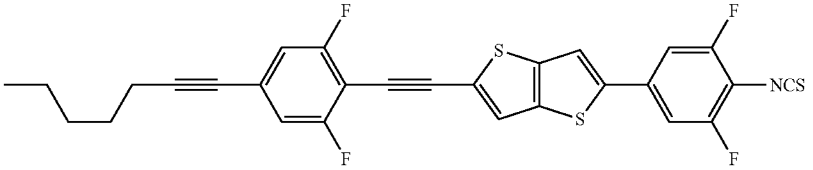
(i-2-12.4)
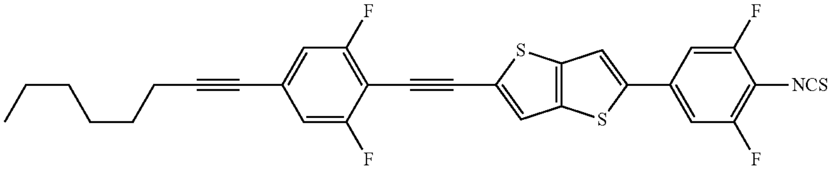
Specific examples of compounds represented by general formula (i-2-13) include compounds represented by structural formulae (i-2-13.1) to (i-2-13.5) below.
[Chem. 45]
(i-2-13.1)
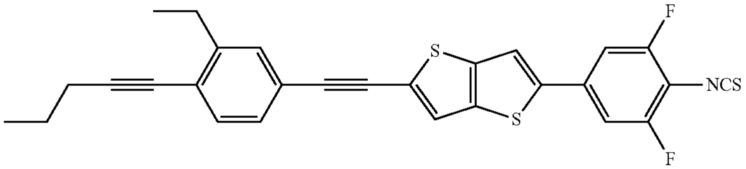
(i-2-13.2)
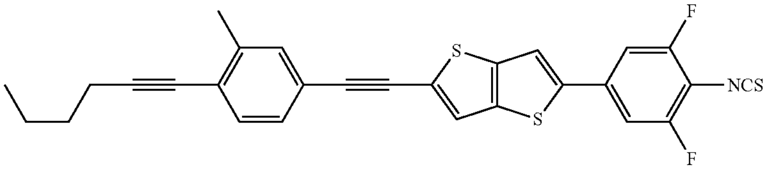
(i-2-13.3)
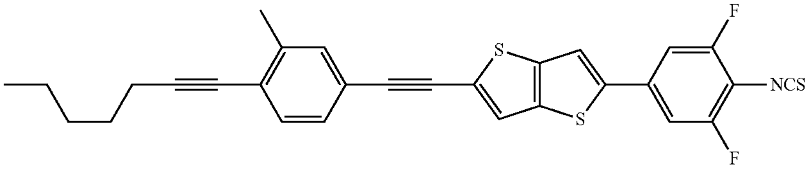
(i-2-13.4)
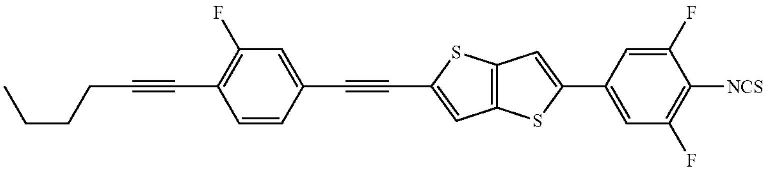
(i-2-13.5)
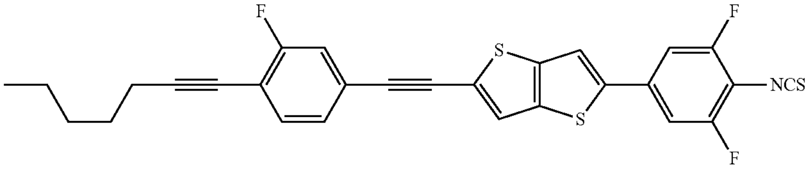

Specific examples of compounds represented by general formula (i-2-14) include compounds represented by structural formulae (i-2-14.1) to (i-2-14.4) below.

[Chem. 46]

(i-2-14.1)

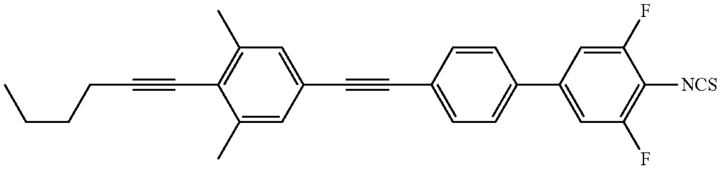

(i-2-14.2)

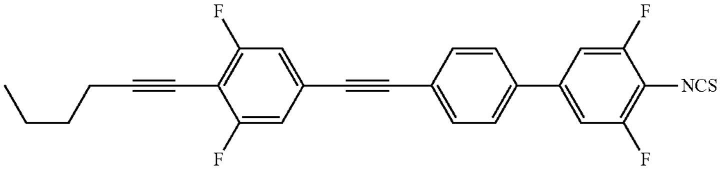

(i-2-14.3)

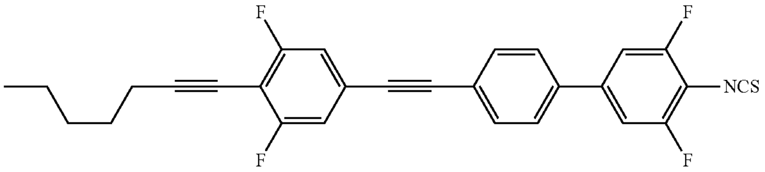

(i-2-14.4)

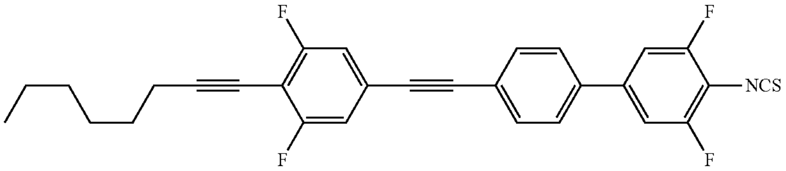

Specific examples of compounds represented by general formula (i-2-15) include compounds represented by structural formulae (i-2-15.1) to (i-2-15.6) below.

[Chem. 47]

(i-2-15.1)

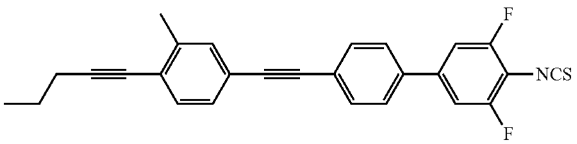

(i-2-15.2)

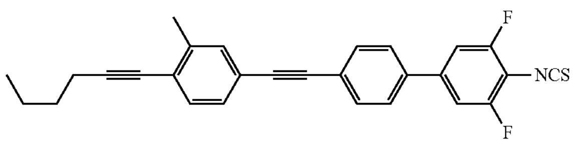

(i-2-15.3)

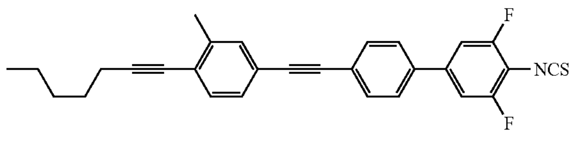

-continued (i-2-15.4)

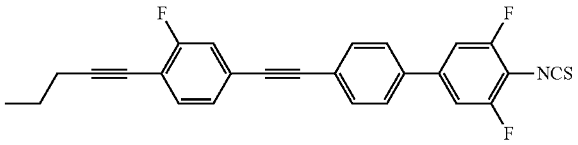

(i-2-15.5)

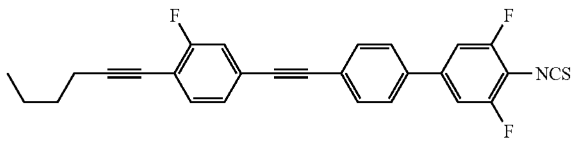

(i-2-15.6)

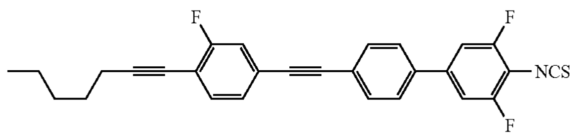

A compound represented by general formula (i-3) is preferably a compound represented by one of general formulae (i-3-1) to (i-3-11) below.

[Chem. 48]
(i-3-1)
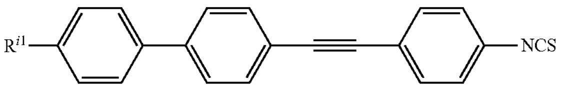
(i-3-2)
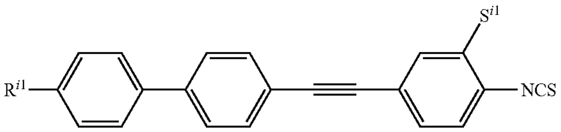
(i-3-3)
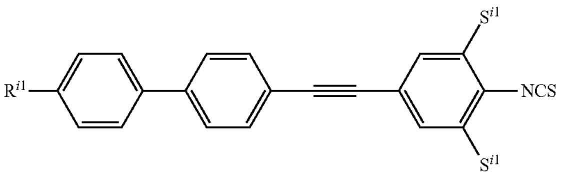
(i-3-4)
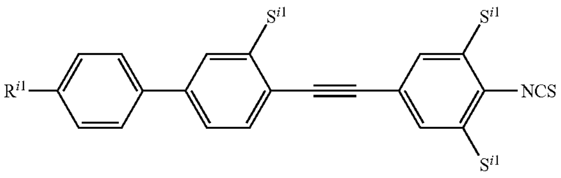
(i-3-5)
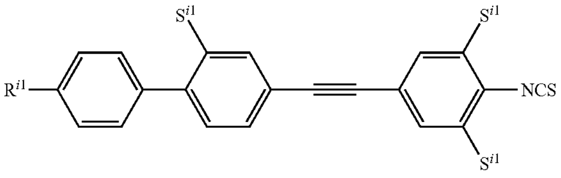
(i-3-6)
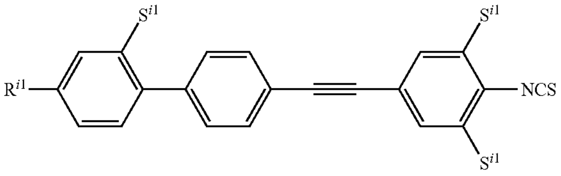
-continued
(i-3-7)
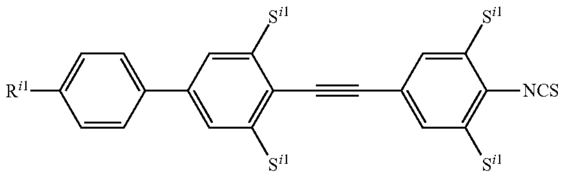
(i-3-8)
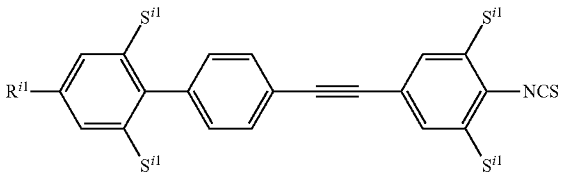
(i-3-9)
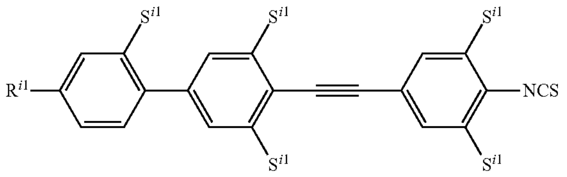
(i-3-10)
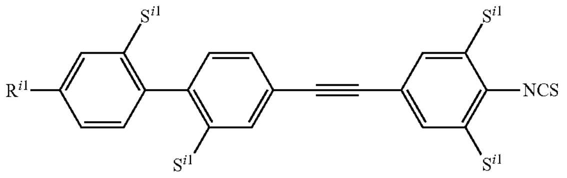
[Chem. 49]
(i-3-11)
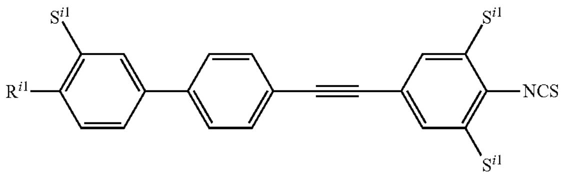
In general formulae (i-3-1) to (i-3-11), $R^{i1}$ and $S^{i1}$ each independently have the same meaning as $R^{i1}$ and $S^{i1}$ in general formula (i).
Specific examples of compounds represented by general formula (i-3-1) include compounds represented by structural formulae (i-3-1.1) to (i-3-1.4) below.
[Chem. 50]
(i-3-1.1)
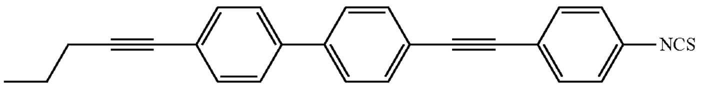
(i-3-1.2)
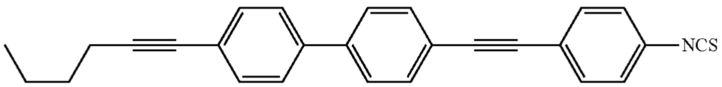

-continued
(i-3-1.3)
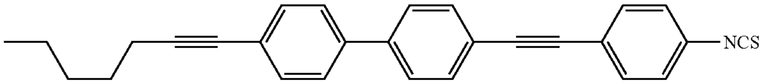
(i-3-1.4)
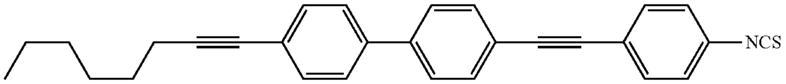
Specific examples of compounds represented by general formula (i-3-2) include compounds represented by structural formulae (i-3-2.1) to (i-3-2.4) below.
[Chem. 51]
(i-3-2.1)
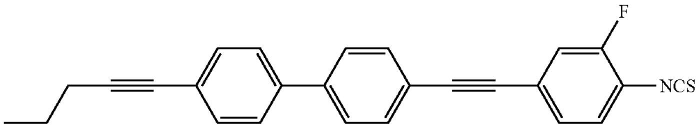
(i-3-2.2)
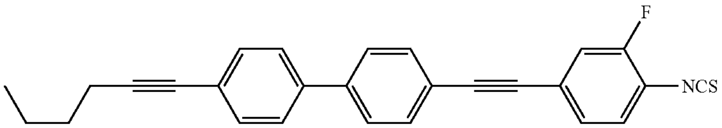
(i-3-2.3)
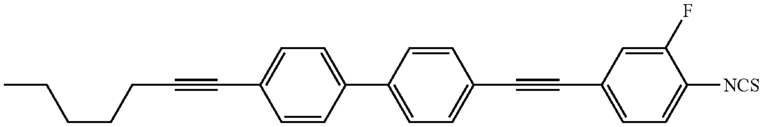
(i-3-2.4)
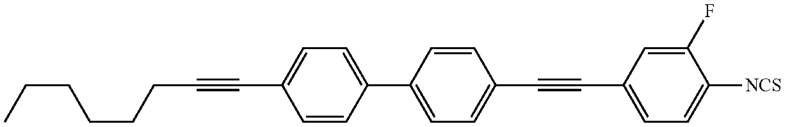
Specific examples of compounds represented by general formula (i-3-3) include compounds represented by structural formulae (i-3-3.1) to (i-3-3.6) below.
[Chem. 52]
(i-3-3.1)
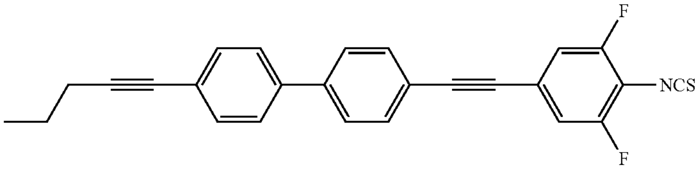
(i-3-3.2)
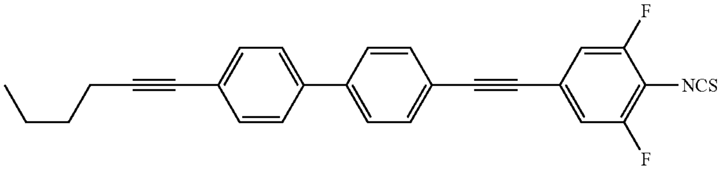

-continued
(i-3-3.3)
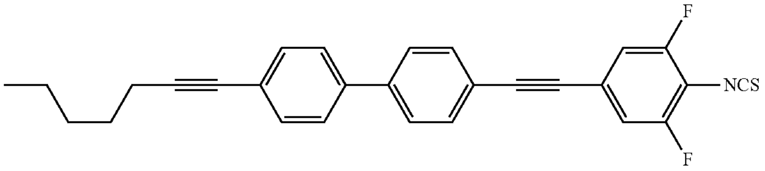
(i-3-3.4)
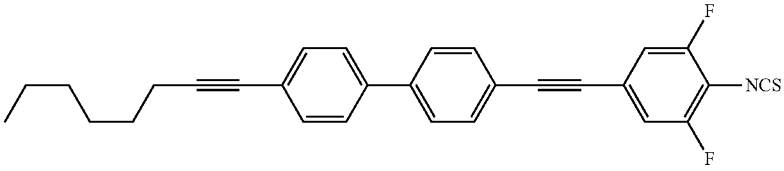
(i-3-3.5)
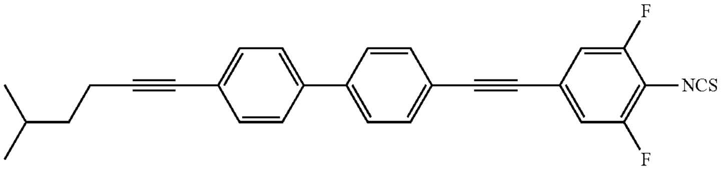
(i-3-3.6)
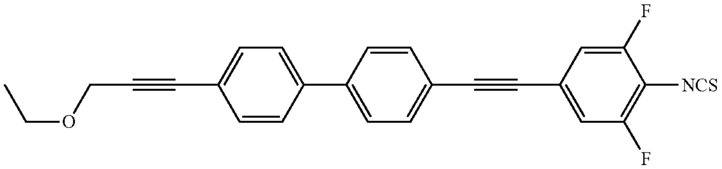
Specific examples of compounds represented by general formula (i-3-4) include compounds represented by structural formulae (i-3-4.1) to (i-3-4.7) below.
[Chem. 53]
(i-3-4.1)
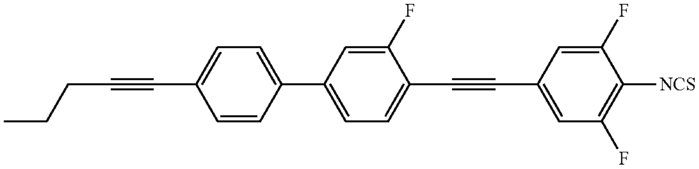
(i-3-4.2)
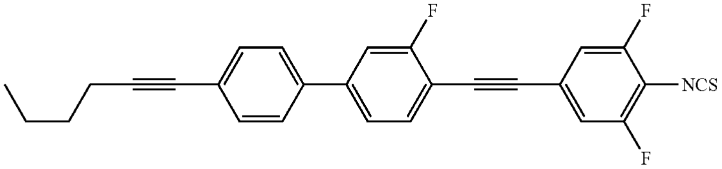
(i-3-4.3)
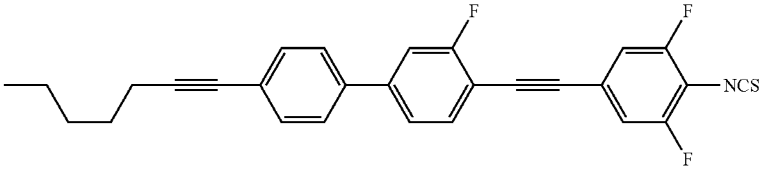

-continued
(i-3-4.4)
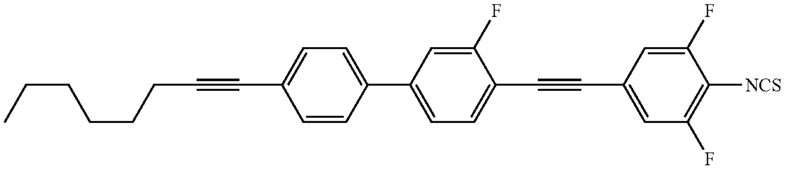
(i-3-4.5)
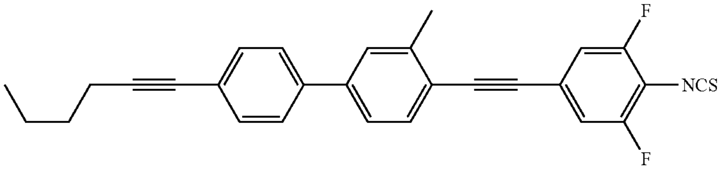
(i-3-4.6)
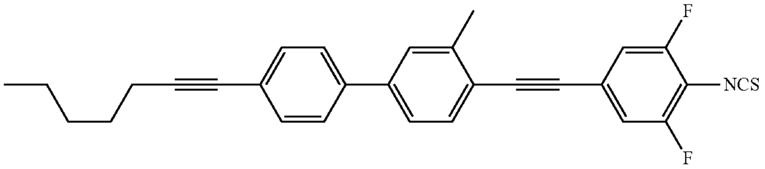
(i-3-4.7)
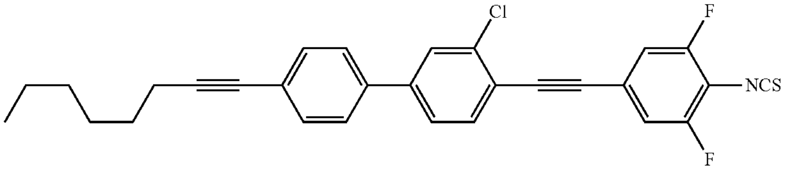
Specific examples of compounds represented by general formula (i-3-5) include compounds represented by structural formulae (i-3-5.1) to (i-3-5.5) below.
[Chem. 54]
(i-3-5.1)
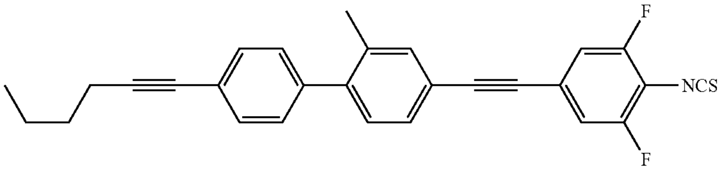
(i-3-5.2)
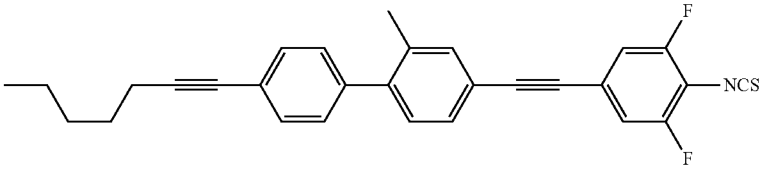
(i-3-5.3)
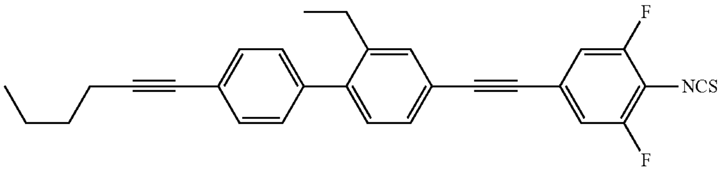

-continued
(i-3-5.4)
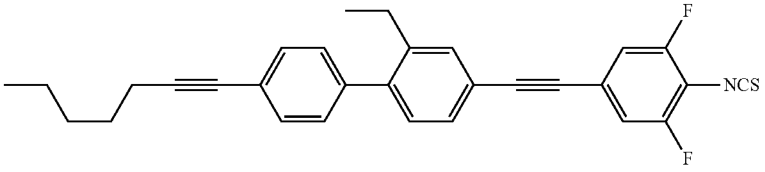
(i-3-5.5)
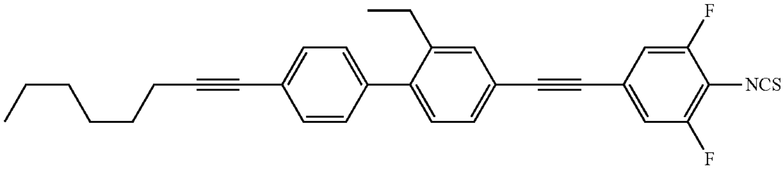
Specific examples of compounds represented by general formula (i-3-6) include compounds represented by structural formulae (i-3-6.1) to (i-3-6.5) below.
[Chem. 55]
(i-3-6.1)
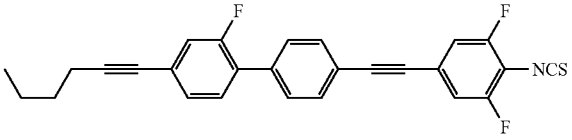
(i-3-6.2)
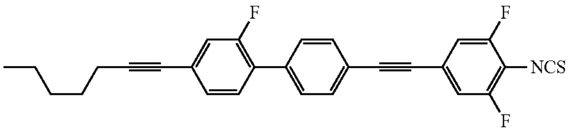
-continued
(i-3-6.3)
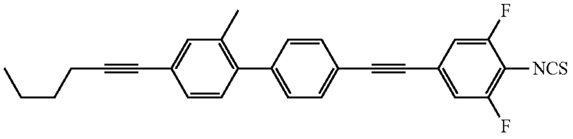
(i-3-6.4)
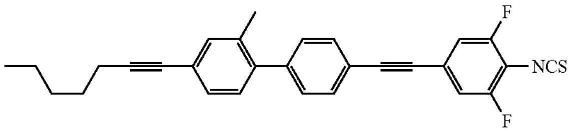
(i-3-6.5)
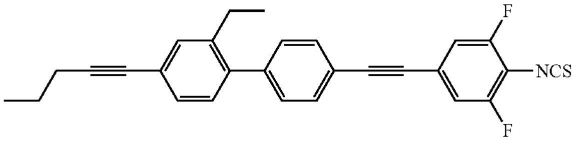
Specific examples of compounds represented by general formula (i-3-7) include compounds represented by structural formulae (i-3-7.1) to (i-3-7.4) below.
[Chem. 56]
(i-3-7.1)
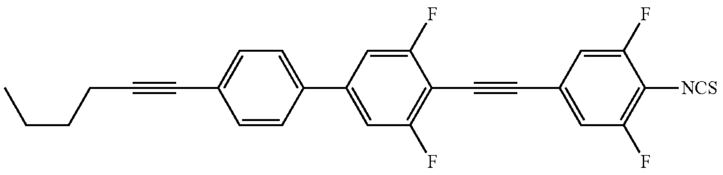
(i-3-7.2)
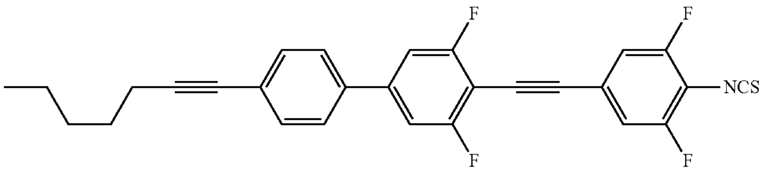

-continued
(i-3-7.3)
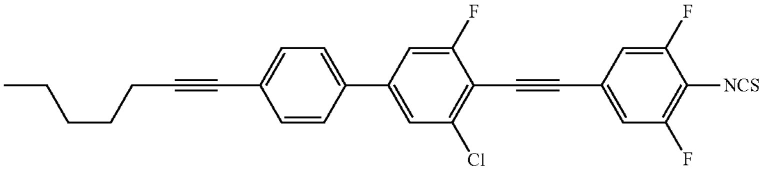
(i-3-7.4)
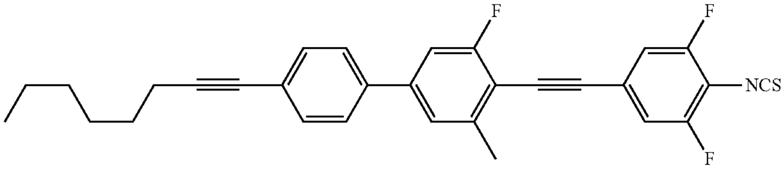
Specific examples of compounds represented by general formula (i-3-8) include compounds represented by structural formulae (i-3-8.1) to (i-3-8.3) below.
[Chem. 57]
(i-3-8.1)
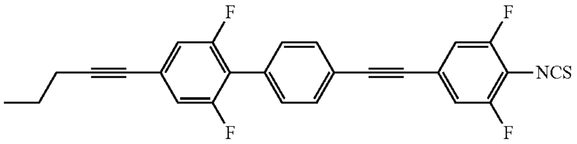
-continued
(i-3-8.2)
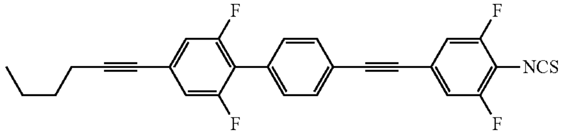
(i-3-8.3)
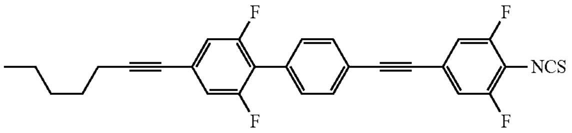
Specific examples of compounds represented by general formula (i-3-9) include compounds represented by structural formulae (i-3-9.1) to (i-3-9.3) below.
[Chem. 58]
(i-3-9.1)
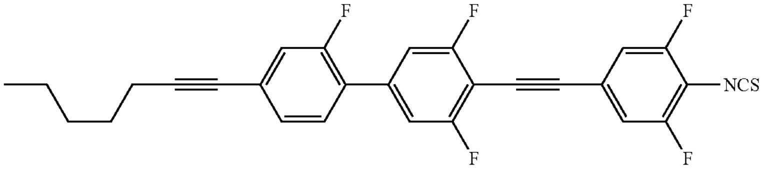
(i-3-9.2)
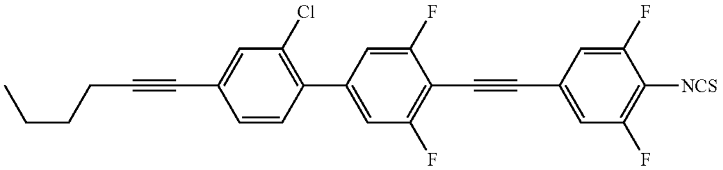
(i-3-9.3)
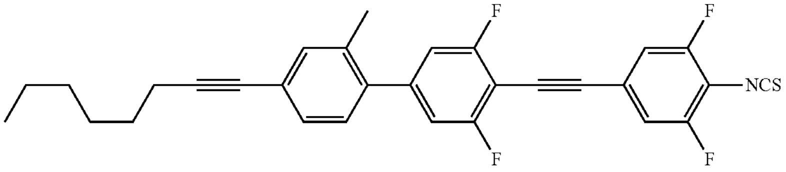

Specific examples of compounds represented by general formula (i-3-10) include compounds represented by structural formulae (i-3-10.1) to (i-3-10.3) below.

[Chem. 59]

(i-3-10.1)

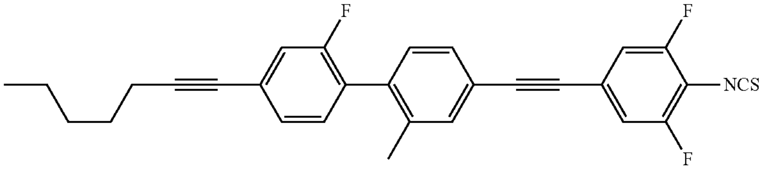

(i-3-10.2)

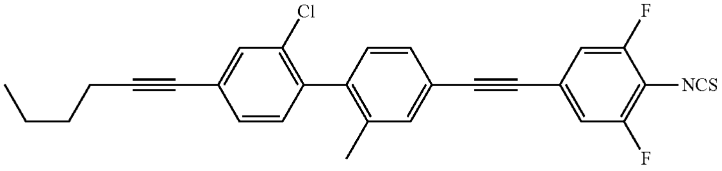

(i-3-10.3)

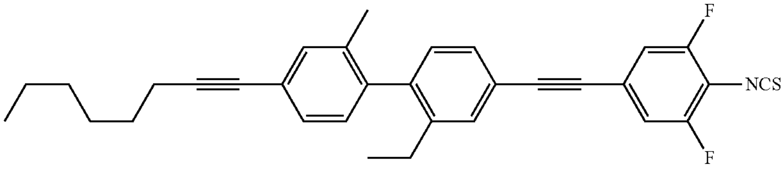

Specific examples of compounds represented by general formula (i-3-11) include compounds represented by structural formulae (i-3-11.1) to (i-3-11.6) below.

[Chem. 60]

(i-3-11.1)

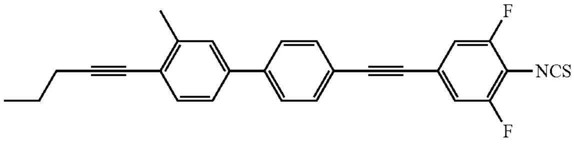

(i-3-11.2)

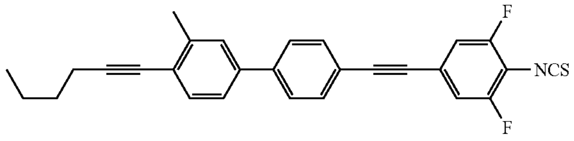

(i-3-11.3)

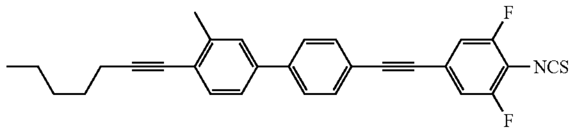

(i-3-11.4)

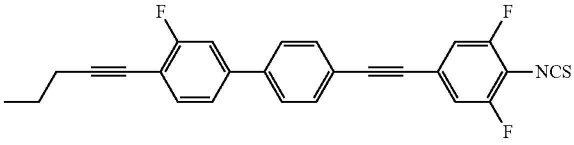

-continued (i-3-11.5)

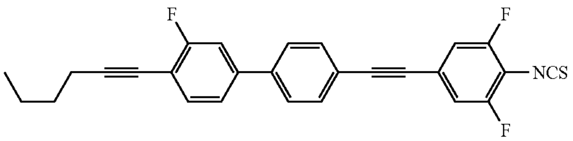

(i-3-11.6)

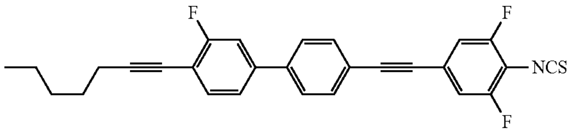

A compound represented by general formula (i-4) is preferably a compound represented by one of general formulae (i-4-1) to (i-4-10) below.

[Chem. 61]

(i-4-1)

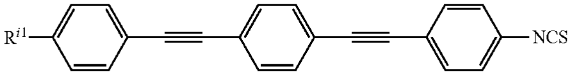

(i-4-2)

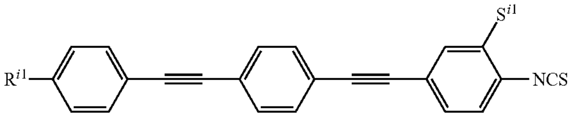

-continued
(i-4-3)
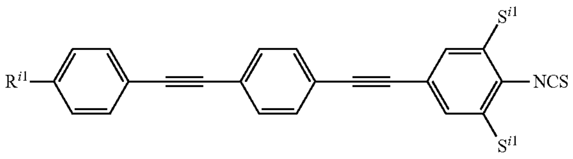
(i-4-4)
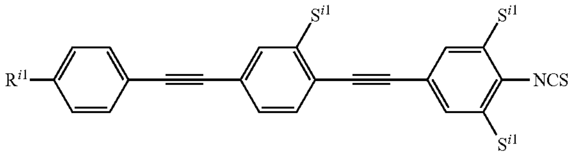
(i-4-5)
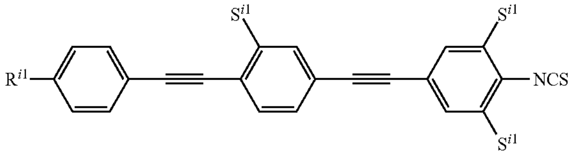
(i-4-6)
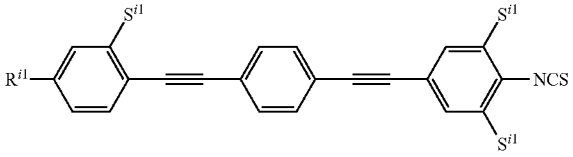
-continued
(i-4-7)
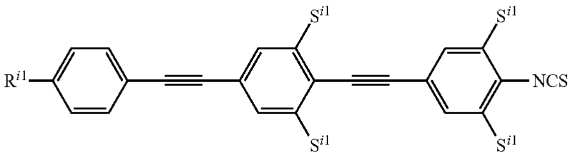
(i-4-8)
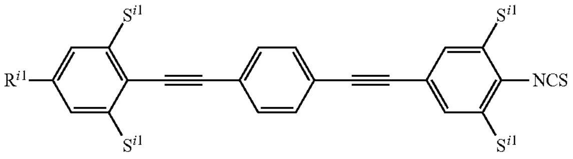
(i-4-9)
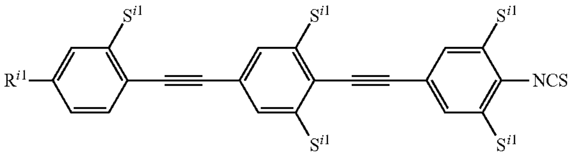
(i-4-10)
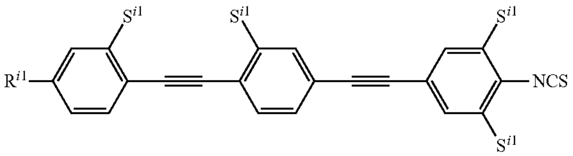
Specific examples of compounds represented by general formula (i-4-1) include compounds represented by structural formulae (i-4-1.1) to (i-4-1.4) below.
[Chem. 62]
(i-4-1.1)
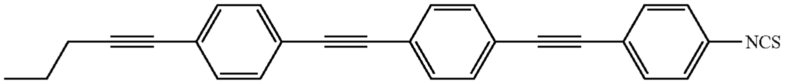
(i-4-1.2)
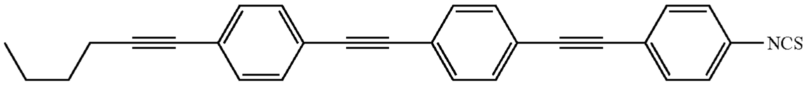
(i-4-1.3)
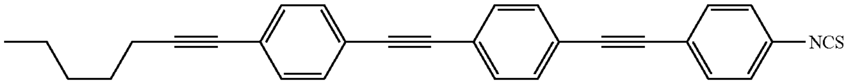
(i-4-1.4)
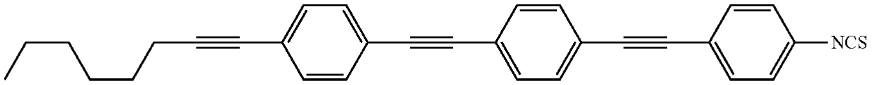

Specific examples of compounds represented by general formula (i-4-2) include compounds represented by structural formulae (i-4-2.1) to (i-4-2.5) below.
[Chem. 63]
(i-4-2.1)
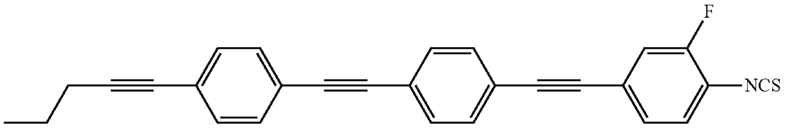
(i-4-2.2)
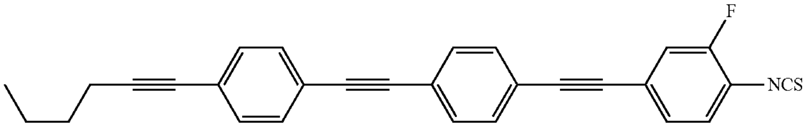
(i-4-2.3)
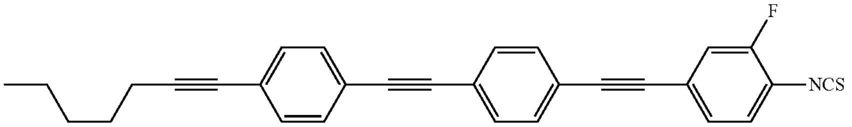
(i-4-2.4)
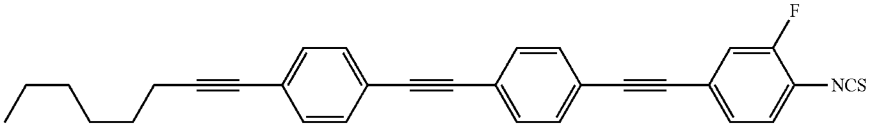
(i-4-2.5)
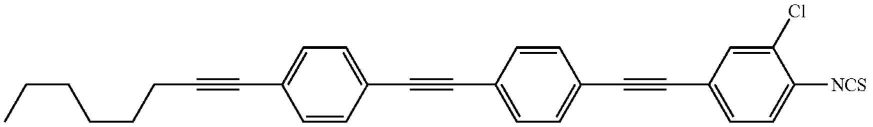
Specific examples of compounds represented by general formula (i-4-3) include compounds represented by structural formulae (i-4-3.1) to (i-4-3.5) below.
[Chem. 64]
(i-4-3.1)
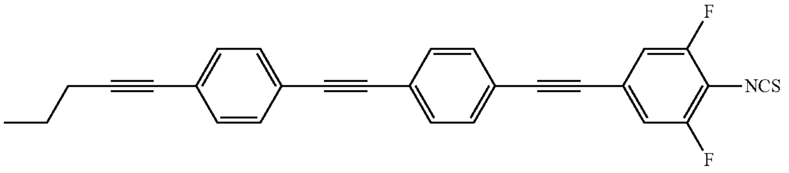
(i-4-3.2)
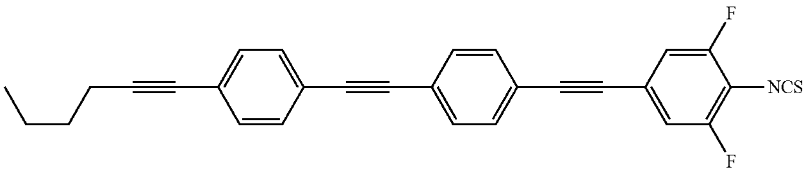
(i-4-3.3)
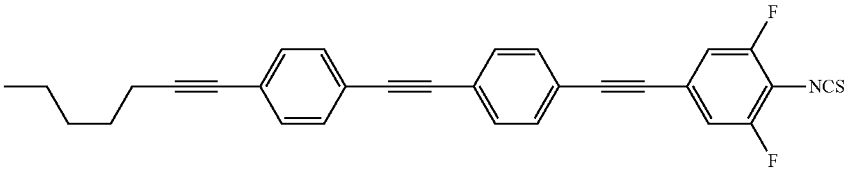

-continued
(i-4-3.4)
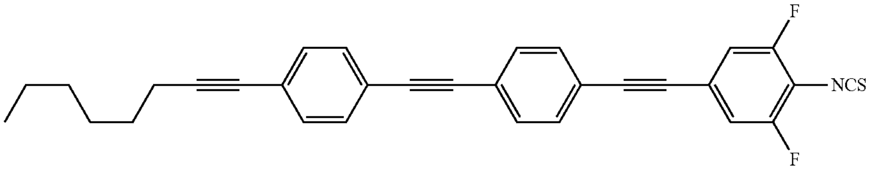
(i-4-3.5)
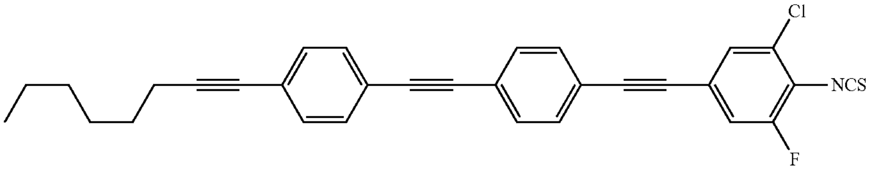
Specific examples of compounds represented by general formula (i-4-4) include compounds represented by structural formulae (i-4-4.1) to (i-4-4.4) below.
[Chem. 65]
(i-4-4.1)
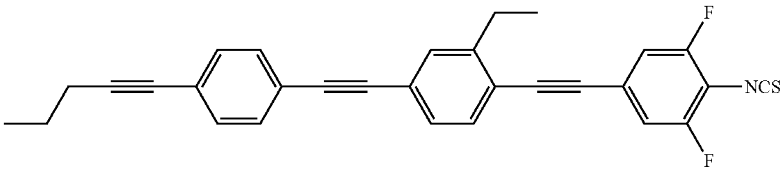
(i-4-4.2)
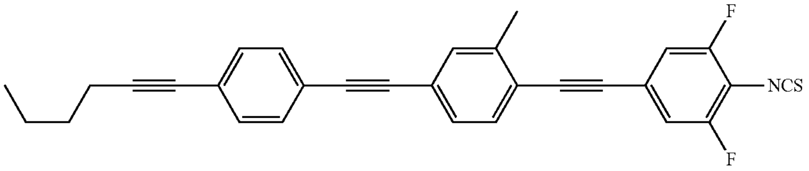
(i-4-4.3)
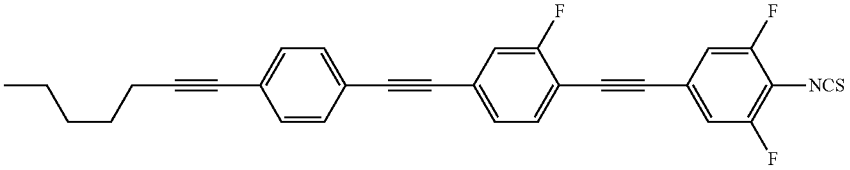
(i-4-4.4)
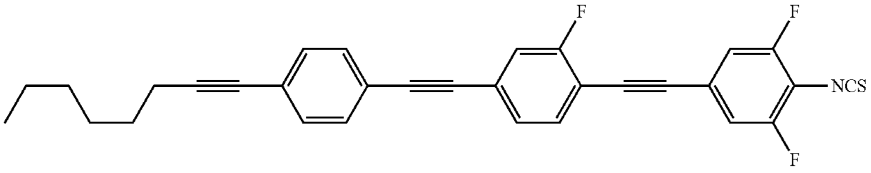

Specific examples of compounds represented by general formula (i-4-5) include compounds represented by structural formulae (i-4-5.1) to (i-4-5.4) below.
[Chem. 66]
(i-4-5.1)
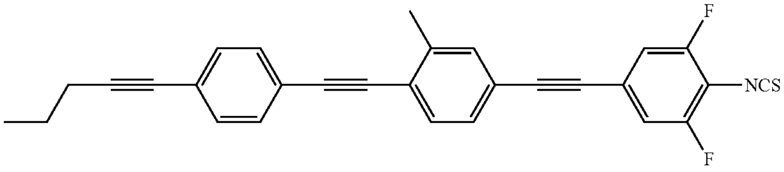
(i-4-5.2)
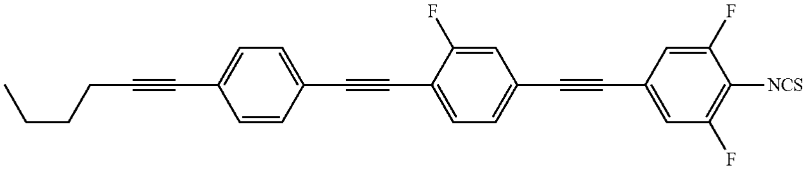
(i-4-5.3)
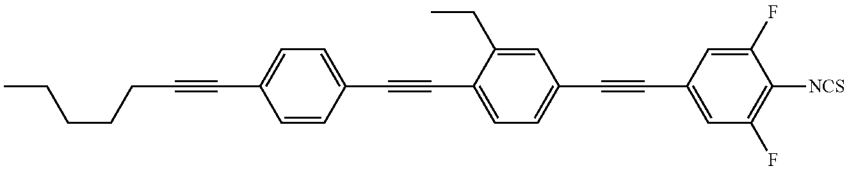
(i-4-5.4)
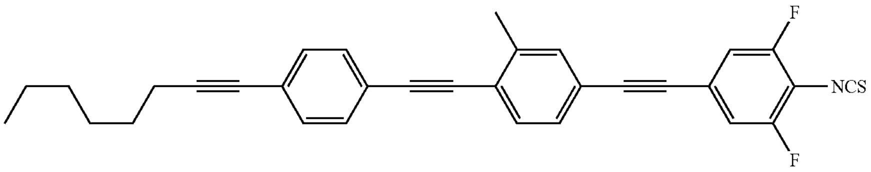
Specific examples of compounds represented by general formula (i-4-6) include compounds represented by structural formulae (i-4-6.1) to (i-4-6.6) below.
[Chem. 67]
(i-4-6.1)
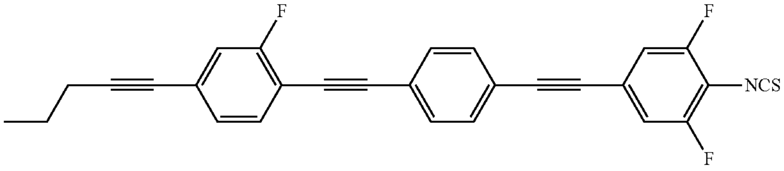
(i-4-6.2)
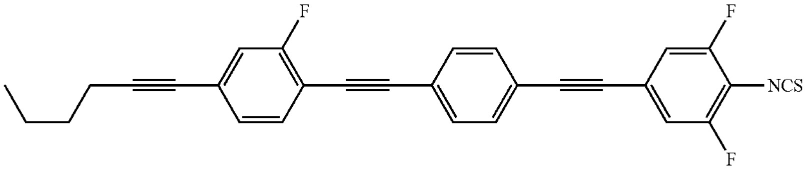
(i-4-6.3)
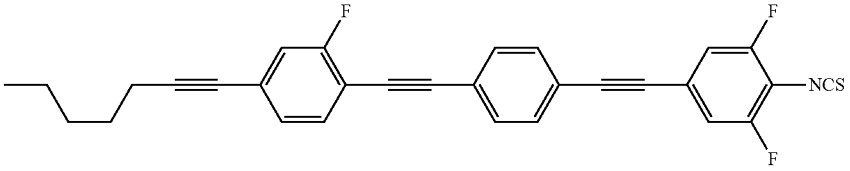

-continued
(i-4-6.4)
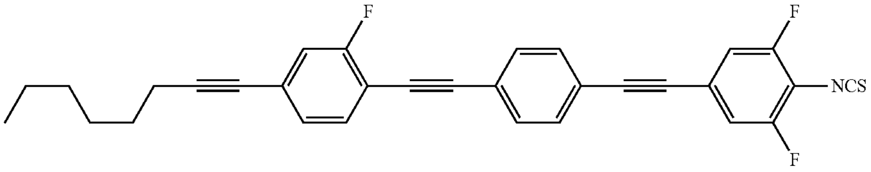
(i-4-6.5)
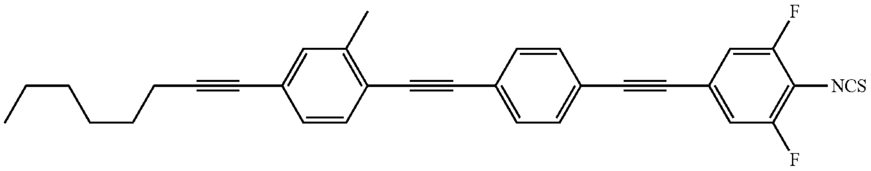
(i-4-6.6)
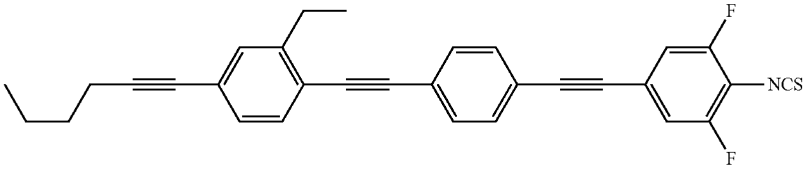
Specific examples of compounds represented by general formula (i-4-7) include compounds represented by structural formulae (i-4-7.1) to (i-4-7.4) below.
[Chem. 68]
(i-4-7.1)
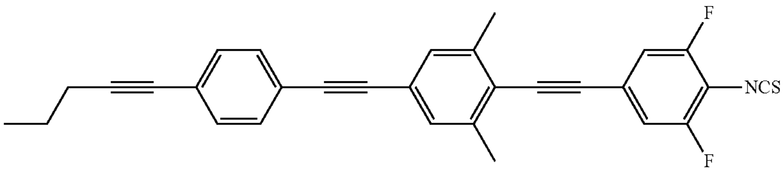
(i-4-7.2)
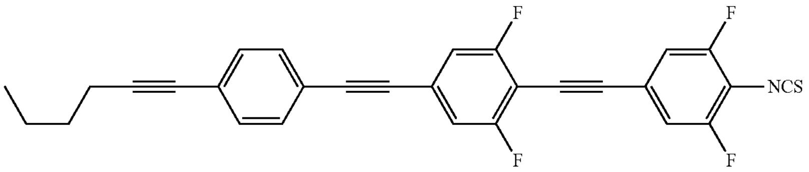
(i-4-7.3)
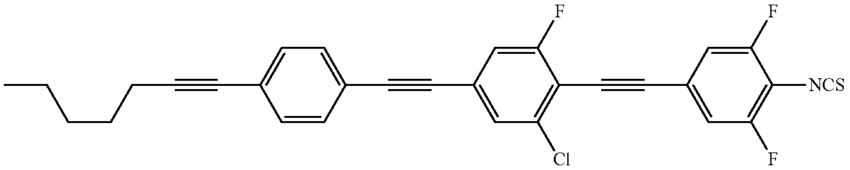
(i-4-7.4)
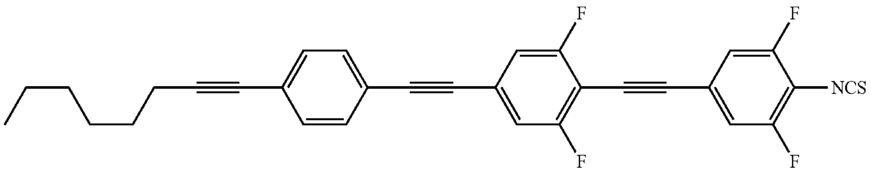

Specific examples of compounds represented by general formula (i-4-8) include compounds represented by structural formulae (i-4-8.1) to (i-4-8.5) below.
[Chem. 69]
(i-4-8.1)
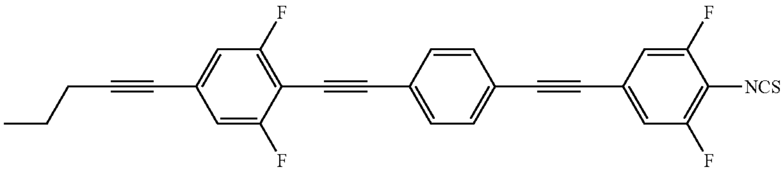
(i-4-8.2)
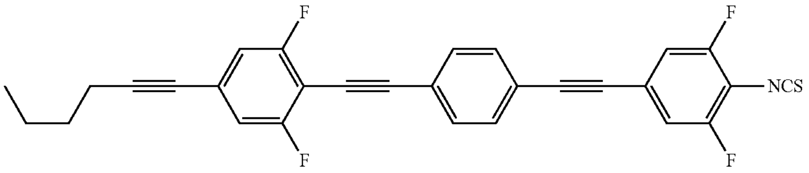
(i-4-8.3)
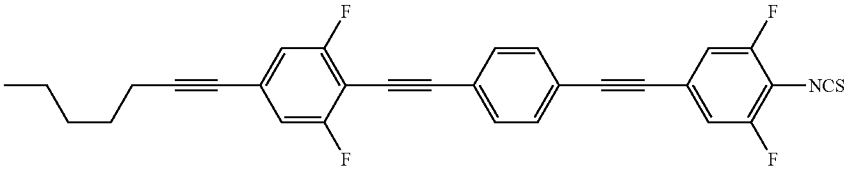
(i-4-8.4)
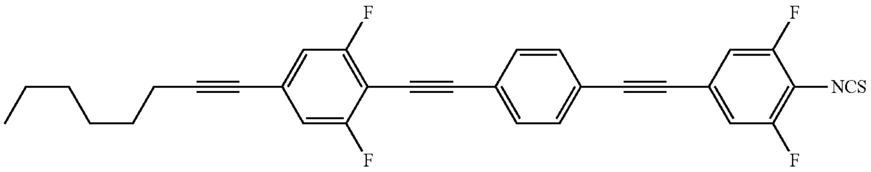
(i-4-8.5)
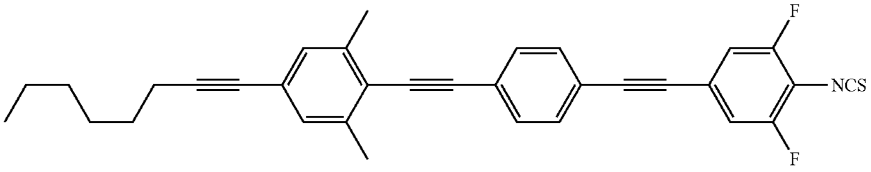
Specific examples of compounds represented by general formula (i-4-9) include compounds represented by structural formulae (i-4-9.1) to (i-4-9.4) below.
[Chem. 70]
(i-4-9.1)
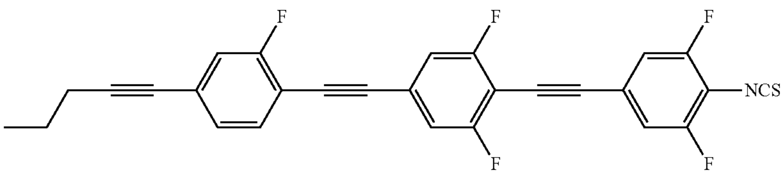
(i-4-9.2)
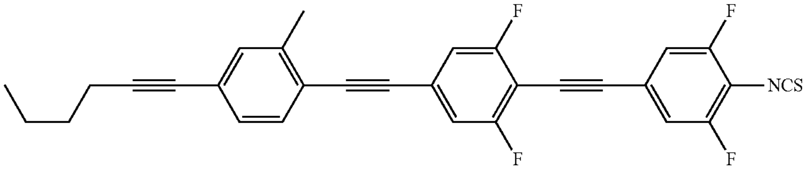

-continued
(i-4-9.3)
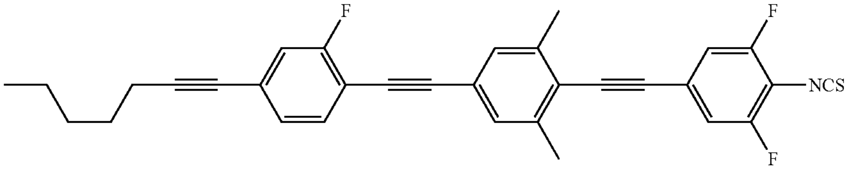
(i-4-9.4)
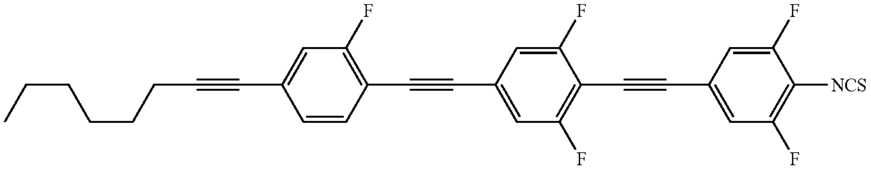
Specific examples of compounds represented by general formula (i-4-10) include compounds represented by structural formulae (i-4-10.1) to (i-4-10.4) below.
[Chem. 71]
(i-4-10.1)
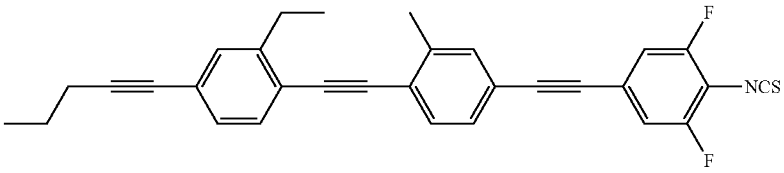
(i-4-10.2)
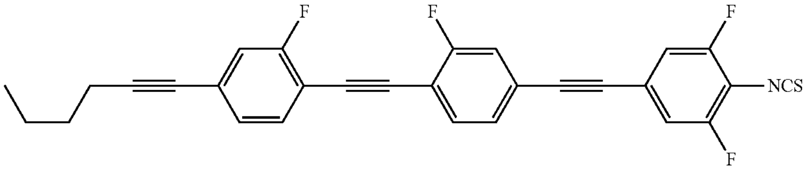
(i-4-10.3)
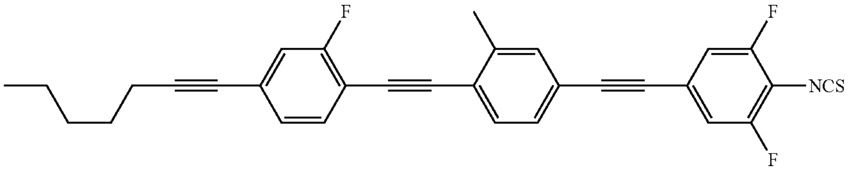
(i-4-10.4)
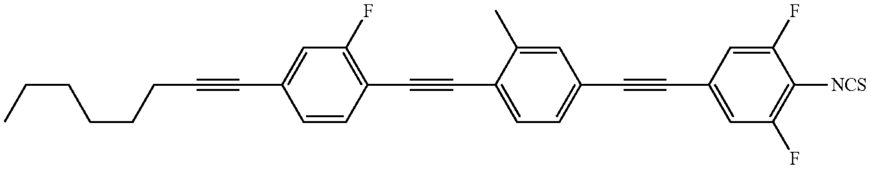

A compound represented by general formula (i-5) is preferably a compound represented by one of general formulae (i-5-1) to (i-5-6) below.

[Chem. 72]

(i-5-1)

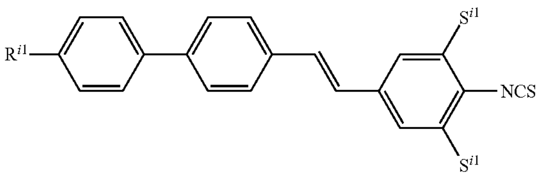

(i-5-2)

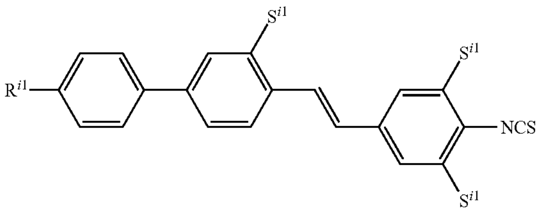

(i-5-3)

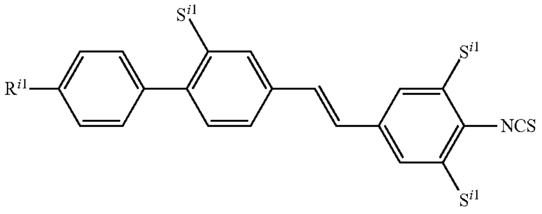

-continued (i-5-4)

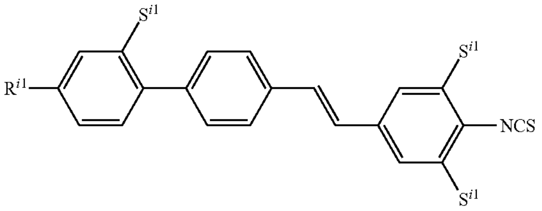

(i-5-5)

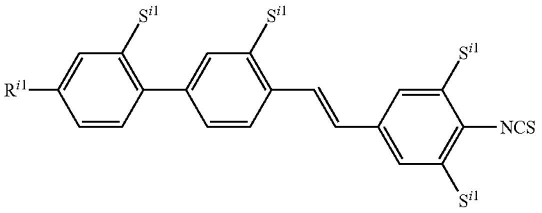

(i-5-6)

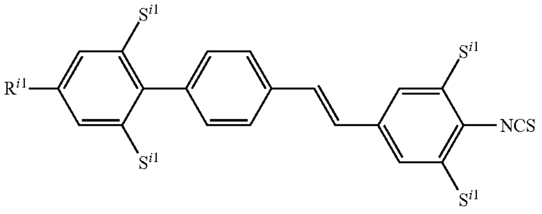

In general formulae (i-5-1) to (i-5-6), $R^{i1}$ and $S^{i1}$ each independently have the same meaning as $R^{i1}$ and $S^{i1}$ in general formula (i).

Specific examples of compounds represented by general formula (i-5-1) include compounds represented by structural formulae (i-5-1.1) to (i-5-1.4) below.

[Chem. 73]

(i-5-1.1)

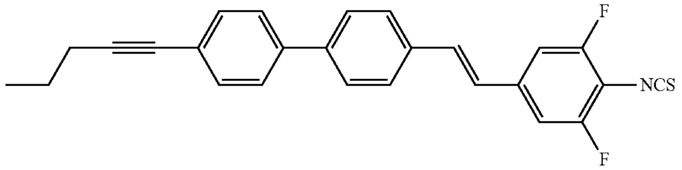

(i-5-1.2)

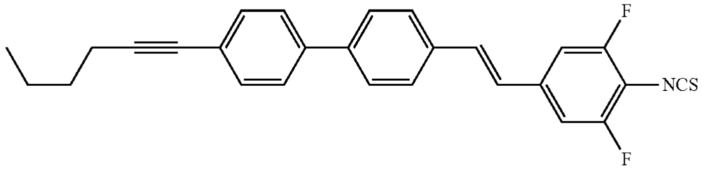

-continued (i-5-1.3)

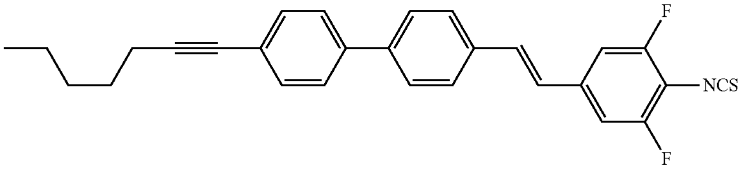

(i-5-1.4)

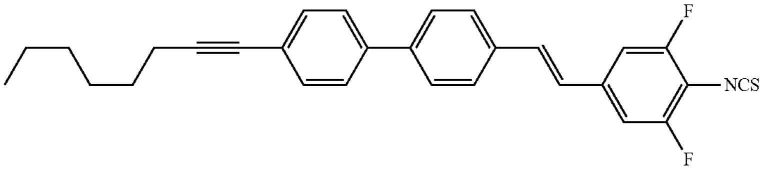

Specific examples of compounds represented by general formula (i-5-2) include compounds represented by structural formulae (i-5-2.1) to (i-5-2.4) below.

[Chem. 74]

(i-5-2.1)

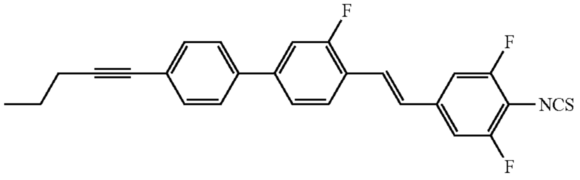

(i-5-2.2)

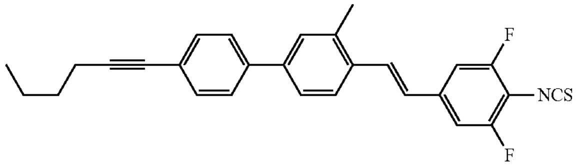

(i-5-2.3)

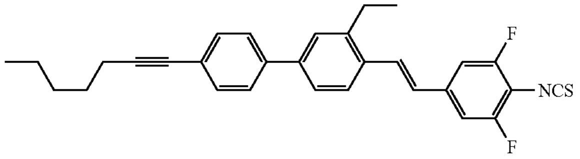

(i-5-2.4)

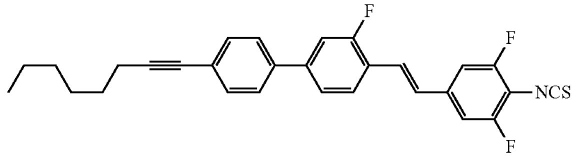

Specific examples of compounds represented by general formula (i-5-3) include compounds represented by structural formulae (i-5-3.1) to (i-5-3.4) below.

[Chem. 75]

(i-5-3.1)

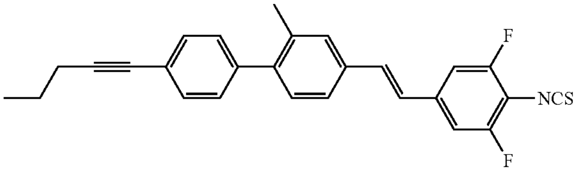

(i-5-3.2)

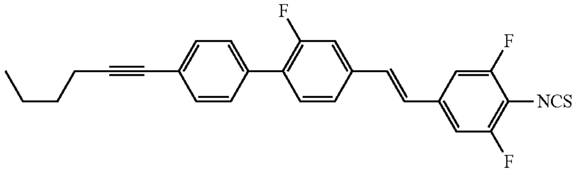

(i-5-3.3)

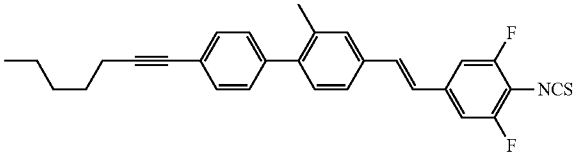

(i-5-3.4)

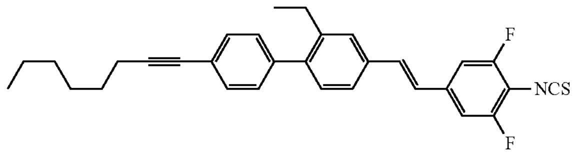

Specific examples of compounds represented by general formula (i-5-4) include compounds represented by structural formulae (i-5-4.1) to (i-5-4.4) below.

[Chem. 76]

(i-5-4.1)

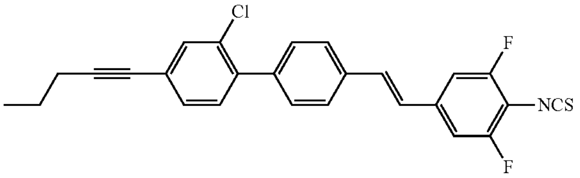

-continued (i-5-4.2)

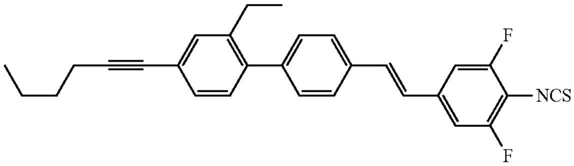

(i-5-4.3)

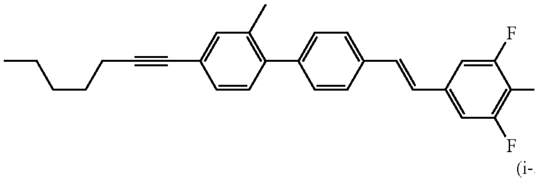

(i-5-4.4)

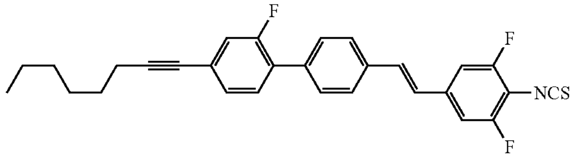

Specific examples of compounds represented by general formula (i-5-5) include compounds represented by structural formulae (i-5-5.1) to (i-5-5.4) below.

[Chem. 77]

(i-5-5.1)

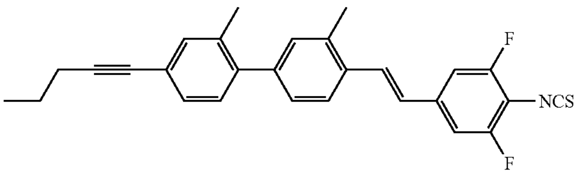

(i-5-5.2)

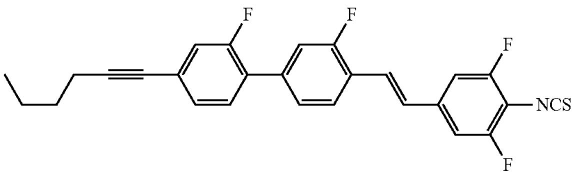

(i-5-5.3)

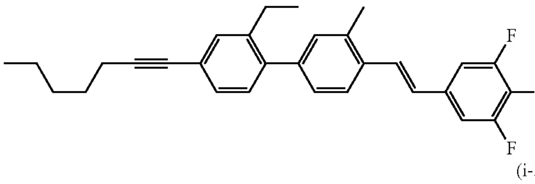

(i-5-5.4)

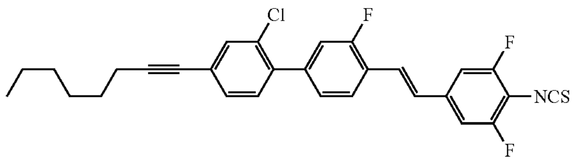

Specific examples of compounds represented by general formula (i-5-6) include compounds represented by structural formulae (i-5-6.1) to (i-5-6.4) below.

(i-5-6.1)

[Chem. 78]

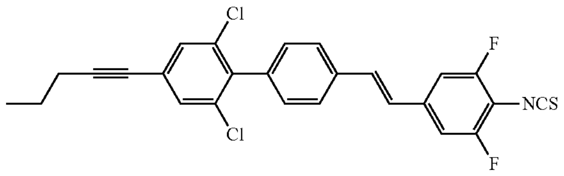

(i-5-6.2)

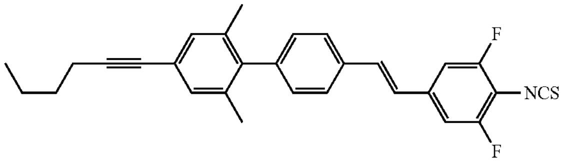

(i-5-6.3)

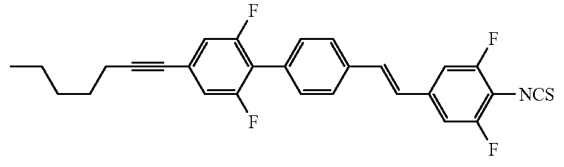

(i-5-6.4)

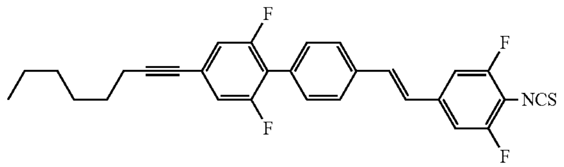

One or two, preferably 1 to 10, preferably 1 to 5, preferably 1 to 3 of the compounds represented by general formula (i), general formulae (i-1) to (i-5), general formulae (i-1-1) to (i-1-7), general formulae (i-2-1) to (i-2-15), general formulae (i-3-1) to (i-3-11), general formulae (i-4-1) to (i-4-10), general formulae (i-5-1) to (i-5-6), structural formulae (i-1-1.1) to (i-1-1.4), structural formulae (i-1-2.1) to (i-1-2.5), structural formulae (i-1-3.1) to (i-1-3.4), structural formulae (i-1-4.1) to (i-1-4.4), structural formulae (i-1-5.1) to (i-1-5.4), structural formulae (i-1-6.1) to (i-1-6.4), structural formulae (i-1-7.1) to (i-1-7.4), structural formulae (i-2-1.1) to (i-2-1.4), structural formulae (i-2-2.1) to (i-2-2.5), structural formulae (i-2-3.1) to (i-2-3.4), structural formulae (i-2-4.1) to (i-2-4.9), structural formulae (i-2-5.1) to (i-2-5.6), structural formulae (i-2-6.1) to (i-2-6.6), structural formulae (i-2-7.1) to (i-2-7.3), structural formulae (i-2-8.1) to (i-2-8.4), structural formulae (i-2-9.1) to (i-2-9.4), structural formulae (i-2-10.1) to (i-2-10.4), structural formulae (i-2-11.1) to (i-2-11.5), structural formulae (i-2-12.1) to (i-2-12.4), structural formulae (i-2-13.1) to (i-2-13.5), structural formulae (i-2-14.1) to (i-2-14.4), structural formulae (i-2-15.1) to (i-2-15.6), structural formulae (i-3-1.1) to (i-3-1.4), structural formulae (i-3-2.1) to (i-3-2.4), structural formulae (i-3-3.1) to (i-3-3.6), structural formulae (i-3-4.1) to (i-3-4.7), structural formulae (i-3-5.1) to (i-3-5.5), structural formulae (i-3-6.1) to (i-3-6.5), structural formulae (i-3-7.1) to (i-3-7.4), structural formulae (i-3-8.1) to (i-3-8.3), structural formulae (i-3-9.1) to (i-3-9.3), structural formulae (i-3-10.1) to (i-3-10.3), structural formulae (i-3-11.1) to (i-3-11.6), structural formulae (i-4-1.1) to (i-4-1.4), structural formulae (i-4-2.1) to (i-4-2.5), structural formulae (i-4-3.1) to (i-4-3.5), structural formulae (i-4-4.1)

to (i-4-4.4), structural formulae (i-4-5.1) to (i-4-5.4), structural formulae (i-4-6.1) to (i-4-6.6), structural formulae (i-4-7.1) to (i-4-7.4), structural formulae (i-4-8.1) to (i-4-8.5), structural formulae (i-4-9.1) to (i-4-9.4), structural formulae (i-4-10.1) to (i-4-10.4), structural formulae (i-5-1.1) to (i-5-1.4), structural formulae (i-5-2.1) to (i-5-2.4), structural formulae (i-5-3.1) to (i-5-3.4), structural formulae (i-5-4.1) to (i-5-4.4), structural formulae (i-5-5.1) to (i-5-5.4), or structural formulae (i-5-6.1) to (i-5-6.4) are used in the liquid crystal composition.

The lower limit of the total content of the compound(s) represented by general formula (i), general formulae (i-1) to (i-5), general formulae (i-1-1) to (i-1-7), general formulae (i-2-1) to (i-2-15), general formulae (i-3-1) to (i-3-11), general formulae (i-4-1) to (i-4-10), general formulae (i-5-1) to (i-5-6), structural formulae (i-1-1.1) to (i-1-1.4), structural formulae (i-1-2.1) to (i-1-2.5), structural formulae (i-1-3.1) to (i-1-3.4), structural formulae (i-1-4.1) to (i-1-4.4), structural formulae (i-1-5.1) to (i-1-5.4), structural formulae (i-1-6.1) to (i-1-6.4), structural formulae (i-1-7.1) to (i-1-7.4), structural formulae (i-2-1.1) to (i-2-1.4), structural formulae (i-2-2.1) to (i-2-2.5), structural formulae (i-2-3.1) to (i-2-3.4), structural formulae (i-2-4.1) to (i-2-4.9), structural formulae (i-2-5.1) to (i-2-5.6), structural formulae (i-2-6.1) to (i-2-6.6), structural formulae (i-2-7.1) to (i-2-7.3), structural formulae (i-2-8.1) to (i-2-8.4), structural formulae (i-2-9.1) to (i-2-9.4), structural formulae (i-2-10.1) to (i-2-10.4), structural formulae (i-2-11.1) to (i-2-11.5), structural formulae (i-2-12.1) to (i-2-12.4), structural formulae (i-2-13.1) to (i-2-13.5), structural formulae (i-2-14.1) to (i-2-14.4), structural formulae (i-2-15.1) to (i-2-15.6), structural formulae (i-3-1.1) to (i-3-1.4), structural formulae (i-3-2.1) to (i-3-2.4), structural formulae (i-3-3.1) to (i-3-3.6), structural formulae (i-3-4.1) to (i-3-4.7), structural formulae (i-3-5.1) to (i-3-5.5), structural formulae (i-3-6.1) to (i-3-6.5), structural formulae (i-3-7.1) to (i-3-7.4), structural formulae (i-3-8.1) to (i-3-8.3), structural formulae (i-3-9.1) to (i-3-9.3), structural formulae (i-3-10.1) to (i-3-10.3), structural formulae (i-3-11.1) to (i-3-11.6), structural formulae (i-4-1.1) to (i-4-1.4), structural formulae (i-4-2.1) to (i-4-2.5), structural formulae (i-4-3.1) to (i-4-3.5), structural formulae (i-4-4.1) to (i-4-4.4), structural formulae (i-4-5.1) to (i-4-5.4), structural formulae (i-4-6.1) to (i-4-6.6), structural formulae (i-4-7.1) to (i-4-7.4), structural formulae (i-4-8.1) to (i-4-8.5), structural formulae (i-4-9.1) to (i-4-9.4), structural formulae (i-4-10.1) to (i-4-10.4), structural formulae (i-5-1.1) to (i-5-1.4), structural formulae (i-5-2.1) to (i-5-2.4), structural formulae (i-5-3.1) to (i-5-3.4), structural formulae (i-5-4.1) to (i-5-4.4), structural formulae (i-5-5.1) to (i-5-5.4), or structural formulae (i-5-6.1) to (i-5-6.4) in 100% by mass of the liquid crystal composition is preferably 1% by mass or more, preferably 3% by mass or more, preferably 5% by mass or more, preferably 10% by mass or more, preferably 15% by mass or more, preferably 20% by mass or more, preferably 25% by mass or more, and preferably 30% by mass or more.

The upper limit of the total content of the compound(s) represented by general formula (i), general formulae (i-1) to (i-5), general formulae (i-1-1) to (i-1-7), general formulae (i-2-1) to (i-2-15), general formulae (i-3-1) to (i-3-11), general formulae (i-4-1) to (i-4-10), general formulae (i-5-1) to (i-5-6), structural formulae (i-1-1.1) to (i-1-1.4), structural formulae (i-1-2.1) to (i-1-2.5), structural formulae (i-1-3.1) to (i-1-3.4), structural formulae (i-1-4.1) to (i-1-4.4), structural formulae (i-1-5.1) to (i-1-5.4), structural formulae (i-1-6.1) to (i-1-6.4), structural formulae (i-1-7.1) to (i-1-7.4), structural formulae (i-2-1.1) to (i-2-1.4), structural formulae (i-2-2.1) to (i-2-2.5), structural formulae (i-2-3.1) to (i-2-3.4), structural formulae (i-2-4.1) to (i-2-4.9), structural formulae (i-2-5.1) to (i-2-5.6), structural formulae (i-2-6.1) to (i-2-6.6), structural formulae (i-2-7.1) to (i-2-7.3), structural formulae (i-2-8.1) to (i-2-8.4), structural formulae (i-2-9.1) to (i-2-9.4), structural formulae (i-2-10.1) to (i-2-10.4), structural formulae (i-2-11.1) to (i-2-11.5), structural formulae (i-2-12.1) to (i-2-12.4), structural formulae (i-2-13.1) to (i-2-13.5), structural formulae (i-2-14.1) to (i-2-14.4), structural formulae (i-2-15.1) to (i-2-15.6), structural formulae (i-3-1.1) to (i-3-1.4), structural formulae (i-3-2.1) to (i-3-2.4), structural formulae (i-3-3.1) to (i-3-3.6), structural formulae (i-3-4.1) to (i-3-4.7), structural formulae (i-3-5.1) to (i-3-5.5), structural formulae (i-3-6.1) to (i-3-6.5), structural formulae (i-3-7.1) to (i-3-7.4), structural formulae (i-3-8.1) to (i-3-8.3), structural formulae (i-3-9.1) to (i-3-9.3), structural formulae (i-3-10.1) to (i-3-10.3), structural formulae (i-3-11.1) to (i-3-11.6), structural formulae (i-4-1.1) to (i-4-1.4), structural formulae (i-4-2.1) to (i-4-2.5), structural formulae (i-4-3.1) to (i-4-3.5), structural formulae (i-4-4.1) to (i-4-4.4), structural formulae (i-4-5.1) to (i-4-5.4), structural formulae (i-4-6.1) to (i-4-6.6), structural formulae (i-4-7.1) to (i-4-7.4), structural formulae (i-4-8.1) to (i-4-8.5), structural formulae (i-4-9.1) to (i-4-9.4), structural formulae (i-4-10.1) to (i-4-10.4), structural formulae (i-5-1.1) to (i-5-1.4), structural formulae (i-5-2.1) to (i-5-2.4), structural formulae (i-5-3.1) to (i-5-3.4), structural formulae (i-5-4.1) to (i-5-4.4), structural formulae (i-5-5.1) to (i-5-5.4), or structural formulae (i-5-6.1) to (i-5-6.4) in 100% by mass of the liquid crystal composition is preferably 75% by mass or less, preferably 65% by mass or less, preferably 55% by mass or less, preferably 45% by mass or less, preferably 35% by mass or less, preferably 25% by mass or less, preferably 15% by mass or less, and preferably 5% by mass or less.

The total content of the compound(s) represented by general formula (i), general formulae (i-1) to (i-5), general formulae (i-1-1) to (i-1-7), general formulae (i-2-1) to (i-2-15), general formulae (i-3-1) to (i-3-11), general formulae (i-4-1) to (i-4-10), general formulae (i-5-1) to (i-5-6), structural formulae (i-1-1.1) to (i-1-1.4), structural formulae (i-1-2.1) to (i-1-2.5), structural formulae (i-1-3.1) to (i-1-3.4), structural formulae (i-1-4.1) to (i-1-4.4), structural formulae (i-1-5.1) to (i-1-5.4), structural formulae (i-1-6.1) to (i-1-6.4), structural formulae (i-1-7.1) to (i-1-7.4), structural formulae (i-2-1.1) to (i-2-1.4), structural formulae (i-2-2.1) to (i-2-2.5), structural formulae (i-2-3.1) to (i-2-3.4), structural formulae (i-2-4.1) to (i-2-4.9), structural formulae (i-2-5.1) to (i-2-5.6), structural formulae (i-2-6.1) to (i-2-6.6), structural formulae (i-2-7.1) to (i-2-7.3), structural formulae (i-2-8.1) to (i-2-8.4), structural formulae (i-2-9.1) to (i-2-9.4), structural formulae (i-2-10.1) to (i-2-10.4), structural formulae (i-2-11.1) to (i-2-11.5), structural formulae (i-2-12.1) to (i-2-12.4), structural formulae (i-2-13.1) to (i-2-13.5), structural formulae (i-2-14.1) to (i-2-14.4), structural formulae (i-2-15.1) to (i-2-15.6), structural formulae (i-3-1.1) to (i-3-1.4), structural formulae (i-3-2.1) to (i-3-2.4), structural formulae (i-3-3.1) to (i-3-3.6), structural formulae (i-3-4.1) to (i-3-4.7), structural formulae (i-3-5.1) to (i-3-5.5), structural formulae (i-3-6.1) to (i-3-6.5), structural formulae (i-3-7.1) to (i-3-7.4), structural formulae (i-3-8.1) to (i-3-8.3), structural formulae (i-3-9.1) to (i-3-9.3), structural formulae (i-3-10.1) to (i-3-10.3), structural formulae (i-3-11.1) to (i-3-11.6), structural formulae (i-4-1.1) to (i-4-1.4), structural formulae (i-4-2.1) to (i-4-2.5), structural formulae (i-4-3.1) to (i-4-3.5), structural formulae (i-4-4.1) to (i-4-4.4), structural formulae (i-4-5.1)

to (i-4-5.4), structural formulae (i-4-6.1) to (i-4-6.6), structural formulae (i-4-7.1) to (i-4-7.4), structural formulae (i-4-8.1) to (i-4-8.5), structural formulae (i-4-9.1) to (i-4-9.4), structural formulae (i-4-10.1) to (i-4-10.4), structural formulae (i-5-1.1) to (i-5-1.4), structural formulae (i-5-2.1) to (i-5-2.4), structural formulae (i-5-3.1) to (i-5-3.4), structural formulae (i-5-4.1) to (i-5-4.4), structural formulae (i-5-5.1) to (i-5-5.4), or structural formulae (i-5-6.1) to (i-5-6.4) in 100% by mass of the liquid crystal composition is preferably 1 to 75% by mass, preferably 3 to 65% by mass, preferably 5 to 55% by mass, preferably 5 to 45% by mass, preferably 5 to 35% by mass, and preferably 5 to 25% by mass, in terms of solubility, Δn and/or $\Delta\varepsilon_r$.

The compounds represented by general formula (i) (including subordinate concepts) can be synthesized using known synthetic methods, some examples of which are given below.

(Production Example 1) Production of Compound Represented by Formula (s-5) Below

[Chem. 79]

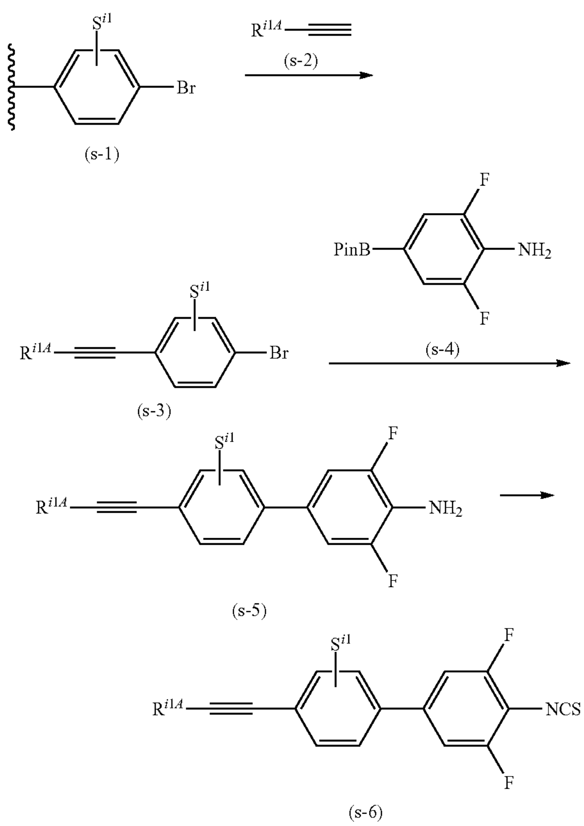

(s-1) (s-3) (s-5) (s-6)

(In the formula, $R^{i1A}$ and $S^{i1}$ have the same meaning as $R^{i1A}$ and $S^{i1}$ in general formula (i).)

The compound represented by general formula (s-1) is allowed to react with the compound represented by general formula (s-2) to yield the compound represented by general formula (s-3).

Examples of the reaction method include the Sonogashira coupling reaction using a palladium catalyst, a copper catalyst, and a base.

Specific examples of the palladium catalyst include [1,1'-bis(diphenylphosphino)ferrocene]palladium(II) dichloride, palladium(II) acetate, dichlorobis[di-tert-butyl(p-dimethylaminophenyl)phosphino]palladium(II), dichlorobis(triphenylphosphine)palladium(II), and tetrakis(triphenylphosphine)palladium(0).

When palladium(II) acetate is used as the palladium catalyst, a ligand such as triphenylphosphine or 2-dicyclohexylphosphino-2',4',6'-triisopropylbiphenyl may be added.

Specific examples of the copper catalyst include copper(I) iodide.

Specific examples of the base include triethylamine.

The compound represented by general formula (s-3) is allowed to react with the compound represented by general formula (s-4) to yield the compound represented by general formula (s-5).

Examples of the reaction method include Suzuki coupling in the presence of a metal catalyst and a base.

Specific examples of the metal catalyst include those listed above.

Specific examples of the base include potassium carbonate, potassium phosphate, and cesium carbonate.

Finally, the amino group is allowed to react with 1,1-thiocarbonyldiimidazole, 1,1-thiocarbonyldi-2(1H)-pyridone, thiophosgene, or the like to yield the target product (s-6).

(Production Example 2) Production of Compound Represented by Formula (s-12) Below

[Chem. 80]

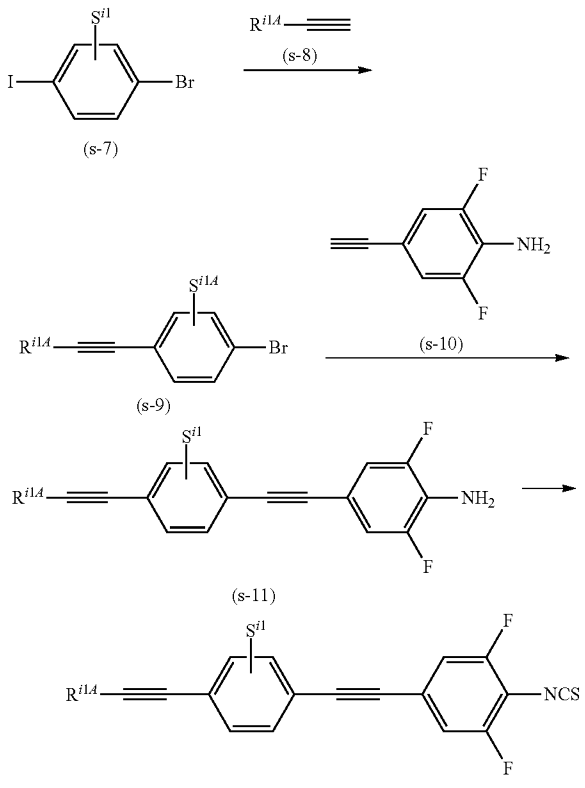

(s-7) (s-9) (s-11) (s-12)

(In the formula, $R^{i1A}$ and $S^{i1}$ have the same meaning as $R^{i1A}$ and $S^{i1}$ in general formula (i).)

The compound represented by general formula (s-7) is allowed to react with the compound represented by general formula (s-8) to yield the compound represented by general formula (s-9).

Examples of the reaction method include the Sonogashira coupling reaction using a palladium catalyst, a copper catalyst, and a base.

Specific examples of the palladium catalyst, the copper catalyst, and the base include those listed in (Production Example 1).

The compound represented by general formula (s-9) is allowed to react with the compound represented by general formula (s-10) to yield the compound represented by general formula (s-11).

Examples of the reaction method include the Sonogashira coupling reaction using a palladium catalyst, a copper catalyst, and a base.

Specific examples of the palladium catalyst, the copper catalyst, and the base include those listed in (Production Example 1).

Finally, the amino group is allowed to react with 1,1-thiocarbonyldiimidazole, 1,1-thiocarbonyldi-2(1H)-pyridone, thiophosgene, or the like to yield the target product (s-12).

(Production Example 3) Production of Compound Represented by Formula (s-21) Below

[Chem. 81]

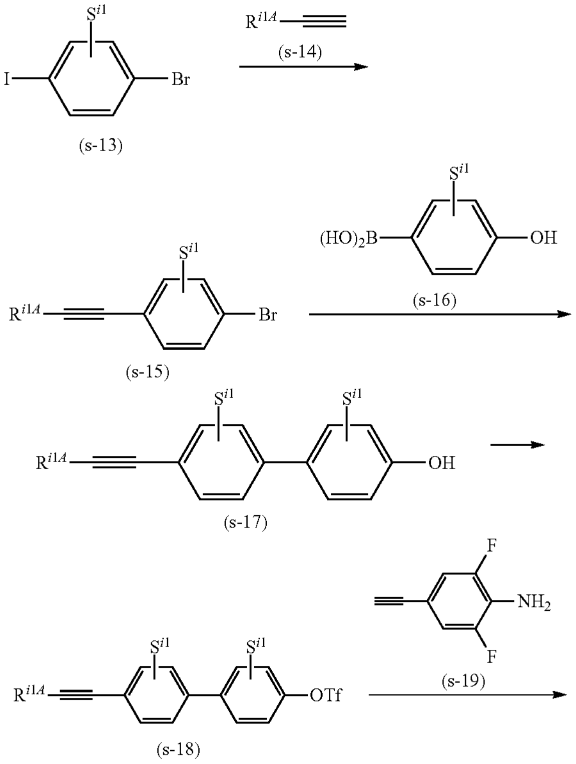

(s-13) (s-14) (s-15) (s-16) (s-17) (s-19) (s-18)

-continued

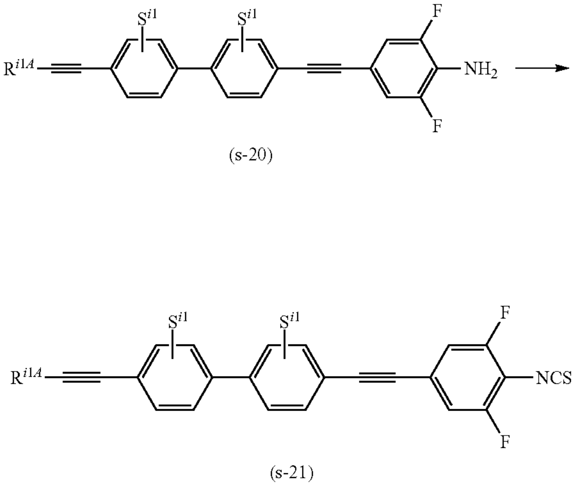

(s-20)

(s-21)

(In the formula, $R^{i1A}$ and $S^{i1}$ have the same meaning as $R^{i1A}$ and $S^{i1}$ in general formula (i).)

The compound represented by general formula (s-13) is allowed to react with the compound represented by general formula (s-14) to yield the compound represented by general formula (s-15).

Examples of the reaction method include the Sonogashira coupling reaction using a palladium catalyst, a copper catalyst, and a base.

Specific examples of the palladium catalyst, the copper catalyst, and the base include those listed in (Production Example 1).

The compound represented by general formula (s-15) is allowed to react with the compound represented by general formula (s-16) to yield the compound represented by general formula (s-17).

Examples of the reaction method include Suzuki coupling in the presence of a metal catalyst and a base.

Specific examples of the metal catalyst and the base include the compounds listed in (Production Example 1).

The compound represented by general formula (s-17) is allowed to react with, for example, trifluoromethanesulfonic anhydride in the presence of a base to yield the compound represented by general formula (s-18).

Specific examples of the base include triethylamine and pyridine.

The compound represented by general formula (s-18) is allowed to react with the compound represented by general formula (s-19) to yield the compound represented by general formula (s-20).

Examples of the reaction method include the Sonogashira coupling reaction using a palladium catalyst, a copper catalyst, and a base.

Specific examples of the palladium catalyst, the copper catalyst, and the base include those listed in (Production Example 1).

Finally, the amino group is allowed to react with 1,1-thiocarbonyldiimidazole, 1,1-thiocarbonyldi-2(1H)-pyridone, thiophosgene, or the like to yield the target product (s-21).

(Production Example 4) Production of Compound Represented by Formula (s-31) Below

[Chem. 82]

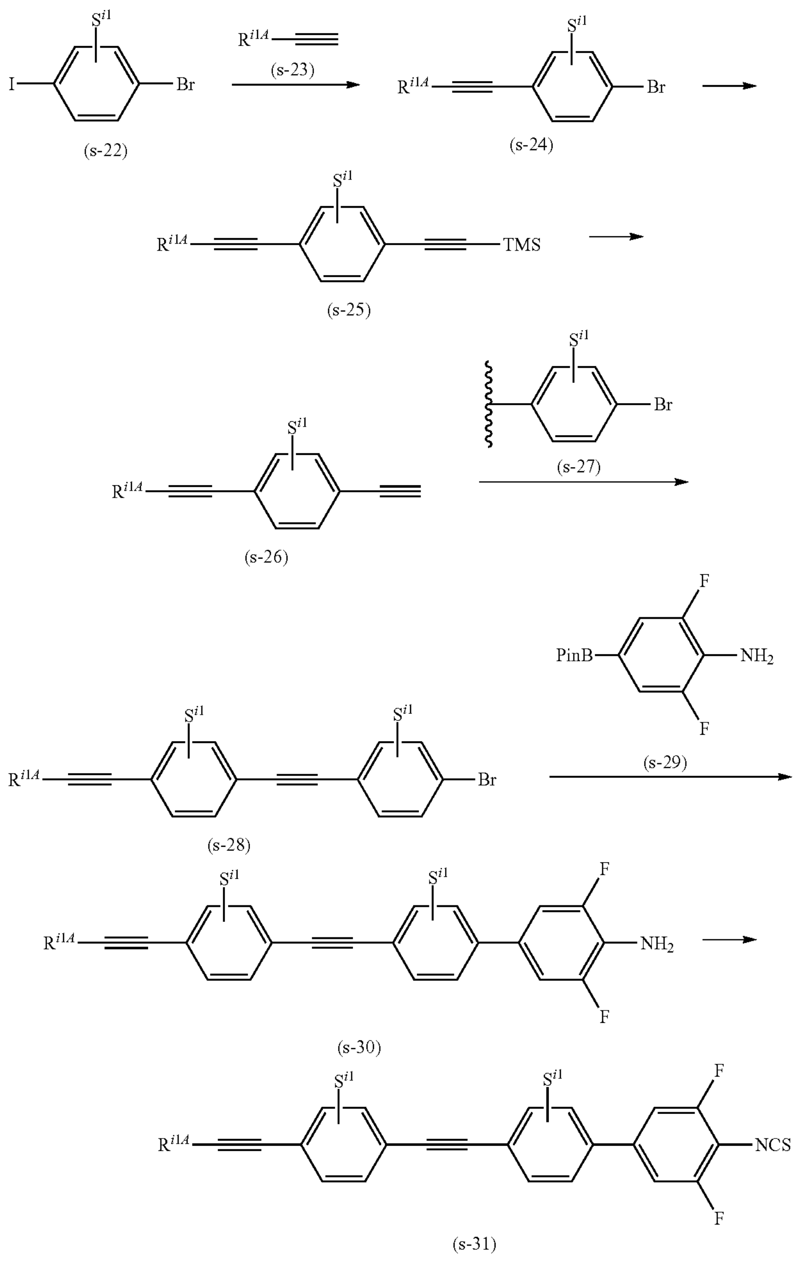

(In the formula, $R^{i1A}$ and $S^{i1}$ have the same meaning as $R^{i1A}$ and $S^{i1}$ in general formula (i).)

The compound represented by general formula (s-22) is allowed to react with the compound represented by general formula (s-23) to yield the compound represented by general formula (s-24).

Examples of the reaction method include the Sonogashira coupling reaction using a palladium catalyst, a copper catalyst, and a base.

Specific examples of the palladium catalyst, the copper catalyst, and the base include those listed in (Production Example 1).

The compound represented by general formula (s-24) is allowed to reach with trimethylsilylacetylene to yield the compound represented by general formula (s-25).

Examples of the reaction method include the Sonogashira coupling reaction using a palladium catalyst, a copper catalyst, and a base.

Specific examples of the palladium catalyst, the copper catalyst, and the base include those listed in (Production Example 1).

The compound represented by general formula (s-25) is allowed to reach with potassium carbonate to yield the compound represented by general formula (s-26).

The compound represented by general formula (s-26) is allowed to react with the compound represented by general formula (s-27) to yield the compound represented by general formula (s-28).

Examples of the reaction method include the Sonogashira coupling reaction using a palladium catalyst, a copper catalyst, and a base.

Specific examples of the palladium catalyst, the copper catalyst, and the base include those listed in (Production Example 1).

The compound represented by general formula (s-28) is allowed to react with the compound represented by general formula (s-29) to yield the compound represented by general formula (s-30).

Examples of the reaction method include Suzuki coupling in the presence of a metal catalyst and a base.

Specific examples of the metal catalyst and the base include the compounds listed in (Production Example 1).

Finally, the amino group is allowed to react with 1,1-thiocarbonyldiimidazole, 1,1-thiocarbonyldi-2(1H)-pyridone, thiophosgene, or the like to yield the target product (s-31).

The reaction conditions other than those described in each process include, for example, those described in literatures such as Experimental Chemistry (edited by The Chemical Society of Japan, published by Maruzen Publishing Co., Ltd.), Organic Syntheses (A John Wiley & Sons, Inc. publication), Beilstein Handbook of Organic Chemistry (Beilstein-Institut fuer Literatur der Organischen Chemie, Springer-Verlag Berlin and Heidelberg GmbH & Co. K), and Fiesers' Reagents for Organic Synthesis (John Wiley & Sons, Inc.), and those listed in databases such as SciFinder (Chemical Abstracts Service, American Chemical Society) and Reaxys (Elsevier Ltd.).

When substances unstable to oxygen and/or moisture are handled in each process, it is preferable to perform the operation in an inert gas such as nitrogen gas or argon gas.

The functional group can be protected as necessary in each process.

Examples of the protective group include protective groups listed in GREENE'S PROTECTIVE GROUPS IN ORGANIC SYNTHESIS (Fourth Edition), coauthored by PETER G. M. WUTS and THEODORA W. GREENE, A John Wiley & Sons, Inc., Publication).

Purification can be performed as necessary in each process.

Examples of the purification method include chromatography, recrystallization, distillation, sublimation, reprecipitation, adsorption, and liquid phase separation.

Specific examples of the purifying agent include silica gel, alumina, and activated carbon.

(Other Compounds)

(Compounds Represented by General Formula (ii))

The liquid crystal composition according to the present invention may further contain one or two or more of compounds represented by general formula (ii) below having an isothiocyanate group (—NCS) in terms of solubility, Δn and/or $\Delta\varepsilon_r$.

[Chem. 83]

$$R^{ii1}\text{—}[A^{ii1}\text{—}Z^{ii1}]_{n^{ii1}}\text{—}A^{ii2}\text{—NCS} \quad \text{(ii)}$$

In general formula (ii), $R^{ii1}$ represents an alkyl group having 1 to 20 carbon atoms.

The alkyl group is a linear, branched, or cyclic alkyl group, and preferably a linear alkyl group.

The number of carbon atoms in the alkyl group is preferably 2 to 10, and preferably 2 to 6.

One or two or more —$CH_2$—'s in the alkyl group are each independently optionally substituted with —O—, —S—, —CO—, and/or —CS—.

One or two or more —$CH_2$—$CH_2$—'s in the alkyl group are optionally substituted with —CH═CH—, —CO—O—, —O—CO—, —CO—S—, —S—CO—, —CO—NH—, —NH—CO—, —CF═CF—, and/or —C≡C—.

One or two or more —$CH_2$—$CH_2$—$CH_2$—'s in the alkyl group are optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

For example, $R^{ii1}$ can represent an alkoxy group having 1 to 19 carbon atoms by substituting one —$CH_2$— in the alkyl group with —O—.

The alkoxy group is a linear, branched, or cyclic alkoxy group, and preferably a linear alkoxy group.

The number of carbon atoms in the alkoxy group is preferably 2 to 10, and preferably 2 to 6.

$R^{ii1}$ can represent an alkylsulfanyl group (alkylthio group) having 1 to 19 carbon atoms by substituting one —$CH_2$— in the alkyl group with —S—.

The alkylsulfanyl group is a linear, branched, or cyclic alkylsulfanyl group, and preferably a linear alkylsulfanyl group.

The number of carbon atoms in the alkylsulfanyl group is preferably 1 to 10, and preferably 1 to 6.

$R^{ii1}$ can represent an alkenyl group having 2 to 20 carbon atoms by substituting one or two or more —$CH_2$—$CH_2$—'s in the alkyl group with —CH═CH—.

The alkenyl group is a linear, branched, or cyclic alkenyl group, and preferably a linear alkenyl group.

The number of carbon atoms in the alkenyl group is preferably 2 to 10, and preferably 2 to 6.

$R^{ii1}$ can represent an alkynyl group having 2 to 20 carbon atoms by substituting one or two or more —$CH_2$—$CH_2$—'s in the alkyl group with —C≡C—.

The alkynyl group is a linear, branched, or cyclic alkynyl group, and preferably a linear alkynyl group.

The number of carbon atoms in the alkynyl group is preferably 2 to 10, and preferably 2 to 6.

$R^{ii1}$ can represent an alkenyloxy group having 2 to 19 carbon atoms by substituting one —$CH_2$— in the alkyl group with —O— and one or two or more —$CH_2$—$CH_2$—'s in the alkyl group with —CH═CH—.

The alkenyloxy group is a linear, branched, or cyclic alkenyloxy group, and preferably a linear alkenyloxy group.

The number of carbon atoms in the alkenyloxy group is preferably 2 to 10, and preferably 2 to 6.

$R^{ii1}$ can represent an alkyl halide group having 1 to 20 carbon atoms by substituting one or two or more hydrogen atoms in the alkyl group with a halogen atom.

The alkyl halide group is a linear, branched, or cyclic alkyl halide group, and preferably a linear alkyl halide group.

The number of carbon atoms in the alkyl halide group is preferably 2 to 10, and preferably 2 to 6.

$R^{ii1}$ can represent an alkoxy halide group having 1 to 19 carbon atoms by substituting one —$CH_2$— in the alkyl group with —O— and one or two or more hydrogen atoms in the alkyl group with a halogen atom.

The alkoxy halide group is a linear, branched, or cyclic alkoxy halide group, and preferably a linear alkoxy halide group.

The number of carbon atoms in the alkoxy halide group is preferably 2 to 10, and preferably 2 to 6.

Specific examples of the alkyl group having 1 to 20 carbon atoms (including substituted ones) in $R^{ii1}$ include groups represented by formulae ($R^{ii1}$-1) to ($R^{ii1}$-37).

[Chem. 84]

($R^{ii1}$-1)

($R^{ii1}$-2)

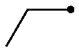

($R^{ii1}$-3)

($R^{ii1}$-4)

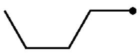

($R^{ii1}$-5)

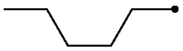

($R^{ii1}$-6)

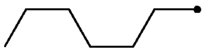

($R^{ii1}$-7)

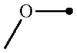

($R^{ii1}$-8)

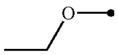

($R^{ii1}$-9)

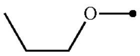

($R^{ii1}$-10)

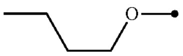

($R^{ii1}$-11)

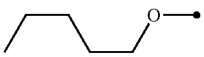

($R^{ii1}$-12)

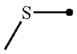

($R^{ii1}$-13)

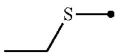

($R^{ii1}$-14)

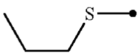

-continued ($R^{ii1}$-15)

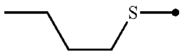

($R^{ii1}$-16)

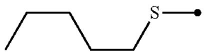

($R^{ii1}$-17)

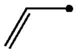

($R^{ii1}$-18)

($R^{ii1}$-19)

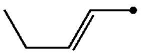

($R^{ii1}$-20)

($R^{ii1}$-21)

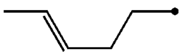

($R^{ii1}$-22)

($R^{ii1}$-23)

($R^{ii1}$-24)

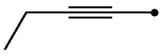

($R^{ii1}$-25)

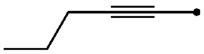

($R^{ii1}$-26)

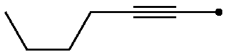

($R^{ii1}$-27)

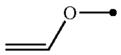

($R^{ii1}$-28)

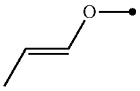

($R^{ii1}$-29)

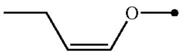

($R^{ii1}$-30)

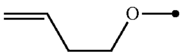

($R^{ii1}$-31)

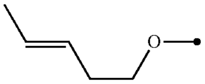

($R^{ii1}$-32)

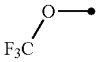

-continued ($R^{ii1}$-33)

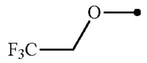

($R^{ii1}$-34)

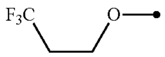

($R^{ii1}$-35)

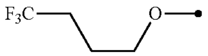

($R^{ii1}$-36)

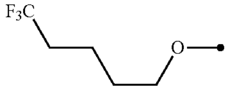

($R^{ii1}$-37)

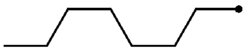

In formulae ($R^{ii1}$-1) to ($R^{ii1}$-37), a black dot represents a bond with $A^{ii1}$.

When the ring structure to which $R^{11}$ is bonded is a phenyl group (aromatic group), a linear alkyl group having 1 to 5 carbon atoms, a linear alkoxy group having 1 to 4 carbon atoms, and an alkenyl group having 4 to 5 carbon atoms are preferred. When the ring structure to which $R^{ii1}$ is bonded is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferred.

To stabilize the nematic phase, $R^{ii1}$ preferably has a total number of carbon atoms and, if present, oxygen atoms of 5 or less and preferably is linear.

In terms of solubility, $R^{ii1}$ is preferably a linear alkyl group having 2 to 8 carbon atoms, a linear alkoxy group having 2 to 8 carbon atoms, a linear alkoxy halide group having 2 to 8 carbon atoms, or a linear alkylsulfanyl group having 1 to 6 carbon atoms.

In general formula (ii), $A^{ii1}$ and $A^{ii2}$ each independently represent a group selected from the group consisting of the following groups (a), (b), (c), and (d):

(a) a 1,4-cyclohexylene group (one $—CH_2—$ or two or more non-adjacent $—CH_2—$'s in this group are optionally substituted with —O— and/or —S—.);

(b) a 1,4-phenylene group (one —CH= or two or more —CH='s in this group are optionally substituted with —N=.);

(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH= or two or more —CH='s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N=.), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group (one —CH= or two or more —CH='s in this group are optionally substituted with —N=.).

One or two or more hydrogen atoms in $A^{ii1}$ and $A^{ii2}$ are each independently optionally substituted with a substituent $S^{ii1}$.

The substituent $S^{ii1}$ represents a halogen atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms.

The halogen atom includes fluorine, chlorine, bromine, and iodine atoms.

The alkyl group having 1 to 20 carbon atoms is a linear, branched, or cyclic alkyl group, and preferably a linear alkyl group.

The number of carbon atoms in the alkyl group having 1 to 20 carbon atoms is preferably 2 to 10, and preferably 2 to 6.

One or two or more $—CH_2—$'s in the alkyl group are each independently optionally substituted with —O—, —S—, —CO—, and/or —CS—.

One or two or more $—CH_2—CH_2—$'s in the alkyl group are each independently optionally substituted with —CO—O—, —O—CO—, —CO—S—, —S—CO—, —CO—NH—, —NH—CO—, —CH=CH—, —CF=CF—, and/or —C≡C—.

One or two or more $—CH_2—CH_2—CH_2—$'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

The substituent $S^{ii1}$ is preferably a fluorine atom or a chlorine atom.

At least one of $A^{ii1}$s or $A^{ii2}$ is preferably substituted with at least one substituent $S^{ii1}$, preferably substituted with a halogen atom, and preferably substituted with a fluorine atom.

A plurality of substituents $S^{ii1}$, if present, may be the same or different.

As the substitution position of the substituent $S^{ii1}$ in $A^{ii1}$, any of formulae ($A^{ii1}$-SP-1) to ($A^{ii1}$-SP-5) below is preferred.

[Chem. 85]

($A^{ii1}$-SP-1)

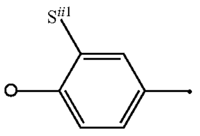

-continued (Aii1-SP-2)

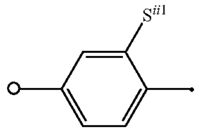

(Aii1-SP-3)

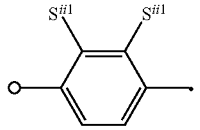

(Aii1-SP-4)

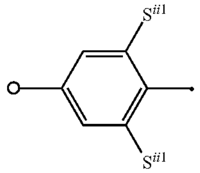

(Aii1-SP-5)

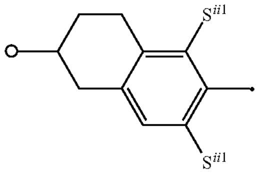

In formulae ($A^{ii1}$-SP-1) to ($A^{ii1}$-SP-5), a white dot represents a bond with $R^{ii1}$ or $Z^{ii1}$, and a black dot represents a bond with $Z^{ii1}$.

As the substitution position of the substituent $S^{ii1}$ in $A^{ii2}$, any of formulae ($A^{ii2}$-SP-1) to ($A^{ii2}$-SP-8) below is preferred.

[Chem. 86]

($A^{ii2}$-SP-1)

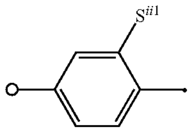

($A^{ii2}$-SP-2)

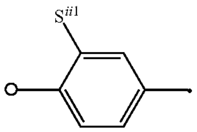

($A^{ii2}$-SP-3)

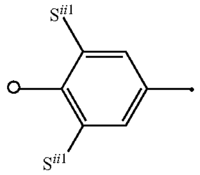

($A^{ii2}$-SP-4)

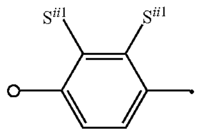

-continued ($A^{ii2}$-SP-5)

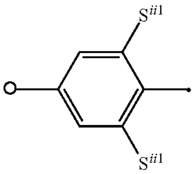

($A^{ii2}$-SP-6)

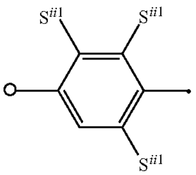

($A^{ii2}$-SP-7)

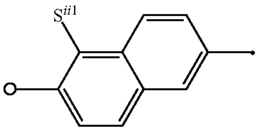

($A^{ii2}$-SP-8)

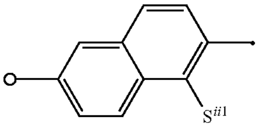

In formulae ($A^{ii2}$-SP-1) to ($A^{ii2}$-SP-8), a white dot represents a bond with $Z^{ii1}$, and a black dot represents a bond with an isothiocyanate group (—NCS).

More specifically, $A^{ii1}$ preferably represents any of formulae ($A^{ii1}$-1) to ($A^{ii1}$-13) below.

[Chem. 87]

($A^{ii1}$-1)

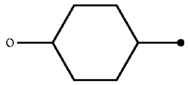

($A^{ii1}$-2)

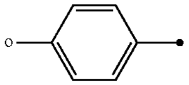

($A^{ii1}$-3)

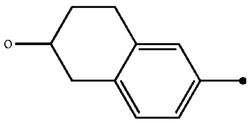

($A^{ii1}$-4)

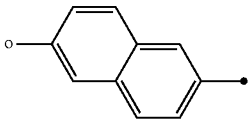

($A^{ii1}$-5)

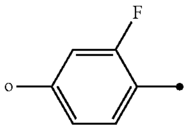

-continued ($A^{ii1}$-6)

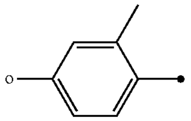

($A^{ii1}$-7)

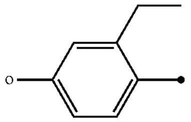

($A^{ii1}$-8)

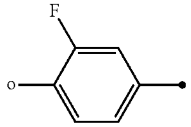

($A^{ii1}$-9)

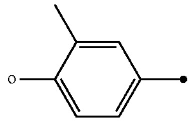

($A^{ii1}$-10)

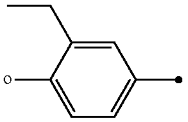

($A^{ii1}$-11)

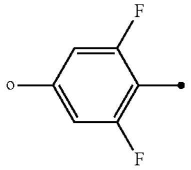

($A^{ii1}$-12)

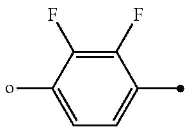

($A^{ii1}$-13)

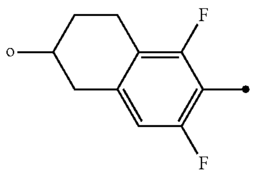

In formulae ($A^{ii1}$-1) to ($A^{ii1}$-13), a white dot represents a bond with $R^{ii1}$ or $Z^{ii1}$, and a black dot represents a bond with $Z^{ii1}$.

More specifically, $A^{ii2}$ preferably represents any of formulae ($A^{ii2}$-1) to ($A^{ii2}$-7) below.

[Chem. 88]

($A^{ii2}$-1)

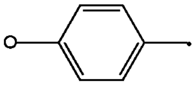

($A^{ii2}$-2)

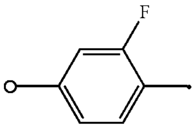

($A^{ii2}$-3)

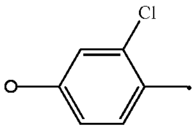

($A^{ii2}$-4)

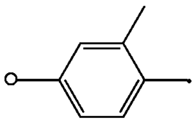

($A^{ii2}$-5)

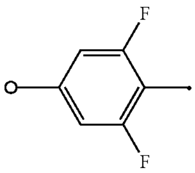

($A^{ii2}$-6)

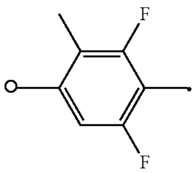

($A^{ii2}$-7)

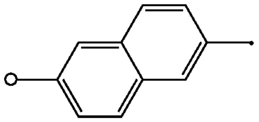

In formulae ($A^{ii2}$-1) to ($A^{ii2}$-7), a white dot represents a bond with $Z^{ii1}$, and a black dot represents a bond with the isothiocyanate group (—NCS).

In general formula (ii), $Z^{ii1}$ represents a single bond or an alkylene group having 1 to 20 carbon atoms.

One or two or more $—CH_2—$'s in the alkylene group are each independently optionally substituted with —O—.

One or two or more $—CH_2—CH_2—$'s in the alkylene group are each independently optionally substituted with $—CH_2—CH(CH_3)—$, $—CH(CH_3)—CH_2—$, —CH═CH—, —CF═CF—, $—CH═C(CH_3)—$, $—C(CH_3)═CH—$, —CH═N—, —N═CH—, —N═N—, —C≡C—, —CO—O—, and/or —O—CO—.

One or two or more $—CH_2—CH_2—CH_2—$'s in the alkyl group are each independently optionally substituted with —O—CO—O—.

However, when the alkyl group having 1 to 10 carbon atoms is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

Specific examples of the alkylene group having 1 to 20 carbon atoms (including substituted ones) include groups represented by formulae ($Z^{ii1}$-1) to ($Z^{ii1}$-24).

[Chem. 89]

($Z^{ii1}$-1)

($Z^{ii1}$-2)

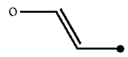

($Z^{ii1}$-3)

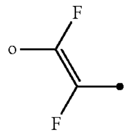

($Z^{ii1}$-4)

($Z^{ii1}$-5)

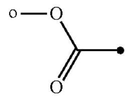

($Z^{ii1}$-6)

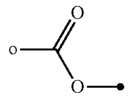

($Z^{ii1}$-7)

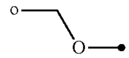

($Z^{ii1}$-8)

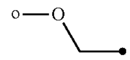

($Z^{ii1}$-9)

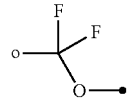

($Z^{ii1}$-10)

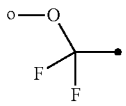

($Z^{ii1}$-11)

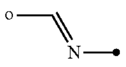

($Z^{ii1}$-12)

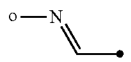

($Z^{ii1}$-13)

($Z^{ii1}$-14)

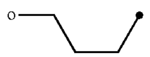

-continued ($Z^{ii1}$-15)

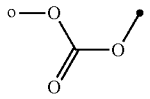

($Z^{ii1}$-16)

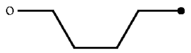

($Z^{ii1}$-17)

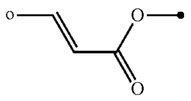

($Z^{ii1}$-18)

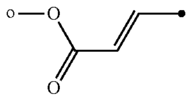

($Z^{ii1}$-19)

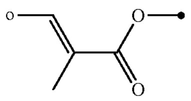

($Z^{ii1}$-20)

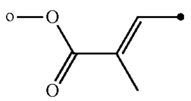

($Z^{ii1}$-21)

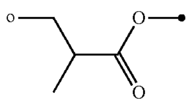

($Z^{ii1}$-22)

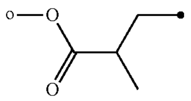

($Z^{ii1}$-23)

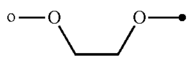

($Z^{ii1}$-24)

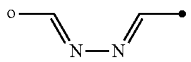

In formulae ($Z^{ii1}$-1) to ($Z^{ii1}$-24), a white dot represents a bond with $A^{ii1}$, and a black dot represents a bond with $A^{ii1}$ or $A^{ii2}$.

In general formula (ii), $n^{ii1}$ represents an integer of 1 to 4, and preferably 1 or 2.

When $n^{ii1}$ is 1, $Z^{ii1}$ preferably represents a single bond or —C≡C— in terms of Δn and/or $\Delta\varepsilon_r$.

When $n^{ii1}$ is 2, $Z^{ii1}$ preferably represents a single bond or —C≡C— in terms of Δn and/or $\Delta\varepsilon_r$.

In general formula (ii), a plurality of $A^{ii1}$s and $Z^{ii1}$s, if present, each may be the same or different.

However, in the compounds represented by general formula (ii), the compounds represented by general formula (i) (including subordinate concepts) are excluded.

A compound represented by general formula (ii) is preferably a compound represented by one of general formulae (ii-1) to (ii-7) below.

[Chem. 90]

(ii-1)
$$R^{ii1}-A^{ii1}-A^{ii2}-NCS$$

(ii-2)
$$R^{ii1}-A^{ii1}-\equiv-A^{ii2}-NCS$$

(ii-3)
$$R^{ii1}-A^{ii1}-A^{ii1-2}-\equiv-A^{ii2}-NCS$$

(ii-4)
$$R^{ii1}-A^{ii1}-\equiv-A^{ii1-2}-\equiv-A^{ii2}-NCS$$

(ii-5)
$$R^{ii1}-A^{ii1}-A^{ii1-2}-A^{ii2}-NCS$$

(ii-6)
$$R^{ii1}-A^{ii1}-\equiv-A^{ii1-2}-A^{ii2}-NCS$$

(ii-7)
$$R^{ii1}-A^{ii1}-\equiv-A^{ii1-2}-=-A^{ii2}-NCS$$

In general formulae (ii-1) to (ii-7), $R^{ii1}$, $A^{ii1}$, and $A^{ii2}$ have the same meaning as $R^{ii1}$, $A^{ii1}$, and $A^{ii2}$, respectively, in general formula (ii).

In general formulae (ii-3) to (ii-7), the definition of $A^{ii1-2}$ is the same as the definition of $A^{ii1}$ in general formula (ii).

A compound represented by general formula (ii-1) is preferably a compound represented by one of general formulae (ii-1-1) to (ii-1-2) below.

[Chem. 91]

(ii-1-1)

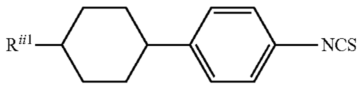

(ii-1-2)

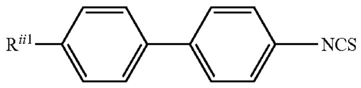

In general formulae (ii-1-1) to (ii-1-2), $R^{ii1}$ has the same meaning as $R^{ii1}$ in general formula (ii).

Specific examples of compounds represented by general formula (ii-1-1) include compounds represented by structural formulae (ii-1-1.1) to (ii-1-1.4) below.

[Chem. 92]

(ii-1-1.1)

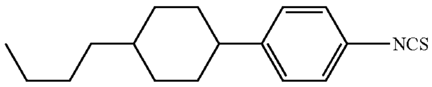

(ii-1-1.2)

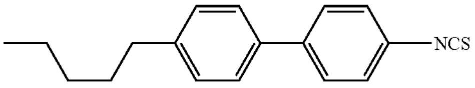

(ii-1-1.3)

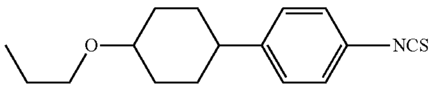

(ii-1-1.4)

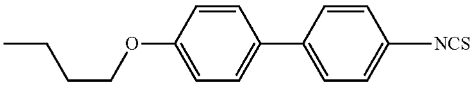

Specific examples of compounds represented by general formula (ii-1-2) include compounds represented by structural formulae (ii-1-2.1) to (ii-1-2.6) below.

[Chem. 93]

(ii-1-2.1)

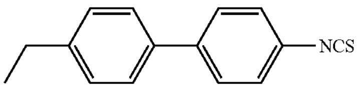

(ii-1-2.2)

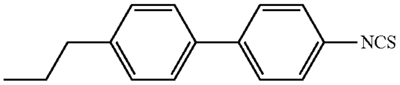

(ii-1-2.3)

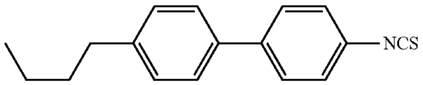

(ii-1-2.4)

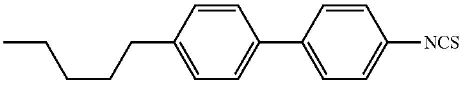

(ii-1-2.5)

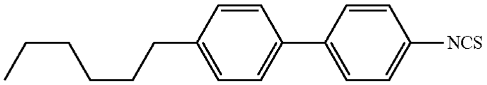

(ii-1-2.6)

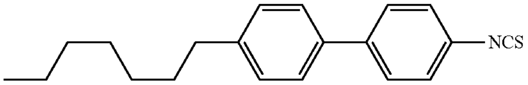

A compound represented by general formula (ii-2) is preferably a compound represented by one of general formulae (ii-2-1) to (ii-2-5) below.

[Chem. 94]

(ii-2-1)

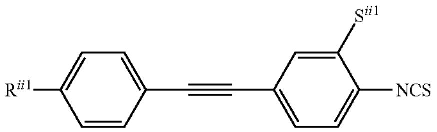

(ii-2-2)

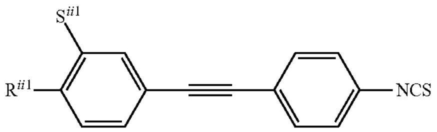

(ii-2-3)

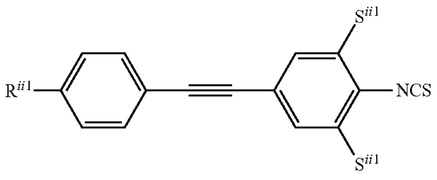

-continued (ii-2-4)

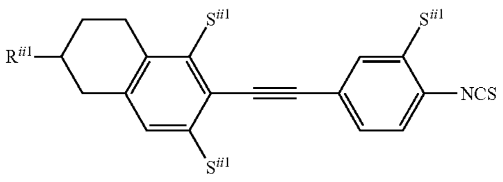

(ii-2-5)

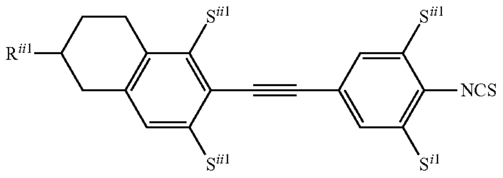

In general formulae (ii-2-1) to (ii-2-5), $R^{ii1}$ and $S^{ii1}$ each independently have the same meaning as $R^{ii1}$ and $S^{ii1}$, respectively, in general formula (ii).

Specific examples of compounds represented by general formula (ii-2-1) include compounds represented by structural formulae (ii-2-1.1) to (ii-2-1.5) below.

[Chem. 95]

(ii-2-1.1)

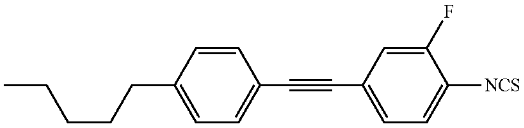

(ii-2-1.2)

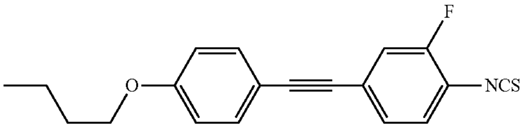

(ii-2-1.3)

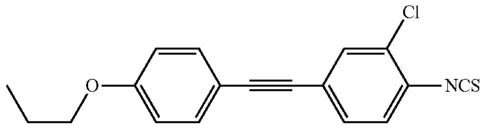

(ii-2-1.4)

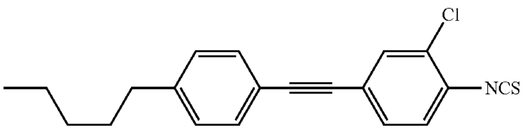

(ii-2-1.5)

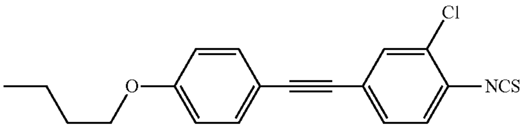

Specific examples of compounds represented by general formula (ii-2-2) include compounds represented by structural formulae (ii-2-2.1) to (ii-2-2.3) below.

[Chem. 96]

(ii-2-2.1)

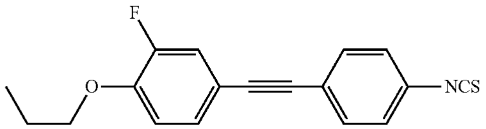

(ii-2-2.2)

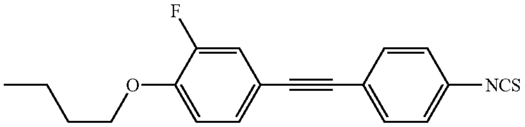

(ii-2-2.3)

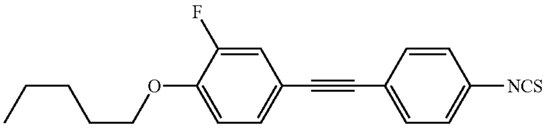

Specific examples of compounds represented by general formula (ii-2-3) include compounds represented by structural formulae (ii-2-3.1) to (ii-2-3.3) below.

[Chem. 97]

(ii-2-3.1)

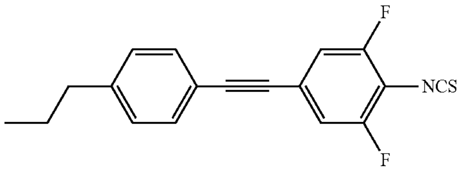

(ii-2-3.2)

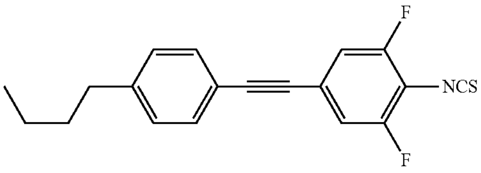

(ii-2-3.3)

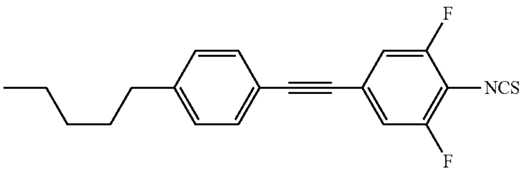

Specific examples of compounds represented by general formula (ii-2-4) include compounds represented by structural formulae (ii-2-4.1) to (ii-2-4.3) below.

[Chem. 98]

(ii-2-4.1)

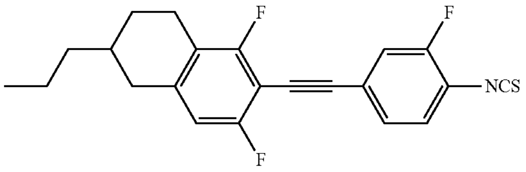

(ii-2-4.2)

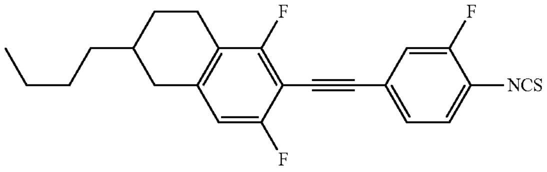

(ii-2-4.3)

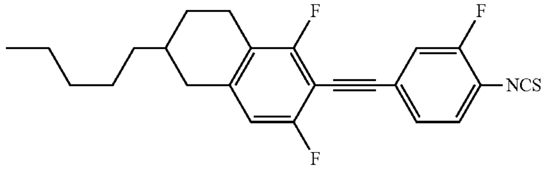

Specific examples of compounds represented by general formula (ii-2-5) include compounds represented by structural formulae (ii-2-5.1) to (ii-2-5.3) below.

[Chem. 99]

(ii-2-5.1)

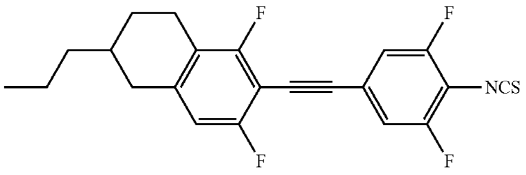

(ii-2-5.2)

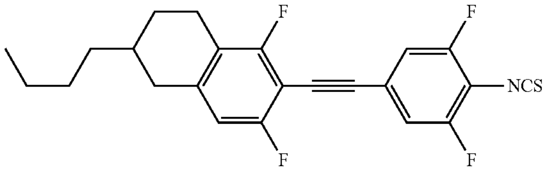

(ii-2-5.3)

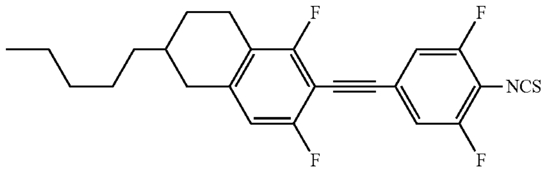

A compound represented by general formula (ii-3) is preferably a compound represented by one of general formulae (ii-3-1) to (ii-3-6) below.

[Chem. 100]

(ii-3-1)

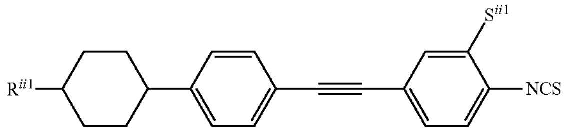

(ii-3-2)

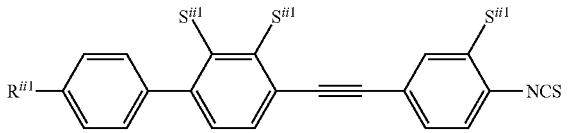

(ii-3-3)

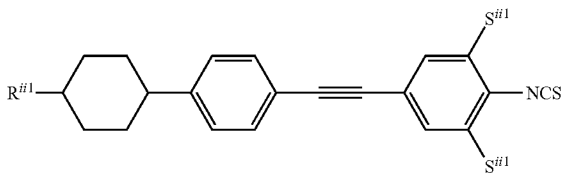

(ii-3-4)

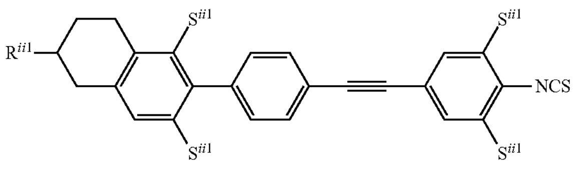

(ii-3-5)

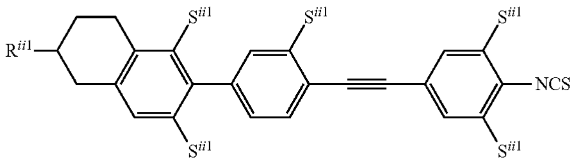

(ii-3-6)

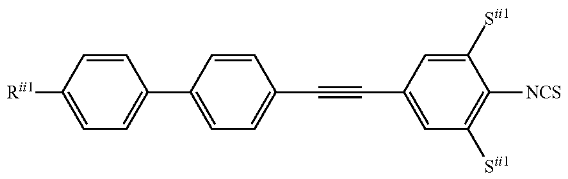

In general formulae (ii-3-1) to (ii-3-6), $R^{ii1}$ and $S^{ii1}$ each independently have the same meaning as $R^{ii1}$ and $S^{ii1}$, respectively, in general formula (ii).

Specific examples of compounds represented by general formula (ii-3-1) include compounds represented by structural formulae (ii-3-1.1) to (ii-3-1.4) below.

[Chem. 101]

(ii-3-1.1)

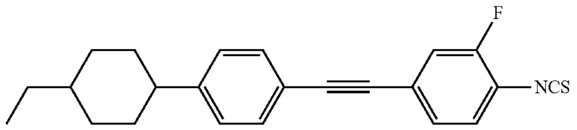

-continued (ii-3-1.2)

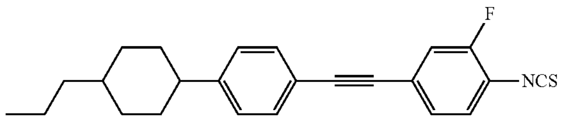

(ii-3-1.3)

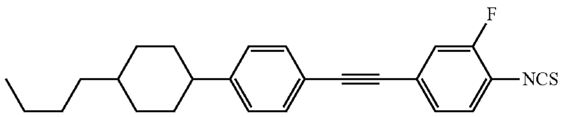

(ii-3-1.4)

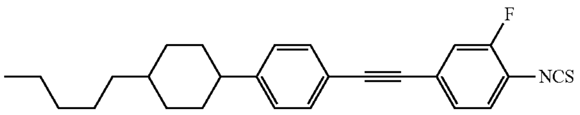

Specific examples of compounds represented by general formula (ii-3-2) include compounds represented by structural formulae (ii-3-2.1) to (ii-3-2.3) below.

[Chem. 102]

(ii-3-2.1)

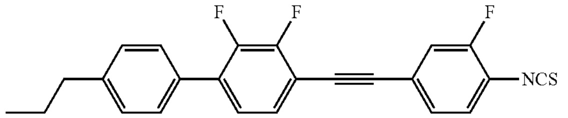

(ii-3-2.2)

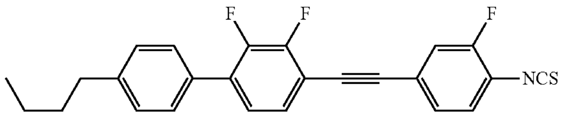

(ii-3-2.3)

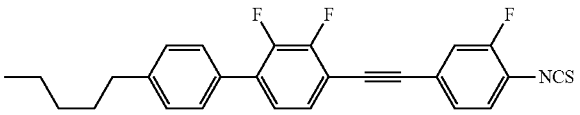

Specific examples of compounds represented by general formula (ii-3-3) include compounds represented by structural formulae (ii-3-3.1) to (ii-3-3.3) below.

[Chem. 103]

(ii-3-3.1)

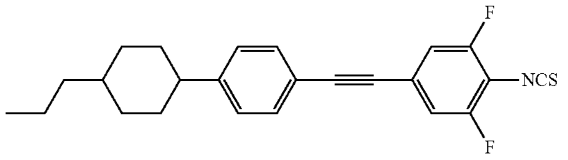

(ii-3-3.2)

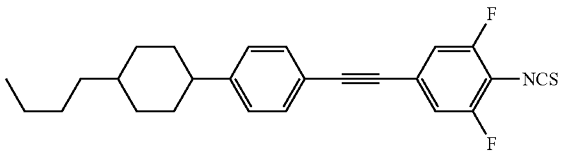

-continued (ii-3-3.3)

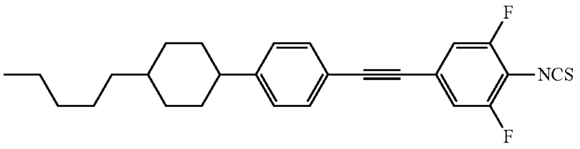

Specific examples of compounds represented by general formula (ii-3-4) include compounds represented by structural formulae (ii-3-4.1) to (ii-3-4.3) below.

[Chem. 104]

(ii-3-4.1)

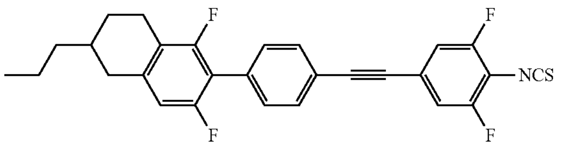

(ii-3-4.2)

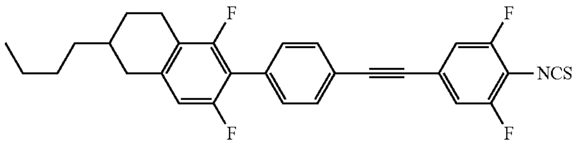

(ii-3-4.3)

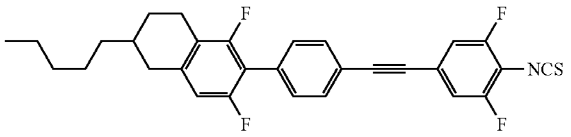

Specific examples of compounds represented by general formula (ii-3-5) include compounds represented by structural formulae (ii-3-5.1) to (ii-3-5.3) below.

[Chem. 105]

(ii-3-5.1)

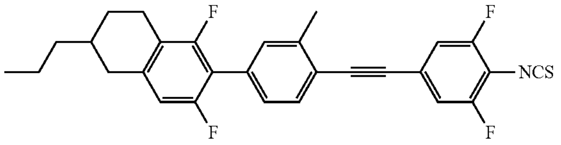

(ii-3-5.2)

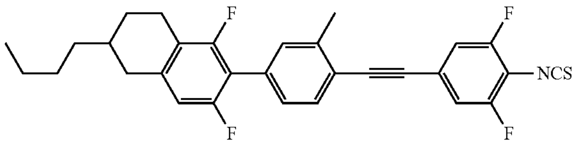

(ii-3-5.3)

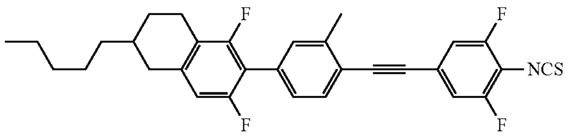

Specific examples of compounds represented by general formula (ii-3-6) include compounds represented by structural formulae (ii-3-6.1) to (ii-3-6.2) below.
[Chem. 106]
(ii-3-6.1)
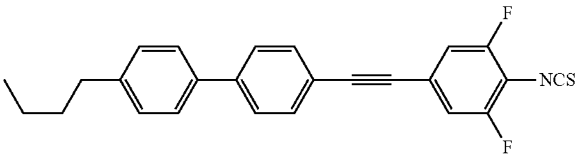
(ii-3-6.2)
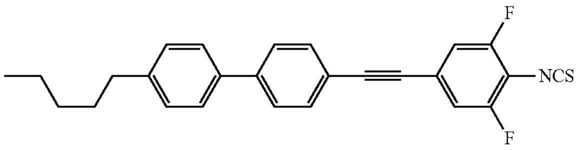
A compound represented by general formula (ii-4) is preferably a compound represented by one of general formulae (ii-4-1) to (ii-4-17) below.
[Chem. 107]
(ii-4-1)
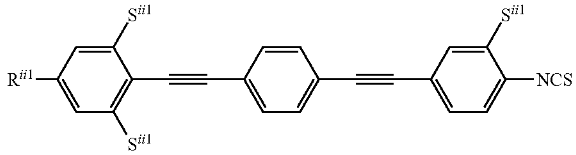
(ii-4-2)
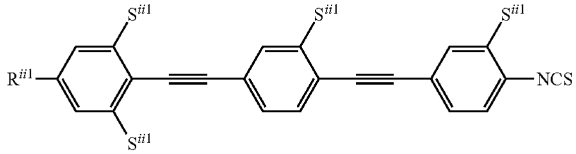
(ii-4-3)
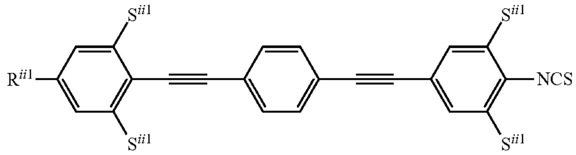
(ii-4-4)
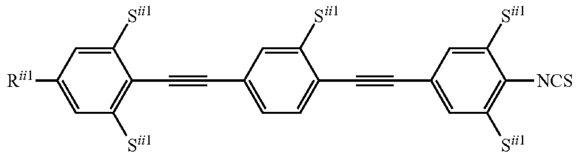
-continued
[Chem. 108]
(ii-4-5)
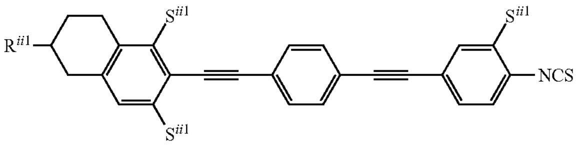
(ii-4-6)
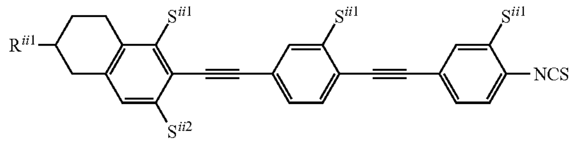
(ii-4-7)
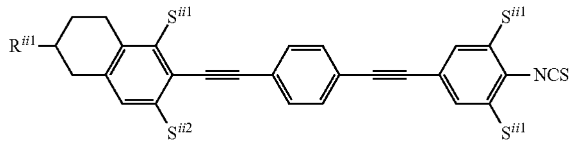
(ii-4-8)
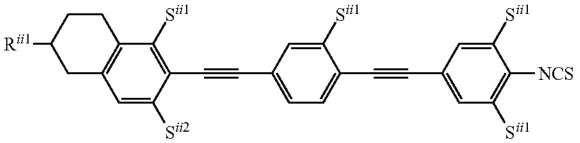
[Chem. 109]
(ii-4-9)
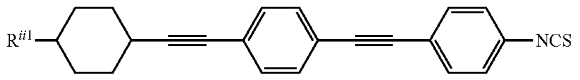
(ii-4-10)
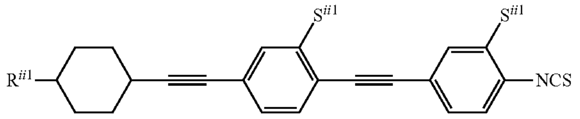
(ii-4-11)
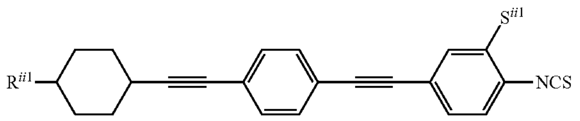
(ii-4-12)
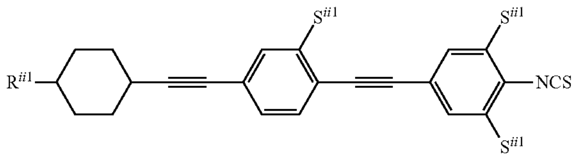
(ii-4-13)
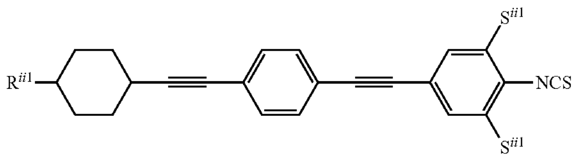

-continued (ii-4-14)

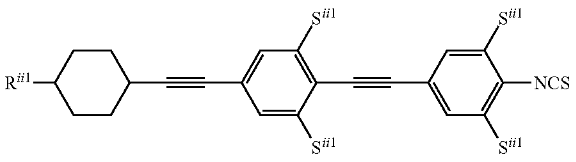

(ii-4-15)

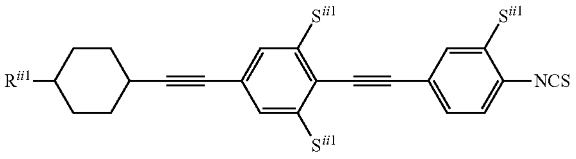

(ii-4-16)

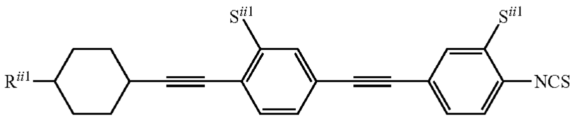

(ii-4-17)

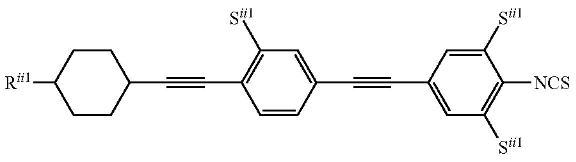

In general formulae (ii-4-1) to (ii-4-17), $R^{ii1}$ and $S^{ii1}$ each independently have the same meaning as $R^{ii1}$ and $S^{ii1}$, respectively, in general formula (ii).

Specific examples of compounds represented by general formula (ii-4-1) include compounds represented by structural formulae (ii-4-1.1) to (ii-4-1.3) below.

[Chem. 110]

(ii-4-1.1)

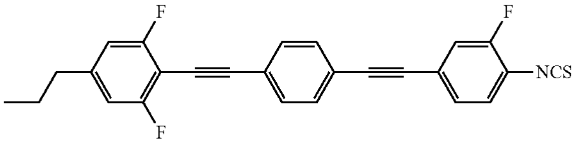

(ii-4-1.2)

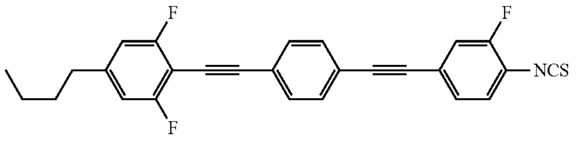

(ii-4-1.3)

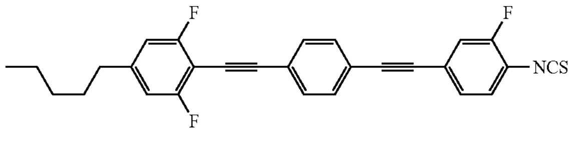

Specific examples of compounds represented by general formula (ii-4-2) include compounds represented by structural formulae (ii-4-2.1) to (ii-4-2.3) below.

[Chem. 111]

(ii-4-2.1)

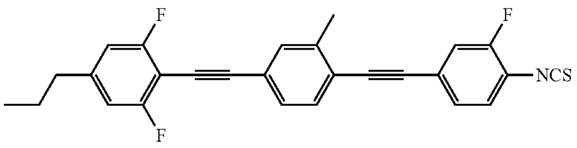

(ii-4-2.2)

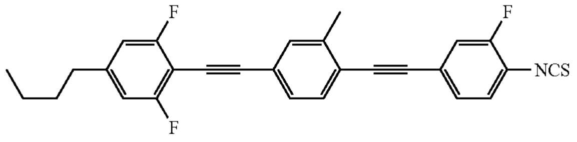

(ii-4-2.3)

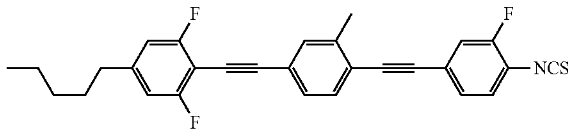

Specific examples of compounds represented by general formula (ii-4-3) include compounds represented by structural formulae (ii-4-3.1) to (ii-4-3.3) below.

[Chem. 112]

(ii-4-3.1)

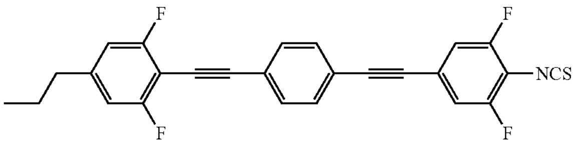

(ii-4-3.2)

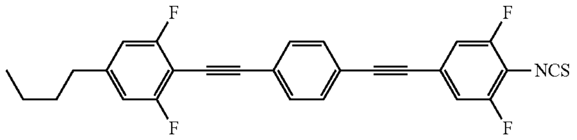

(ii-4-3.3)

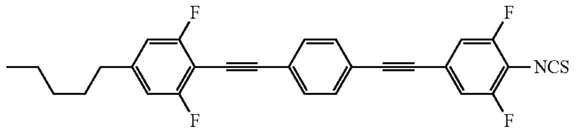

Specific examples of compounds represented by general formula (ii-4-4) include compounds represented by structural formulae (ii-4-4.1) to (ii-4-4.3) below.

[Chem. 113]

(ii-4-4.1)

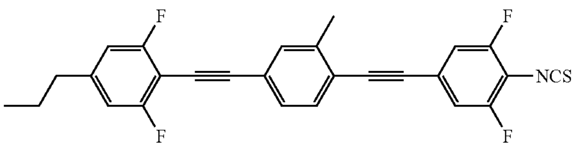

-continued
(ii-4-4.2)
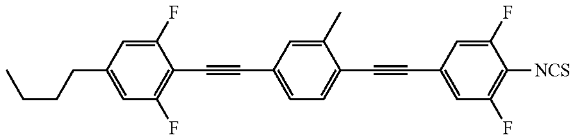
(ii-4-4.3)
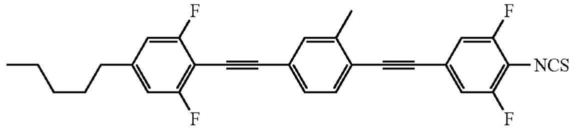
Specific examples of compounds represented by general formula (ii-4-5) include compounds represented by structural formulae (ii-4-5.1) to (ii-4-5.3) below.
[Chem. 114]
(ii-4-5.1)
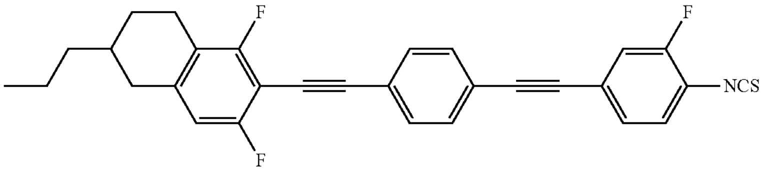
(ii-4-5.2)
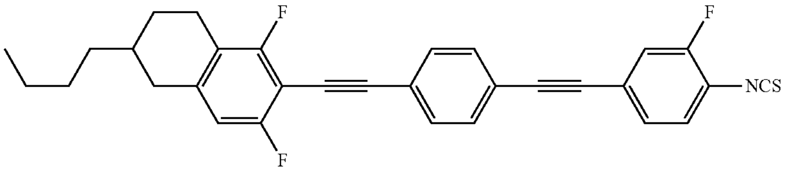
(ii-4-5.3)
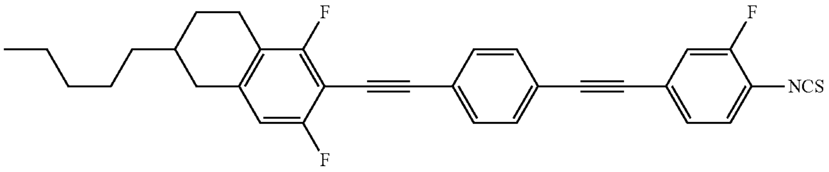
Specific examples of compounds represented by general formula (ii-4-6) include compounds represented by structural formulae (ii-4-6.1) to (ii-4-6.3) below.
[Chem. 115]
(ii-4-6.1)
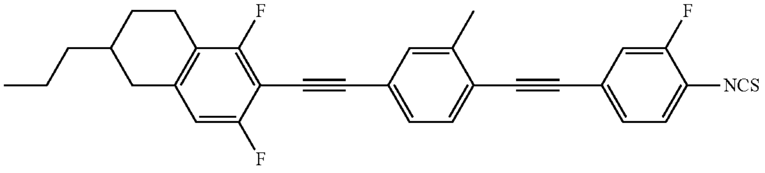
(ii-4-6.2)
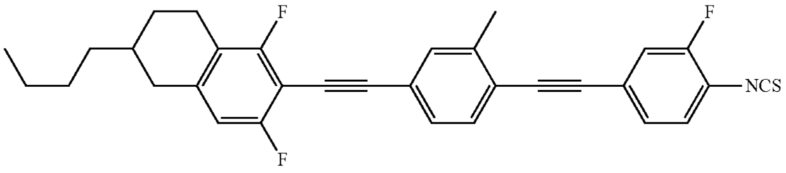

-continued
(ii-4-6.3)
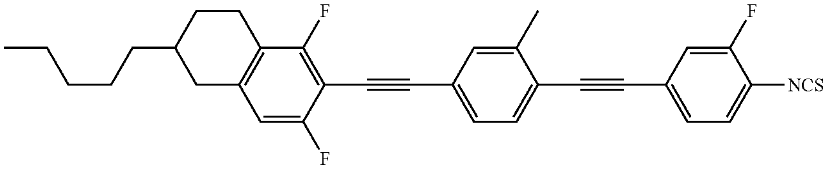
Specific examples of compounds represented by general formula (ii-4-7) include compounds represented by structural formulae (ii-4-7.1) to (ii-4-7.3) below.
[Chem. 116]
(ii-4-7.1)
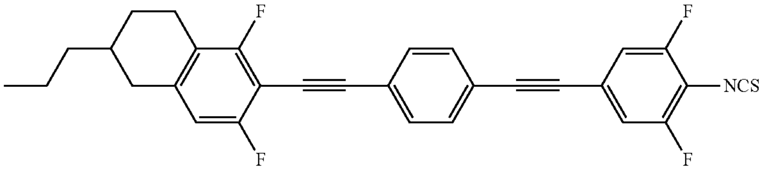
(ii-4-7.2)
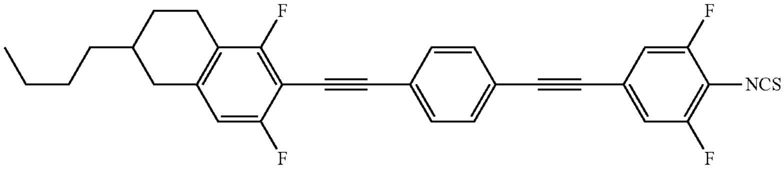
(ii-4-7.3)
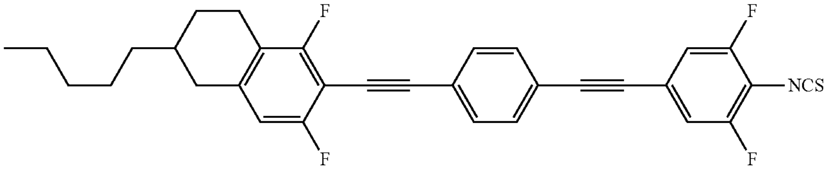
Specific examples of compounds represented by general formula (ii-4-8) include compounds represented by structural formulae (ii-4-8.1) to (ii-4-8.3) below.
[Chem. 117]
(ii-4-8.1)
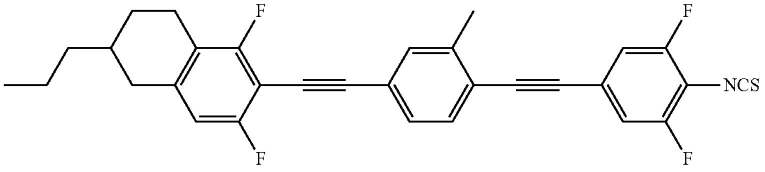
(ii-4-8.2)
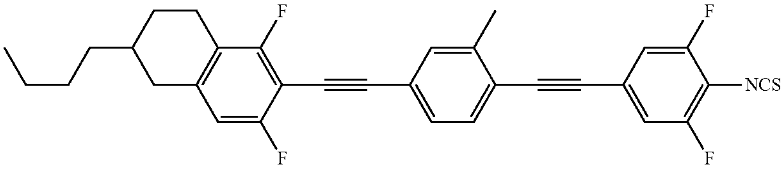

-continued (ii-4-8.3)

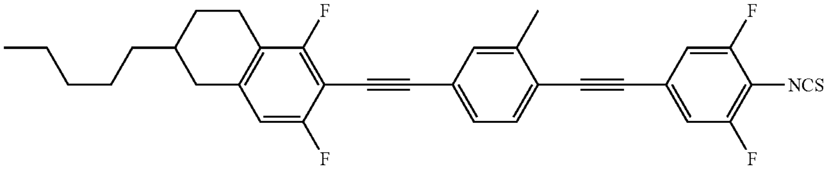

Specific examples of compounds represented by general formula (ii-4-9) include compounds represented by structural formulae (ii-4-9.1) to (ii-4-9.4) below.

[Chem. 118]

(ii-4-9.1)

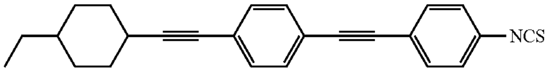

(ii-4-9.2)

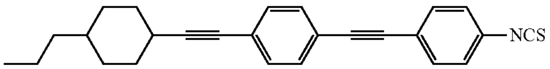

(ii-4-9.3)

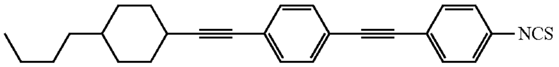

(ii-4-9.4)

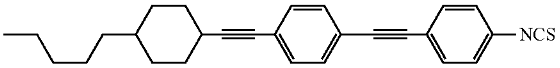

Specific examples of compounds represented by general formula (ii-4-10) include compounds represented by structural formulae (ii-4-10.1) to (ii-4-10.5) below.

[Chem. 119]

(ii-4-10.1)

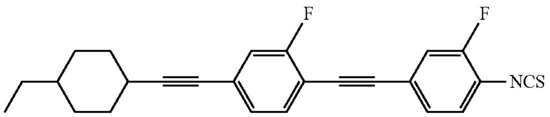

(ii-4-10.2)

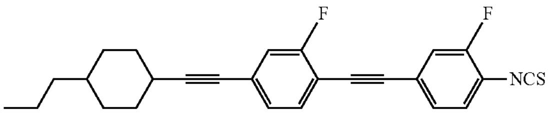

(ii-4-10.3)

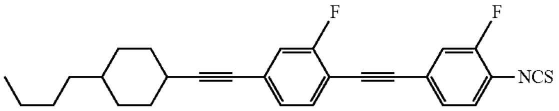

(ii-4-10.4)

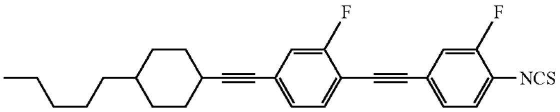

-continued (ii-4-10.5)

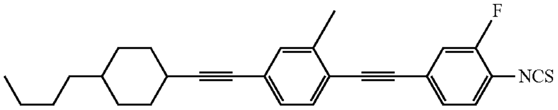

Specific examples of compounds represented by general formula (ii-4-11) include compounds represented by structural formulae (ii-4-11.1) to (ii-4-11.4) below.

[Chem. 120]

(ii-4-11.1)

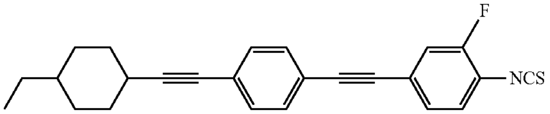

(ii-4-11.2)

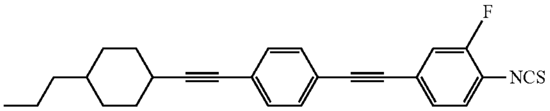

(ii-4-11.3)

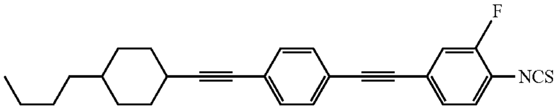

(ii-4-11.4)

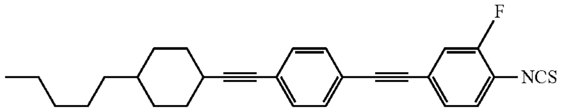

Specific examples of compounds represented by general formula (ii-4-12) include compounds represented by structural formulae (ii-4-12.1) to (ii-4-12.5) below.

[Chem. 121]

(ii-4-12.1)

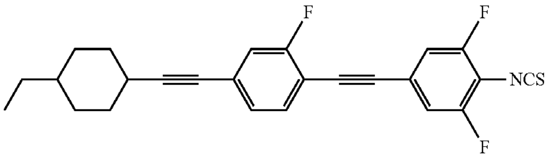

-continued
(ii-4-12.2)
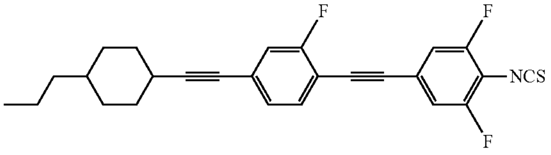
(ii-4-12.3)
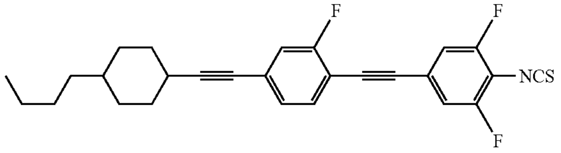
(ii-4-12.4)
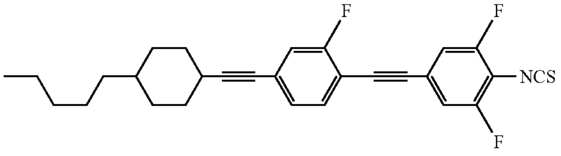
(ii-4-12.5)
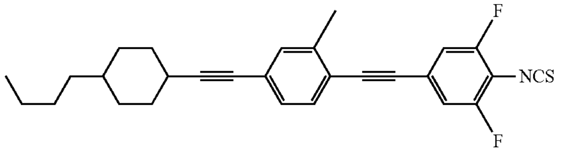
Specific examples of compounds represented by general formula (ii-4-13) include compounds represented by structural formulae (ii-4-13.1) to (ii-4-13.8) below.
[Chem. 122]
(ii-4-13.1)
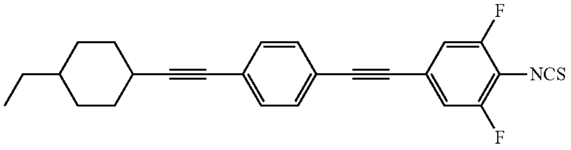
(ii-4-13.2)
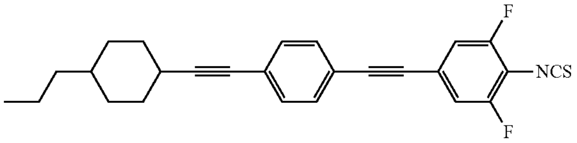
(ii-4-13.3)
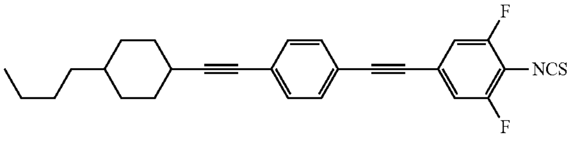
(ii-4-13.4)
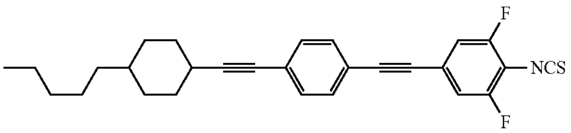
-continued
[Chem. 123]
(ii-4-13.5)
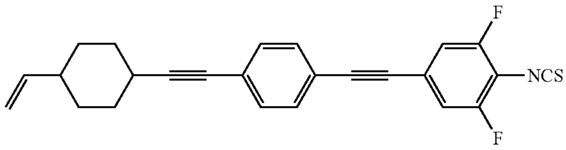
(ii-4-13.6)
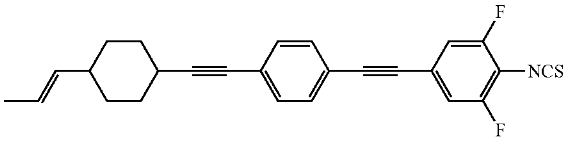
(ii-4.13.7)
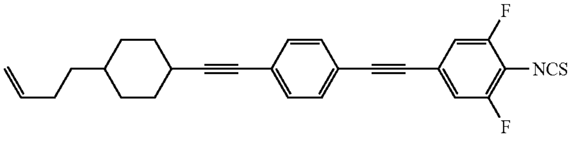
(ii-4-13.8)
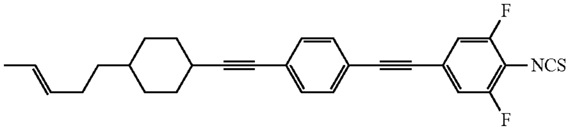
Specific examples of compounds represented by general formula (ii-4-14) include compounds represented by structural formulae (ii-4-14.1) to (ii-4-14.4) below.
[Chem. 124]
(ii-4-14.1)
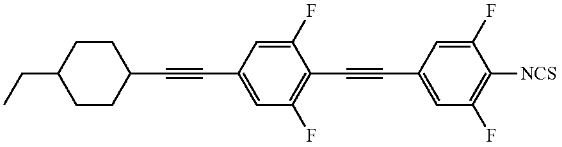
(ii-4-14.2)
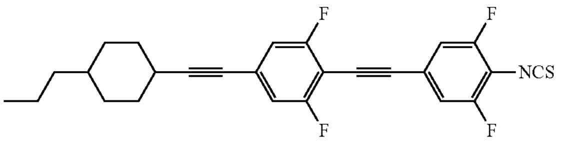
(ii-4-14.3)
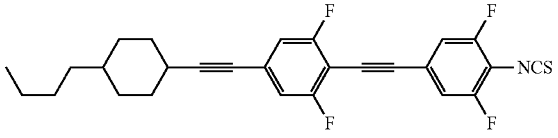
(ii-4-14.4)
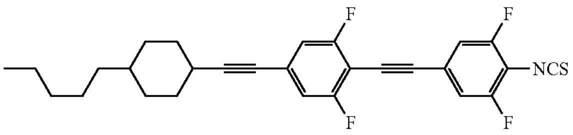

Specific examples of compounds represented by general formula (ii-4-15) include compounds represented by structural formulae (ii-4-15.1) to (ii-4-15.4) below.

[Chem. 125]

(ii-4-15.1)

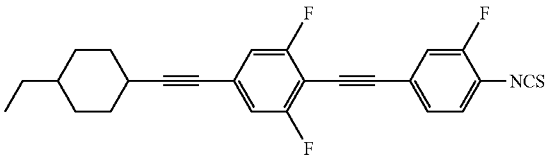

(ii-4-15.2)

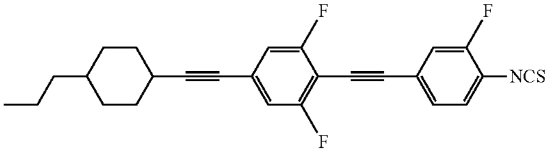

(ii-4-15.3)

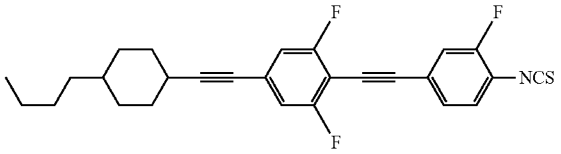

(ii-4-15.4)

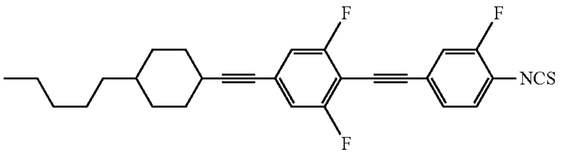

Specific examples of compounds represented by general formula (ii-4-16) include a compound represented by structural formula (ii-4-16.1) below.

[Chem. 126]

(ii-4-16.1)

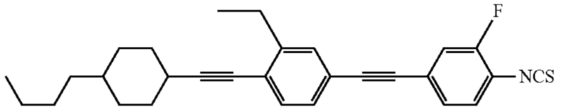

Specific examples of compounds represented by general formula (ii-4-17) include a compound represented by structural formula (ii-4-17.1) below.

[Chem. 126]

(ii-4-17.1)

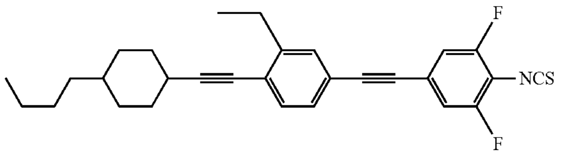

A compound represented by general formula (ii-5) is preferably a compound represented by one of general formulae (ii-5-1) to (ii-5-5) below.

[Chem. 128]

(ii-5-1)

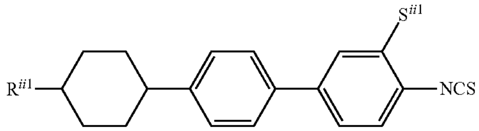

(ii-5-2)

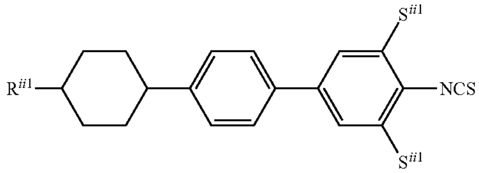

(ii-5-3)

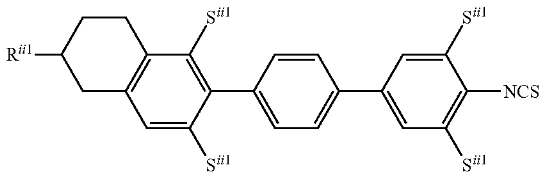

(ii-5-4)

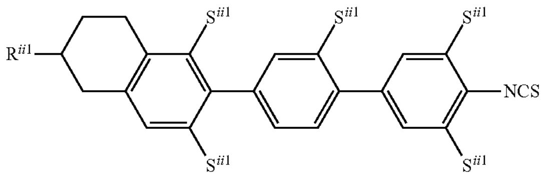

(ii-5-5)

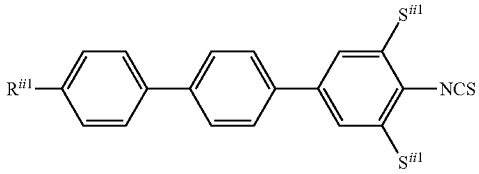

In general formulae (ii-5-1) to (ii-5-5), $R^{ii1}$ and $S^{ii1}$ each independently have the same meaning as $R^{ii1}$ and $S^{ii1}$, respectively, in general formula (ii).

Specific examples of compounds represented by general formula (ii-5-1) include compounds represented by structural formulae (ii-5-1.1) to (ii-5-1.4) below.

[Chem. 129]

(ii-5-1.1)

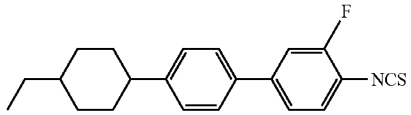

-continued (ii-5-1.2)

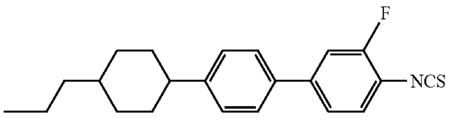

(ii-5-1.3)

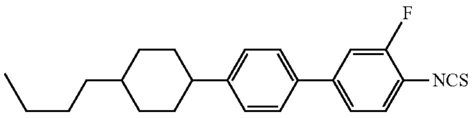

(ii-5-1.4)

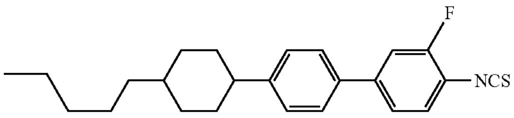

Specific examples of compounds represented by general formula (ii-5-2) include compounds represented by structural formulae (ii-5-2.1) to (ii-5-2.4) below.

[Chem. 130]

(ii-5-2.1)

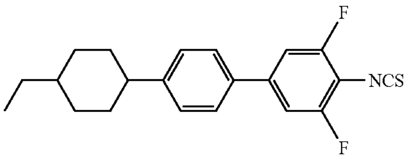

(ii-5-2.2)

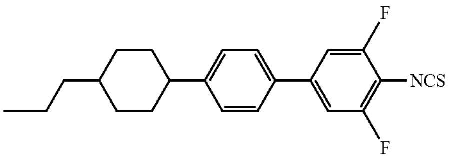

(ii-5-2.3)

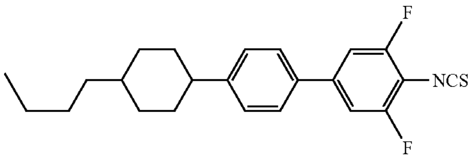

(ii-5-2.4)

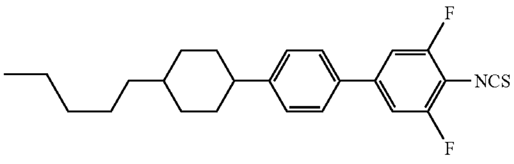

Specific examples of compounds represented by general formula (ii-5-3) include compounds represented by structural formulae (ii-5-3.1) to (ii-5-3.3) below.

[Chem. 131]

(ii-5-3.1)

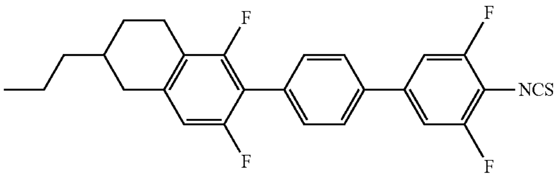

(ii-5-3.2)

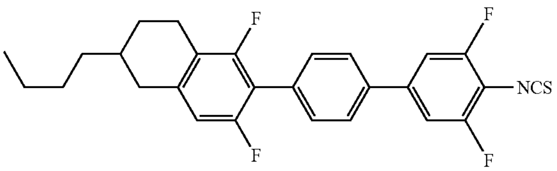

(ii-5-3.3)

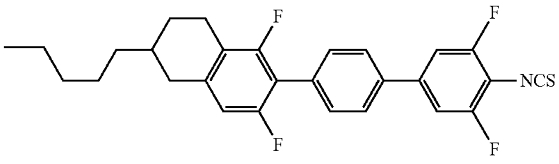

Specific examples of compounds represented by general formula (ii-5-4) include compounds represented by structural formulae (ii-5-4.1) to (ii-5-4.3) below.

[Chem. 132]

(ii-5-4.1)

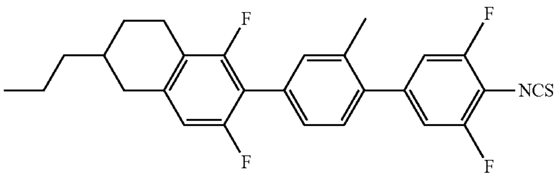

(ii-5-4.2)

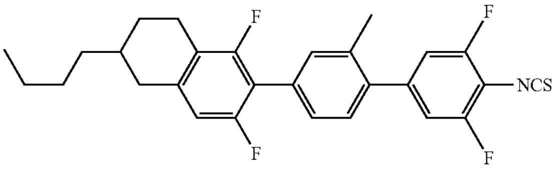

(ii-5-4.3)

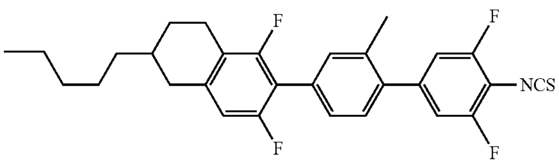

Specific examples of compounds represented by general formula (ii-5-5) include a compound represented by structural formula (ii-5-5.1) below.

[Chem. 133]
(ii-5-5.1)
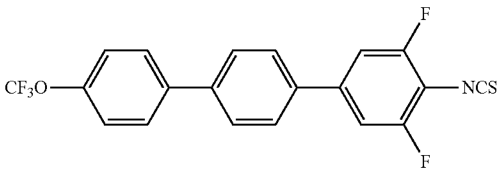
A compound represented by general formula (ii-6) is preferably a compound represented by one of general formulae (ii-6-1) to (ii-6-34) below.
[Chem. 134]
(ii-6-1)
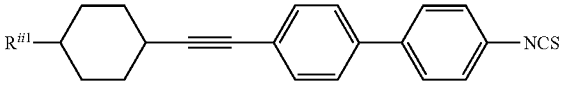
(ii-6-2)
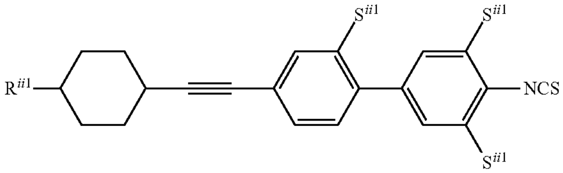
(ii-6-3)
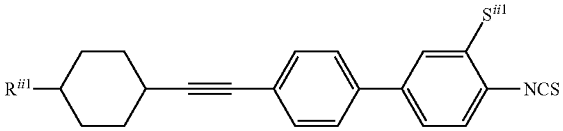
(ii-6-4)
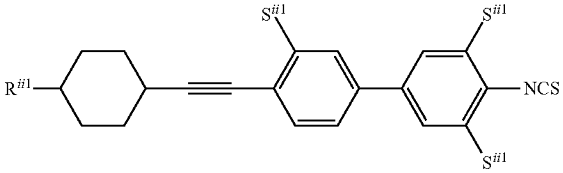
(ii-6-5)
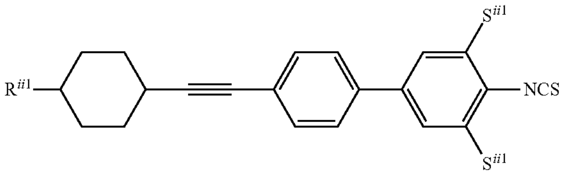
(ii-6-6)
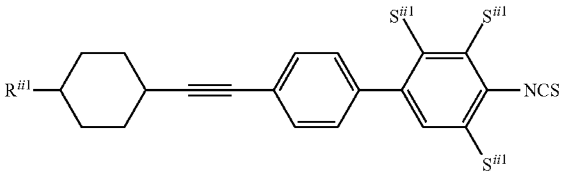
-continued
[Chem. 135]
(ii-6-7)
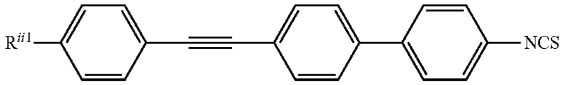
(ii-6-8)
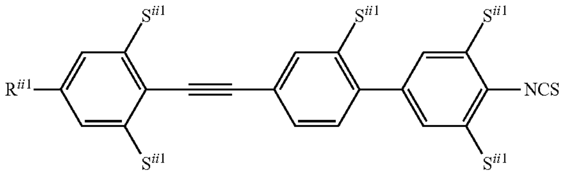
(ii-6-9)
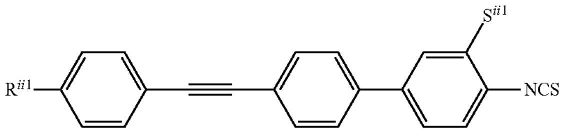
(ii-6-10)
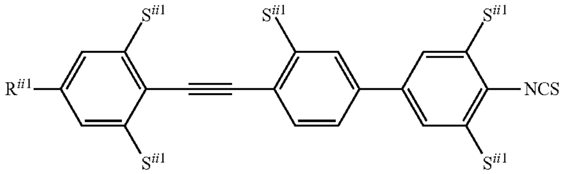
(ii-6-11)
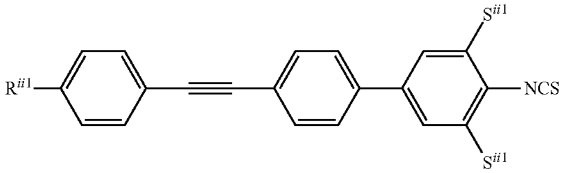
(ii-6-12)
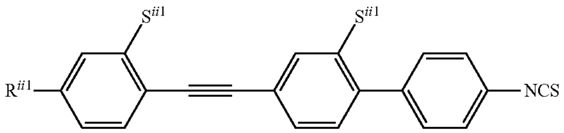
(ii-6-13)
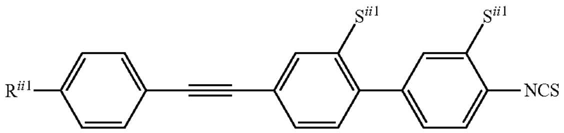
(ii-6-14)
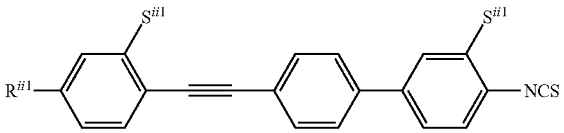

-continued
[Chem. 136]
(ii-6-15)
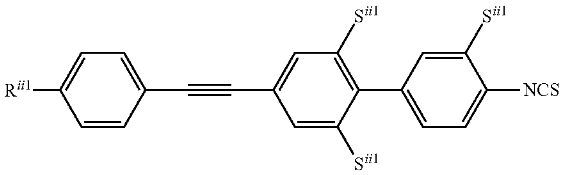
(ii-6-16)
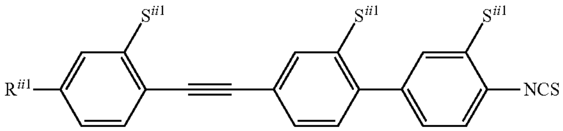
(ii-6-17)
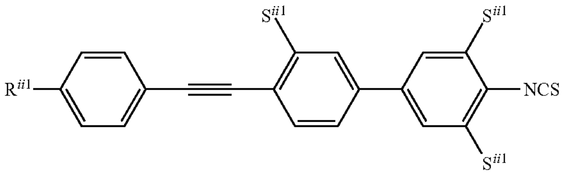
(ii-6-18)
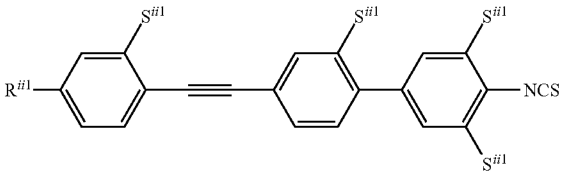
(ii-6-19)
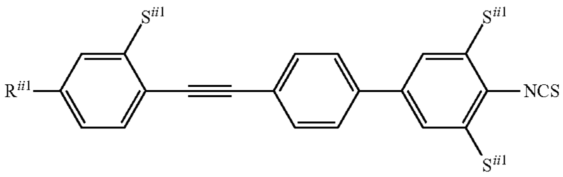
(ii-6-20)
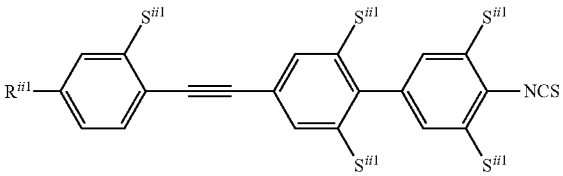
(ii-6-21)
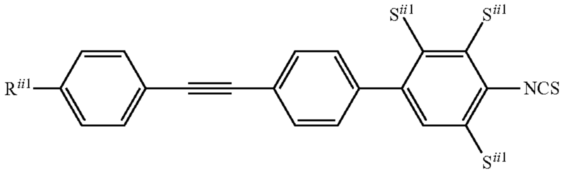
(ii-6-22)
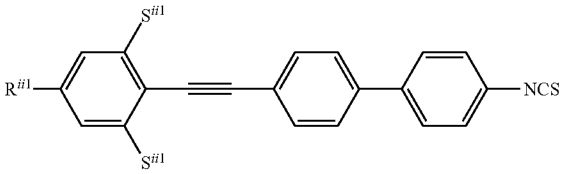
-continued
[Chem. 137]
(ii-6-23)
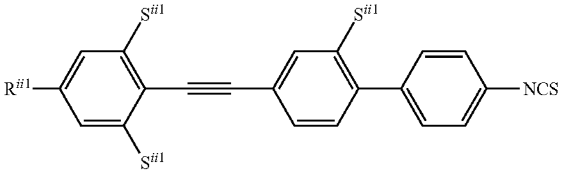
(ii-6-24)
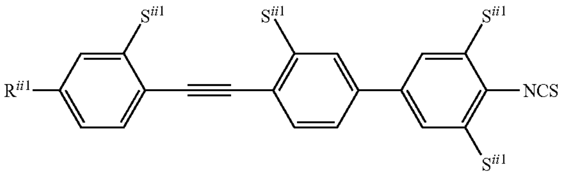
(ii-6-25)
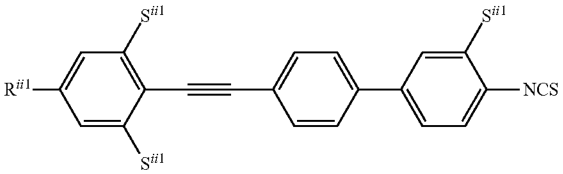
(ii-6-26)
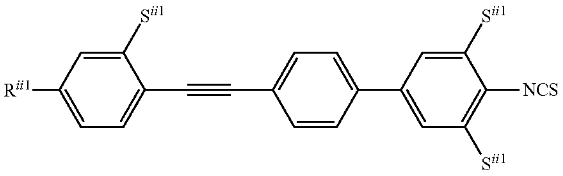
(ii-6-27)
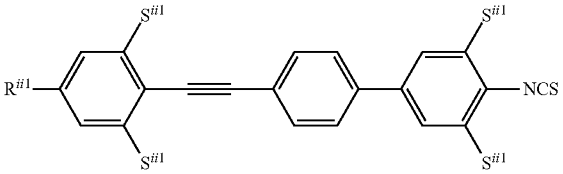
(ii-6-28)
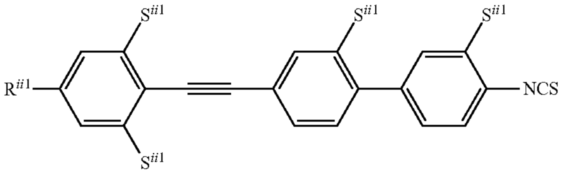
(ii-6-29)
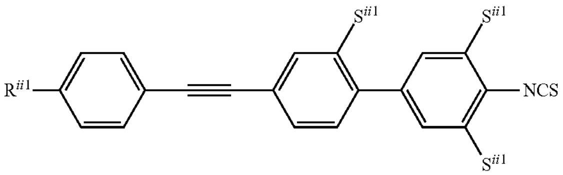

-continued (ii-6-30)

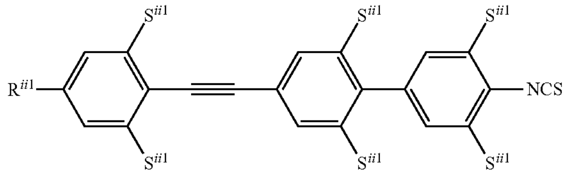

[Chem. 138]

(ii-6-31)

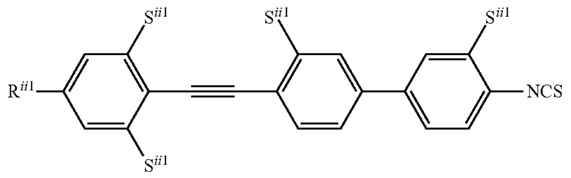

(ii-6-32)

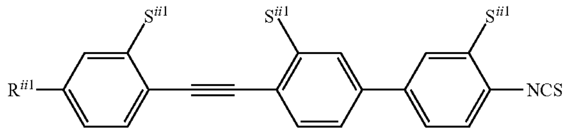

(ii-6-33)

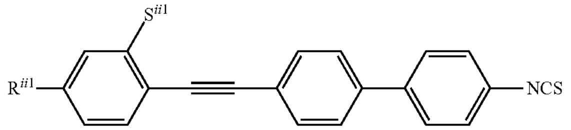

(ii-6-34)

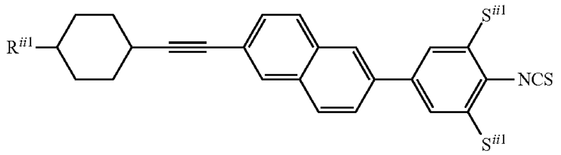

Specific examples of compounds represented by general formula (ii-6-1) include compounds represented by structural formulae (ii-6-1.1) to (ii-6-1.4) below.

[Chem. 139]

(ii-6-1.1)

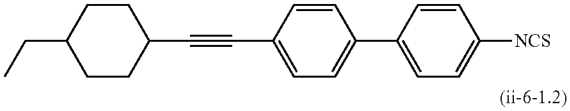

(ii-6-1.2)

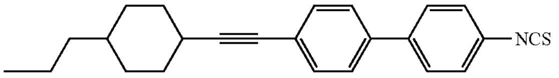

(ii-6-1.3)

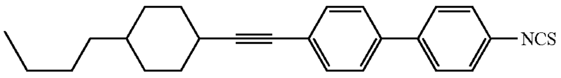

(ii-6-1.4)

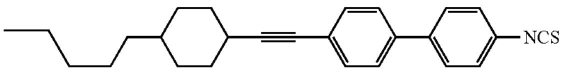

Specific examples of compounds represented by general formula (ii-6-2) include compounds represented by structural formulae (ii-6-2.1) to (ii-6-2.4) below.

[Chem. 140]

(ii-6-2.1)

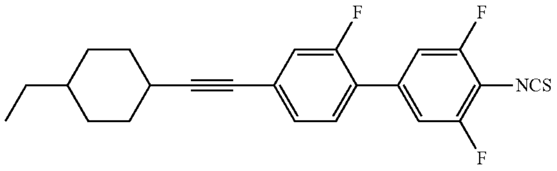

(ii-6-2.2)

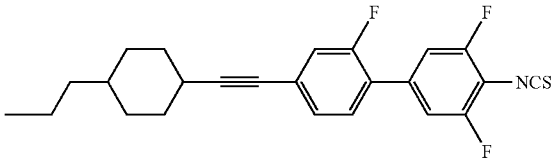

(ii-6-2.3)

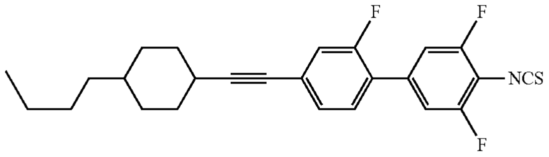

(ii-6-2.4)

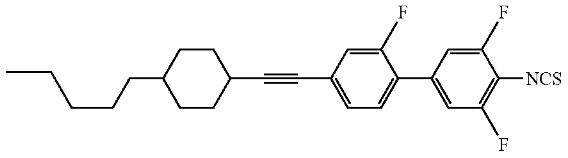

Specific examples of compounds represented by general formula (ii-6-3) include compounds represented by structural formulae (ii-6-3.1) to (ii-6-3.4) below.

[Chem. 141]

(ii-6-3.1)

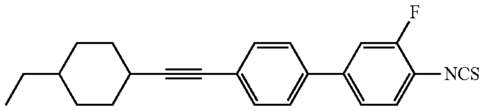

(ii-6-3.2)

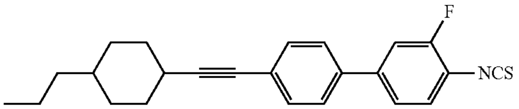

(ii-6-3.3)

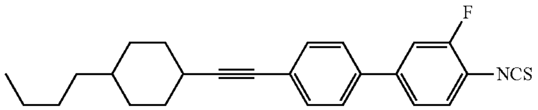

-continued (ii-6-3.4)

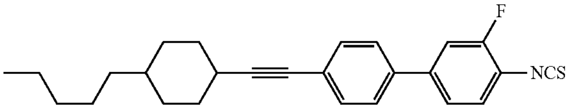

Specific examples of compounds represented by general formula (ii-6-4) include compounds represented by structural formulae (ii-6-4.1) to (ii-6-4.4) below.

[Chem. 142]

(i-6-4.1)

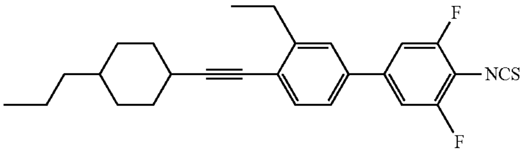

(i-6-4.2)

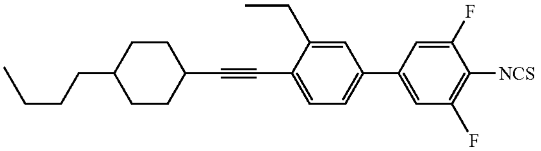

(i-6-4.3)

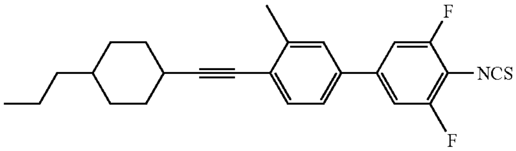

(i-6-4.4)

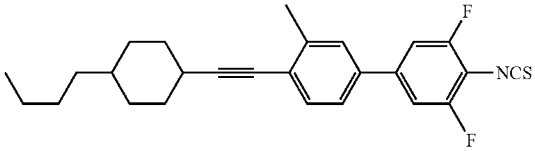

Specific examples of compounds represented by general formula (ii-6-5) include compounds represented by structural formulae (ii-6-5.1) to (ii-6-5.8) below.

[Chem. 143]

(ii-6-5.1)

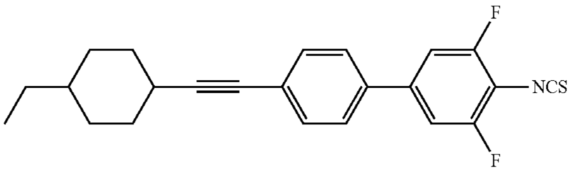

-continued (ii-6-5.2)

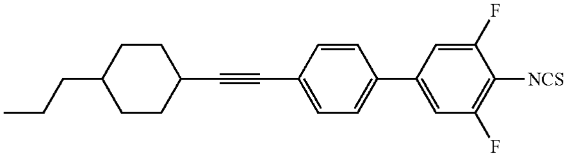

(ii-6-5.3)

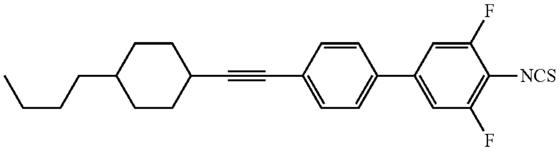

(ii-6-5.4)

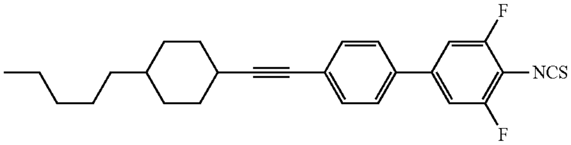

[Chem. 144]

(ii-6.5.5)

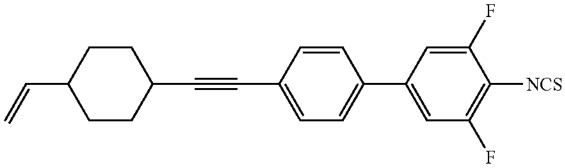

(ii-6-5.6)

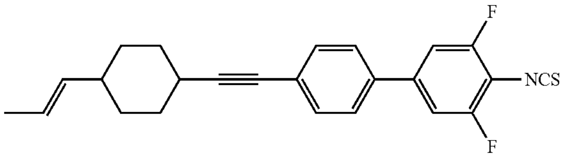

(ii-6-5.7)

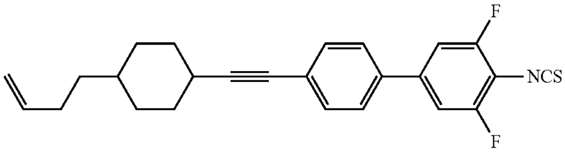

(ii-6-5.8)

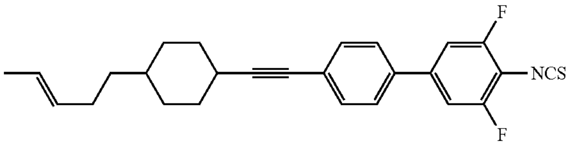

Specific examples of compounds represented by general formula (ii-6-6) include compounds represented by structural formulae (ii-6-6.1) to (ii-6-6.2) below.

[Chem. 145]

(ii-6-6.1)

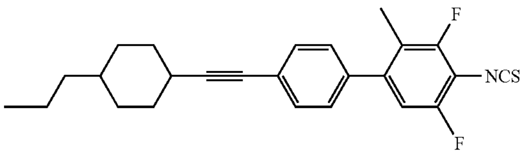

(ii-6-6.2)

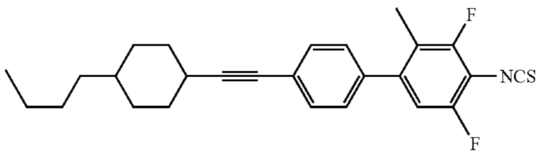

Specific examples of compounds represented by general formula (ii-6-7) include compounds represented by structural formulae (ii-6-7.1) to (ii-6-7.4) below.

[Chem. 146]

(ii-6-7.1)

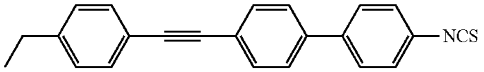

(ii-6-7.2)

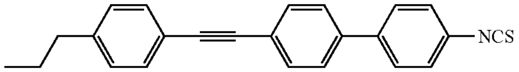

(ii-6-7.3)

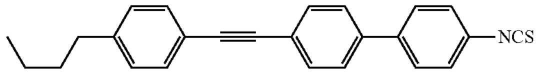

(ii-6-7.4)

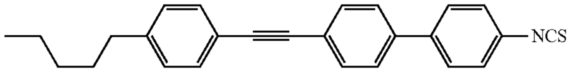

Specific examples of compounds represented by general formula (ii-6-8) include compounds represented by structural formulae (ii-6-8.1) to (ii-6-8.5) below.

[Chem. 147]

(ii-6-8.1)

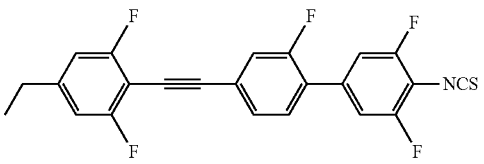

(ii-6-8.2)

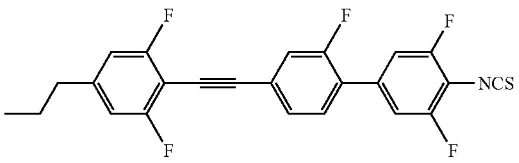

-continued (ii-6-8.3)

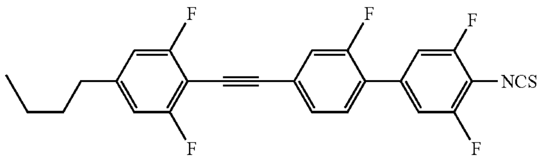

(ii-6-8.4)

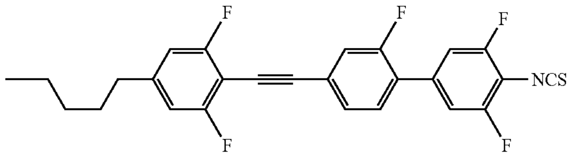

(ii-6-8.5)

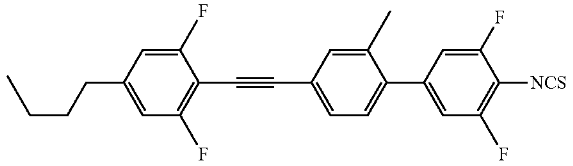

Specific examples of compounds represented by general formula (ii-6-9) include compounds represented by structural formulae (ii-6-9.1) to (ii-6-9.4) below.

[Chem. 148]

(ii-6-9.1)

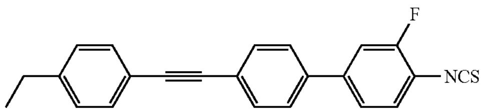

(ii-6-9.2)

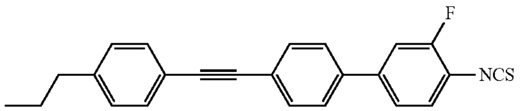

(ii-6-9.3)

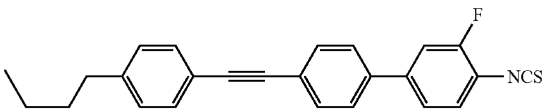

(ii-6-9.4)

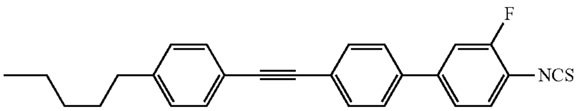

Specific examples of compounds represented by general formula (ii-6-10) include a compound represented by structural formula (ii-6-10.1) below.

[Chem. 149]
(ii-6-10.1)
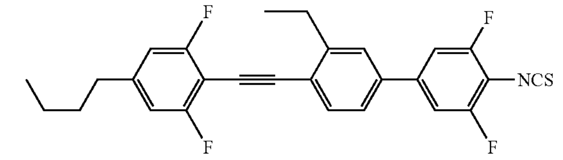
Specific examples of compounds represented by general formula (ii-6-11) include compounds represented by structural formulae (ii-6-11.1) to (ii-6-11.16) below.
[Chem. 150]
(ii-6-11.1)
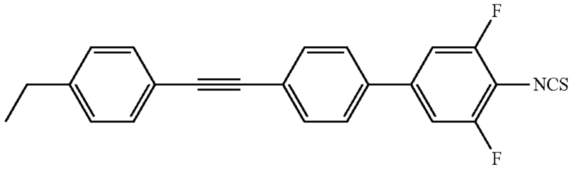
(ii-6-11.2)
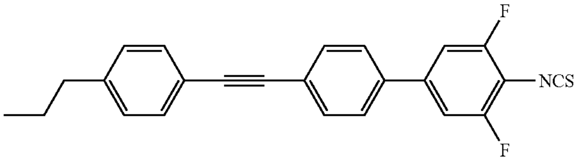
(ii-6-11.3)
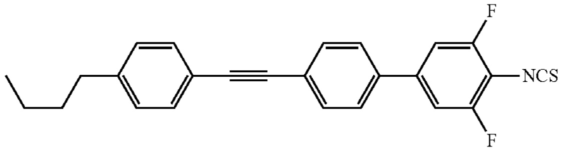
(ii-6-11.4)
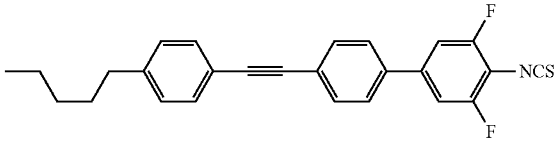
[Chem. 151]
(ii-6-11.5)
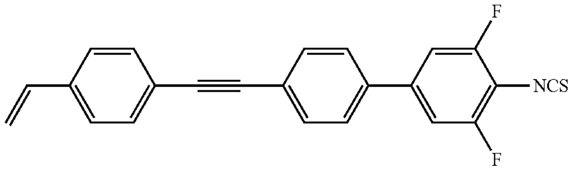
(ii-6-11.6)
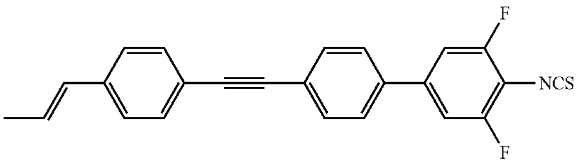
-continued
(ii-6-11.7)
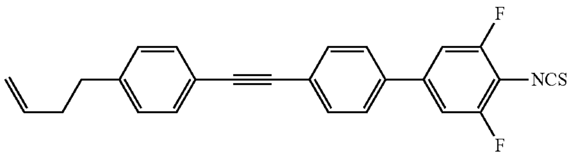
(ii-6-11.8)
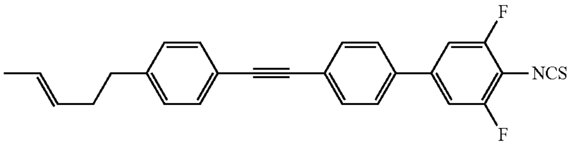
[Chem. 152]
(ii-6-11.9)
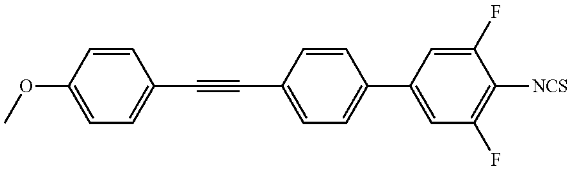
(ii-6-11.10)
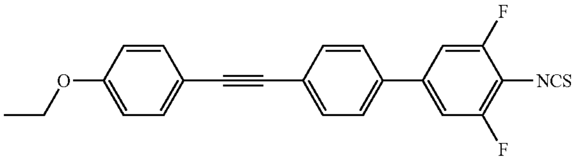
(ii-6-11.11)
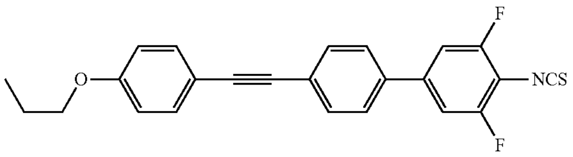
(ii-6-11.12)
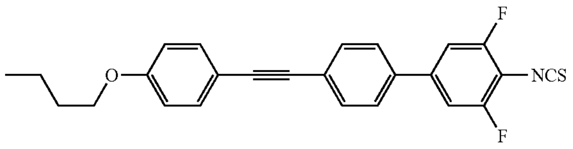
[Chem. 153]
(ii-6-11.13)
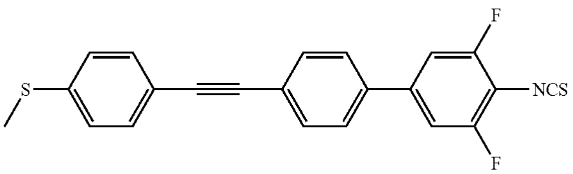
(ii-6-11.14)
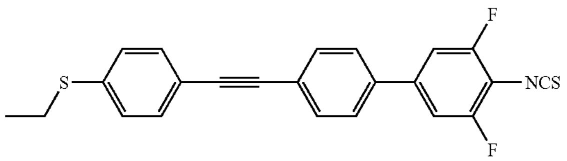

-continued (ii-6-11.15)

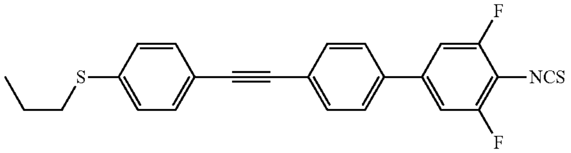

(ii-6-11.16)

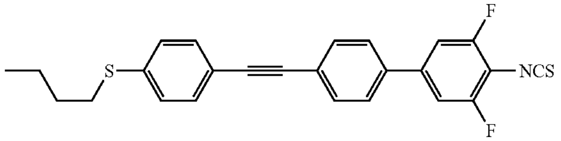

Specific examples of compounds represented by general formula (ii-6-12) include compounds represented by structural formulae (ii-6-12.1) to (ii-6-12.4) below.

[Chem. 154]

(ii-6-12.1)

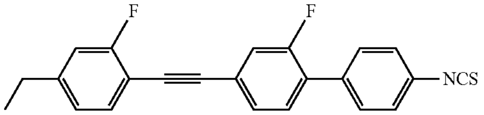

(ii-6-12.2)

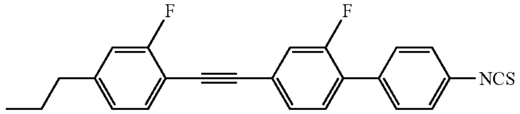

(ii-6-12.3)

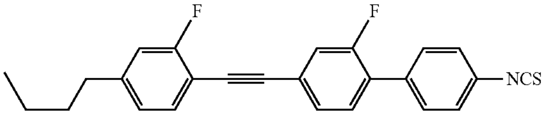

(ii-6-12.4)

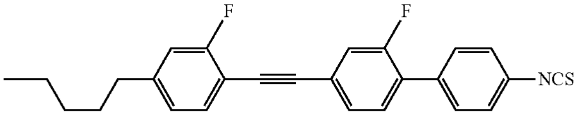

Specific examples of compounds represented by general formula (ii-6-13) include compounds represented by structural formulae (ii-6-13.1) to (ii-1-13.4) below.

[Chem. 155]

(ii-6-13.1)

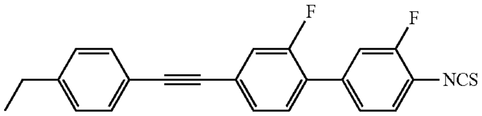

(ii-6-13.2)

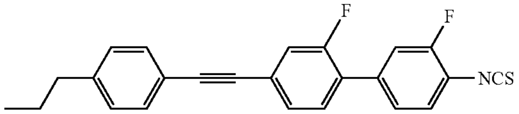

-continued (ii-6-13.3)

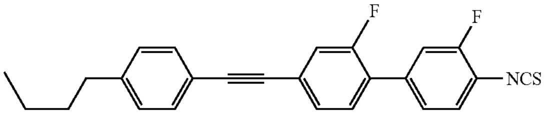

(ii-6-13.4)

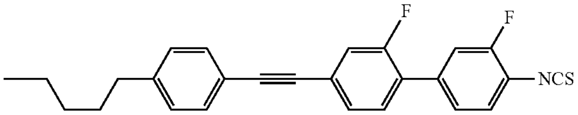

Specific examples of compounds represented by general formula (ii-6-14) include compounds represented by structural formulae (ii-6-14.1) to (ii-6-14.4) below.

[Chem. 156]

(ii-6-14.1)

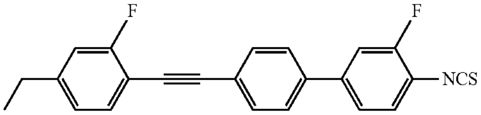

(ii-6-14.2)

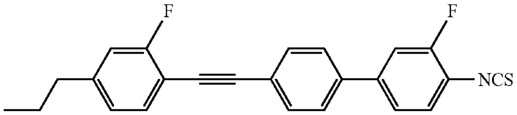

(ii-6-14.3)

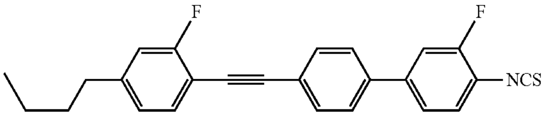

(ii-6-14.4)

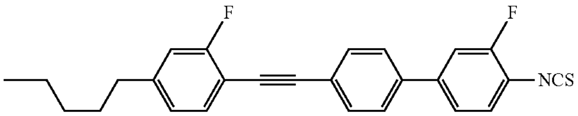

Specific examples of compounds represented by general formula (ii-6-15) include compounds represented by structural formulae (ii-6-15.1) to (ii-6-15.4) below.

[Chem. 157]

(ii-6-15.1)

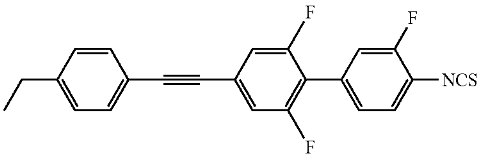

-continued (ii-6-15.2)

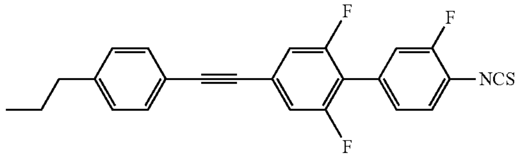

(ii-6-15.3)

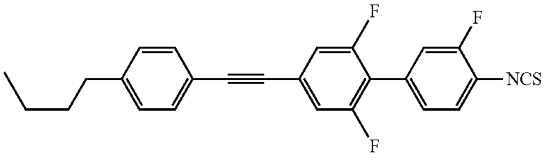

(ii-6-15.4)

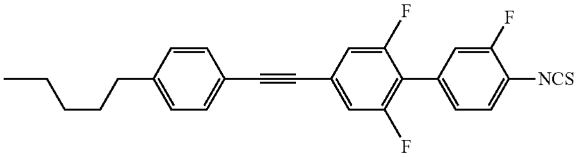

Specific examples of compounds represented by general formula (ii-6-16) include compounds represented by structural formulae (ii-6-16.1) to (ii-6-16.5) below.

[Chem. 158]

(ii-6-16.1)

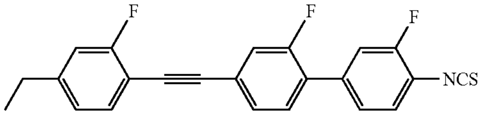

(ii-6-16.2)

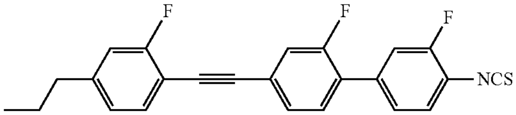

(ii-6-16.3)

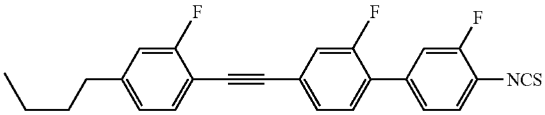

(ii-6-16.4)

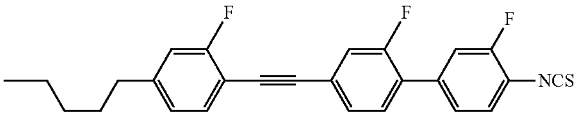

(ii-6-16.5)

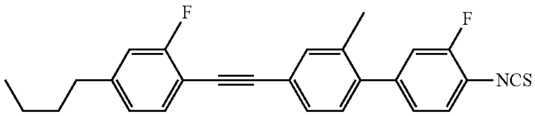

Specific examples of compounds represented by general formula (ii-6-17) include compounds represented by structural formulae (ii-6-17.1) to (ii-6-17.2) below.

[Chem. 159]

(ii-6-17.1)

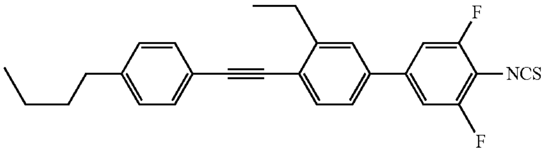

(ii-6-17.2)

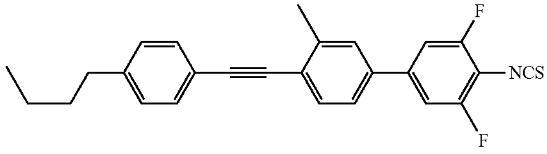

Specific examples of compounds represented by general formula (ii-6-18) include compounds represented by structural formulae (ii-6-18.1) to (ii-6-18.5) below.

[Chem. 160]

(ii-6-18.1)

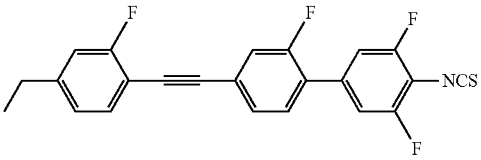

(ii-6-18.2)

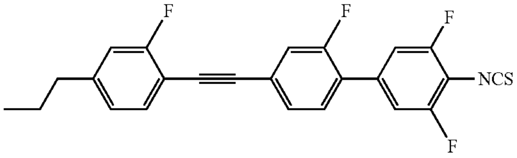

(ii-6-18.3)

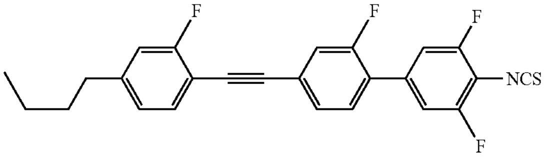

(ii-6-18.4)

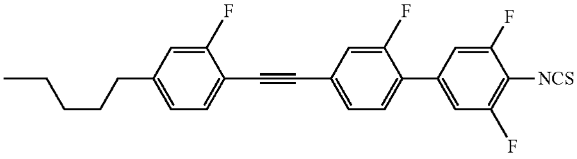

(ii-6-18.5)

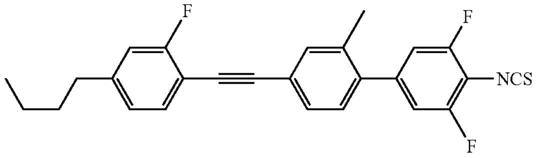

Specific examples of compounds represented by general formula (ii-6-19) include compounds represented by structural formulae (ii-6-19.1) to (ii-6-19.14) below.

[Chem. 161]
(ii-6-19.1)
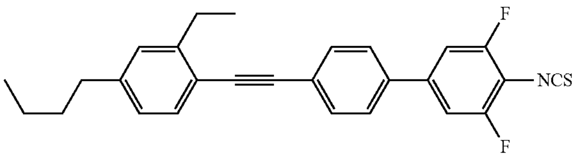
(ii-6-19.2)
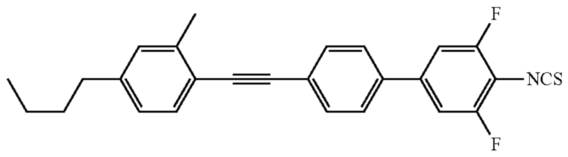
(ii-6-19.3)
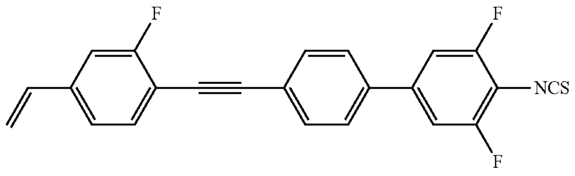
(ii-6-19.4)
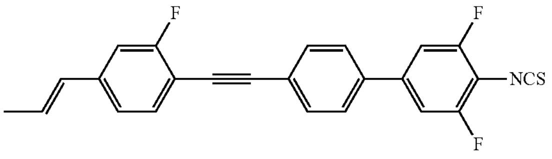
(ii-6-19.5)
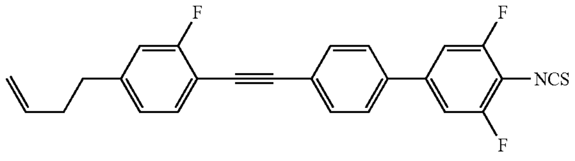
(ii-6-19.6)
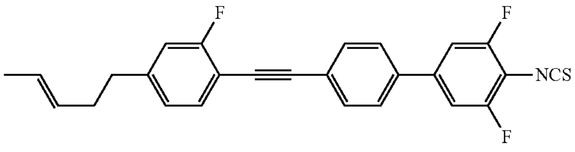
[Chem. 162]
(ii-6-19.7)
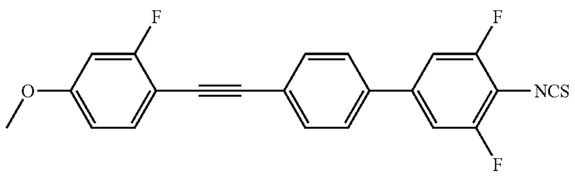
(ii-6-19.8)
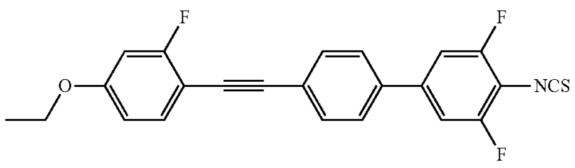
-continued
(ii-6-19.9)
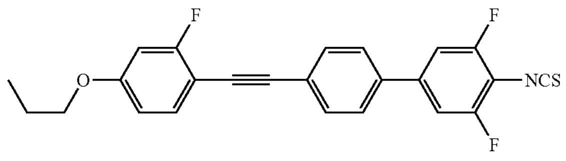
(ii-6-19.10)
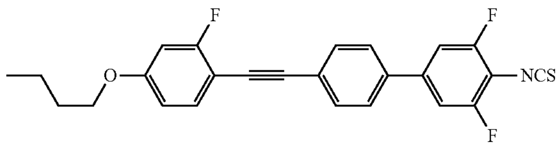
[Chem. 163]
(ii-6-19.11)
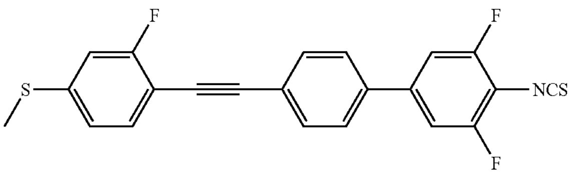
(ii-6-19.12)
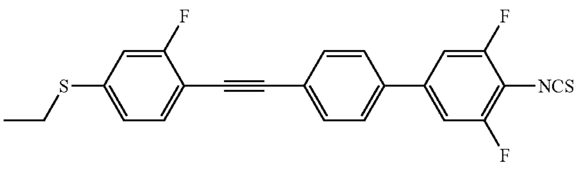
(ii-6-19.13)
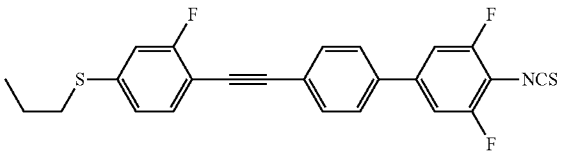
(ii-6-19.14)
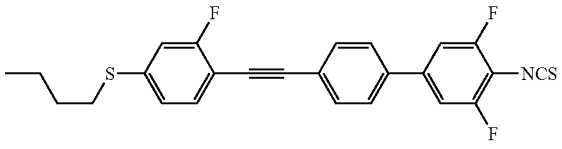
Specific examples of compounds represented by general formula (ii-6-20) include compounds represented by structural formulae (ii-6-20.1) to (ii-6-20.4) below.
[Chem. 164]
(ii-6-20.1)
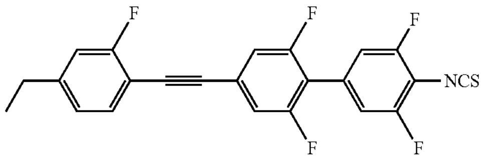

-continued (ii-6-20.2)

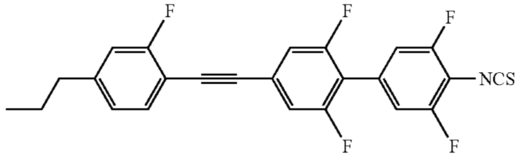

(ii-6-20.3)

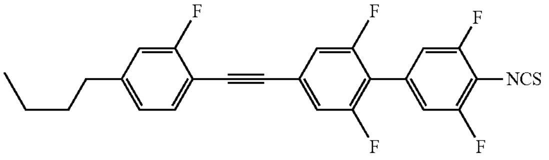

(ii-6-20.4)

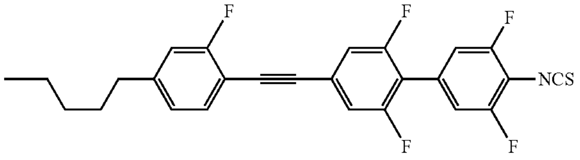

Specific examples of compounds represented by general formula (ii-6-21) include a compound represented by structural formula (ii-6-21.1) below.

[Chem. 165]

(ii-6-21.1)

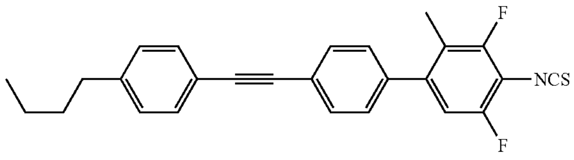

Specific examples of compounds represented by general formula (ii-6-22) include compounds represented by structural formulae (ii-6-22.1) to (ii-6-22.4) below.

[Chem. 166]

(ii-6-22.1)

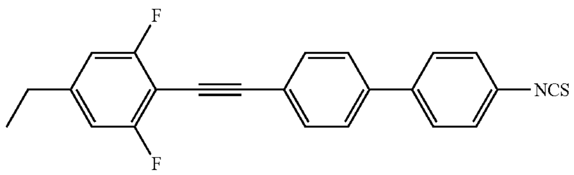

(ii-6-22.2)

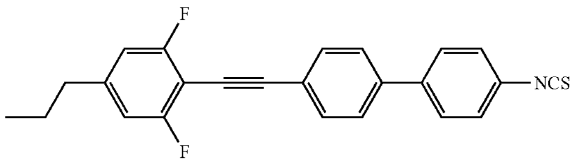

-continued (ii-6-22.3)

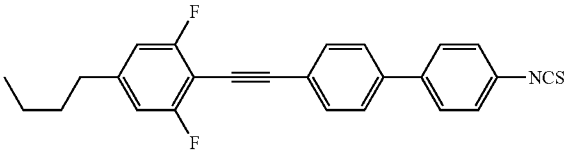

(ii-6-22.4)

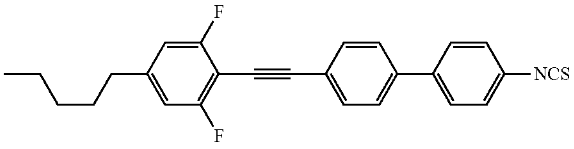

Specific examples of compounds represented by general formula (ii-6-23) include compounds represented by structural formulae (ii-6-23.1) to (ii-6-23.4) below.

[Chem. 167]

(ii-6-23.1)

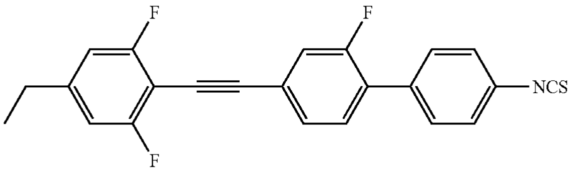

(ii-6-23.2)

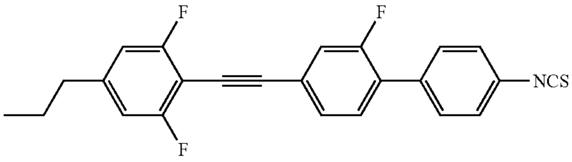

(ii-6-23.3)

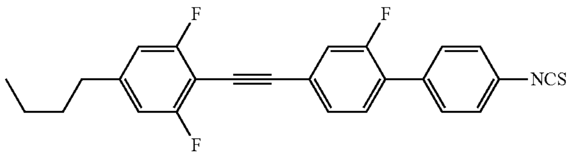

(ii-6-23.4)

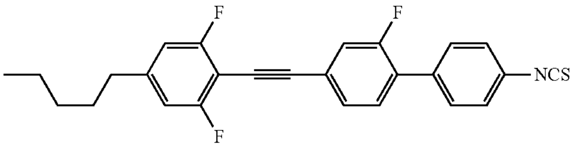

Specific examples of compounds represented by general formula (ii-6-24) include a compound represented by structural formula (ii-6-24.1) below.

[Chem. 168]

(i-1-24.1)

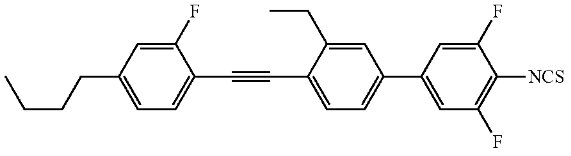

Specific examples of compounds represented by general formula (ii-6-25) include compounds represented by structural formulae (ii-6-25.1) to (ii-6-25.4) below.

[Chem. 169]

(ii-6-25.1)

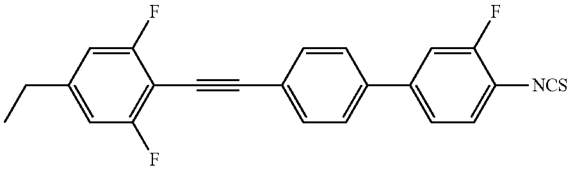

(ii-6-25.2)

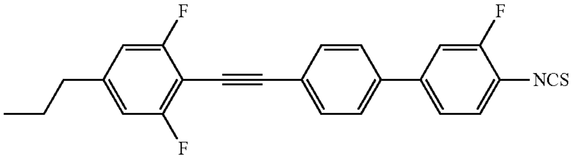

(ii-6-25.3)

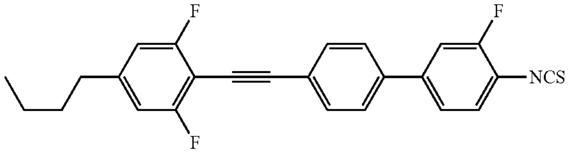

(ii-6-25.4)

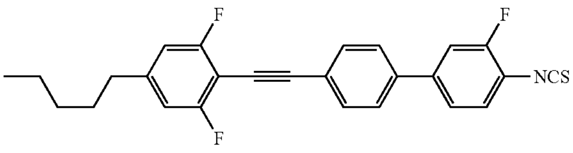

Specific examples of compounds represented by general formula (ii-6-26) include compounds represented by structural formulae (ii-6-26.1) to (ii-6-26.4) below.

[Chem. 170]

(ii-6-26.1)

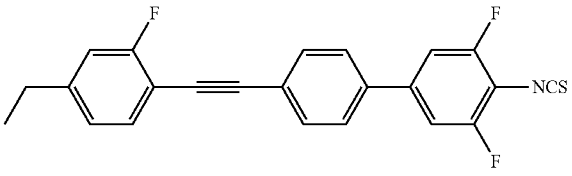

-continued (ii-6-26.2)

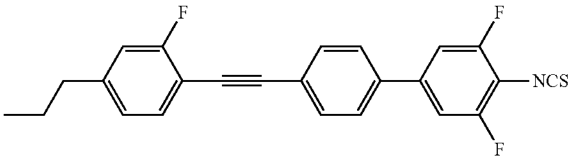

(ii-6-26.3)

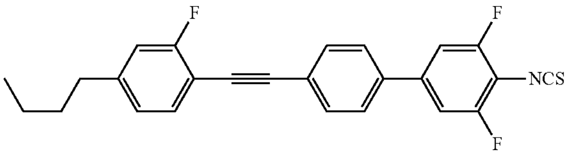

(ii-6-26.4)

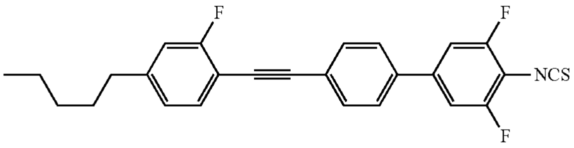

Specific examples of compounds represented by general formula (ii-6-27) include compounds represented by structural formulae (ii-6-27.1) to (ii-6-27.16) below.

[Chem. 171]

(ii-6-27.1)

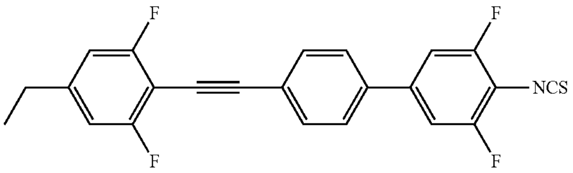

(ii-6-27.2)

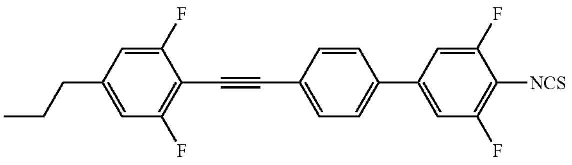

(ii-6-27.3)

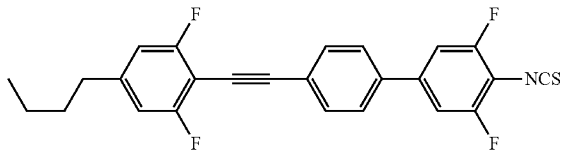

(ii-6-27.4)

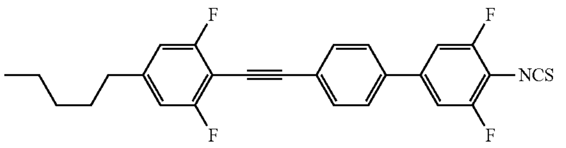

-continued
[Chem. 172]
(ii-6-27.5)
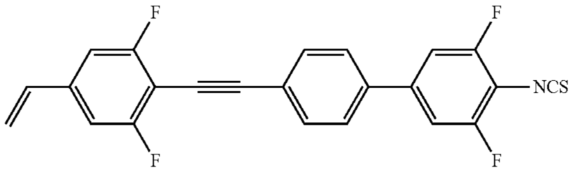
(ii-6-27.6)
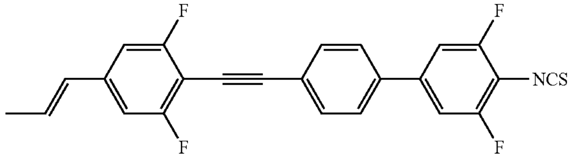
(ii-6-27.7)
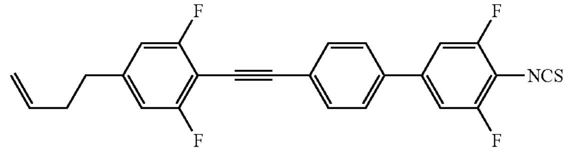
(ii-6-27.8)
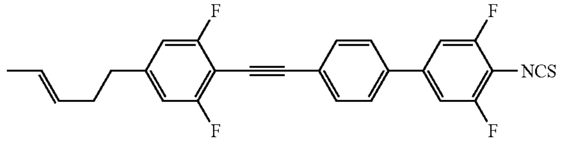
[Chem. 173]
(ii-6-27.9)
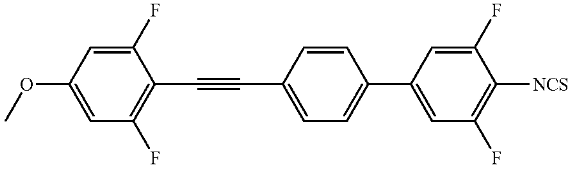
(ii-6-27.10)
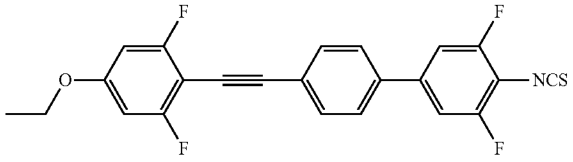
(ii-6-27.11)
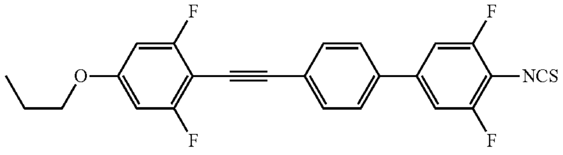
(ii-6-27.12)
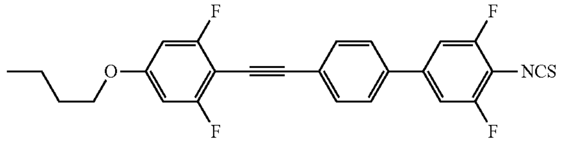
-continued
[Chem. 174]
(ii-6-27.13)
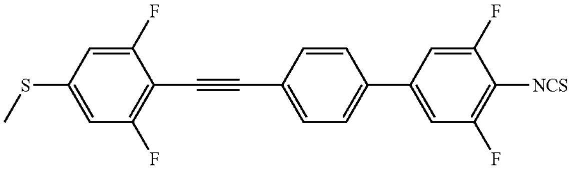
(ii-6-27.14)
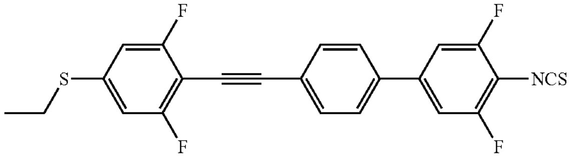
(ii-6-27.15)
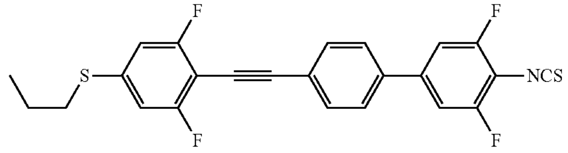
(ii-6-27.16)
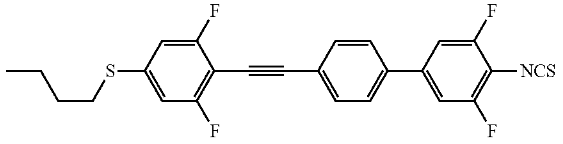
Specific examples of compounds represented by general formula (ii-6-28) include compounds represented by structural formulae (ii-6-28.1) to (ii-6-28.5) below.
[Chem. 175]
(ii-6-28.1)
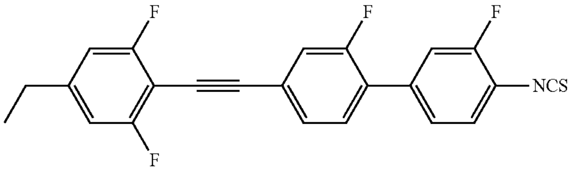
(ii-6-28.2)
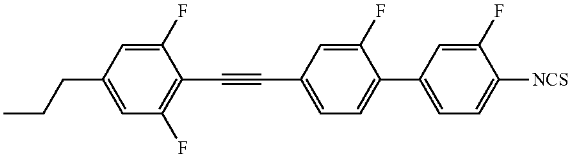
(ii-6-28.3)
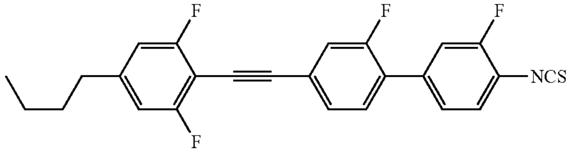

-continued (ii-6-28.4)

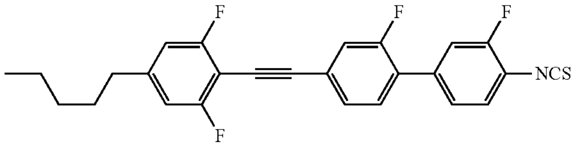

(ii-6-28.5)

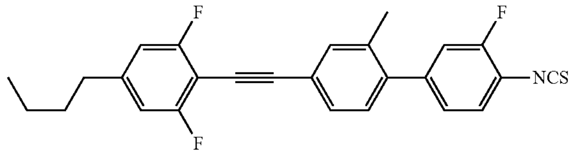

Specific examples of compounds represented by general formula (ii-6-29) include compounds represented by structural formulae (ii-6-29.1) to (ii-6-29.5) below.

[Chem. 176]

(ii-6-29.1)

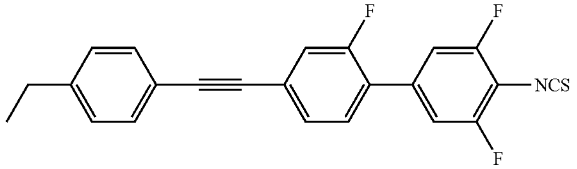

(ii-6-29.2)

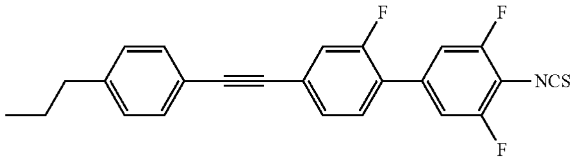

(ii-6-29.3)

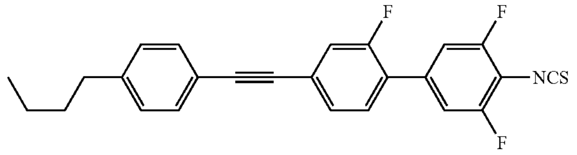

(ii-6-29.4)

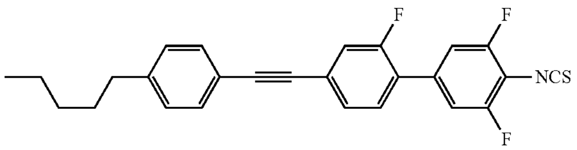

(ii-6-29.5)

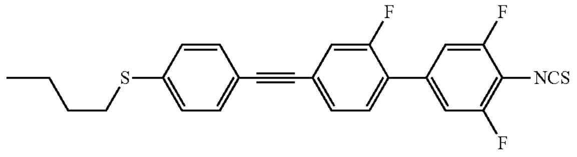

Specific examples of compounds represented by general formula (ii-6-30) include compounds represented by structural formulae (ii-6-30.1) to (ii-6-30.4) below.

[Chem. 177]

(ii-6-30.1)

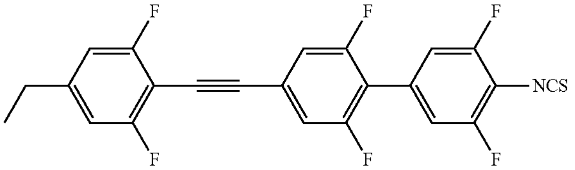

(ii-6-30.2)

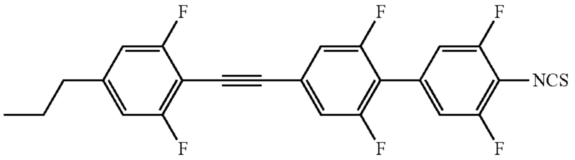

(ii-6-30.3)

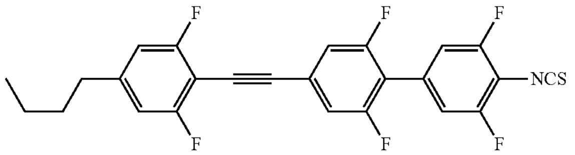

(ii-6-30.4)

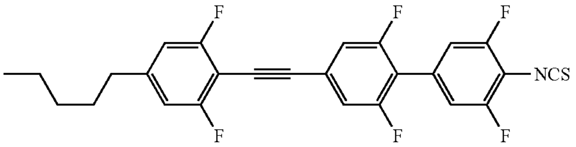

Specific examples of compounds represented by general formula (ii-6-31) include a compound represented by structural formula (ii-6-31.1) below.

[Chem. 178]

(ii-6-31.1)

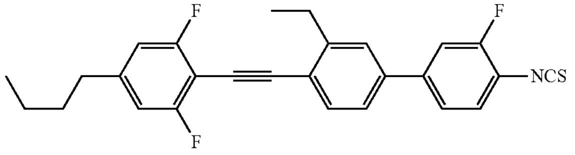

Specific examples of compounds represented by general formula (ii-6-32) include a compound represented by structural formula (ii-6-32.1) below.

[Chem. 179]

(ii-6-32.1)

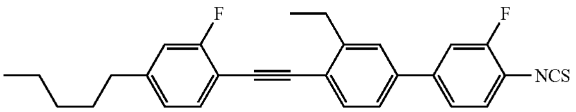

Specific examples of compounds represented by general formula (ii-6-33) include compounds represented by structural formulae (ii-6-33.1) to (ii-6-33.4) below.

[Chem. 180]

(ii-6-33.1)

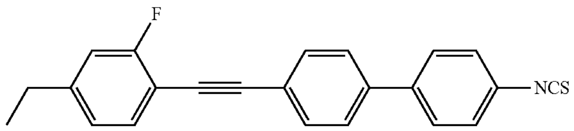

(ii-6-33.2)

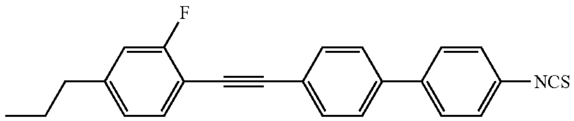

(ii-6-33.3)

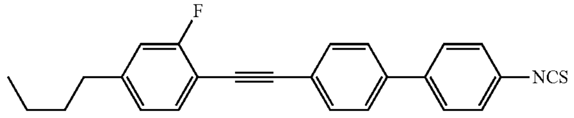

(ii-6-33.4)

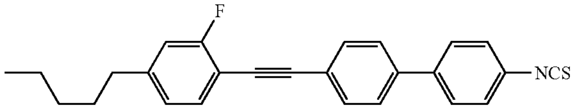

Specific examples of compounds represented by general formula (ii-6-34) include a compound represented by structural formula (ii-6-34.1) below.

[Chem. 181]

(ii-6-34.1)

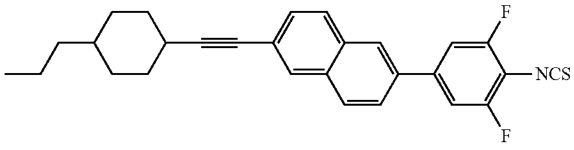

A compound represented by general formula (ii-7) is preferably a compound represented by general formula (ii-7-1) below.

[Chem. 182]

(ii-7-1)

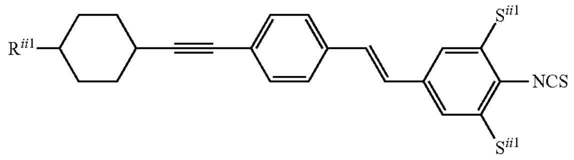

Specific examples of compounds represented by general formula (ii-7-1) include a compound represented by structural formula (ii-7-1.1) below.

[Chem. 183]

(ii-7-1.1)

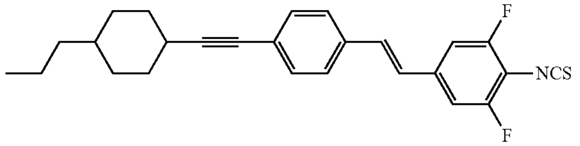

One or two or more, preferably 1 to 15, preferably 2 to 10, and preferably 3 to 8 of the compounds represented by general formula (ii), general formulae (ii-1) to (ii-7), general formulae (ii-1-1) to (ii-1-2), general formulae (ii-2-1) to (ii-2-5), general formulae (ii-3-1) to (ii-3-6), general formulae (ii-4-1) to (ii-4-17), general formulae (ii-5-1) to (ii-5-5), general formulae (ii-6-1) to (ii-6-34), general formula (ii-7-1), structural formulae (ii-1-1.1) to (ii-1-1.4), structural formulae (ii-1-2.1) to (ii-1-2.6), structural formulae (ii-2-1.1) to (ii-2-1.5), structural formulae (ii-2-2.1) to (ii-2-2.3), structural formulae (ii-2-3.1) to (ii-2-3.3), structural formulae (ii-2-4.1) to (ii-2-4.3), structural formulae (ii-2-5.1) to (ii-2-5.3), structural formulae (ii-3-1.1) to (ii-3-1.4), structural formulae (ii-3-2.1) to (ii-3-2.3), structural formulae (ii-3-3.1) to (ii-3-3.3), structural formulae (ii-3-4.1) to (ii-3-4.3), structural formulae (ii-3-5.1) to (ii-3-5.3), structural formulae (ii-3-6.1) to (ii-3-6.2), structural formulae (ii-4-1.1) to (ii-4-1.3), structural formulae (ii-4-2.1) to (ii-4-2.3), structural formulae (ii-4-3.1) to (ii-4-3.3), structural formulae (ii-4-4.1) to (ii-4-4.3), structural formulae (ii-4-5.1) to (ii-4-5.3), structural formulae (ii-4-6.1) to (ii-4-6.3), structural formulae (ii-4-7.1) to (ii-4-7.3), structural formulae (ii-4-8.1) to (ii-4-8.3), structural formulae (ii-4-9.1) to (ii-4-9.4), structural formulae (ii-4-10.1) to (ii-4-10.5), structural formulae (ii-4-11.1) to (ii-4-11.4), structural formulae (ii-4-12.1) to (ii-4-12.5), structural formulae (ii-4-13.1) to (ii-4-13.8), structural formulae (ii-4-14.1) to (ii-4-14.4), structural formulae (ii-4-15.1) to (ii-4-15.4), structural formula (ii-4-16.1), structural formula (ii-4-17.1), structural formulae (ii-5-1.1) to (ii-5-1.4), structural formulae (ii-5-2.1) to (ii-5-2.4), structural formulae (ii-5-3.1) to (ii-5-3.3), structural formulae (ii-5-4.1) to (ii-5-4.3), structural formula (ii-5-5.1), structural formulae (ii-6-1.1) to (ii-6-1.4), structural formulae (ii-6-2.1) to (ii-6-2.4), structural formulae (ii-6-3.1) to (ii-6-3.4), structural formulae (ii-6-4.1) to (ii-6-4.4), structural formulae (ii-6-5.1) to (ii-6-5.8), structural formulae (ii-6-6.1) to (ii-6-6.2), structural formulae (ii-6-7.1) to (ii-6-7.4), structural formulae (ii-6-8.1) to (ii-6-8.5), structural formulae (ii-6-9.1) to (ii-6-9.4), structural formula (ii-6-10.1), structural formulae (ii-6-11.1) to (ii-6-11.16), structural formulae (ii-6-12.1) to (ii-6-12.4), structural formulae (ii-6-13.1) to (ii-6-13.4), structural formulae (ii-6-14.1) to (ii-6-14.4), structural formulae (ii-6-15.1) to (ii-6-15.4), structural formulae (ii-6-16.1) to (ii-6-16.5), structure formulae (ii-6-17.1) to (ii-6-17.2), structural formulae (ii-6-18.1) to (ii-6-18.5), structural formulae (ii-6-19.1) to (ii-6-19.14), structural formulae (ii-6-20.1) to (ii-6-20.4), structural formula (ii-6-21.1), structural formulae (ii-6-22.1) to (ii-6-22.4), structural formulae (ii-6-23.1) to (ii-6-23.4), structural formula (ii-6-24.1), structural formulae (ii-6-25.1) to (ii-6-25.4), structural formulae (ii-6-26.1) to (ii-6-26.4), structural formulae (ii-6-27.1) to (ii-6-27.16), structural formulae (ii-6-28.1) to (ii-6-28.5), structural formulae (ii-6-29.1) to (ii-6-29.5), structural formulae (ii-6-30.1) to (ii-6-30.4), structural formula (ii-6-31.1), structural formula (ii-6-32.1), structural formulae (ii-6-33.1) to (ii-6-33.4), structural formula (ii-6-34.1), or structural formula (ii-7-1.1) are used in the liquid crystal composition.

The lower limit of the total content of the compound(s) represented by general formula (ii), general formulae (ii-1) to (ii-7), general formulae (ii-1-1) to (ii-1-2), general formulae (ii-2-1) to (ii-2-5), general formulae (ii-3-1) to (ii-3-6), general formulae (ii-4-1) to (ii-4-17), general formulae (ii-5-1) to (ii-5-5), general formulae (ii-6-1) to (ii-6-34), general formula (ii-7-1), structural formulae (ii-1-1.1) to (ii-1-1.4), structural formulae (ii-1-2.1) to (ii-1-2.6), structural formulae (ii-2-1.1) to (ii-2-1.5), structural formulae (ii-2-2.1) to (ii-2-2.3), structural formulae (ii-2-3.1) to (ii-2-3.3), structural formulae (ii-2-4.1) to (ii-2-4.3), structural formulae (ii-2-5.1) to (ii-2-5.3), structural formulae (ii-3-1.1) to (ii-3-1.4), structural formulae (ii-3-2.1) to (ii-3-2.3), structural formulae (ii-3-3.1) to (ii-3-3.3), structural formulae (ii-3-4.1) to (ii-3-4.3), structural formulae (ii-3-5.1) to (ii-3-5.3), structural formulae (ii-3-6.1) to (ii-3-6.2), structural formulae (ii-4-1.1) to (ii-4-1.3), structural formulae (ii-4-2.1) to (ii-4-2.3), structural formulae (ii-4-3.1) to (ii-4-3.3), structural formulae (ii-4-4.1) to (ii-4-4.3), structural formulae (ii-4-5.1) to (ii-4-5.3), structural formulae (ii-4-6.1) to (ii-4-6.3), structural formulae (ii-4-7.1) to (ii-4-7.3), structural formulae (ii-4-8.1) to (ii-4-8.3), structural formulae (ii-4-9.1) to (ii-4-9.4), structural formulae (ii-4-10.1) to (ii-4-10.5), structural formulae (ii-4-11.1) to (ii-4-11.4), structural formulae (ii-4-12.1) to (ii-4-12.5), structural formulae (ii-4-13.1) to (ii-4-13.8), structural formulae (ii-4-14.1) to (ii-4-14.4), structural formulae (ii-4-15.1) to (ii-4-15.4), structural formula (ii-4-16.1), structural formula (ii-4-17.1), structural formulae (ii-5-1.1) to (ii-5-1.4), structural formulae (ii-5-2.1) to (ii-5-2.4), structural formulae (ii-5-3.1) to (ii-5-3.3), structural formulae (ii-5-4.1) to (ii-5-4.3), structural formula (ii-5-5.1), structural formulae (ii-6-1.1) to (ii-6-1.4), structural formulae (ii-6-2.1) to (ii-6-2.4), structural formulae (ii-6-3.1) to (ii-6-3.4), structural formulae (ii-6-4.1) to (ii-6-4.4), structural formulae (ii-6-5.1) to (ii-6-5.8), structural formulae (ii-6-6.1) to (ii-6-6.2), structural formulae (ii-6-7.1) to (ii-6-7.4), structural formulae (ii-6-8.1) to (ii-6-8.5), structural formulae (ii-6-9.1) to (ii-6-9.4), structural formula (ii-6-10.1), structural formulae (ii-6-11.1) to (ii-6-11.16), structural formulae (ii-6-12.1) to (ii-6-12.4), structural formulae (ii-6-13.1) to (ii-1-13.4), structural formulae (ii-6-14.1) to (ii-6-14.4), structural formulae (ii-6-15.1) to (ii-6-15.4), structural formulae (ii-1-16.1) to (ii-6-16.5), structure formulae (ii-6-17.1) to (ii-6-17.2), structural formulae (ii-6-18.1) to (ii-6-18.5), structural formulae (ii-6-19.1) to (ii-6-19.14), structural formulae (ii-6-20.1) to (ii-6-20.4), structural formula (ii-6-21.1), structural formulae (ii-6-22.1) to (ii-6-22.4), structural formulae (ii-6-23.1) to (ii-6-23.4), structural formula (ii-6-24.1), structural formulae (ii-6-25.1) to (ii-6-25.4), structural formulae (ii-6-26.1) to (ii-6-26.4), structural formulae (ii-6-27.1) to (ii-6-27.16), structural formulae (ii-6-28.1) to (ii-6-28.5), structural formulae (ii-6-29.1) to (ii-6-29.5), structural formulae (ii-6-30.1) to (ii-6-30.4), structural formula (ii-6-31.1), structural formula (ii-6-32.1), structural formulae (ii-6-33.1) to (ii-6-33.4), structural formula (ii-6-34.1), or structural formula (ii-7-1.1) in 100% by mass of the liquid crystal composition is preferably 1% by mass or more, preferably 5% by mass or more, preferably 10% by mass or more, preferably 15% by mass or more, preferably 20% by mass or more, preferably 25% by mass or more, preferably 30% by mass or more, preferably 35% by mass or more, preferably 40% by mass or more, preferably 45% by mass or more, preferably 55% by mass or more, preferably 65% by mass or more, preferably 75% by mass or more, and preferably 85% by mass or more.

The upper limit of the total content of the compound(s) represented by general formula (ii), general formulae (ii-1) to (ii-7), general formulae (ii-1-1) to (ii-1-2), general formulae (ii-2-1) to (ii-2-5), general formulae (ii-3-1) to (ii-3-6), general formulae (ii-4-1) to (ii-4-17), general formulae (ii-5-1) to (ii-5-5), general formulae (ii-6-1) to (ii-6-34), general formula (ii-7-1), structural formulae (ii-1-1.1) to (ii-1-1.4), structural formulae (ii-1-2.1) to (ii-1-2.6), structural formulae (ii-2-1.1) to (ii-2-1.5), structural formulae (ii-2-2.1) to (ii-2-2.3), structural formulae (ii-2-3.1) to (ii-2-3.3), structural formulae (ii-2-4.1) to (ii-2-4.3), structural formulae (ii-2-5.1) to (ii-2-5.3), structural formulae (ii-3-1.1) to (ii-3-1.4), structural formulae (ii-3-2.1) to (ii-3-2.3), structural formulae (ii-3-3.1) to (ii-3-3.3), structural formulae (ii-3-4.1) to (ii-3-4.3), structural formulae (ii-3-5.1) to (ii-3-5.3), structural formulae (ii-3-6.1) to (ii-3-6.2), structural formulae (ii-4-1.1) to (ii-4-1.3), structural formulae (ii-4-2.1) to (ii-4-2.3), structural formulae (ii-4-3.1) to (ii-4-3.3), structural formulae (ii-4-4.1) to (ii-4-4.3), structural formulae (ii-4-5.1) to (ii-4-5.3), structural formulae (ii-4-6.1) to (ii-4-6.3), structural formulae (ii-4-7.1) to (ii-4-7.3), structural formulae (ii-4-8.1) to (ii-4-8.3), structural formulae (ii-4-9.1) to (ii-4-9.4), structural formulae (ii-4-10.1) to (ii-4-10.5), structural formulae (ii-4-11.1) to (ii-4-11.4), structural formulae (ii-4-12.1) to (ii-4-12.5), structural formulae (ii-4-13.1) to (ii-4-13.8), structural formulae (ii-4-14.1) to (ii-4-14.4), structural formulae (ii-4-15.1) to (ii-4-15.4), structural formula (ii-4-16.1), structural formula (ii-4-17.1), structural formulae (ii-5-1.1) to (ii-5-1.4), structural formulae (ii-5-2.1) to (ii-5-2.4), structural formulae (ii-5-3.1) to (ii-5-3.3), structural formulae (ii-5-4.1) to (ii-5-4.3), structural formula (ii-5-5.1), structural formulae (ii-6-1.1) to (ii-6-1.4), structural formulae (ii-6-2.1) to (ii-6-2.4), structural formulae (ii-6-3.1) to (ii-6-3.4), structural formulae (ii-6-4.1) to (ii-6-4.4), structural formulae (ii-6-5.1) to (ii-6-5.8), structural formulae (ii-6-6.1) to (ii-6-6.2), structural formulae (ii-6-7.1) to (ii-6-7.4), structural formulae (ii-6-8.1) to (ii-6-8.5), structural formulae (ii-6-9.1) to (ii-6-9.4), structural formula (ii-6-10.1), structural formulae (ii-6-11.1) to (ii-6-11.16), structural formulae (ii-6-12.1) to (ii-6-12.4), structural formulae (ii-6-13.1) to (ii-1-13.4), structural formulae (ii-6-14.1) to (ii-6-14.4), structural formulae (ii-6-15.1) to (ii-6-15.4), structural formulae (ii-1-16.1) to (ii-6-16.5), structure formulae (ii-6-17.1) to (ii-6-17.2), structural formulae (ii-6-18.1) to (ii-6-18.5), structural formulae (ii-6-19.1) to (ii-6-19.14), structural formulae (ii-6-20.1) to (ii-6-20.4), structural formula (ii-6-21.1), structural formulae (ii-6-22.1) to (ii-6-22.4), structural formulae (ii-6-23.1) to (ii-6-23.4), structural formula (ii-6-24.1), structural formulae (ii-6-25.1) to (ii-6-25.4), structural formulae (ii-6-26.1) to (ii-6-26.4), structural formulae (ii-6-27.1) to (ii-6-27.16), structural formulae (ii-6-28.1) to (ii-6-28.5), structural formulae (ii-6-29.1) to (ii-6-29.5), structural formulae (ii-6-30.1) to (ii-6-30.4), structural formula (ii-6-31.1), structural formula (ii-6-32.1), structural formulae (ii-6-33.1) to (ii-6-33.4), structural formula (ii-6-34.1), or structural formula (ii-7-1.1) in 100% by mass of the liquid crystal composition is preferably 95% by mass or less, preferably 85% by mass or less, preferably 75% by mass or less, preferably 65% by mass or less, preferably 55% by mass or less, preferably 45% by mass or less, preferably 35% by mass or less, preferably 25% by mass or less, preferably 15% by mass or less, and preferably 5% by mass or less.

The total content of the compound(s) represented by general formula (ii), general formulae (ii-1) to (ii-7), general formulae (ii-1-1) to (ii-1-2), general formulae (ii-2-1) to (ii-2-5), general formulae (ii-3-1) to (ii-3-6), general formulae (ii-4-1) to (ii-4-17), general formulae (ii-5-1) to (ii-5-5), general formulae (ii-6-1) to (ii-6-34), general formula (ii-7-1), structural formulae (ii-1-1.1) to (ii-1-1.4), structural formulae (ii-1-2.1) to (ii-1-2.6), structural formulae (ii-2-1.1) to (ii-2-1.5), structural formulae (ii-2-2.1) to (ii-2-2.3), structural formulae (ii-2-3.1) to (ii-2-3.3), structural formulae (ii-2-4.1) to (ii-2-4.3), structural formulae (ii-2-5.1) to (ii-2-5.3), structural formulae (ii-3-1.1) to (ii-3-1.4), structural formulae (ii-3-2.1) to (ii-3-2.3), structural formulae (ii-3-3.1) to (ii-3-3.3), structural formulae (ii-3-4.1) to (ii-3-4.3), structural formulae (ii-3-5.1) to (ii-3-5.3), structural formulae (ii-3-6.1) to (ii-3-6.2), structural formulae (ii-4-1.1) to (ii-4-1.3), structural formulae (ii-4-2.1) to (ii-4-2.3), structural formulae (ii-4-3.1) to (ii-4-3.3), structural formulae (ii-4-4.1) to (ii-4-4.3), structural formulae (ii-4-5.1) to (ii-4-5.3), structural formulae (ii-4-6.1) to (ii-4-6.3), structural formulae (ii-4-7.1) to (ii-4-7.3), structural formulae (ii-4-8.1) to (ii-4-8.3), structural formulae (ii-4-9.1) to (ii-4-9.4), structural formulae (ii-4-10.1) to (ii-4-10.5), structural formulae (ii-4-11.1) to (ii-4-11.4), structural formulae (ii-4-12.1) to (ii-4-12.5), structural formulae (ii-4-13.1) to (ii-4-13.8), structural formulae (ii-4-14.1) to (ii-4-14.4), structural formulae (ii-4-15.1) to (ii-4-15.4), structural formula (ii-4-16.1), structural formula (ii-4-17.1), structural formulae (ii-5-1.1) to (ii-5-1.4), structural formulae (ii-5-2.1) to (ii-5-2.4), structural formulae (ii-5-3.1) to (ii-5-3.3), structural formulae (ii-5-4.1) to (ii-5-4.3), structural formula (ii-5-5.1), structural formulae (ii-6-1.1) to (ii-6-1.4), structural formulae (ii-6-2.1) to (ii-6-2.4), structural formulae (ii-6-3.1) to (ii-6-3.4), structural formulae (ii-6-4.1) to (ii-6-4.4), structural formulae (ii-6-5.1) to (ii-6-5.8), structural formulae (ii-6-6.1) to (ii-6-6.2), structural formulae (ii-6-7.1) to (ii-6-7.4), structural formulae (ii-6-8.1) to (ii-6-8.5), structural formulae (ii-6-9.1) to (ii-6-9.4), structural formula (ii-6-10.1), structural formulae (ii-6-11.1) to (ii-6-11.16), structural formulae (ii-6-12.1) to (ii-6-12.4), structural formulae (ii-6-13.1) to (ii-1-13.4), structural formulae (ii-6-14.1) to (ii-6-14.4), structural formulae (ii-6-15.1) to (ii-6-15.4), structural formulae (ii-1-16.1) to (ii-6-16.5), structure formulae (ii-6-17.1) to (ii-6-17.2), structural formulae (ii-6-18.1) to (ii-6-18.5), structural formulae (ii-6-19.1) to (ii-6-19.14), structural formulae (ii-6-20.1) to (ii-6-20.4), structural formula (ii-6-21.1), structural formulae (ii-6-22.1) to (ii-6-22.4), structural formulae (ii-6-23.1) to (ii-6-23.4), structural formula (ii-6-24.1), structural formulae (ii-6-25.1) to (ii-6-25.4), structural formulae (ii-6-26.1) to (ii-6-26.4), structural formulae (ii-6-27.1) to (ii-6-27.16), structural formulae (ii-6-28.1) to (ii-6-28.5), structural formulae (ii-6-29.1) to (ii-6-29.5), structural formulae (ii-6-30.1) to (ii-6-30.4), structural formula (ii-6-31.1), structural formula (ii-6-32.1), structural formulae (ii-6-33.1) to (ii-6-33.4), structural formula (ii-6-34.1), or structural formula (ii-7-1.1) in 100% by mass of the liquid crystal composition is preferably 10 to 95% by mass, preferably 15 to 85% by mass, and preferably 20 to 75% by mass, in terms of solubility, Δn and/or $\Delta\varepsilon_r$. The total content is preferably 1 to 50% by mass, preferably 1 to 45% by mass, preferably 3 to 40% by mass, preferably 3 to 35% by mass, preferably 3 to 25% by mass, and preferably 3 to 15% by mass.

The compounds represented by general formula (ii) (including subordinate concepts) can be synthesized using known synthetic methods.

The liquid crystal composition according to the present invention may further contain one or two or more of compounds represented by general formula (v) below having at least one —C≡C— as a linking group and a cyano group (—CN) in terms of Vth, Δn and/or $\Delta\varepsilon_r$.

[Chem. 184]

$$R^{v1}\!-\!\left[A^{v1}-Z^{v1}\right]_{n^{v1}}\!-A^{v2}-CN \qquad \text{(v)}$$

In general formula (v), $R^{v1}$ represents an alkyl group having 1 to 20 carbon atoms.

The alkyl group is a linear, branched, or cyclic alkyl group, and preferably a linear alkyl group.

The number of carbon atoms in the alkyl group is preferably 2 to 10, and preferably 2 to 6.

One or two or more —$CH_2$—'s in the alkyl group are each independently optionally substituted with —O—, —S—, —CO—, and/or —CS—.

One or two or more —$CH_2$—$CH_2$—'s in the alkyl group are each independently optionally substituted with —CH═CH—, —CO—O—, —O—CO—, and/or —C≡C—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

For example, $R^{v1}$ can represent an alkoxy group having 1 to 19 carbon atoms by substituting one —$CH_2$— in the alkyl group with —O—.

The alkoxy group is a linear, branched, or cyclic alkoxy group, and preferably a linear alkoxy group.

The number of carbon atoms in the alkoxy group is preferably 2 to 10, and preferably 2 to 6.

$R^{v1}$ can represent an alkylsulfanyl group (alkylthio group) having 1 to 19 carbon atoms by substituting one —$CH_2$— in $R^{v1}$ with —S—.

The alkylsulfanyl group is a linear, branched, or cyclic alkylsulfanyl group, and preferably a linear alkylsulfanyl group.

The number of carbon atoms in the alkylsulfanyl group is preferably 2 to 10, and preferably 2 to 6.

$R^{v1}$ can represent an alkenyl group having 2 to 20 carbon atoms by substituting one or two or more —$CH_2$—$CH_2$—'s in the alkyl group with —CH═CH—.

The alkenyl group is a linear, branched, or cyclic alkenyl group, and preferably a linear alkenyl group.

The number of carbon atoms in the alkenyl group is preferably 2 to 10, and preferably 2 to 6.

$R^{v1}$ can represent an alkynyl group having 2 to 20 carbon atoms by substituting one or two or more —$CH_2$—$CH_2$—'s in the alkyl group with —C≡C—.

The alkynyl group is a linear, branched, or cyclic alkynyl group, and preferably a linear alkynyl group.

The number of carbon atoms in the alkynyl group is preferably 2 to 10, and preferably 2 to 6.

$R^{v1}$ can represent an alkenyloxy group having 2 to 19 carbon atoms by substituting one —$CH_2$— in the alkyl group with —O— and one or two or more —$CH_2$—$CH_2$—'s in the alkyl group with —CH═CH—.

The alkenyloxy group is a linear, branched, or cyclic alkenyloxy group, and preferably a linear alkenyloxy group.

The number of carbon atoms in the alkenyloxy group is preferably 2 to 10, and preferably 2 to 6.

$R^{v1}$ can represent an alkyl halide group having 1 to 20 carbon atoms by substituting one or two or more hydrogen atoms in the alkyl group with a halogen atom.

The alkyl halide group is a linear, branched, or cyclic alkyl halide group, and preferably a linear alkyl halide group.

The number of carbon atoms in the alkyl halide group is preferably 2 to 10, and preferably 2 to 6.

$R^{v1}$ can represent an alkoxy halide group having 1 to 19 carbon atoms by substituting one —$CH_2$— in the alkyl group with —O— and one or two or more hydrogen atoms in the alkyl group with a halogen atom.

The alkoxy halide group is a linear, branched, or cyclic alkoxy halide group, and preferably a linear alkoxy halide group.

The number of carbon atoms in the alkoxy halide group is preferably 2 to 10, and preferably 2 to 6.

Specific examples of the alkyl group having 1 to 20 carbon atoms (including substituted ones) in $R^{v1}$ include groups represented by formulae ($R^{v1}$-1) to ($R^{v1}$-36).

[Chem. 185]

($R^{v1}$-1)

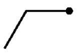
($R^{v1}$-2)

($R^{v1}$-3)

($R^{v1}$-4)

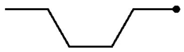
($R^{v1}$-5)

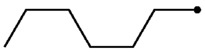
($R^{v1}$-6)

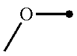
($R^{v1}$-7)

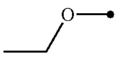
($R^{v1}$-8)

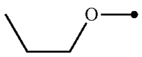
($R^{v1}$-9)

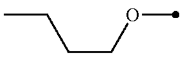
($R^{v1}$-10)

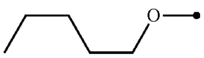
($R^{v1}$-11)

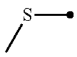
($R^{v1}$-12)

-continued

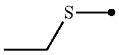
($R^{v1}$-13)

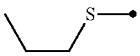
($R^{v1}$-14)

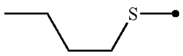
($R^{v1}$-15)

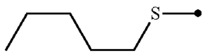
($R^{v1}$-16)

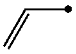
($R^{v1}$-17)

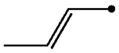
($R^{v1}$-18)

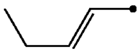
($R^{v1}$-19)

($R^{v1}$-20)

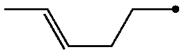
($R^{v1}$-21)

($R^{v1}$-22)

($R^{v1}$-23)

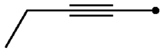
($R^{v1}$-24)

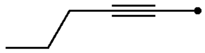
($R^{v1}$-25)

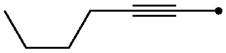
($R^{v1}$-26)

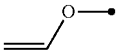
($R^{v1}$-27)

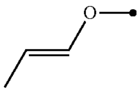
($R^{v1}$-28)

($R^{v1}$-29)

($R^{v1}$-30)

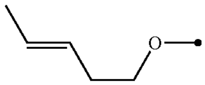
($R^{v1}$-31)

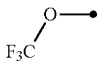
($R^{v1}$-32)

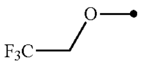
($R^{v1}$-33)

-continued ($R^{v1}$-34)

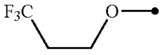

($R^{v1}$-35)

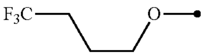

($R^{v1}$-36)

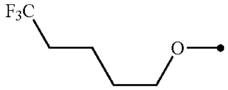

In formulae ($R^{v1}$-1) to ($R^{v1}$-36), a black dot represents a bond with $A^{v1}$.

When the ring structure to which $R^{v1}$ is bonded is a phenyl group (aromatic group), a linear alkyl group having 1 to 5 carbon atoms, a linear alkoxy group having 1 to 4 carbon atoms, and an alkenyl group having 4 to 5 carbon atoms are preferred. When the ring structure to which $R^{v1}$ is bonded is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferred.

To stabilize the nematic phase, $R^{v1}$ preferably has a total number of carbon atoms and, if present, oxygen atoms of 5 or less and preferably is linear.

$R^{v1}$ is preferably a linear alkyl group having 2 to 8 carbon atoms in terms of solubility.

In general formula (v), $A^{v1}$ and $A^{v2}$ each independently represent a group selected from the group consisting of the following groups (a), (b), (c), and (d):

(a) a 1,4-cyclohexylene group (one —$CH_2$— or two or more non-adjacent —$CH_2$—'s in this group are optionally substituted with —O— and/or —S—.);

(b) a 1,4-phenylene group (one —CH═ or two or more —CH═'s in this group are optionally substituted with —N═.);

(c) a naphthalene-2,6-diyl group, a 1,2,3,4-tetrahydronaphthalene-2,6-diyl group, or a decahydronaphthalene-2,6-diyl group (one —CH═ or two or more —CH═'s in the naphthalene-2,6-diyl group or 1,2,3,4-tetrahydronaphthalene-2,6-diyl group are optionally substituted with —N═.), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH═ or two or more —CH═'s in this group are optionally substituted with —N═.).

One or two or more hydrogen atoms in $A^{v1}$ and $A^{v2}$ are each independently optionally substituted with a substituent $S^{v1}$.

The substituent $S^{v1}$ represents a halogen atom, a cyano group, or an alkyl group having 1 to 6 carbon atoms.

The halogen atom includes fluorine, chlorine, bromine, and iodine atoms.

One or two or more —$CH_2$—'s in the alkyl group are each independently optionally substituted with —O—, —S—, —CO—, and/or —CS—.

One or two or more hydrogen atoms in the alkyl group are each independently optionally substituted with a halogen atom.

The halogen atom includes fluorine, chlorine, bromine, and iodine atoms.

However, when the alkyl group having 1 to 6 carbon atoms is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

At least one of $A^{v1}$s or $A^{v2}$ is preferably substituted with at least one substituent $S^{v1}$.

A plurality of substituents $S^{v1}$, if present, may be the same or different.

As the substitution position of the substituent $S^{v1}$ in $A^{v1}$, formula ($A^{v1}$-SP-1) below is preferred in terms of solubility.

[Chem. 186]

($A^{v1}$-SP-1)

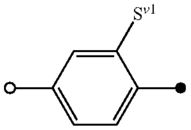

In formula ($A^{v1}$-SP-1), a white dot represents a bond with $R^{v1}$ or $Z^{v1}$, and a black dot represents a bond with $Z^{v1}$.

As the substitution position of the substituent $S^{v1}$ in $A^{v2}$, any of formulae ($A^{v2}$-SP-1) to ($A^{v2}$-SP-2) below is preferred.

[Chem. 187]

($A^{v1}$-SP-1)

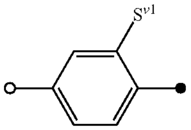

($A^{v2}$-SP-2)

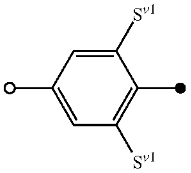

In formulae ($A^{v2}$-SP-1) to ($A^{v2}$-SP-2), a white dot represents a bond with $Z^{v1}$, and a black dot represents a bond with the cyano group (—CN).

More specifically, $A^{v1}$ preferably represents any of formulae ($A^{v1}$-1) to ($A^{v1}$-3) below.

[Chem. 188]

($A^{v1}$-1)

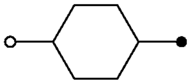

($A^{v1}$-2)

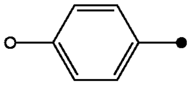

-continued (A$^{v1}$-3)

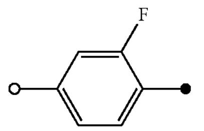

In formulae (A$^{v1}$-1) to (A$^{v1}$-3), a white dot represents a bond with R$^{v1}$ or Z$^{v1}$, and a black dot represents a bond with Z$^{v1}$.

More specifically, A$^{v2}$ preferably represents any of formulae (A$^{v2}$-1) to (A$^{v2}$-3) below.

[Chem. 189]

(A$^{v2}$-1)

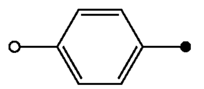

(A$^{v2}$-2)

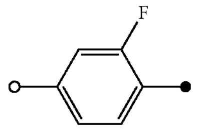

(A$^{v2}$-3)

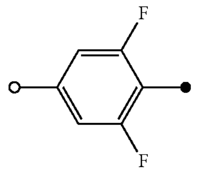

In formulae (A$^{v2}$-1) to (A$^{v2}$-3), a white dot represents a bond with Z$^{v1}$, and a black dot represents a bond with the cyano group (—CN).

In general formula (v), Z$^{v1}$ represents a single bond, —C≡C—, —CH=CH—, or —CF=CF—.

However, at least one of Z$^{v1}$s represents —C≡C—.

In general formula (v), n$^{v1}$ represents an integer of 1 or 2.

In general formula (v), a plurality of A$^{v1}$s and Z$^{v1}$s, if present, each may be the same or different.

A compound represented by general formula (v) is preferably a compound represented by one of general formulae (v-1) to (v-2) below.

[Chem. 190]

(v-1)

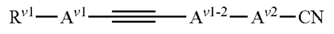

(v-2)

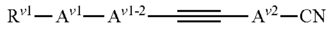

In general formulae (v-1) to (v-2), R$^{v1}$, A$^{v1}$, and A$^{v2}$ have the same meaning as R$^{v1}$, A$^{v1}$, and A$^{v2}$, respectively, in general formula (v).

In general formulae (v-1) to (v-2), the definition of A$^{v1-2}$ is the same as the definition of A$^{v1}$ in general formula (v).

A compound represented by general formula (v-1) is preferably a compound represented by one of general formulae (v-1-1) to (v-1-6) below.

[Chem. 191]

(v-1-1)

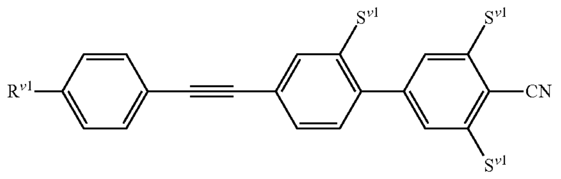

(v-1-2)

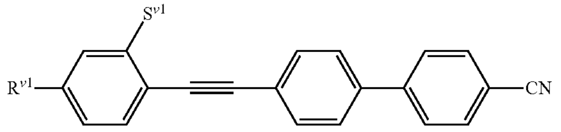

(v-1-3)

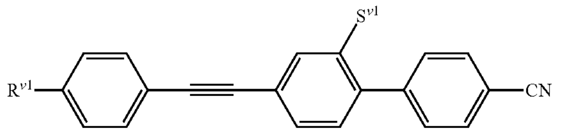

(v-1-4)

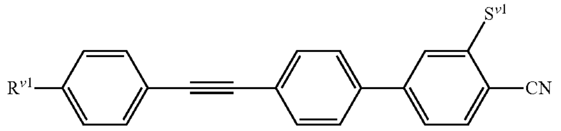

(v-1-5)

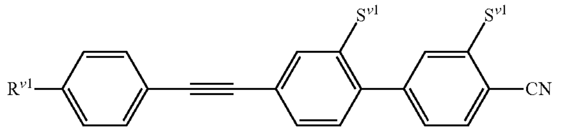

(v-1-6)

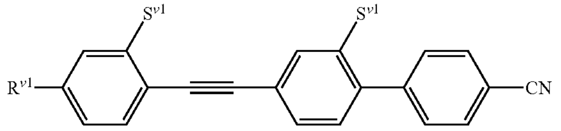

In general formulae (v-1-1) to (v-1-6), R$^{v1}$ and S$^{v1}$ each independently have the same meaning as R$^{v1}$ and S$^{v1}$, respectively, in general formula (v).

Specific examples of compounds represented by general formula (v-1-1) include compounds represented by structural formulae (v-1-1.1) to (v-1-1.3) below.

[Chem. 192]

(v-1-1.1)

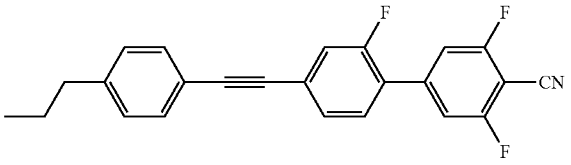

-continued (v-1-1.2)

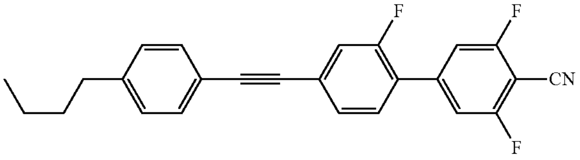

(v-1-1.3)

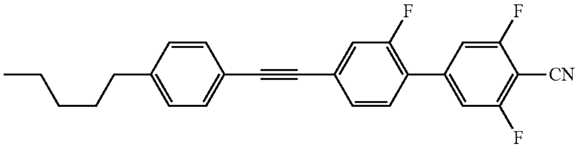

Specific examples of compounds represented by general formula (v-1-2) include compounds represented by structural formulae (v-1-2.1) to (v-1-2.3) below.

[Chem. 193]

(v-1-2.1)

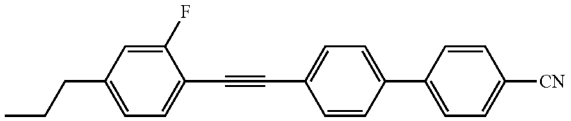

(v-1-2.2)

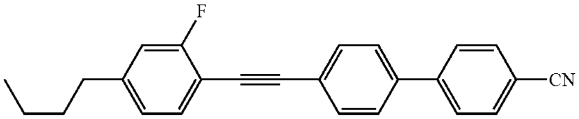

(v-1-2.3)

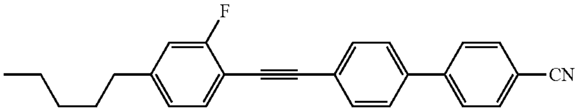

Specific examples of compounds represented by general formula (v-1-3) include compounds represented by structural formulae (v-1-3.1) to (v-1-3.3) below.

[Chem. 194]

(v-1-3.1)

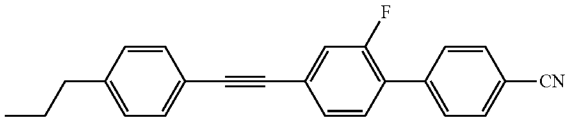

(v-1-3.2)

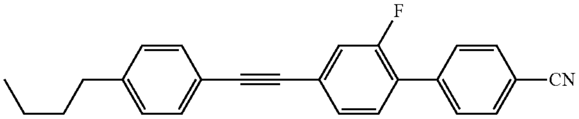

-continued (v-1-3.3)

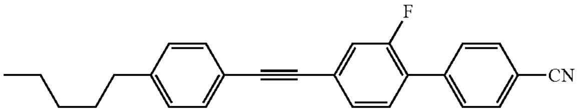

Specific examples of compounds represented by general formula (v-1-4) include compounds represented by structural formulae (v-1-4.1) to (v-1-4.3) below.

[Chem. 195]

(v-1-4.1)

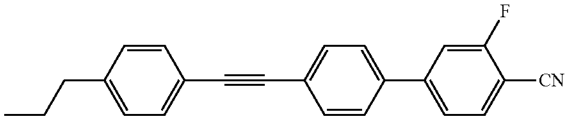

(v-1-4.2)

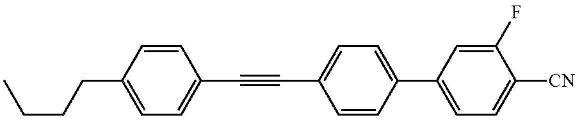

(v-1-4.3)

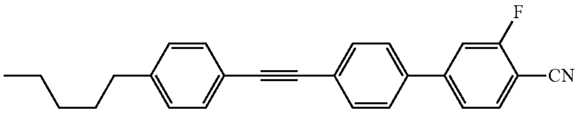

Specific examples of compounds represented by general formula (v-1-5) include compounds represented by structural formulae (v-1-5.1) to (v-1-5.3) below.

[Chem. 196]

(v-1-5.1)

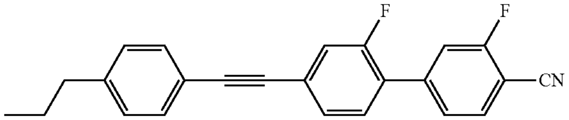

(v-1-5.2)

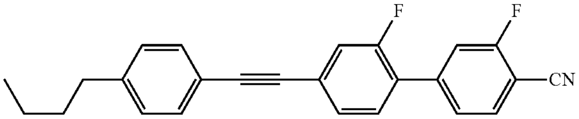

(v-1-5.3)

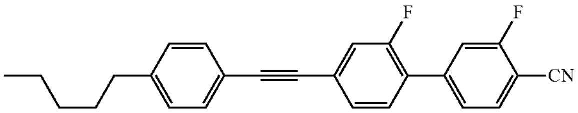

Specific examples of compounds represented by general formula (v-1-6) include compounds represented by structural formulae (v-1-6.1) to (v-1-6.3) below.

[Chem. 197]

(V-1-6.1)

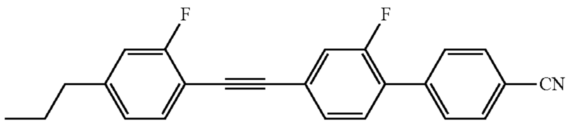

(v-1-6.2)

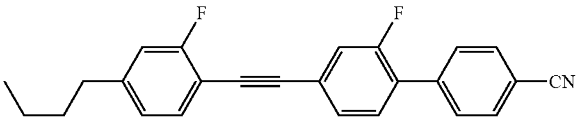

(v-1-6.3)

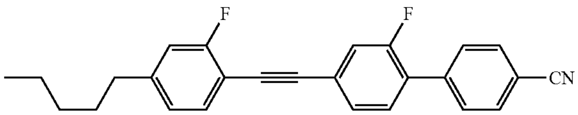

A compound represented by general formula (v-2) is preferably a compound represented by one of general formulae (v-2-1) to (v-2-2) below.

[Chem. 198]

(v-2-1)

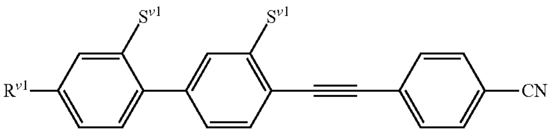

(v-2-2)

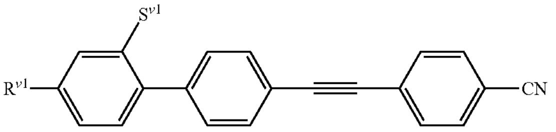

In general formulae (v-2-1) to (v-2-2), $R^{v1}$ and $S^{v1}$ each independently have the same meaning as $R^{v1}$ and $S^{v1}$, respectively, in general formula (v).

Specific examples of compounds represented by general formula (v-2-1) include compounds represented by structural formulae (i-2-1.1) to (i-2-1.3) below.

[Chem. 199]

(v-2-1.1)

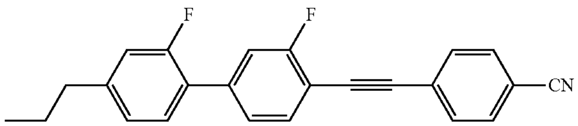

(v-2-1.2)

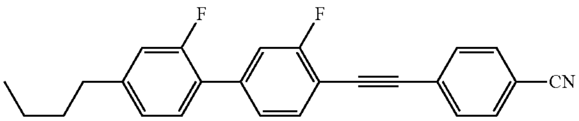

-continued (v-2-1.3)

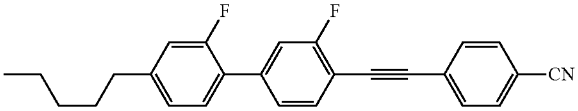

Specific examples of compounds represented by general formula (v-2-2) include compounds represented by structural formulae (v-2-2.1) to (v-2-2.3) below.

[Chem. 200]

(v-2-2.1)

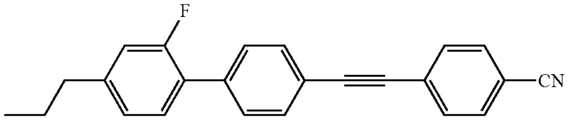

(v-2-2.2)

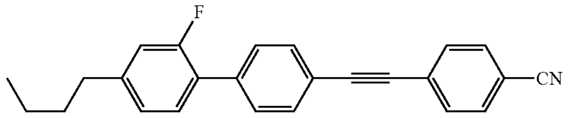

(v-2-2.3)

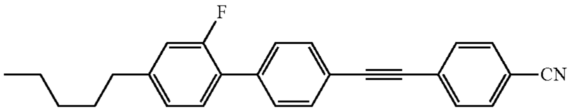

One or two or more, preferably 1 to 5, preferably 1 to 4, preferably 1 to 3, preferably 1 to 2, and preferably one of the compounds represented by general formula (v), general formulae (v-1) to (v-2), general formulae (v-1-1) to (v-1-6), general formulae (v-2-1) to (v-2-2), structural formulae (v-1-1.1) to (v-1-1.3), structural formulae (v-1-2.1) to (v-1-2.3), structural formulae (v-1-3.1) to (v-1-3.3), structural formulae (v-1-4.1) to (v-1-4.3), structural formulae (v-1-5.1) to (v-1-5.3), structural formulae (v-1-6.1) to (v-1-6.3), structural formulae (v-2-1.1) to (v-2-1.3), or structural formulae (v-2-2.1) to (v-2-2.3) are used in the liquid crystal composition.

The lower limit of the total content of the compound(s) represented by general formula (v), general formulae (v-1) to (v-2), general formulae (v-1-1) to (v-1-6), general formulae (v-2-1) to (v-2-2), structural formulae (v-1-1.1) to (v-1-1.3), structural formulae (v-1-2.1) to (v-1-2.3), structural formulae (v-1-3.1) to (v-1-3.3), structural formulae (v-1-4.1) to (v-1-4.3), structural formulae (v-1-5.1) to (v-1-5.3), structural formulae (v-1-6.1) to (v-1-6.3), structural formulae (v-2-1.1) to (v-2-1.3), or structural formulae (v-2-2.1) to (v-2-2.3) in 100% by mass of the liquid crystal composition is preferably 1% by mass or more, preferably 3% by mass or more, and preferably 5% by mass or more.

The upper limit of the total content of the compound(s) represented by general formula (v), general formulae (v-1) to (v-2), general formulae (v-1-1) to (v-1-6), general formulae (v-2-1) to (v-2-2), structural formulae (v-1-1.1) to (v-1-1.3), structural formulae (v-1-2.1) to (v-1-2.3), structural formulae (v-1-3.1) to (v-1-3.3), structural formulae (v-1-4.1) to (v-1-4.3), structural formulae (v-1-5.1) to (v-1-5.3), structural formulae (v-1-6.1) to (v-1-6.3), structural formulae (v-2-1.1) to (v-2-1.3), or structural formulae (v-2-2.1) to (v-2-2.3) in 100% by mass of the liquid crystal composition is preferably 30% by mass or less, preferably 25% by mass or less, and preferably 20% by mass or less.

The total content of the compound(s) represented by general formula (v), general formulae (v-1) to (v-2), general formulae (v-1-1) to (v-1-6), general formulae (v-2-1) to (v-2-2), structural formulae (v-1-1.1) to (v-1-1.3), structural formulae (v-1-2.1) to (v-1-2.3), structural formulae (v-1-3.1) to (v-1-3.3), structural formulae (v-1-4.1) to (v-1-4.3), structural formulae (v-1-5.1) to (v-1-5.3), structural formulae (v-1-6.1) to (v-1-6.3), structural formulae (v-2-1.1) to (v-2-1.3), or structural formulae (v-2-2.1) to (v-2-2.3) in 100% by mass of the liquid crystal composition is preferably 1 to 30% by mass, preferably 3 to 25% by mass, and preferably 5 to 20% by mass, in terms of solubility and/or $V_{th}$.

The compounds represented by general formula (v) (including subordinate concepts) can be synthesized using known synthetic methods.

The liquid crystal composition according to the present invention may further contain one or two or more of compounds represented by general formula (vi) below having at least one —C≡C— as a linking group, in terms of Δn and/or $\Delta\varepsilon_r$.

[Chem. 201]

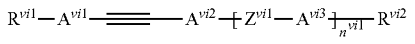

(vi)

In general formula (vi), $R^{vi1}$ represents a hydrogen atom or an alkyl group having 1 to 20 carbon atoms.

The alkyl group having 1 to 20 carbon atoms is a linear, branched, or cyclic alkyl group, and preferably a linear alkyl group.

The number of carbon atoms in the alkyl group having 1 to 20 carbon atoms is preferably 2 to 10, and preferably 2 to 6.

One or two or more $—CH_2—$'s in the alkyl group are each independently optionally substituted with —O—, —S—, —CO—, and/or —CS—.

One or two or more $—CH_2—CH_2—$'s in the alkyl group are each independently optionally substituted with —CO—O—, —O—CO—, —CO— S—, —S—CO—, —CO—NH—, —NH—CO—, —CH═CH—, —CF═CF—, and/or —C≡C—.

One or two or more $—CH_2—CH_2—CH_2—$'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

For example, $R^{vi1}$ can represent an alkoxy group having 1 to 19 carbon atoms by substituting one $—CH_2—$ in the alkyl group with —O—.

The alkoxy group is a linear, branched, or cyclic alkoxy group, and preferably a linear alkoxy group.

The number of carbon atoms in the alkoxy group is preferably 2 to 10, and preferably 2 to 6.

$R^{vi1}$ can represent an alkylsulfanyl group (alkylthio group) having 1 to 19 carbon atoms by substituting one $—CH_2—$ in the alkyl group with —S—.

The alkylsulfanyl group is a linear, branched, or cyclic alkylsulfanyl group, and preferably a linear alkylsulfanyl group.

The number of carbon atoms in the alkylsulfanyl group is preferably 1 to 10, and preferably 1 to 6.

$R^{vi1}$ can represent an alkenyl group having 2 to 20 carbon atoms by substituting one or two or more $—CH_2—CH_2—$'s in the alkyl group with —CH═CH—.

The alkenyl group is a linear, branched, or cyclic alkenyl group, and preferably a linear alkenyl group.

The number of carbon atoms in the alkenyl group is preferably 2 to 10, and preferably 2 to 6.

$R^{vi1}$ can represent an alkynyl group having 2 to 20 carbon atoms by substituting one or two or more $—CH_2—CH_2—$'s in the alkyl group with —C≡C—.

The alkynyl group is a linear, branched, or cyclic alkynyl group, and preferably a linear alkynyl group.

The number of carbon atoms in the alkynyl group is preferably 2 to 10, and preferably 2 to 6.

$R^{vi1}$ can represent an alkenyloxy group having 2 to 19 carbon atoms by substituting one $—CH_2—$ in the alkyl group with —O— and one or two or more $—CH_2—CH_2—$'s in the alkyl group with —CH═CH—. The alkenyloxy group is a linear, branched, or cyclic alkenyloxy group, and preferably a linear alkenyloxy group.

The number of carbon atoms in the alkenyloxy group is preferably 2 to 10, and preferably 2 to 6.

$R^{vi1}$ can represent an alkyl halide group having 1 to 20 carbon atoms by substituting one or two or more hydrogen atoms in the alkyl group with a halogen atom.

The alkyl halide group is a linear, branched, or cyclic alkyl halide group, and preferably a linear alkyl halide group.

The number of carbon atoms in the alkyl halide group is preferably 2 to 10, and preferably 2 to 6.

$R^{vi1}$ can represent an alkoxy halide group having 1 to 19 carbon atoms by substituting one $—CH_2—$ in the alkyl group with —O— and one or two or more hydrogen atoms in the alkyl group with a halogen atom.

The alkoxy halide group is a linear, branched, or cyclic alkoxy halide group, and preferably a linear alkoxy halide group.

The number of carbon atoms in the alkoxy halide group is preferably 2 to 10, and preferably 2 to 6.

Specific examples of the alkyl group having 1 to 20 carbon atoms (including substituted ones) in $R^{vi1}$ include groups represented by formulae ($R^{vi1}$-1) to ($R^{vi1}$-36).

[Chem. 202]

($R^{vi1}$-1)

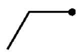

($R^{vi1}$-2)

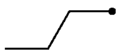

($R^{vi1}$-3)

-continued ($R^{vi1}$-4)

($R^{vi1}$-5)

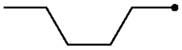

($R^{vi1}$-6)

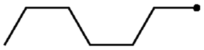

($R^{vi1}$-7)

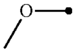

($R^{vi1}$-8)

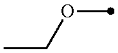

($R^{vi1}$-9)

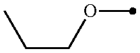

($R^{vi1}$-10)

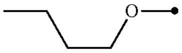

($R^{vi1}$-11)

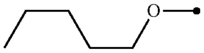

($R^{vi1}$-12)

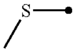

($R^{vi1}$-13)

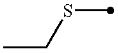

($R^{vi1}$-14)

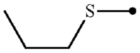

($R^{vi1}$-15)

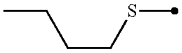

($R^{vi1}$-16)

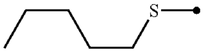

($R^{vi1}$-17)

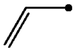

($R^{vi1}$-18)

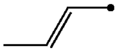

($R^{vi1}$-19)

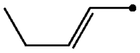

($R^{vi1}$-20)

($R^{vi1}$-21)

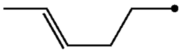

($R^{vi1}$-22)

($R^{vi1}$-23)

($R^{vi1}$-24)

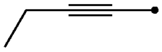

($R^{vi1}$-25)

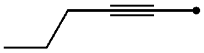

($R^{vi1}$-26)

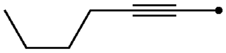

-continued ($R^{vi1}$-27)

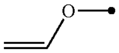

($R^{vi1}$-28)

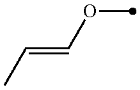

($R^{vi1}$-29)

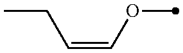

($R^{vi1}$-30)

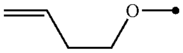

($R^{vi1}$-31)

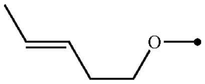

($R^{vi1}$-32)

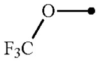

($R^{vi1}$-33)

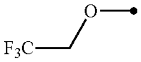

($R^{vi1}$-34)

($R^{vi1}$-35)

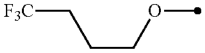

($R^{vi1}$-36)

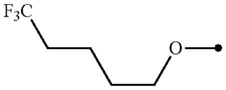

In formulae ($R^{vi1}$-1) to ($R^{vi1}$-36), a black dot represents a bond with $A^{vi1}$.

When the reliability of the entire liquid crystal composition is important, $R^{vi1}$ is preferably an alkyl group having 1 to 12 carbon atoms. When the viscosity of the entire liquid crystal composition is important, $R^{vi1}$ is preferably an alkenyl group having 2 to 8 carbon atoms.

When the ring structure to which $R^{vi1}$ is bonded is a phenyl group (aromatic group), a linear alkyl group having 1 to 5 carbon atoms, a linear alkoxy group having 1 to 4 carbon atoms, and an alkenyl group having 4 to 5 carbon atoms are preferred. When the ring structure to which $R^{vi1}$ is bonded is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferred.

To stabilize the nematic phase, $R^{vi1}$ preferably has a total number of carbon atoms and, if present, oxygen atoms of 5 or less and preferably is linear.

In terms of solubility, $R^{vi1}$ is preferably a linear alkyl group having 2 to 6 carbon atoms or a linear alkylsulfanyl group having 1 to 6 carbon atoms.

In general formula (vi), $R^{vi2}$ represents a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, or an alkyl group having 1 to 20 carbon atoms.

The alkyl group having 1 to 20 carbon atoms is a linear, branched, or cyclic alkyl group, and preferably a linear alkyl group.

The number of carbon atoms in the alkyl group is preferably 2 to 10, and preferably 2 to 6.

One or two or more —$CH_2$—'s in the alkyl group are each independently optionally substituted with —O—, —S—, —CO—, and/or —CS—.

One or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—.

One or two or more —$CH_2$—$CH_2$—$CH_2$—'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

For example, $R^{vi2}$ can represent an alkoxy group having 1 to 19 carbon atoms by substituting one —$CH_2$— in the alkyl group with —O—.

The alkoxy group is a linear, branched, or cyclic alkoxy group, and preferably a linear alkoxy group.

The number of carbon atoms in the alkoxy group is preferably 2 to 10, and preferably 2 to 6.

$R^{vi2}$ can represent an alkylsulfanyl group (alkylthio group) having 1 to 19 carbon atoms by substituting one —$CH_2$— in the alkyl group with —S—.

The alkylsulfanyl group is a linear, branched, or cyclic alkylsulfanyl group, and preferably a linear alkylsulfanyl group.

The number of carbon atoms in the alkylsulfanyl group is preferably 1 to 10, and preferably 1 to 6.

$R^{vi2}$ can represent an alkenyl group having 2 to 20 carbon atoms by substituting one or two or more —$CH_2$—$CH_2$—'s in the alkyl group with —CH═CH—.

The alkenyl group is a linear, branched, or cyclic alkenyl group, and preferably a linear alkenyl group.

The number of carbon atoms in the alkenyl group is preferably 2 to 10, and preferably 2 to 6.

$R^{vi2}$ can represent an alkynyl group having 2 to 20 carbon atoms by substituting one or two or more —$CH_2$—$CH_2$—'s in the alkyl group with —C≡C—.

The alkynyl group is a linear, branched, or cyclic alkynyl group, and preferably a linear alkynyl group.

The number of carbon atoms in the alkynyl group is preferably 2 to 10, and preferably 2 to 6.

$R^{vi2}$ can represent an alkenyloxy group having 2 to 19 carbon atoms by substituting one —$CH_2$— in the alkyl group with —O— and one or two or more —$CH_2$—$CH_2$—'s in the alkyl group with —CH═CH—.

The alkenyloxy group is a linear, branched, or cyclic alkenyloxy group, and preferably a linear alkenyloxy group.

The number of carbon atoms in the alkenyloxy group is preferably 2 to 10, and preferably 2 to 6.

$R^{vi2}$ can represent an alkyl halide group having 1 to 20 carbon atoms by substituting one or two or more hydrogen atoms in the alkyl group with a halogen atom.

The alkyl halide group is a linear, branched, or cyclic alkyl halide group, and preferably a linear alkyl halide group.

The number of carbon atoms in the alkyl halide group is preferably 2 to 10, and preferably 2 to 6.

$R^{vi2}$ can represent an alkoxy halide group having 1 to 19 carbon atoms by substituting one —$CH_2$— in the alkyl group with —O— and one or two or more hydrogen atoms in the alkyl group with a halogen atom.

The alkoxy halide group is a linear, branched, or cyclic alkoxy halide group, and preferably a linear alkoxy halide group.

The number of carbon atoms in the alkoxy halide group is preferably 2 to 10, and preferably 2 to 6.

Specific examples of the alkyl group having 1 to 20 carbon atoms (including substituted ones) in $R^{vi2}$ include groups represented by formulae ($R^{vi2}$-1) to ($R^{vi2}$-36).

[Chem. 203]

($R^{vi2}$-1)

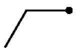
($R^{vi2}$-2)

($R^{vi2}$-3)

($R^{vi2}$-4)

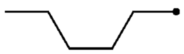
($R^{vi2}$-5)

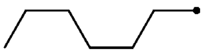
($R^{vi2}$-6)

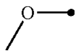
($R^{vi2}$-7)

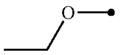
($R^{vi2}$-8)

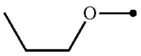
($R^{vi2}$-9)

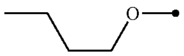
($R^{vi2}$-10)

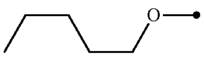
($R^{vi2}$-11)

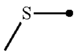
($R^{vi2}$-12)

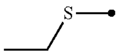
($R^{vi2}$-13)

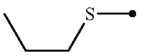
($R^{vi2}$-14)

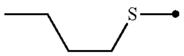
($R^{vi2}$-15)

-continued ($R^{vi2}$-16)

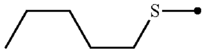

($R^{vi2}$-17)

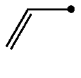

($R^{vi2}$-18)

($R^{vi2}$-19)

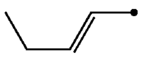

($R^{vi2}$-20)

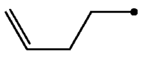

($R^{vi2}$-21)

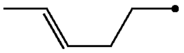

($R^{vi2}$-22)

($R^{vi2}$-23)

($R^{vi2}$-24)

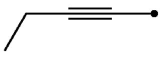

($R^{vi2}$-25)

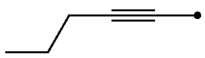

($R^{vi2}$-26)

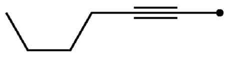

($R^{vi2}$-27)

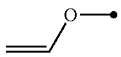

($R^{vi2}$-28)

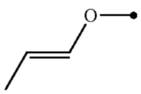

($R^{vi2}$-29)

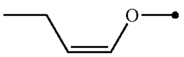

($R^{vi2}$-30)

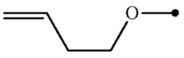

($R^{vi2}$-31)

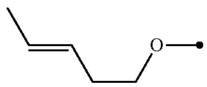

($R^{vi2}$-32)

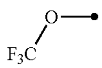

($R^{vi2}$-33)

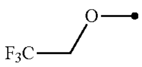

($R^{vi2}$-34)

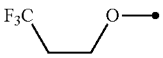

($R^{vi2}$-35)

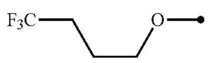

($R^{vi2}$-36)

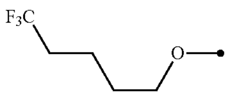

In formulae ($R^{vi2}$-1) to ($R^{vi2}$-36), a black dot represents a bond with $A^{vi3}$.

When the ring structure to which $R^{vi2}$ is bonded is a phenyl group (aromatic group), a linear alkyl group having 1 to 5 carbon atoms, a linear alkoxy group having 1 to 4 carbon atoms, and an alkenyl group having 4 to 5 carbon atoms are preferred. When the ring structure to which $R^{vi1}$ is bonded is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferred.

To stabilize the nematic phase, $R^{vi2}$ preferably has a total number of carbon atoms and, if present, oxygen atoms of 5 or less and preferably is linear.

$R^{vi2}$ is preferably a fluorine atom, a cyano group, a linear alkyl group having 2 to 6 carbon atoms, a linear alkoxy group having 1 to 6 carbon atoms, or a linear alkylsulfanyl group having 1 to 6 carbon atoms, in terms of solubility, $\Delta n$ and/or $\Delta_r$.

In general formula (vi), $A^{vi1}$, $A^{vi2}$, and $A^{vi3}$ each independently represent a hydrocarbon ring having 3 to 16 carbon atoms or a hetero ring having 3 to 16 carbon atoms.

The hydrocarbon ring having 3 to 16 carbon atoms or the hetero ring having 3 to 16 carbon atoms more specifically represents a group selected from the group consisting of the following groups (a), (b), (c), and (d):

(a) a 1,4-cyclohexylene group (one —$CH_2$— or two or more non-adjacent —$CH_2$—'s in this group are optionally substituted with —O— or —S—.);

(b) a 1,4-phenylene group (one —CH= or two or more —CH='s in this group are optionally substituted with —N=.);

(c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group (one —CH= or two or more —CH='s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N=.), and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group (one —CH= or two or more —CH='s in this group are optionally substituted with —N=.).

One or two or more hydrogen atoms in $A^{vi1}$, $A^{vi2}$, and $A^{vi3}$ are each independently optionally substituted with a substituent $S^{vi1}$.

The substituent $S^{vi1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms.

The alkyl group is a linear, branched, or cyclic alkyl group, and preferably a linear alkyl group.

The number of carbon atoms in the alkyl group is preferably 2 to 10, and preferably 3 to 6.

One or two or more —$CH_2$—'s in the alkyl group are each independently optionally substituted with —O—, —S—, and/or —CO—.

One or two or more —$CH_2$—$CH_2$—'s in the alkyl group are each independently optionally substituted with —CH═CH—, —CF═CF—, —C≡C—, —CO—O—, —O—CO—, —CO—S—, —S—CO—, —CO—NH—, and/or —NH—CO—.

One or two or more —$CH_2$—$CH_2$—$CH_2$—'s in the alkyl group are optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

The substituent $S^{vi1}$ is preferably a fluorine atom or a linear alkyl group having 1 to 3 carbon atoms.

At least one of $A^{vi1}$, $A^{vi2}$, and $A^{vi3}$ are preferably substituted with at least one substituent $S^{vi1}$.

$A^{vi1}$ is preferably substituted with at least one substituent $S^{vi1}$.

A plurality of substituents $S^{vi1}$, if present, may be the same or different.

As the substitution position of the substituent $S^{vi1}$ in $A^{vi1}$, any of formulae ($A^{vi1}$-SP-1) to ($A^{vi1}$-SP-3) below is preferred.

[Chem. 204]

($A^{vi1}$-SP-1)

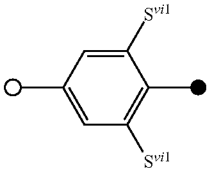

($A^{vi1}$-SP-2)

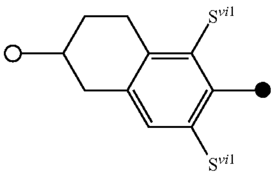

($A^{vi1}$-SP-3)

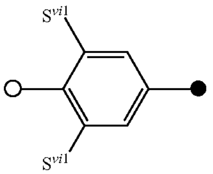

In formulae ($A^{vi1}$-SP-1) to ($A^{vi1}$-SP-3), a white dot represents a bond with $R^{vi1}$, and a black dot represents a bond with —C≡C—. As the substitution position of the substituent $S^{vi1}$ in $A^{vi2}$, any of formulae ($A^{vi2}$-SP-1) to ($A^{vi2}$-SP-7) below is preferred, and any of formulae ($A^{vi2}$-SP-1) to ($A^{vi2}$-SP-7) below is preferred in terms of compatibility with other liquid crystal compounds.

[Chem. 205]

($A^{vi2}$-SP-1)

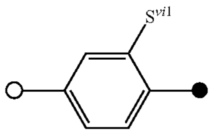

($A^{vi2}$-SP-2)

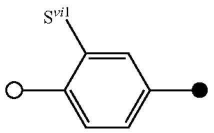

($A^{vi2}$-SP-3)

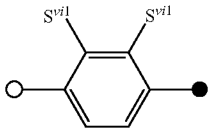

($A^{vi2}$-SP-4)

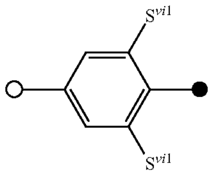

($A^{vi2}$-SP-5)

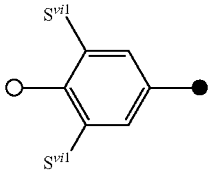

($A^{vi2}$-SP-6)

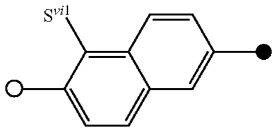

($A^{vi2}$-SP-7)

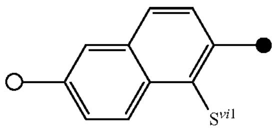

In formulae ($A^{vi2}$-SP-1) to ($A^{vi2}$-SP-7), a white dot represents a bond with —C≡C—, and a black dot represents a bond with $Z^{vi1}$.

As the substitution position of the substituent $S^{vi3}$ in $A^{vi3}$, any of formulae ($A^{vi3}$-SP-1) to ($A^{vi3}$-SP-8) below is preferred, and any of formulae ($A^{vi3}$-SP-1) to ($A^{vi3}$-SP-5) below is preferred in terms of solubility.

[Chem. 206]

($A^{vi3}$-SP-1)

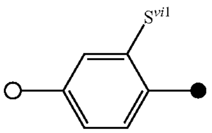

($A^{vi3}$-SP-2)

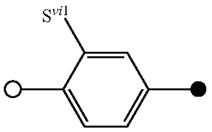

($A^{vi3}$-SP-3)

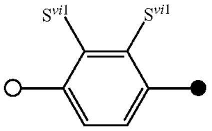

($A^{vi3}$-SP-4)

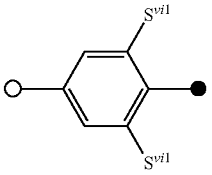

($A^{vi3}$-SP-5)

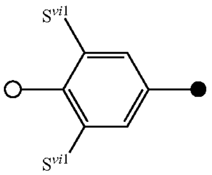

($A^{vi3}$-SP-6)

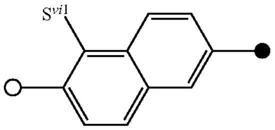

($A^{vi3}$-SP-7)

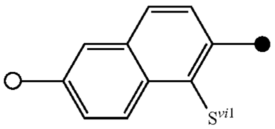

($A^{vi3}$-SP-8)

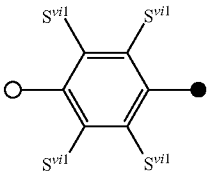

In formulae ($A^{vi3}$-SP-1) to ($A^{vi3}$-SP-8), a white dot represents a bond with $Z^{vi1}$, and a black dot represents a bond with $Z^{vi1}$ or $R^{vi2}$, More specifically, $A^{vi1}$ preferably represents any of formulae ($A^{vi1}$-1) to ($A^{vi1}$-5) below.

[Chem. 207]

($A^{vi1}$-1)

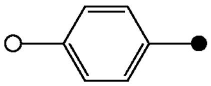

($A^{vi1}$-2)

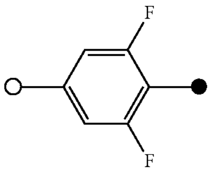

($A^{vi1}$-3)

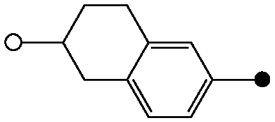

($A^{vi1}$-4)

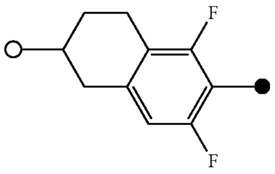

($A^{vi1}$-5)

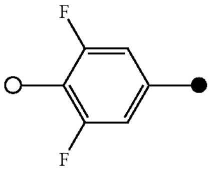

In formulae ($A^{vi1}$-1) to ($A^{vi1}$-5), a white dot represents a bond with $R^{vi1}$, and a black dot represents a bond with —C≡C—.

More specifically, $A^{vi2}$ preferably represents any of formulae ($A^{vi2}$-1) to ($A^{vi2}$-5) below.

[Chem. 208]

($A^{vi2}$-1)

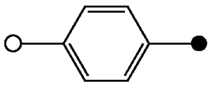

($A^{vi2}$-2)

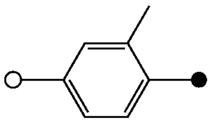

($A^{vi2}$-3)

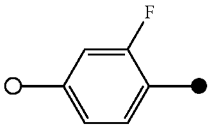

($A^{vi2}$-4)

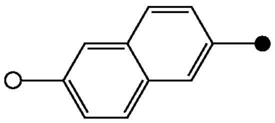

-continued (A$^{vi2}$-5)

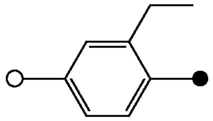

In formulae (A$^{vi2}$-1) to (A$^{vi2}$-5), a white dot represents a bond with —C≡C—, and a black dot represents a bond with $Z^{i1}$.

More specifically, A$^{vi3}$ preferably represents any of formulae (A$^{vi3}$-1) to (A$^{vi3}$-5) below.

[Chem. 209]

(A$^{vi3}$-1)

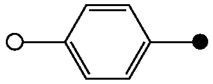

(A$^{vi3}$-2)

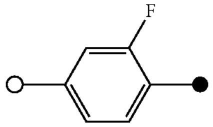

(A$^{vi3}$-3)

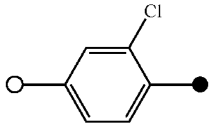

(A$^{vi3}$-4)

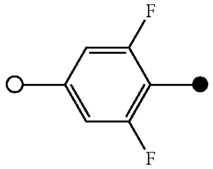

(A$^{vi3}$-5)

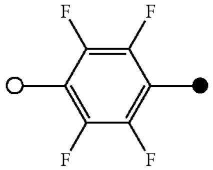

In formulae (A$^{vi3}$-1) to (A$^{vi3}$-5), a white dot represents a bond with Z$^{vi1}$, and a black dot represents a bond with Z$^{vi1}$ or R$^{vi2}$, In general formula (vi), Z$^{vi1}$ each independently represents a single bond or an alkylene group having 1 to 20 carbon atoms.

The alkylene group is a linear, branched, or cyclic alkylene group, and preferably a linear alkylene group.

The number of carbon atoms in the alkylene group is preferably 2 to 10, and preferably 2 to 6.

One or two or more —$CH_2$—'s in the alkylene group are each independently optionally substituted with —O—, —$CF_2$—, and/or —CO—.

One or two or more —$CH_2$—$CH_2$—'s in the alkylene group are each independently optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—.

One or two or more —$CH_2$—$CH_2$—$CH_2$—'s in the alkyl group are each independently optionally substituted with —O—CO—O—.

However, when the alkylene group is substituted with a predetermined group, oxygen atoms are not directly bonded to each other.

Specific examples of the alkylene group having 2 to 20 carbon atoms (including substituted ones) include groups represented by formulae (Z$^{vi1}$-1) to (Z$^{vi1}$-24).

[Chem. 210]

(Z$^{vi1}$-1)

(Z$^{vi1}$-2)

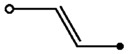

(Z$^{vi1}$-3)

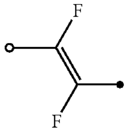

(Z$^{vi1}$-4)

(Z$^{vi1}$-5)

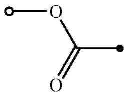

(Z$^{vi1}$-6)

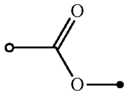

(Z$^{vi1}$-7)

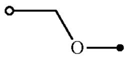

(Z$^{vi1}$-8)

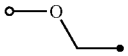

(Z$^{vi1}$-9)

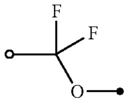

(Z$^{vi1}$-10)

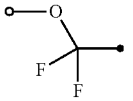

(Z$^{vi1}$-11)

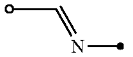

(Z$^{vi1}$-12)

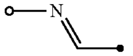

(Z$^{vi1}$-13)

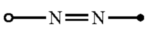

(Z$^{vi1}$-14)

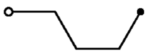

(Z$^{vi1}$-15)

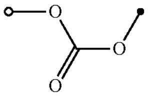

-continued

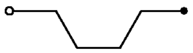
($Z^{vi1}$-16)

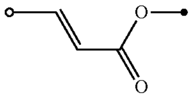
($Z^{vi1}$-17)

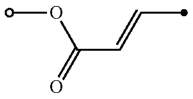
($Z^{vi1}$-18)

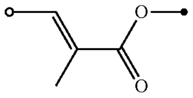
($Z^{vi1}$-19)

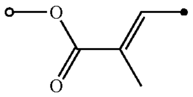
($Z^{vi1}$-20)

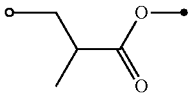
($Z^{vi1}$-21)

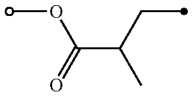
($Z^{vi1}$-22)

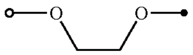
($Z^{vi1}$-23)

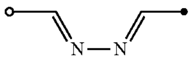
($Z^{vi1}$-24)

In formulae ($Z^{vi1}$-1) to ($Z^{vi1}$-24), a white dot represents a bond with $A^{vi2}$ or $A^{vi3}$, and a black dot represents a bond with $A^{vi3}$.

In general formula (vi), $n^{vi1}$ represents an integer of 1 to 3, and preferably 1 or 2.

When $n^{vi1}$ is 1, $Z^{vi1}$ preferably represents —C≡C— in terms of Δn and/or $\Delta\varepsilon_r$.

When $n^{vi1}$ is 2 or 3, at least one of $Z^{vi1}$s preferably represents —C≡C— in terms of Δn and/or $\Delta\varepsilon_r$.

In general formula (vi), a plurality of $A^{vi3}$s and $Z^{vi1}$s, if present, each may be the same or different.

A compound represented by general formula (vi) is preferably a compound represented by general formula (vi-1) below.

[Chem. 211]

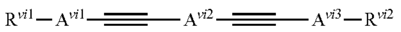
(vi-1)

In general formula (vi-1), $R^{vi1}$, $R^{vi2}$, $A^{vi1}$, $A^{vi2}$, and $A^{vi3}$ have the same meaning as $R^{vi1}$, $R^{vi2}$, $A^{vi1}$, $A^{vi2}$, and $A^{vi3}$, respectively, in general formula (vi).

A compound represented by general formula (vi-1) is preferably a compound represented by one of general formulae (vi-1-1) to (vi-1-12) below.

[Chem. 212]

(vi-1-1)
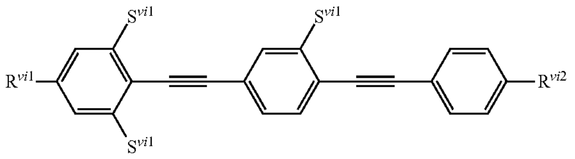

(vi-1-2)
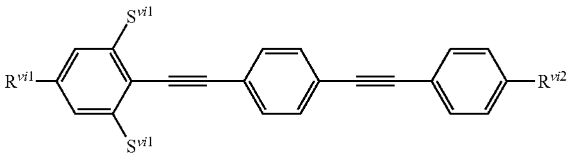

(vi-1-3)
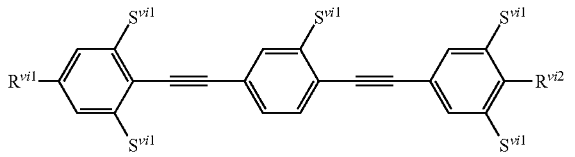

(vi-1-4)
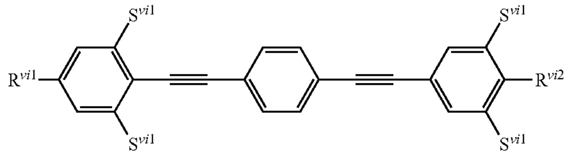

(vi-1-5)
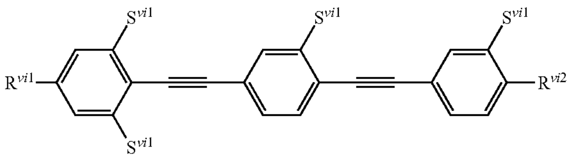

(vi-1-6)
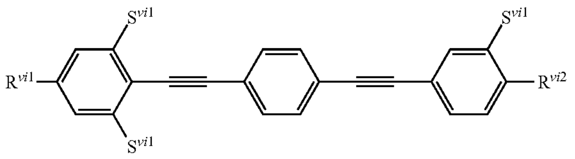

(vi-1-7)
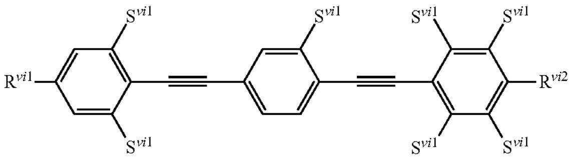

(vi-1-8)
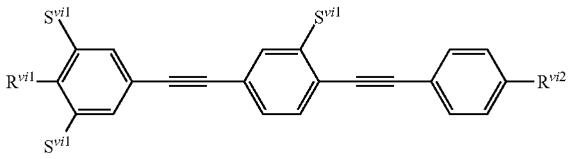

-continued

[Chem. 213]

(vi-1-9)

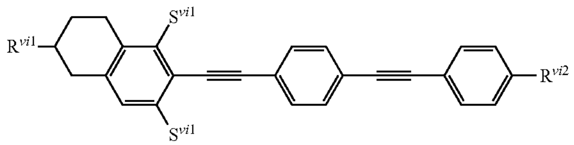

(vi-1-10)

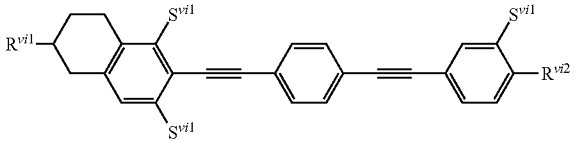

(vi-1-11)

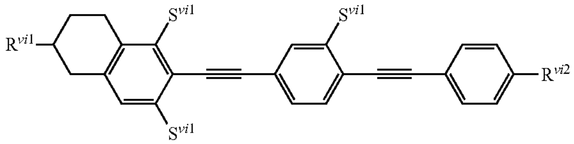

(vi-1-12)

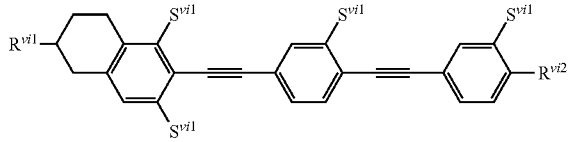

In general formulae (vi-1-1) to (vi-1-12), $R^{vi1}$, $R^{vi2}$, and $S^{vi1}$ each independently have the same meaning as $R^{vi1}$, $R^{vi2}$, and $S^{vi1}$, respectively, in general formula (vi).

Specific examples of compounds represented by general formula (vi-1-1) include compounds represented by structural formulae (vi-1-1.1) to (vi-1-1.24) below.

[Chem. 214]

(vi-1-1.1)

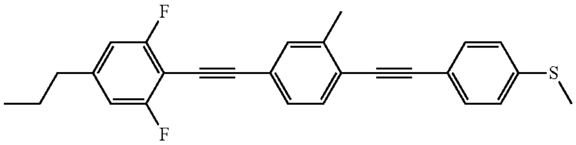

(vi-1-1.2)

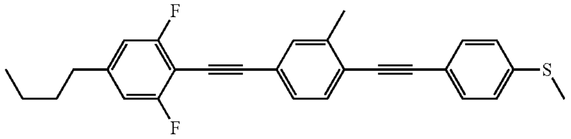

(vi-1-1.3)

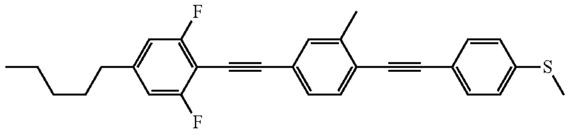

-continued (vi-1-1.4)

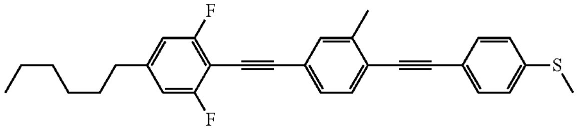

(vi-1-1.5)

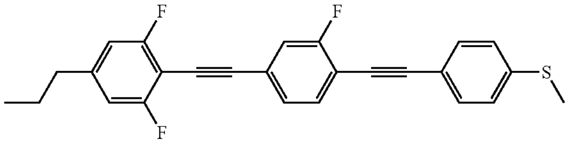

(vi-1-1.6)

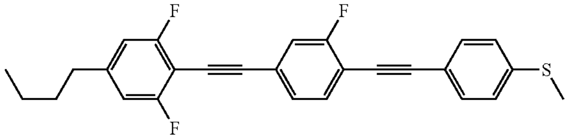

(vi-1-1.7)

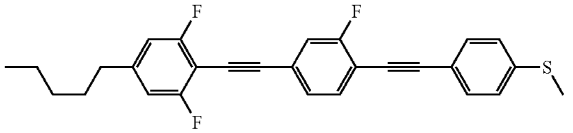

(vi-1-1.8)

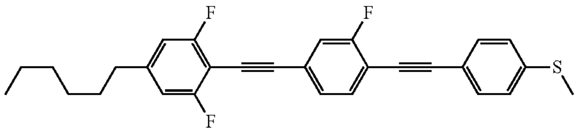

[Chem. 215]

(vi-1-1.9)

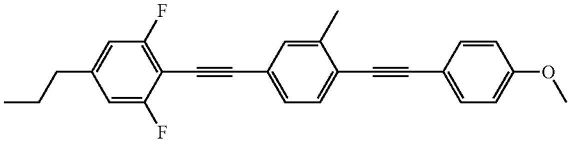

(vi-1-1.10)

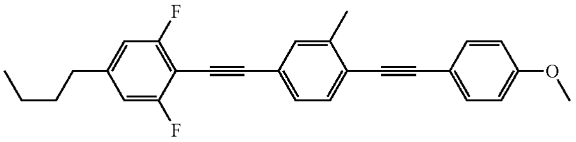

(vi-1-1.11)

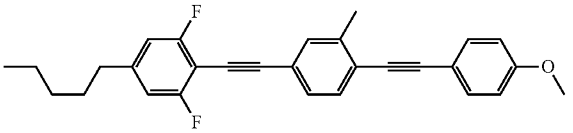

(vi-1-1.12)

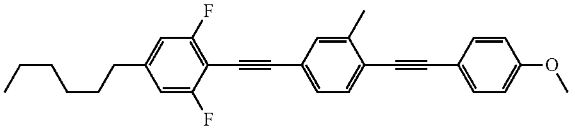

-continued
(vi-1-1.13)
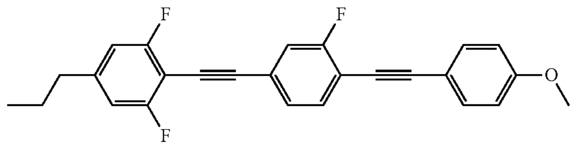
(vi-1-1.14)
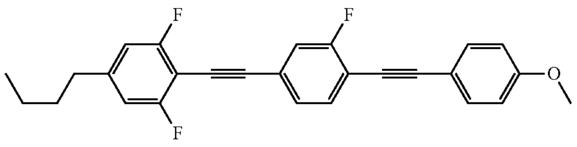
(vi-1-1.15)
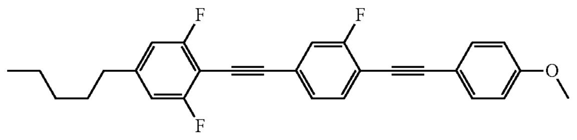
(vi-1-1.16)
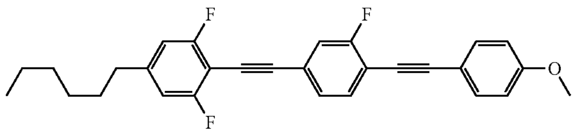
[Chem. 216]
(vi-1-1.17)
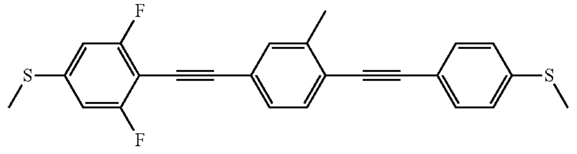
(vi-1-1.18)
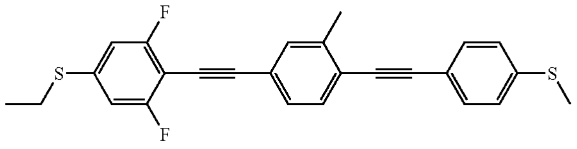
(vi-1-1.19)
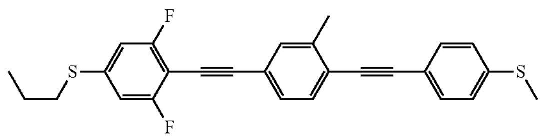
(vi-1-1.20)
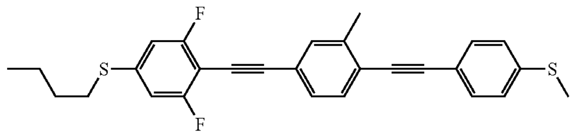
(vi-1-1.21)
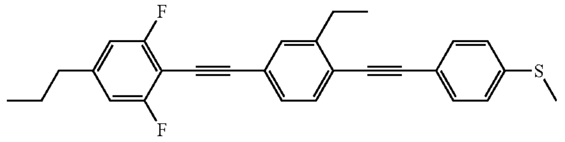
-continued
(vi-1-1.22)
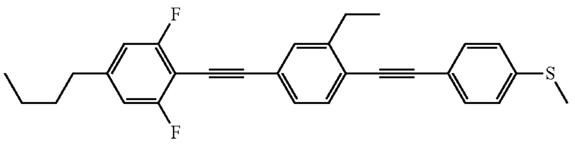
(vi-1-1.23)
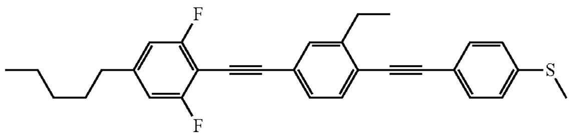
(vi-1-1.24)
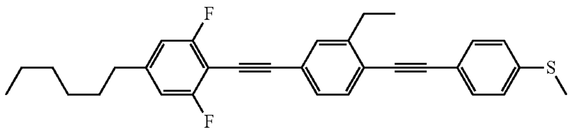
Specific examples of compounds represented by general formula (vi-1-2) include compounds represented by structural formulae (vi-1-2.1) to (vi-1-2.8) below.
[Chem. 217]
(vi-1-2.1)
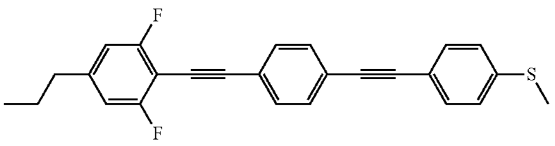
(vi-1-2.2)
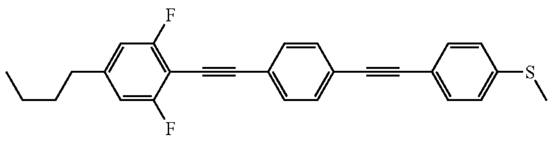
(vi-1-2.3)
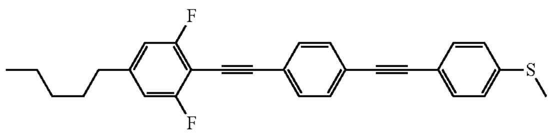
(vi-1-2.4)
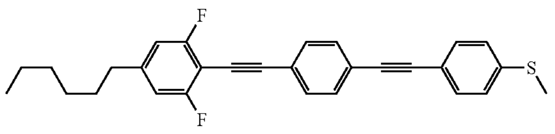
(vi-1-2.5)
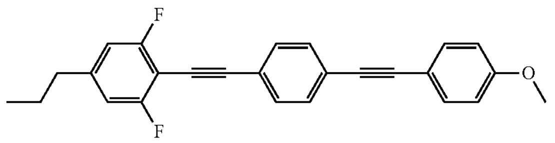

-continued
(vi-1-2.6)
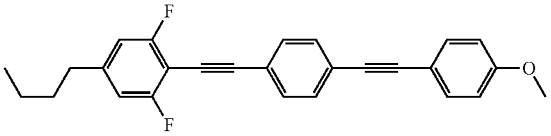
(vi-1-2.7)
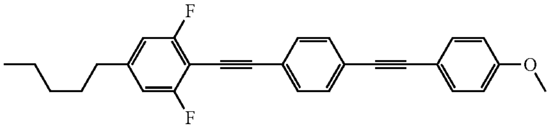
(vi-1-2.8)
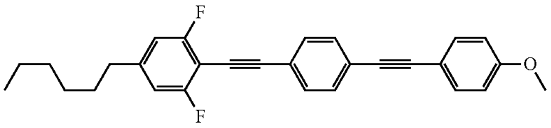
Specific examples of compounds represented by general formula (vi-1-3) include compounds represented by structural formulae (vi-1-3.1) to (vi-1-3.8) below.
[Chem. 218]
(vi-1-3.1)
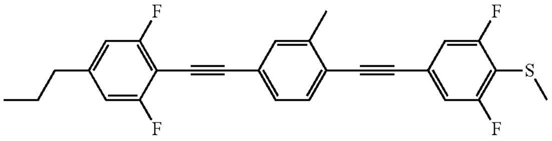
(vi-1-3.2)
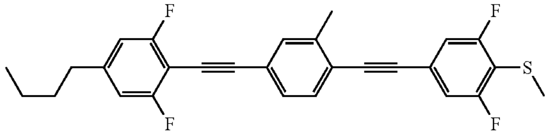
(vi-1-3.3)
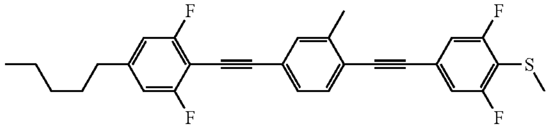
(vi-1-3.4)
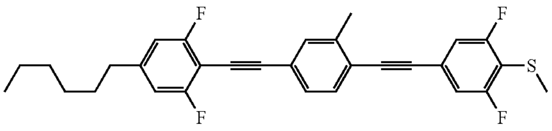
(vi-1-3.5)
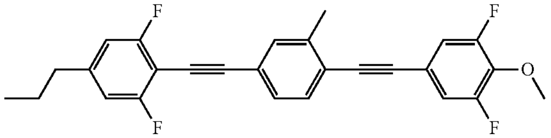
-continued
(vi-1-3.6)
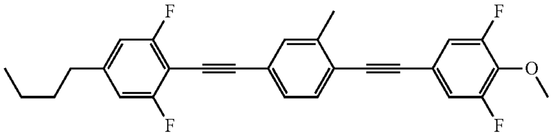
(vi-1-3.7)
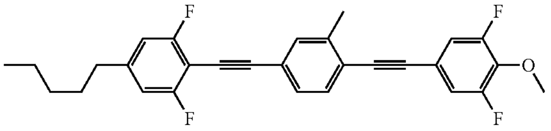
(vi-1-3.8)
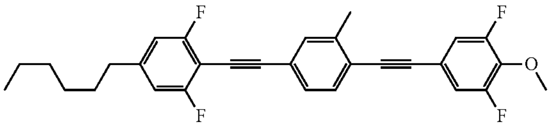
Specific examples of compounds represented by general formula (vi-1-4) include compounds represented by structural formulae (vi-1-4.1) to (vi-1-4.8) below.
[Chem. 219]
(vi-1-4.1)
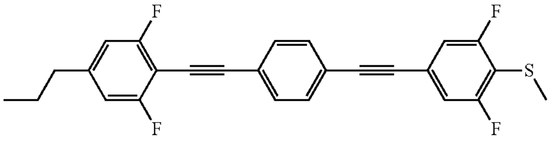
(vi-1-4.2)
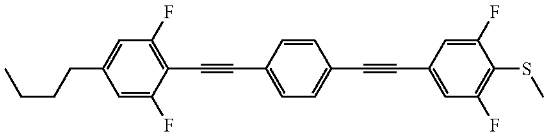
(vi-1-4.3)
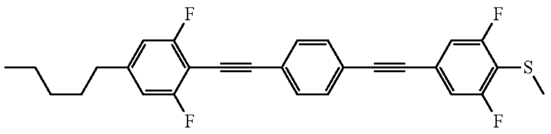
(vi-1-4.4)
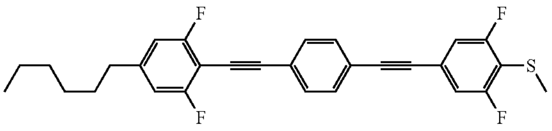
(vi-1-4.5)
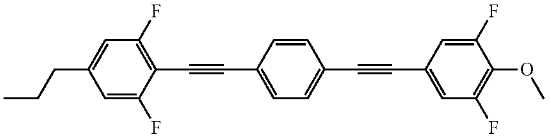

-continued
(vi-1-4.6)
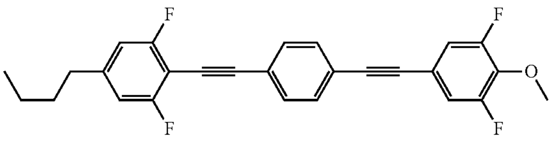
(vi-1-4.7)
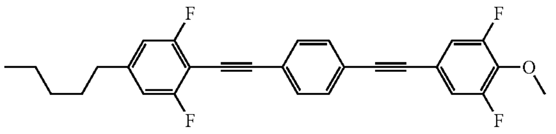
(vi-1-4.8)
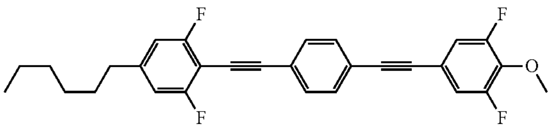
Specific examples of compounds represented by general formula (vi-1-5) include compounds represented by structural formulae (vi-1-5.1) to (vi-1-5.8) below.
[Chem. 220]
(vi-1-5.1)
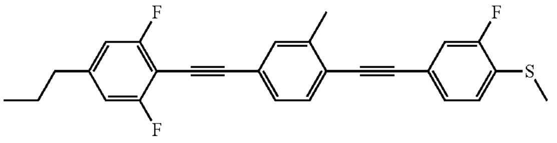
(vi-1-5.2)
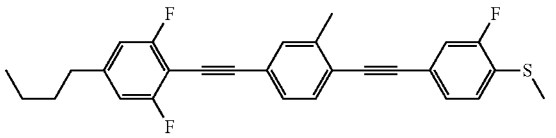
(vi-1-5.3)
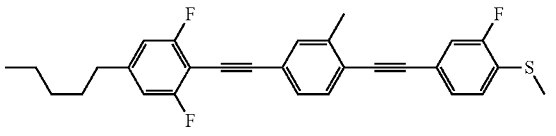
(vi-1-5.4)
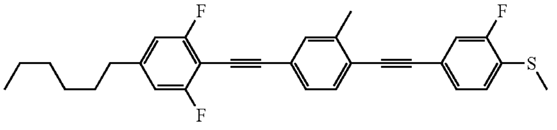
(vi-1-5.5)
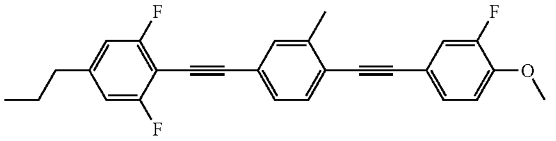
-continued
(vi-1-5.6)
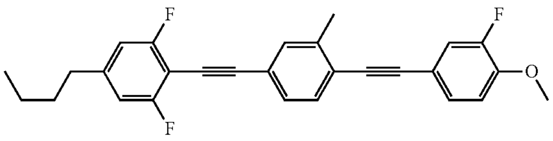
(vi-1-5.7)
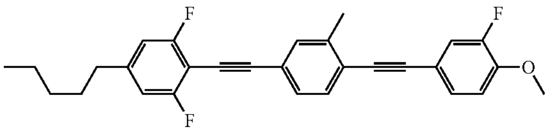
(vi-1-5.8)
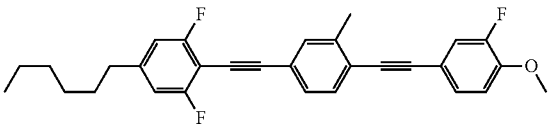
Specific examples of compounds represented by general formula (vi-1-6) include compounds represented by structural formulae (vi-1-6.1) to (vi-1-6.8) below.
[Chem. 221]
(vi-1-6.1)
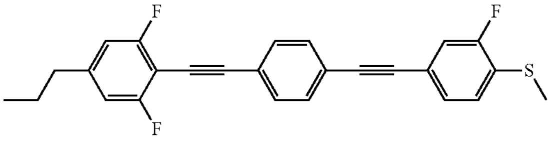
(vi-1-6.2)
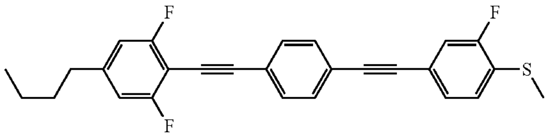
(vi-1-6.3)
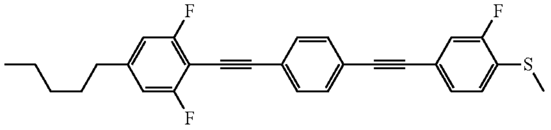
(vi-1-6.4)
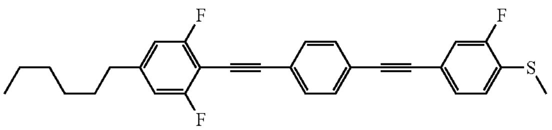
(vi-1-6.5)
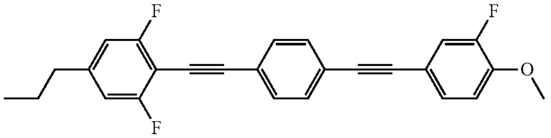

-continued
(vi-1-6.6)
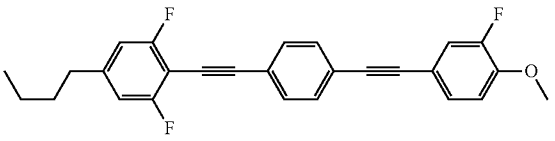
(vi-1-6.7)
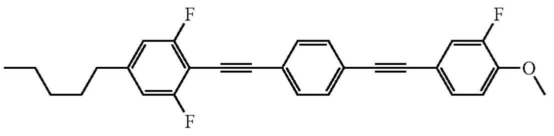
(vi-1-6.8)
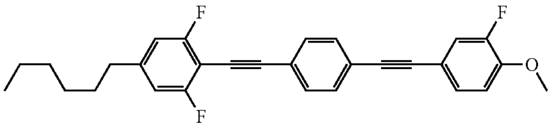
Specific examples of compounds represented by general formula (vi-1-7) include compounds represented by structural formulae (vi-1-7.1) to (vi-1-7.8) below.
[Chem. 222]
(vi-1-7.1)
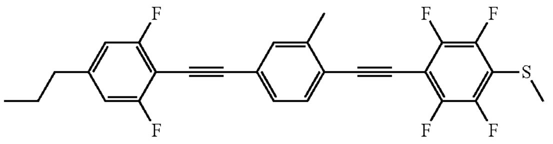
(vi-1-7.2)
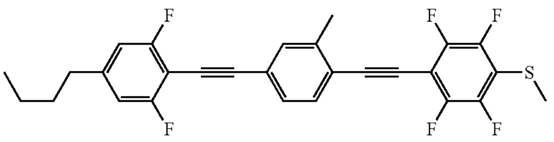
-continued
(vi-1-7.3)
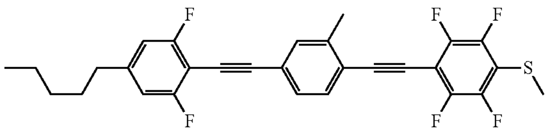
(vi-1-7.4)
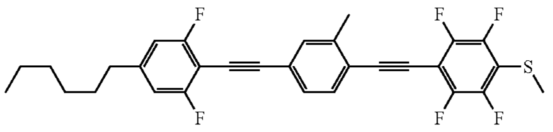
(vi-1-7.5)
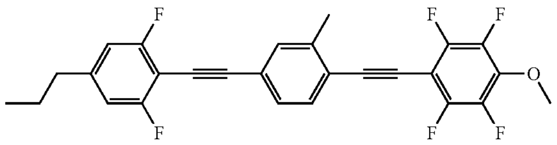
(vi-1-7.6)
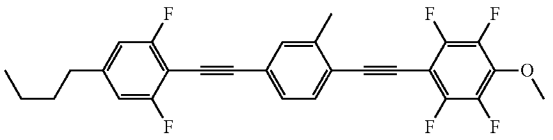
(vi-1-7.7)
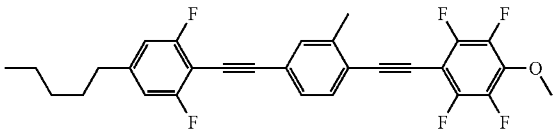
(vi-1-7.8)
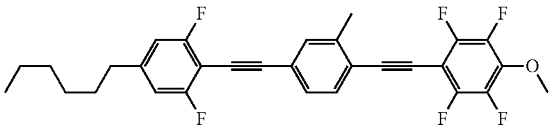
Specific examples of compounds represented by general formula (vi-1-8) include compounds represented by structural formulae (vi-1-8.1) to (vi-1-8.8) below.
[Chem. 223]
(vi-1-8.1)
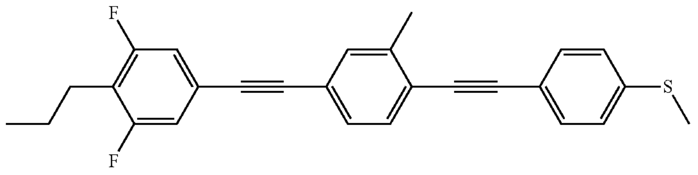
(vi-1-8.2)
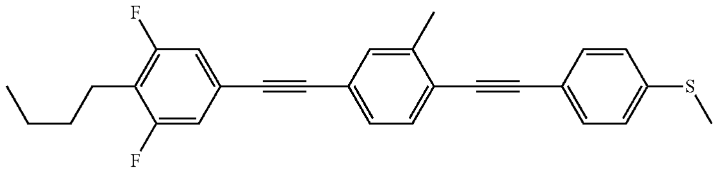

-continued
(vi-1-8.3)
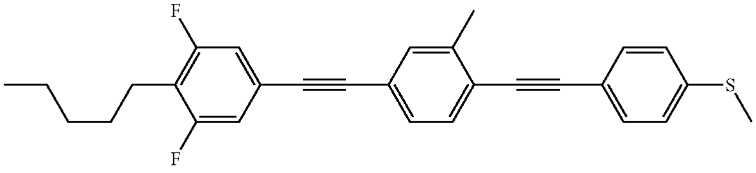
(vi-1-8.4)
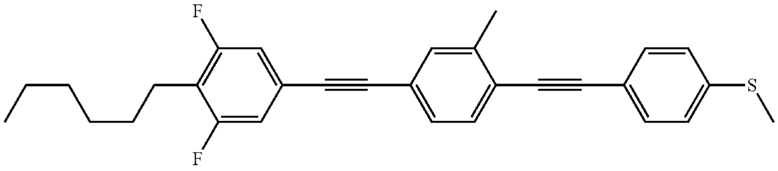
(vi-1-8.5)
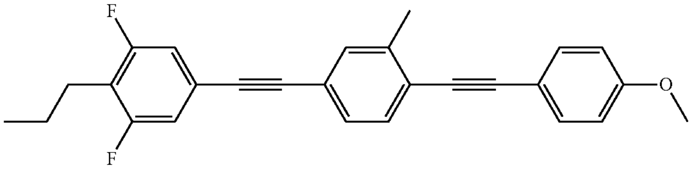
(vi-1-8.6)
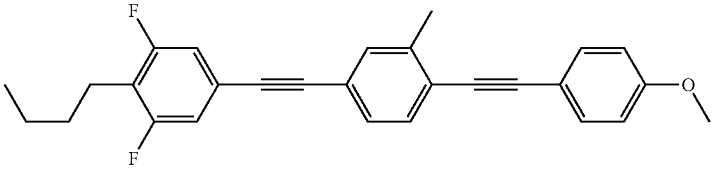
(vi-1-8.7)
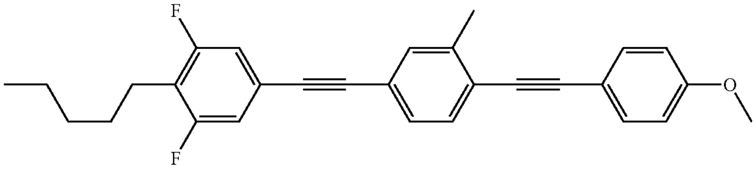
(vi-1-8.8)
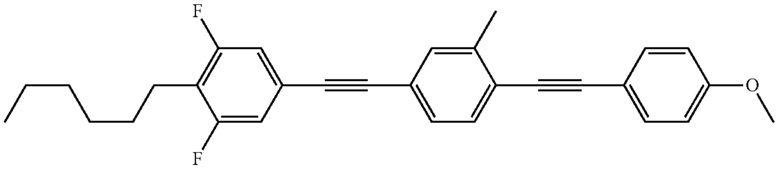
Specific examples of compounds represented by general formula (vi-1-9) include compounds represented by structural formulae (vi-1-9.1) to (vi-1-9.5) below.
[Chem. 224]
(vi-1-9.1)
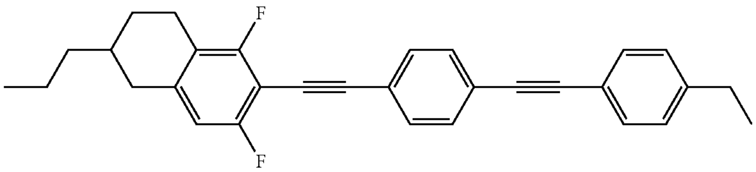

-continued
(vi-1-9.2)
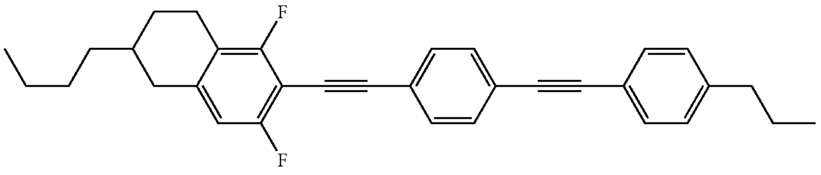
(vi-1-9.3)
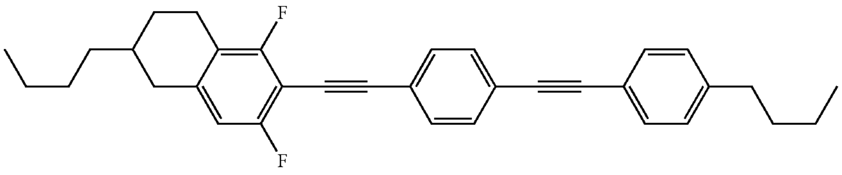
(vi-1-9.4)
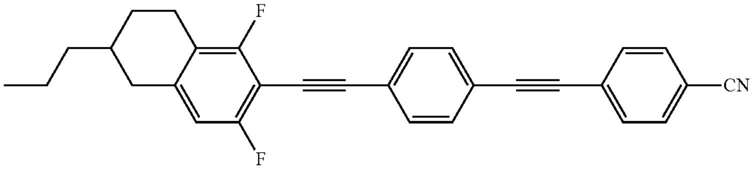
(vi-1-9.5)
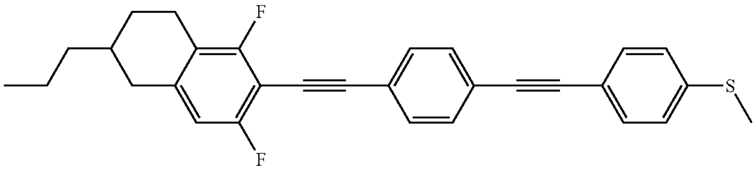
Specific examples of compounds represented by general formula (vi-1-10) include compounds represented by structural formulae (vi-1-10.1) to (vi-1-10.4) below.
[Chem. 225]
(vi-1-10.1)
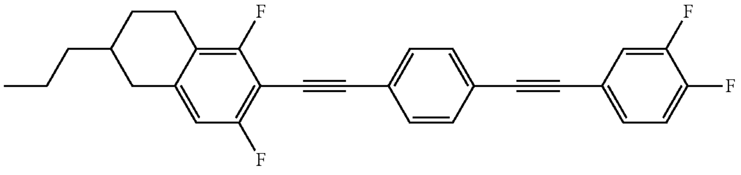
(vi-1-10.2)
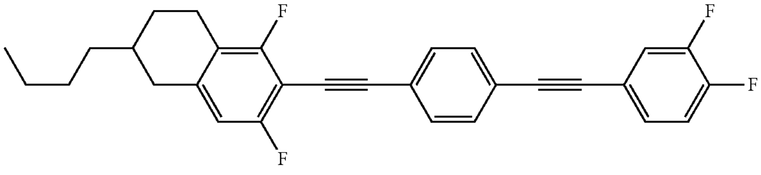
(vi-1-10.3)
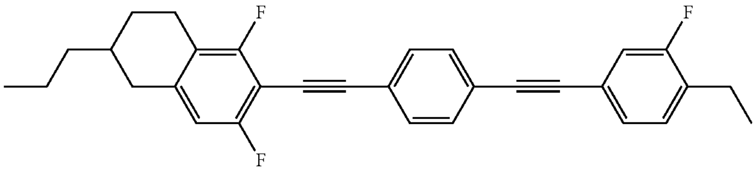

-continued (vi-1-10.4)

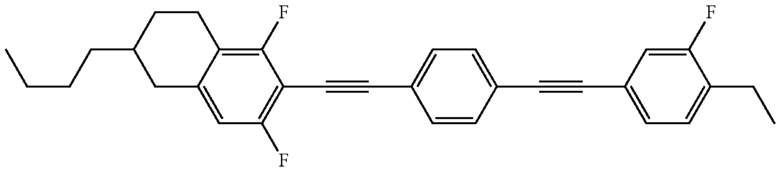

Specific examples of compounds represented by general formula (vi-1-11) include compounds represented by structural formulae (vi-1-11.1) to (vi-1-11.4) below.

[Chem. 226]

(vi-1-11.1)

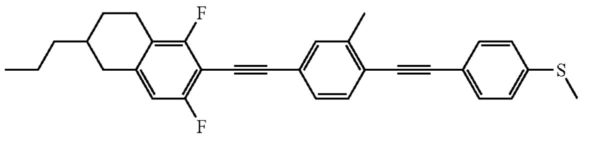

(vi-1-11.2)

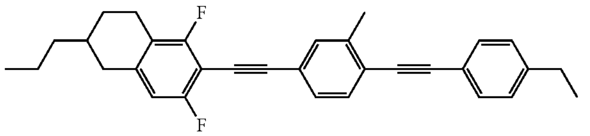

(vi-1-11.3)

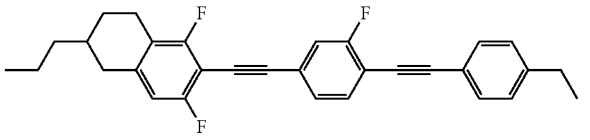

(vi-1-11.4)

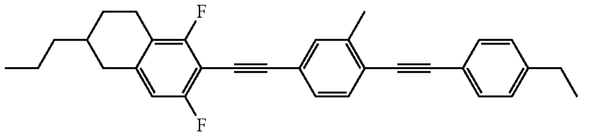

Specific examples of compounds represented by general formula (vi-1-12) include compounds represented by structural formulae (vi-1-12.1) to (vi-1-12.4) below.

[Chem. 227]

(vi-1-12.1)

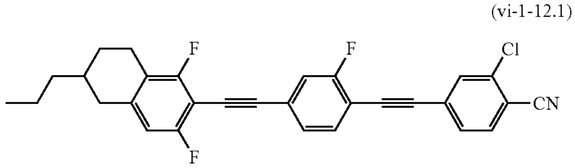

(vi-1-12.2)

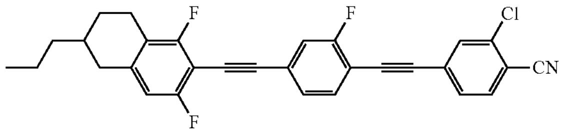

-continued (vi-1-12.3)

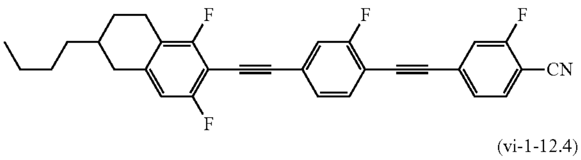

(vi-1-12.4)

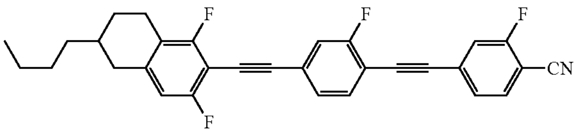

One or two or more, preferably 1 to 5, preferably 1 to 4, preferably 1 to 3, preferably 1 to 2, and preferably one of the compounds represented by general formula (vi), general formula (vi-1), general formulae (vi-1-1) to (vi-1-12), structural formulae (vi-1-1.1) to (vi-1-1.24), structural formulae (vi-1-2.1) to (vi-1-2.8), structural formulae (vi-1-3.1) to (vi-1-3.8), structural formulae (vi-1-4.1) to (vi-1-4.8), structural formulae (vi-1-5.1) to (vi-1-5.8), structural formulae (vi-1-6.1) to (vi-1-6.8), structural formulae (vi-1-7.1) to (vi-1-7.8), structural formulae (vi-1-8.1) to (vi-1-8.8), structural formulae (vi-1-9.1) to (vi-1-9.5), structural formulae (vi-1-10.1) to (vi-1-10.4), structural formulae (vi-1-11.1) to (vi-1-11.4), or structural formulae (vi-1-12.1) to (vi-1-12.4) are used in the liquid crystal composition.

The lower limit of the total content of the compound(s) represented by general formula (vi), general formula (vi-1), general formulae (vi-1-1) to (vi-1-12), structural formulae (vi-1-1.1) to (vi-1-1.24), structural formulae (vi-1-2.1) to (vi-1-2.8), structural formulae (vi-1-3.1) to (vi-1-3.8), structural formulae (vi-1-4.1) to (vi-1-4.8), structural formulae (vi-1-5.1) to (vi-1-5.8), structural formulae (vi-1-6.1) to (vi-1-6.8), structural formulae (vi-1-7.1) to (vi-1-7.8), structural formulae (vi-1-8.1) to (vi-1-8.8), structural formulae (vi-1-9.1) to (vi-1-9.5), structural formulae (vi-1-10.1) to (vi-1-10.4), structural formulae (vi-1-11.1) to (vi-1-11.4), or structural formulae (vi-1-12.1) to (vi-1-12.4) in 100% by mass of the liquid crystal composition is preferably 0.5% by mass or more, preferably 1% by mass or more, and preferably 3% by mass or more.

The upper limit of the total content of the compound(s) represented by general formula (vi), general formula (vi-1), general formulae (vi-1-1) to (vi-1-12), structural formulae (vi-1-1.1) to (vi-1-1.24), structural formulae (vi-1-2.1) to (vi-1-2.8), structural formulae (vi-1-3.1) to (vi-1-3.8), structural formulae (vi-1-4.1) to (vi-1-4.8), structural formulae (vi-1-5.1) to (vi-1-5.8), structural formulae (vi-1-6.1) to (vi-1-6.8), structural formulae (vi-1-7.1) to (vi-1-7.8), structural formulae (vi-1-8.1) to (vi-1-8.8), structural formulae (vi-1-9.1) to (vi-1-9.5), structural formulae (vi-1-10.1) to (vi-1-10.4), structural formulae (vi-1-11.1) to (vi-1-11.4), or structural formulae (vi-1-12.1) to (vi-1-12.4) in 100% by mass of the liquid crystal composition is preferably 25% by mass or less, preferably 20% by mass or less, and preferably 15% by mass or less.

The total content of the compound(s) represented by general formula (vi), general formula (vi-1), general formulae (vi-1-1) to (vi-1-12), structural formulae (vi-1-1.1) to (vi-1-1.24), structural formulae (vi-1-2.1) to (vi-1-2.8), structural formulae (vi-1-3.1) to (vi-1-3.8), structural formulae (vi-1-4.1) to (vi-1-4.8), structural formulae (vi-1-5.1) to (vi-1-5.8), structural formulae (vi-1-6.1) to (vi-1-6.8), structural formulae (vi-1-7.1) to (vi-1-7.8), structural formulae (vi-1-8.1) to (vi-1-8.8), structural formulae (vi-1-9.1) to (vi-1-9.5), structural formulae (vi-1-10.1) to (vi-1-10.4), structural formulae (vi-1-11.1) to (vi-1-11.4), or structural formulae (vi-1-12.1) to (vi-1-12.4) in 100% by mass of the liquid crystal composition is preferably 0.5 to 25% by mass, preferably 1 to 20% by mass, and preferably 3 to 15% by mass, in terms of solubility, $\Delta n$ and/or $\Delta\varepsilon_r$.

The compounds represented by general formula (vi) (including subordinate concepts) can be synthesized using known synthetic methods.

The liquid crystal composition according to the present invention may further contain one or two or more of compounds represented by general formula (vii) below having at least one —C≡C— and —N═N— as linking groups, in terms of $\Delta n$ and/or $\Delta\varepsilon_r$.

[Chem. 228]

$$R^{vii1}—A^{vii1}—C{\equiv}C—A^{vii2}—N{=}N—A^{vii3}—R^{vii2} \qquad \text{(vii)}$$

In general formula (vii), $R^{vii1}$ and $R^{vii2}$ each independently represent a halogen atom, a cyano group, or an alkyl group having 1 to 20 carbon atoms.

The halogen atom includes fluorine, chlorine, bromine, and iodine atoms.

The alkyl group having 1 to 20 carbon atoms is a linear, branched, or cyclic alkyl group, and preferably a linear alkyl group.

The number of carbon atoms in the alkyl group having 1 to 20 carbon atoms is preferably 2 to 10, and preferably 2 to 6.

One or two or more $—CH_2—$'s in the alkyl group are each independently optionally substituted with —O—, —S—, —CO—, and/or —CS—.

One or two or more $—CH_2—CH_2—$'s in the alkyl group are each independently optionally substituted with —CO—O—, —O—CO—, —CO—S—, —S—CO—, —CO—NH—, —NH—CO—, —CH═CH—, —CF═CF—, and/or —C≡C—.

One or two or more $—CH_2—CH_2—CH_2—$'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

For example, $R^{vii1}$ and $R^{vii2}$ can represent an alkoxy group having 1 to 19 carbon atoms by substituting one $—CH_2—$ in the alkyl group with —O—.

The alkoxy group is a linear, branched, or cyclic alkoxy group, and preferably a linear alkoxy group.

The number of carbon atoms in the alkoxy group is preferably 2 to 10, and preferably 2 to 6.

$R^{vii1}$ and $R^{vii2}$ can represent an alkylsulfanyl group (alkylthio group) having 1 to 19 carbon atoms by substituting one $—CH_2—$ in the alkyl group with —S—.

The alkylsulfanyl group is a linear, branched, or cyclic alkylsulfanyl group, and preferably a linear alkylsulfanyl group.

The number of carbon atoms in the alkylsulfanyl group is preferably 2 to 10, and preferably 2 to 6.

$R^{vii1}$ and $R^{vii2}$ can represent an alkenyl group having 2 to 20 carbon atoms by substituting one or two or more $—CH_2—CH_2—$'s in the alkyl group with —CH═CH—.

The alkenyl group is a linear, branched, or cyclic alkenyl group, and preferably a linear alkenyl group.

The number of carbon atoms in the alkenyl group is preferably 2 to 10, and preferably 2 to 6.

$R^{vii1}$ and $R^{vii2}$ can represent an alkynyl group having 2 to 20 carbon atoms by substituting one or two or more $—CH_2—CH_2—$'s in the alkyl group with —C≡C—.

The alkynyl group is a linear, branched, or cyclic alkynyl group, and preferably a linear alkynyl group.

The number of carbon atoms in the alkynyl group is preferably 2 to 10, and preferably 2 to 6.

$R^{vii1}$ and $R^{vii2}$ can represent an alkenyloxy group having 2 to 19 carbon atoms by substituting one $—CH_2—$ in the alkyl group with —O— and one or two or more $—CH_2—CH_2—$'s in the alkyl group with —CH═CH—.

The alkenyloxy group is a linear, branched, or cyclic alkenyloxy group, and preferably a linear alkenyloxy group.

The number of carbon atoms in the alkenyloxy group is preferably 2 to 10, and preferably 2 to 6.

$R^{vii1}$ and $R^{vii2}$ can represent an alkyl halide group having 1 to 20 carbon atoms by substituting one or two or more hydrogen atoms in the alkyl group with a halogen atom.

The alkyl halide group is a linear, branched, or cyclic alkyl halide group, and preferably a linear alkyl halide group.

The number of carbon atoms in the alkyl halide group is preferably 2 to 10, and preferably 2 to 6.

$R^{vii1}$ and $R^{vii2}$ can represent an alkoxy halide group having 1 to 19 carbon atoms by substituting one $—CH_2—$ in the alkyl group with —O— and one or two or more hydrogen atoms in the alkyl group with a halogen atom.

The alkoxy halide group is a linear, branched, or cyclic alkoxy halide group, and preferably a linear alkoxy halide group.

The number of carbon atoms in the alkoxy halide group is preferably 2 to 10, and preferably 2 to 6.

Specific examples of the alkyl group having 1 to 20 carbon atoms (including substituted ones) in $R^{vii1}$ and $R^{vii2}$ include groups represented by formulae ($R^{vii1/2}$-1) to ($R^{vii1/2}$-36).

[Chem. 229]
(R$^{vii1/2}$-1)
(R$^{vii1/2}$-2)
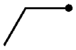
(R$^{vii1/2}$-3)
(R$^{vii1/2}$-4)
(R$^{vii1/2}$-5)
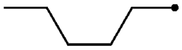
(R$^{vii1/2}$-6)
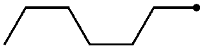
(R$^{vii1/2}$-7)
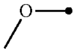
(R$^{vii1/2}$-8)
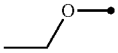
(R$^{vii1/2}$-9)
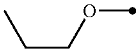
(R$^{vii1/2}$-10)
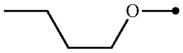
(R$^{vii1/2}$-11)
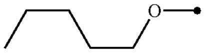
(R$^{vii1/2}$-12)
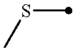
(R$^{vii1/2}$-13)
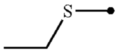
(R$^{vii1/2}$-14)
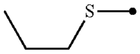
(R$^{vii1/2}$-15)
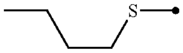
(R$^{vii1/2}$-16)
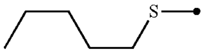
(R$^{vii1/2}$-17)
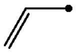
(R$^{vii1/2}$-18)
-continued
(R$^{vii1/2}$-19)
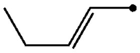
(R$^{vii1/2}$-20)
(R$^{vii1/2}$-21)
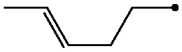
(R$^{vii1/2}$-22)
(R$^{vii1/2}$-23)
(R$^{vii1/2}$-24)
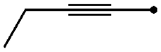
(R$^{vii1/2}$-25)
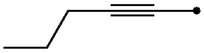
(R$^{vii1/2}$-26)
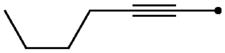
(R$^{vii1/2}$-27)
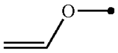
(R$^{vii1/2}$-28)
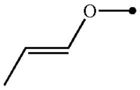
(R$^{vii1/2}$-29)
(R$^{vii1/2}$-30)
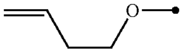
(R$^{vii1/2}$-31)
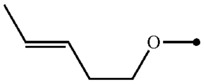
(R$^{vii1/2}$-32)
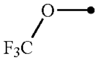
(R$^{vii1/2}$-33)
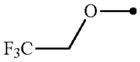
(R$^{vii1/2}$-34)
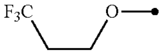
(R$^{vii1/2}$-35)
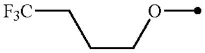

-continued ($R^{vii1/2}$-36)

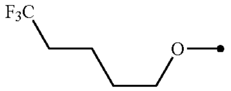

In formulae ($R^{vii1/2}$-1) to ($R^{vii1/2}$-36), a black dot represents a bond with $A^{vii1}$ or $A^{vii3}$.

When the reliability of the entire liquid crystal composition is important, $R^{vii1}$ is preferably an alkyl group having 1 to 12 carbon atoms. When the viscosity of the entire liquid crystal composition is important, $R^{vii1}$ is preferably an alkenyl group having 2 to 8 carbon atoms.

When the ring structure to which $R^{vii1}$ is bonded is a phenyl group (aromatic group), a linear alkyl group having 1 to 5 carbon atoms, a linear alkoxy group having 1 to 4 carbon atoms, and an alkenyl group having 4 to 5 carbon atoms are preferred. When the ring structure to which $R^{vii1}$ is bonded is a saturated ring structure such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferred.

To stabilize the nematic phase, $R^{vii1}$ preferably has a total number of carbon atoms and, if present, oxygen atoms of 5 or less and preferably is linear.

$R^{vii2}$ is preferably a fluorine atom, a cyano group, a trifluoromethyl group, or a trifluoromethoxy group when the compound represented by general formula (vii) is what is called a p-type compound with a positive Ac, and a fluorine atom or a cyano group is preferred.

When the compound represented by general formula (vii) is what is called a nonpolar compound in which ac is almost zero, $R^{vii2}$ has the same meaning as $R^{vii1}$, wherein $R^{vii2}$ and $R^{vii1}$ may be the same or different.

$R^{vii1/2}$ is preferably a linear alkyl group having 2 to 6 carbon atoms in terms of solubility.

In general formula (vii), $A^{vii1}$, $A^{vii2}$, and $A^{vii3}$ each independently represent a group selected from the group consisting of the following groups (a), (b), and (c):

(a) a 1,4-cyclohexylene group (one $—CH_2—$ or two or more non-adjacent $—CH_2—$'s in this group are optionally substituted with —O—.);

(b) a 1,4-phenylene group (one —CH═ or two or more —CH═'s in this group are optionally substituted with —N═.), and (c) a naphthalene-1,4-diyl group, a naphthalene-2,6-diyl group, a 1,2,3,4-tetrahydronaphthalene-2,6-diyl group, or a decahydronaphthalene-2,6-diyl group (one —CH═ or two or more —CH═'s in the naphthalene-1,4-diyl group, naphthalene-2,6-diyl group, or 1,2,3,4-tetrahydronaphthalene-2,6-diyl group are optionally substituted with —N═.).

One or two or more hydrogen atoms in the groups (a), (b), and (c) are each independently optionally substituted with a halogen atom, a cyano group, or an alkyl group having 1 to 6 carbon atoms.

The halogen atom includes fluorine, chlorine, bromine, and iodine atoms. In terms of stability and safety, a fluorine atom is preferred.

$A^{vii1}$, $A^{vii2}$, and/or $A^{vii3}$ are each independently preferably the group (a), which is an aliphatic divalent cyclic group, in order to improve response speed, preferably the group (b) or (c), which is a divalent cyclic group exhibiting aromaticity, in order to increase Δn, and preferably each independently represent any of the following structures:

[Chem. 230]

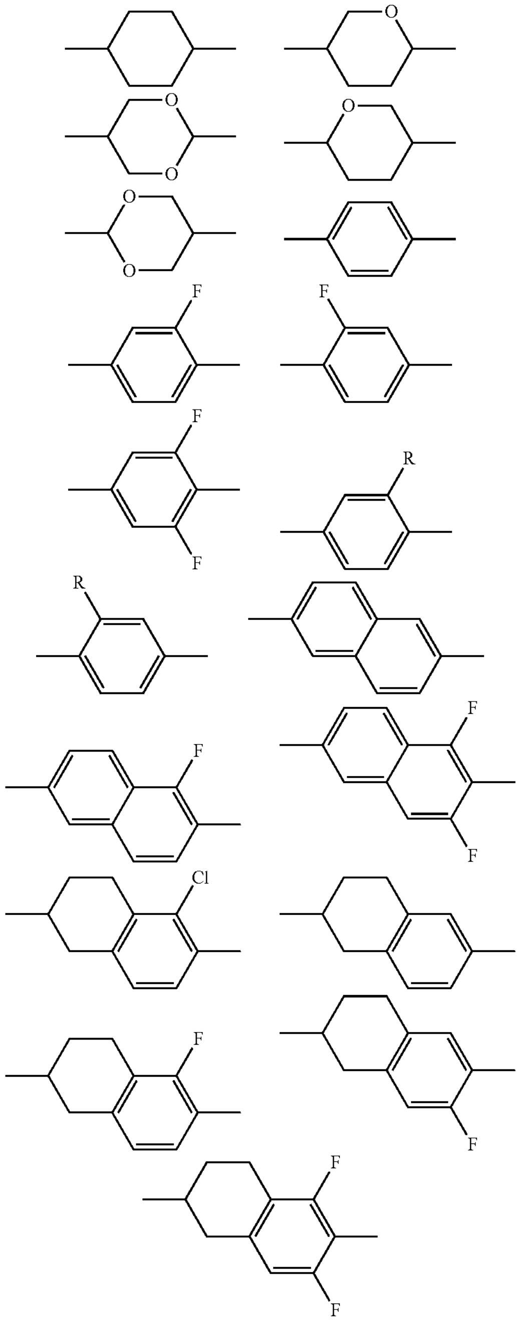

(R represents an alkyl group having 1 to 6 carbon atoms.).

Any of a 1,4-phenylene group, a naphthalene-2,6-diyl group, and a tetrahydronaphthalene-2,6-diyl group is preferred, wherein one or two or more hydrogen atoms in the 1,4-phenylene group, naphthalene-2,6-diyl group, and tetrahydronaphthalene-2,6-diyl group are each independently optionally substituted with a fluorine atom or an alkyl group having 1 to 6 carbon atoms.

In particular, $A^{vii1}$ preferably represents a group selected from the group consisting of the following groups (d) to (f) in terms of improving Δn:

[Chem. 231]

(d)

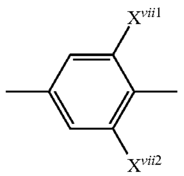

(e)

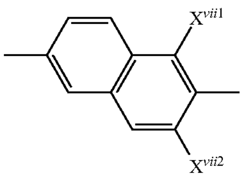

(f)

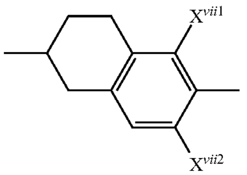

($X^{vii1}$ and $X^{vii2}$ each independently represent a hydrogen atom or a fluorine atom.).

In terms of compatibility with other liquid crystal compounds, the group (f) is preferred.

In order to enhance the compatibility with other liquid crystal compositions, at least one of $A^{vii1}$, $A^{vii2}$, and/or $A^{vii3}$ preferably represents a 1,4-phenylene group substituted with an alkyl group having 1 to 6 carbon atoms, and more preferably represents a 1,4-phenylene group substituted with an ethyl group.

$A^{vii1}$, $A^{vii2}$, and/or $A^{vii3}$, which is a ring structure in a molecule of the compound represented by general formula (vii) in the present invention, preferably has 1 to 5 fluorine atoms in total, and more preferably has 1 to 4 fluorine atoms.

A compound represented by general formula (vii) is preferably a compound represented by one of general formulae (vii-1) to (vii-3) below:

[Chem. 232]

(vii-1)

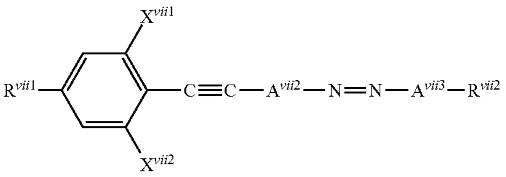

(vii-2)

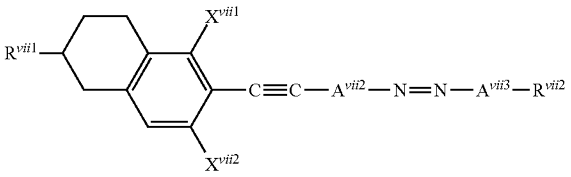

-continued (vii-3)

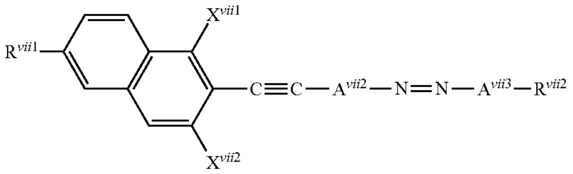

(In general formulae (vii-1) to (vii-3), $R^{vii1}$, $R^{vii2}$, $A^{vii2}$, and $A^{vii3}$ have the same meaning as $R^{vii1}$, $R^{vii2}$, $A^{vii2}$, and $A^{vii3}$, respectively, in general formula (vii), and preferable groups and preferable numbers are also the same.

In general formulae (vii-1) to (vii-3), $X^{vii1}$ and $X^{vii2}$ each independently represent a hydrogen atom or a fluorine atom.).

Specific examples of compounds represented by general formula (vii-1) include compounds represented by structural formulae (vii-1.1) to (vii-1.74) below.

[Chem. 233]

(vii-1.1)

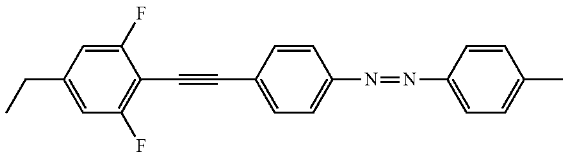

(vii-1.2)

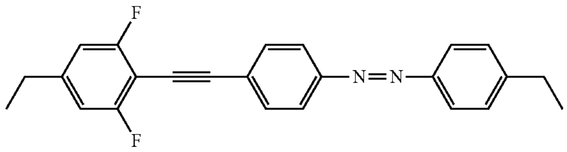

(vii-1.3)

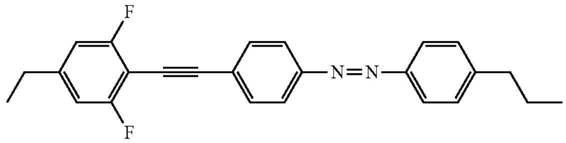

(vii-1.4)

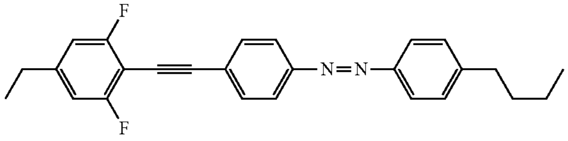

(vii-1.5)

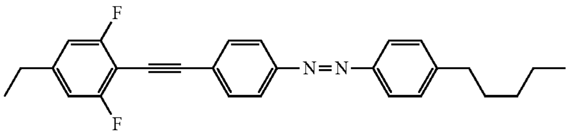

(vii-1.6)

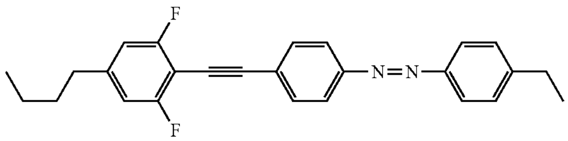

-continued
(vii-1.7)
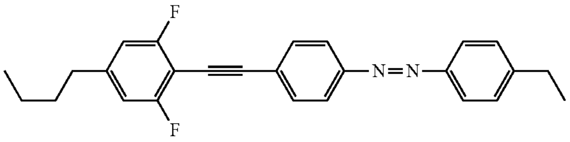
(vii-1.8)
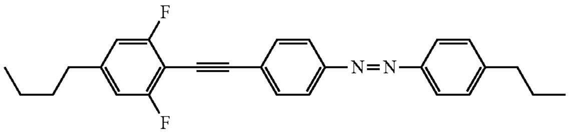
(vii-1.9)
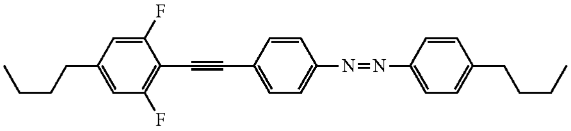
(vii-1.10)
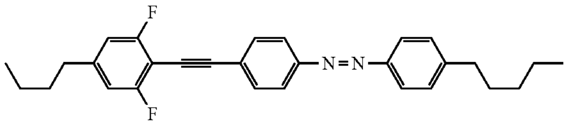
(vii-1.11)
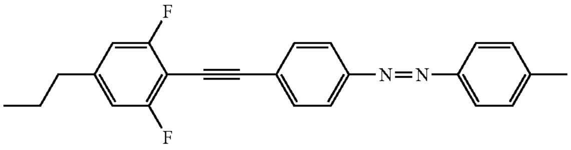
(vii-1.12)
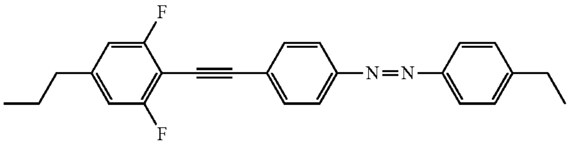
(vii-1.13)
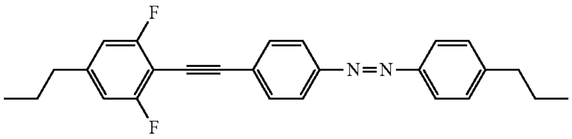
(vii-1.14)
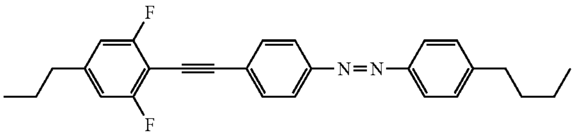
(vii-1.15)
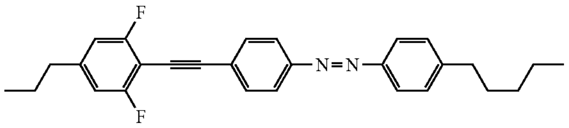
-continued
(vii-1.16)
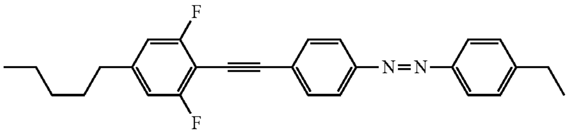
(vii-1.17)
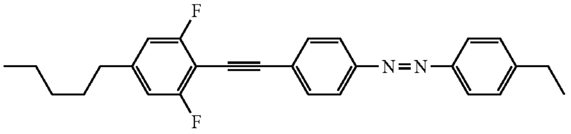
(vii-1.18)
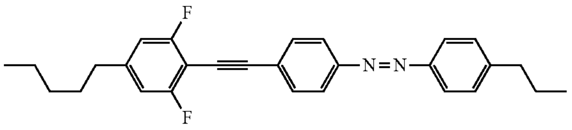
(vii-1.19)
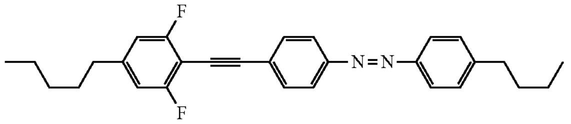
(vii-1.20)
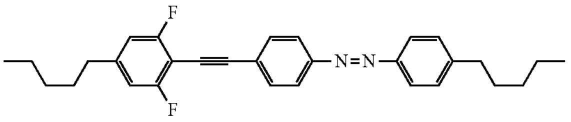
[Chem. 234]
(vii-1.21)
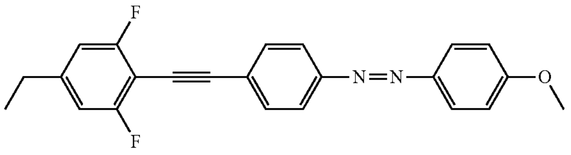
(vii-1.22)
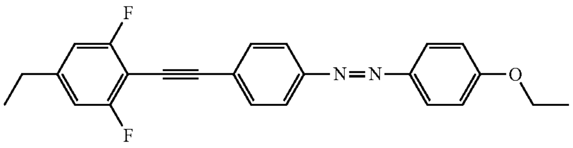
(vii-1.23)
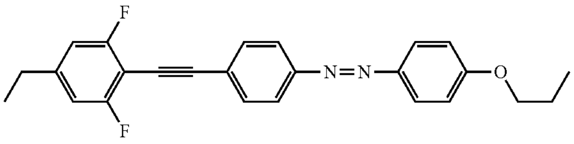
(vii-1.24)
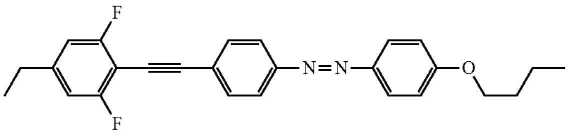

-continued
(vii-1.25)
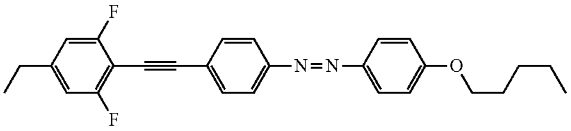
(vii-1.26)
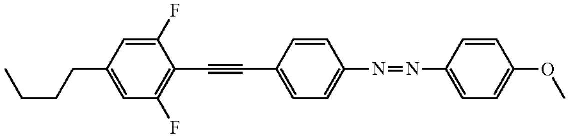
(vii-1.27)
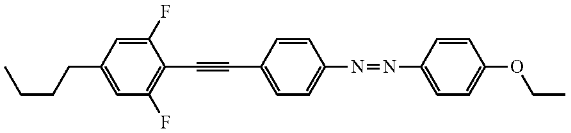
(vii-1.28)
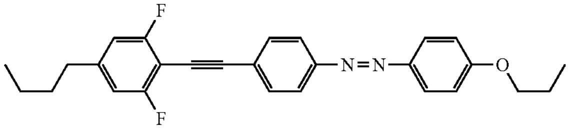
(vii-1.29)
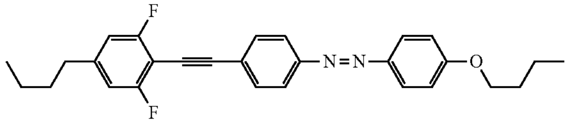
(vii-1.30)
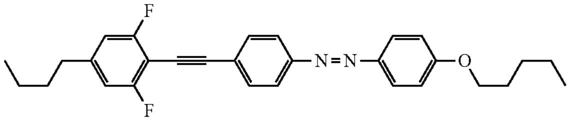
(vii-1.31)
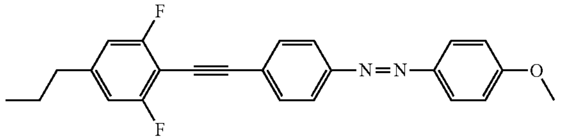
(vii-1.32)
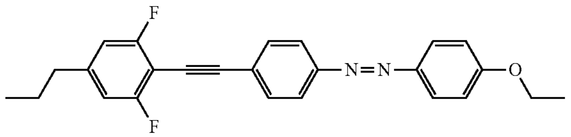
(vii-1.33)
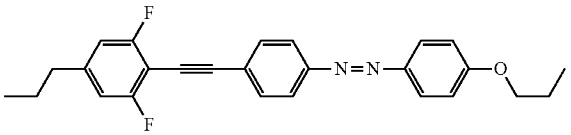
(vii-1.34)
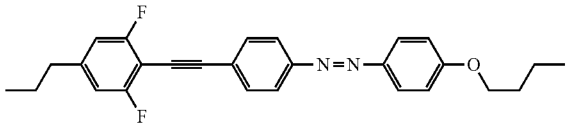
-continued
(vii-1.35)
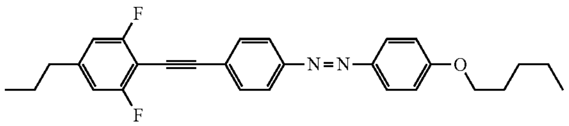
(vii-1.36)
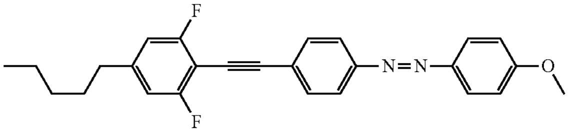
(vii-1.37)
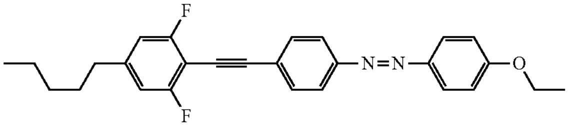
(vii-1.38)
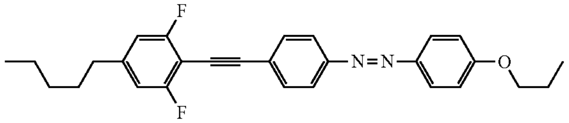
(vii-1.39)
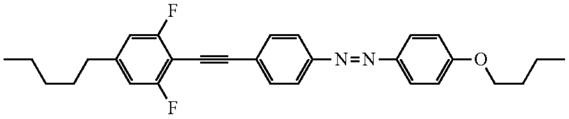
(vii-1.40)
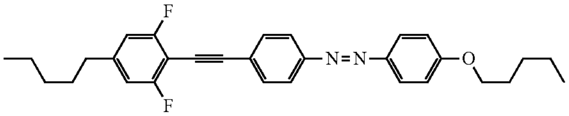
[Chem. 235]
(vii-1.41)
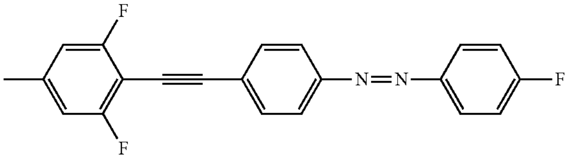
(vii-1.42)
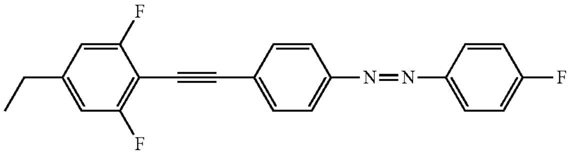
(vii-1.43)
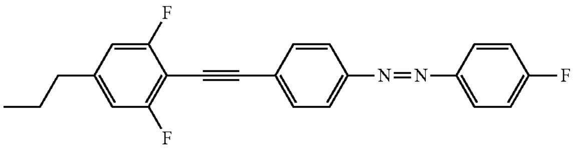

(vii-1.44)
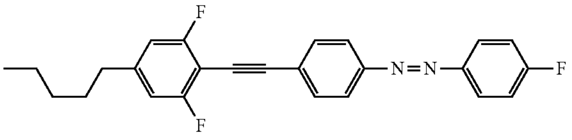
(vii-1.45)
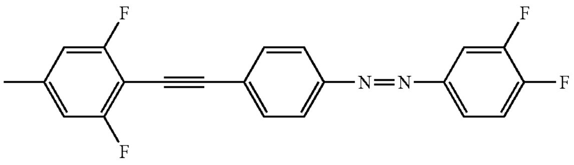
(vii-1.46)
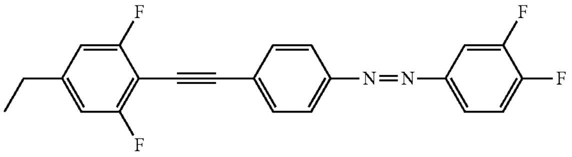
(vii-1.47)
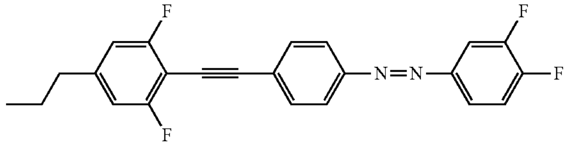
(vii-1.48)
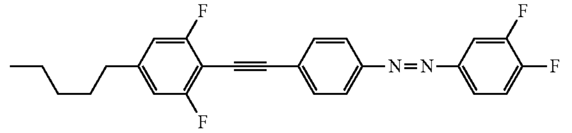
(vii-1.49)
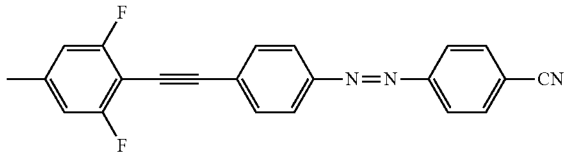
(vii-1.50)
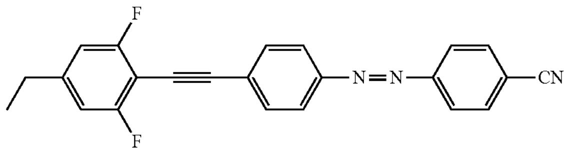
(vii-1.51)
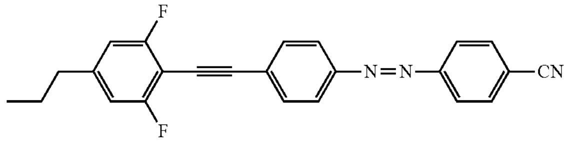
(vii-1.52)
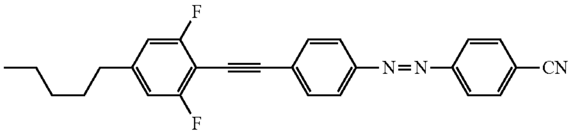
(vii-1.53)
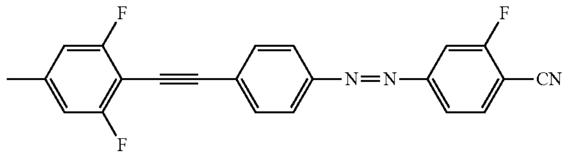
(vii-1.54)
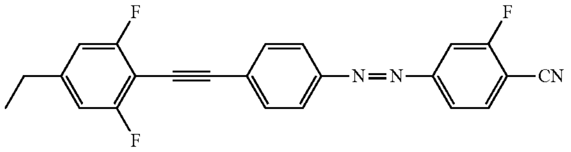
(vii-1.55)
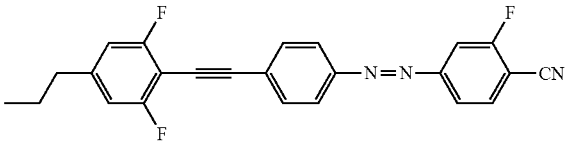
(vii-1.56)
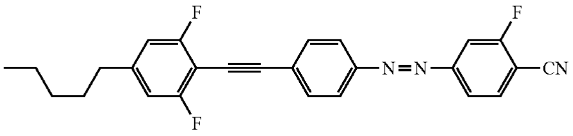
[Chem. 236]
(vii-1.57)
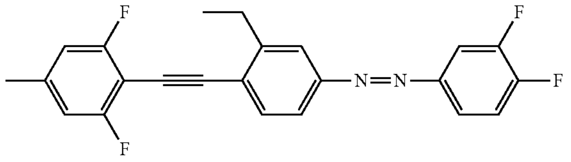
(vii-1.58)
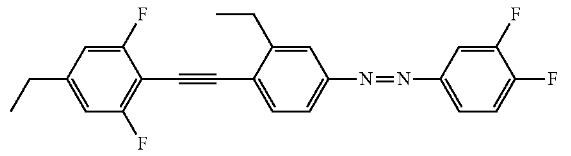
(vii-1.59)
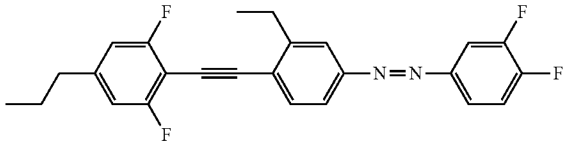
(vii-1.60)
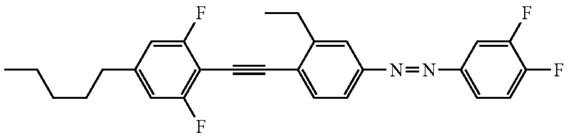

-continued
(vii-1.61)
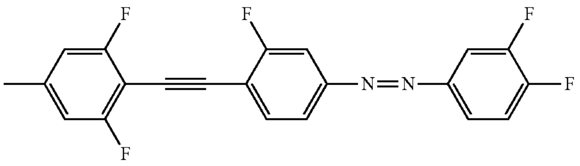
(vii-1.62)
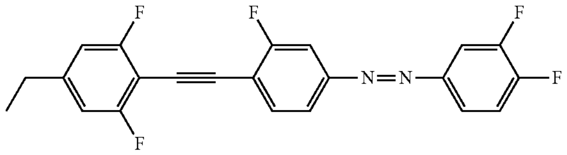
(vii-1.63)
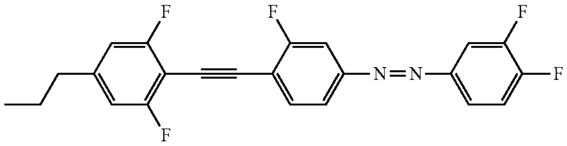
(vii-1.64)
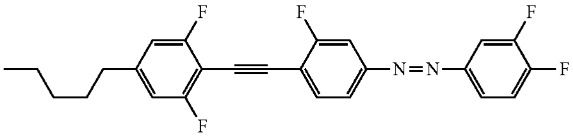
[Chem. 237]
(vii-1.65)
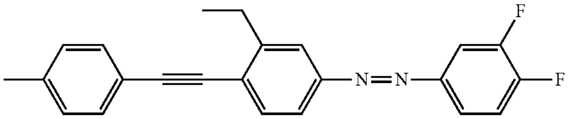
(vii-1.66)
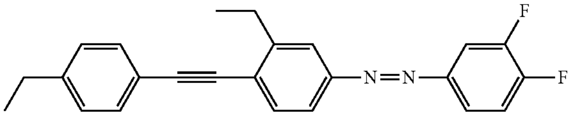
(vii-1.67)
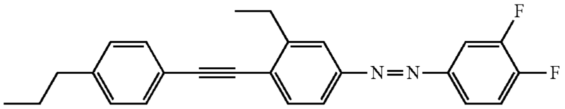
-continued
(vii-1.68)
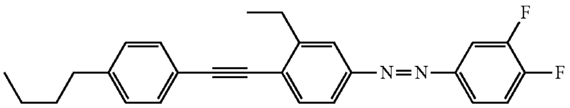
(vii-1.69)
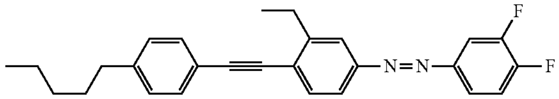
(vii-1.70)
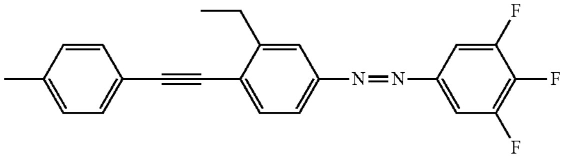
(vii-1.71)
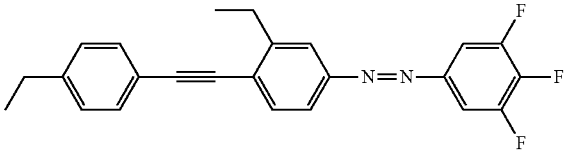
(vii-1.72)
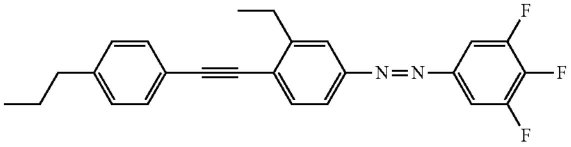
(vii-1.73)
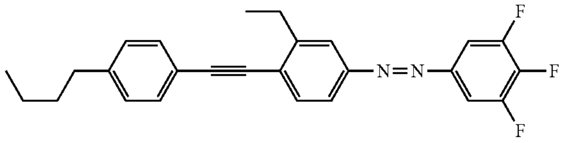
(vii-1.74)
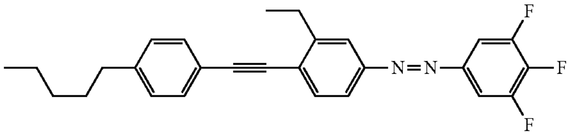
Specific examples of compounds represented by general formula (vii-2) include compounds represented by structural formulae (vii-2.1) to (vii-2.22) below.
[Chem. 238]
(vii-2.1)
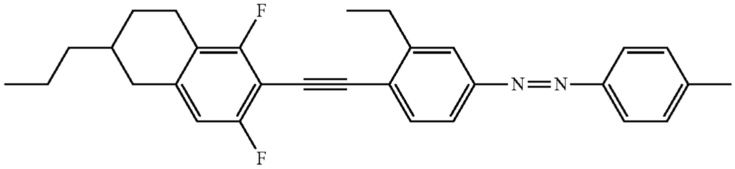

-continued
(vii-2.2)
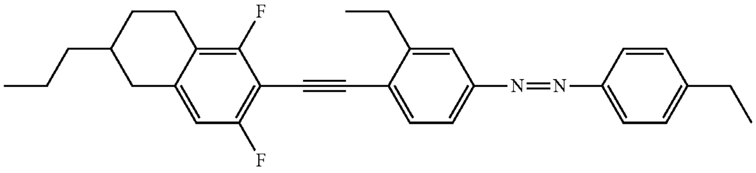
(vii-2.3)
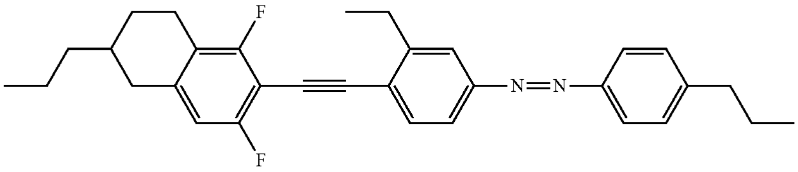
(vii-2.4)
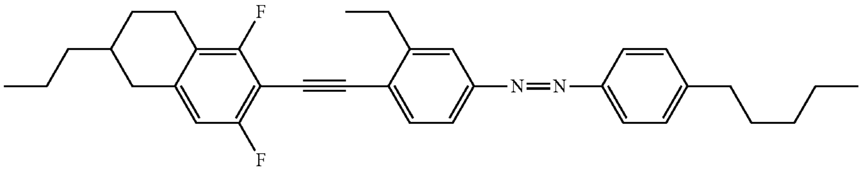
(vii-2.5)
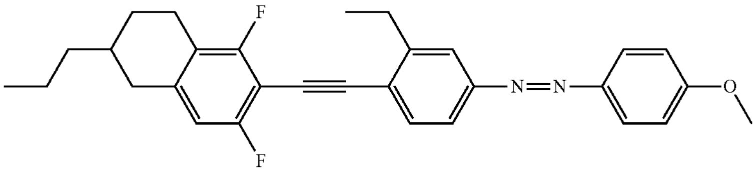
(vii-2.6)
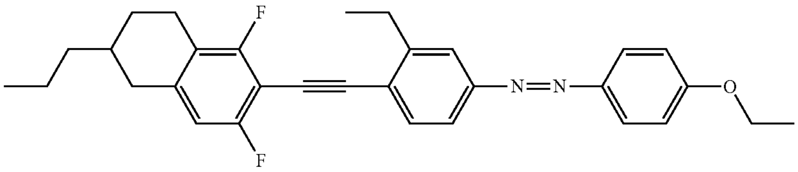
(vv-2.7)
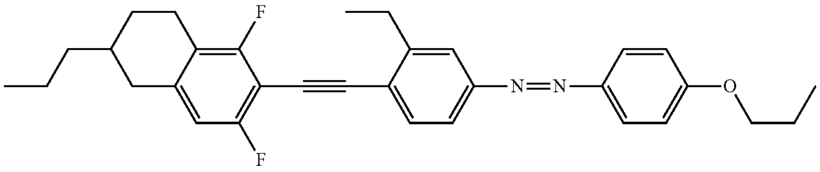
(vii-2.8)
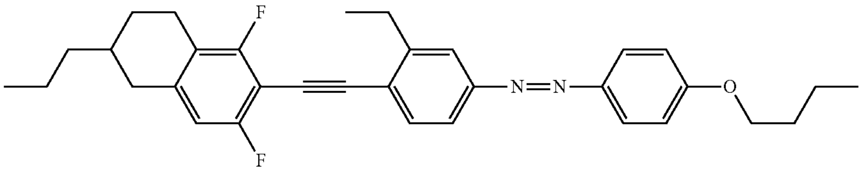
(vii-2.9)
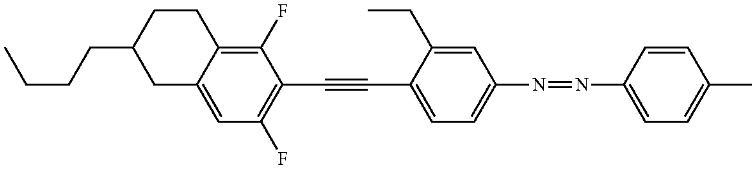
(vii-2.10)
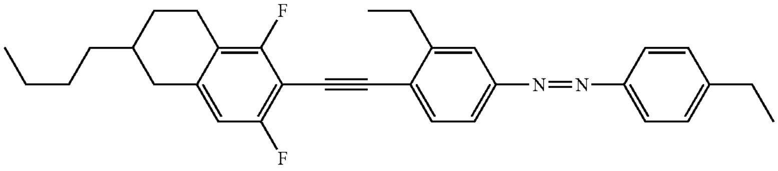

-continued
(vii-2.11)
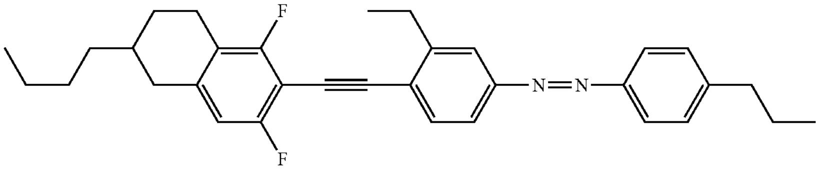
(vii-2.12)
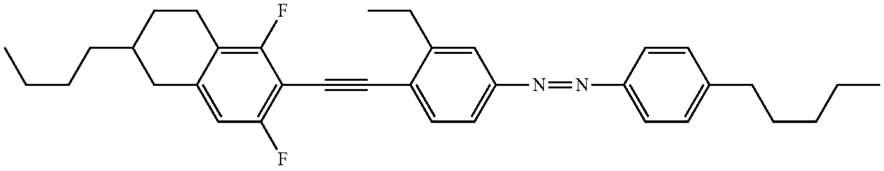
(vii-2.13)
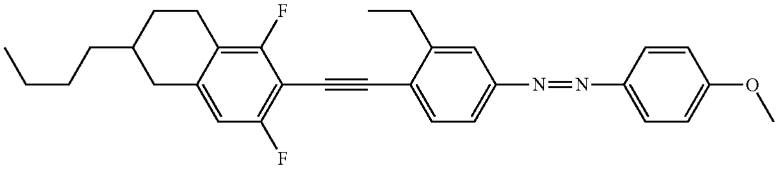
(vii-2.14)
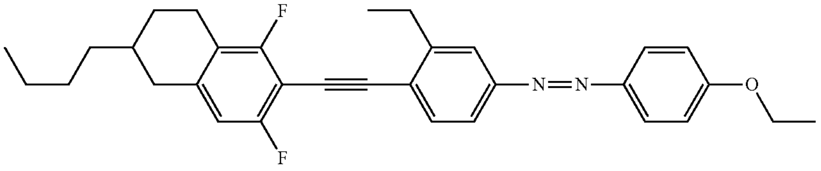
vii-2.15)
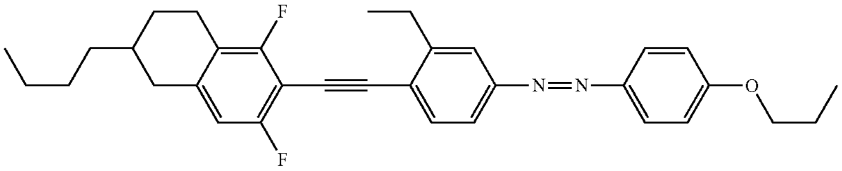
(vii-2.16)
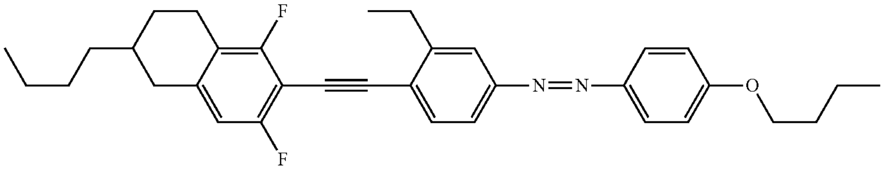
[Chem. 239]
(vii-2.17)
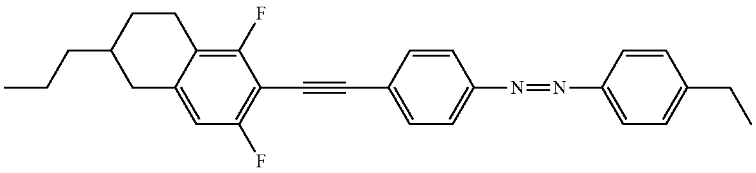
(vii-2.18)
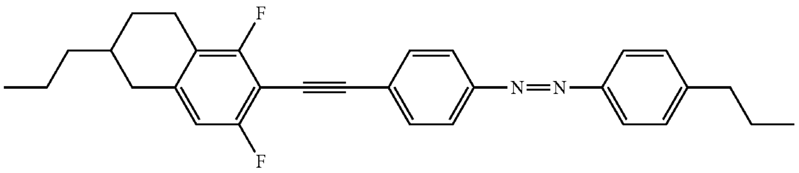

-continued (vii-2.19)

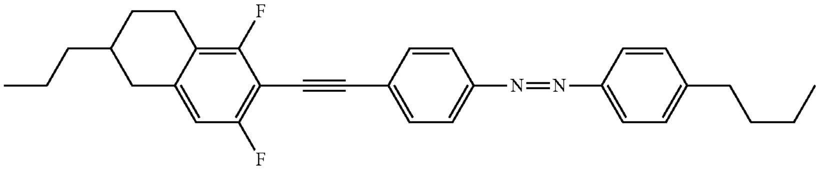

(vii-2.20)

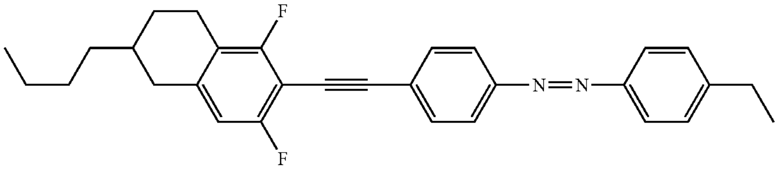

(vii-2.21)

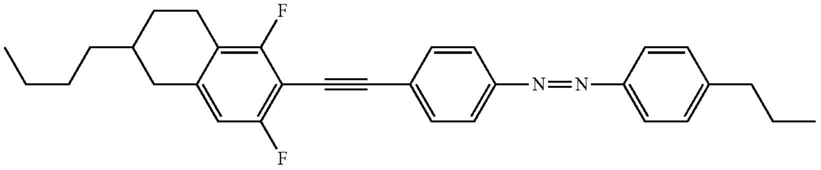

(vii-2.22)

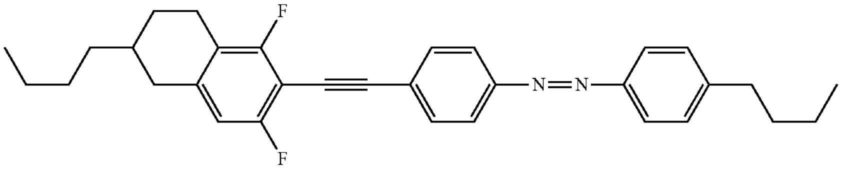

Among the compounds represented by structural formulae (vii-1.1) to (vii-1.74) and (vii-2.1) to (vii-2.22), the compounds represented by structural formulae (vii-1.1) to (vii-1.20) and the compounds represented by structural formulae (vii-2.17) to (vii-2.22) are preferred.

One or two or more, preferably 1 to 10, and preferably 1 to 5 of the compounds represented by general formula (vii), general formulae (vii-1) to (vii-3), structural formulae (vii-1.1) to (vii-1.74), or structural formulae (vii-2.1) to (vii-2.22) are used in the liquid crystal composition.

The lower limit of the total content of the compound(s) represented by general formula (vii), general formulae (vii-1) to (vii-3), structural formulae (vii-1.1) to (vii-1.74), or structural formulae (vii-2.1) to (vii-2.22) in 100% by mass of the liquid crystal composition is preferably 1% by mass, preferably 3% by mass, and preferably 5% by mass.

The upper limit of the total content of the compound(s) represented by general formula (vii), general formulae (vii-1) to (vii-3), structural formulae (vii-1.1) to (vii-1.74), or structural formulae (vii-2.1) to (vii-2.22) in 100% by mass of the liquid crystal composition is preferably 30% by mass, preferably 25% by mass, and preferably 20% by mass.

The total content of the compound(s) represented by general formula (vii), general formulae (vii-1) to (vii-3), structural formulae (vii-1.1) to (vii-1.74), or structural formulae (vii-2.1) to (vii-2.22) in 100% by mass of the liquid crystal composition is preferably 1 to 30% by mass, preferably 3 to 25% by mass, and preferably 5 to 20% by mass, in terms of solubility, $\Delta n$ and/or $\Delta\varepsilon_r$.

The compounds represented by general formula (vii) (including subordinate concepts) can be produced using known methods.

The liquid crystal composition according to the present invention may contain one or two or more of compounds represented by general formulae (np-1) to (np-3) below.

[Chem. 240]

(np-1)

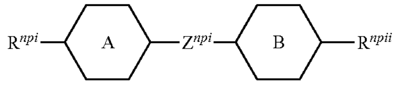

(np-2)

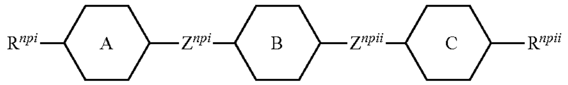

(np-3)

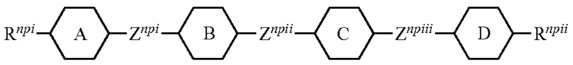

In general formulae (np-1) to (np-3), $R^{npi}$ and $R^{npii}$ each independently represent an alkyl group having 1 to 20 carbon atoms or a halogen atom.

The alkyl group having 1 to 20 carbon atoms is a linear, branched, or cyclic alkyl group, and preferably a linear alkyl group.

The number of carbon atoms in the alkyl group having 1 to 20 carbon atoms is preferably 2 to 10, and preferably 2 to 6.

One or two or more —$CH_2$—'s in the alkyl group are each independently optionally substituted with —O—, —S—, —CO—, and/or —CS—.

One or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CH—, —CH═CF—, —CF═CF—, and/or —C≡C—.

One or two or more —$CH_2$—$CH_2$—$CH_2$—'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

For example, $R^{npi}$ and $R^{npii}$ can represent an alkoxy group having 1 to 19 carbon atoms by substituting one —$CH_2$— in the alkyl group with —O—.

The alkoxy group is a linear, branched, or cyclic alkoxy group, and preferably a linear alkoxy group.

The number of carbon atoms in the alkoxy group is preferably 2 to 10, and preferably 2 to 6.

$R^{npi}$ and $R^{npii}$ can represent an alkylsulfanyl group (thioalkyl group) having 1 to 19 carbon atoms by substituting one —$CH_2$— in the alkyl group with —S—.

The alkylsulfanyl group is a linear, branched, or cyclic alkylsulfanyl group, and preferably a linear alkylsulfanyl group.

The number of carbon atoms in the alkylsulfanyl group is preferably 2 to 10, and preferably 2 to 6.

$R^{npi}$ and $R^{npii}$ can represent an alkenyl group having 2 to 20 carbon atoms by substituting one or two or more —$CH_2$—$CH_2$—'s in the alkyl group with —CH═CH—.

The alkenyl group is a linear, branched, or cyclic alkenyl group, and preferably a linear alkenyl group.

The number of carbon atoms in the alkenyl group is preferably 2 to 10, and preferably 2 to 6.

$R^{npi}$ and $R^{npii}$ can represent an alkynyl group having 2 to 20 carbon atoms by substituting one or two or more —$CH_2$—$CH_2$—'s in the alkyl group with —C≡C—.

The alkynyl group is a linear, branched, or cyclic alkynyl group, and preferably a linear alkynyl group.

The number of carbon atoms in the alkynyl group is preferably 2 to 10, and preferably 2 to 6.

$R^{npi}$ and $R^{npii}$ can represent an alkenyloxy group having 2 to 19 carbon atoms by substituting one —$CH_2$— in the alkyl group with —O— and one or two or more —$CH_2$—$CH_2$—'s in the alkyl group with —CH═CH—.

The alkenyloxy group is a linear, branched, or cyclic alkenyloxy group, and preferably a linear alkenyloxy group.

The number of carbon atoms in the alkenyloxy group is preferably 2 to 10, and preferably 2 to 6.

$R^{npi}$ and $R^{npii}$ can represent an alkyl halide group having 1 to 20 carbon atoms by substituting one or two or more hydrogen atoms in the alkyl group with a halogen atom.

The alkyl halide group is a linear, branched, or cyclic alkyl halide group, and preferably a linear alkyl halide group.

The number of carbon atoms in the alkyl halide group is preferably 2 to 10, and preferably 2 to 6.

$R^{npi}$ and $R^{npii}$ can represent an alkoxy halide group having 1 to 19 carbon atoms by substituting one —$CH_2$— in the alkyl group with —O— and one or two or more hydrogen atoms in the alkyl group with a halogen atom.

The alkoxy halide group is a linear, branched, or cyclic alkoxy halide group, and preferably a linear alkoxy halide group.

The number of carbon atoms in the alkoxy halide group is preferably 2 to 10, and preferably 2 to 6.

Specific examples of the alkyl group having 1 to 20 carbon atoms (including substituted ones) in $R^{npi}$ and $R^{npii}$ include groups represented by formulae ($R^{npi/ii}$-1) to ($R^{npi/ii}$-36).

[Chem. 241]

($R^{npi/ii}$-1)

($R^{npi/ii}$-2)

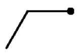

($R^{npi/ii}$-3)

($R^{npi/ii}$-4)

($R^{npi/ii}$-5)

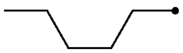

($R^{npi/ii}$-6)

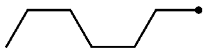

($R^{npi/ii}$-7)

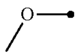

($R^{npi/ii}$-8)

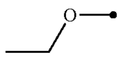

($R^{npi/ii}$-9)

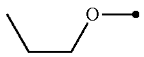

($R^{npi/ii}$-10)

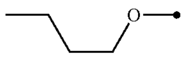

($R^{npi/ii}$-11)

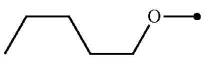

($R^{npi/ii}$-12)

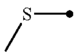

($R^{npi/ii}$-13)

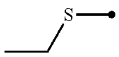

($R^{npi/ii}$-14)

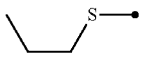

($R^{npi/ii}$-15)

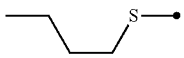

($R^{npi/ii}$-16)

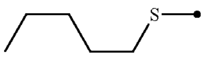

($R^{npi/ii}$-17)

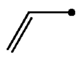

($R^{npi/ii}$-18)

($R^{npi/ii}$-19)

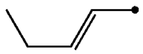

-continued ($R^{npi/ii}$-20)

($R^{npi/ii}$-21)

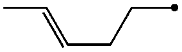

($R^{npi/ii}$-22)

($R^{npi/ii}$-23)

($R^{npi/ii}$-24)

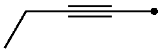

($R^{npi/ii}$-25)

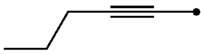

($R^{npi/ii}$-26)

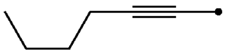

($R^{npi/ii}$-27)

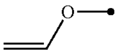

($R^{npi/ii}$-28)

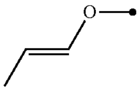

($R^{npi/ii}$-29)

($R^{npi/ii}$-30)

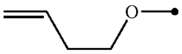

($R^{npi/ii}$-31)

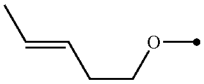

($R^{npi/ii}$-32)

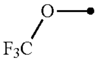

($R^{npi/ii}$-33)

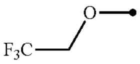

($R^{npi/ii}$-34)

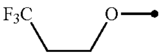

($R^{npi/ii}$-35)

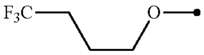

($R^{npi/ii}$-36)

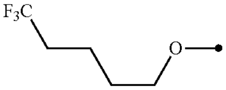

In formulae ($R^{npi/ii}$-1) to ($R^{npi/ii}$-36), a black dot represents a bond with the ring A, B, C, or D.

The halogen atom in $R^{npi}$ and $R^{npii}$ includes fluorine, chlorine, bromine, and iodine atoms.

In general formulae (np-1) to (np-3), the rings A, B, C, and D each independently represent a group selected from the group consisting of the following groups (a), (b), (c), and (d):

(a) a 1,4-cyclohexylene group (one —$CH_2$— or two or more non-adjacent —$CH_2$—'s in this group are optionally substituted with —O—.);

(b) a 1,4-phenylene group (one —CH═ or two or more —CH═'s in this group are optionally substituted with —N═.);

(c) a naphthalene-2,6-diyl group, a 1,2,3,4-tetrahydronaphthalene-2,6-diyl group, or a decahydronaphthalene-2,6-diyl group (one —CH═ or two or more —CH═'s in the naphthalene-2,6-diyl group or 1,2,3,4-tetrahydronaphthalene-2,6-diyl group are optionally substituted with —N═.), and (d) a 1,4-cyclohexenylene group, a 1,3-dioxane-trans-2,5-diyl group, a pyrimidine-2,5-diyl group, or a pyridine-2,5-diyl group.

One or two or more hydrogen atoms in the rings A, B, C, and D are each independently optionally substituted with a substituent $S^{npi1}$.

The substituent $S^{npi1}$ represents a halogen atom, a cyano group, or an alkyl group having 1 to 20 carbon atoms.

The halogen atom includes fluorine, chlorine, bromine, and iodine atoms. In terms of stability and safety, a fluorine atom is preferred.

The alkyl group having 1 to 20 carbon atoms is a linear, branched, or cyclic alkyl group, and preferably a linear alkyl group.

The number of carbon atoms in the alkyl group having 1 to 20 carbon atoms is preferably 2 to 10, and preferably 2 to 6.

One or two or more —$CH_2$—'s in the alkyl group are each independently optionally substituted with —O—, —S—, —CO—, and/or —CS—.

One or two or more —$CH_2$—$CH_2$—'s in the alkyl group are each independently optionally substituted with —CO—O—, —O—CO—, —CO—S—, —S—CO—, —CO—NH—, —NH—CO—, —CH═CH—, —CF═CF—, and/or —C≡C—.

One or two or more —$CH_2$—$CH_2$—$CH_2$—'s in the alkyl group are each independently optionally substituted with —O—CO—O—.

One or two or more hydrogen atoms in the alkyl group are each independently optionally substituted with a halogen atom.

The halogen atom includes fluorine, chlorine, bromine, and iodine atoms.

However, when the alkyl group is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

The substituent $S^{npi1}$ is preferably a halogen atom in terms of $V_{th}$, and preferably a fluorine atom.

A plurality of substituents $S^{npi1}$, if present, may be the same or different.

As the substitution position of the substituent $S^{npi1}$ in the ring A, formula (A-SP-1) below is preferred.

[Chem. 242]

(A-SP-1)

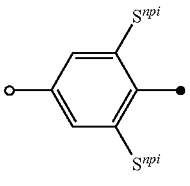

In formula (A-SP-1), a white dot represents a bond with $R^{npi}$, and a black dot represents a bond with $Z^{npi}$.

More specifically, the ring A preferably represents any of formulae (A-1) to (A-3) below.

[Chem. 243]

(A-1)

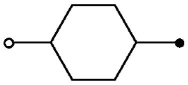

(A-2)

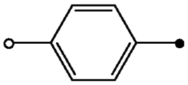

(A-3)

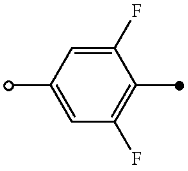

In formulae (A-1) to (A-3), a white dot represents a bond with $R^{npi}$, and a black dot represents a bond with $Z^{npi}$.

More specifically, the ring B preferably represents any of formulae (B-1) to (B-2) below.

[Chem. 244]

(B-1)

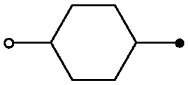

(B-2)

In formulae (B-1) to (B-2), a white dot represents a bond with $Z^{npi}$, and a black dot represents a bond with $R^{npii}$ or $Z^{npii}$.

More specifically, the ring C preferably represents any of formulae (C-1) to (C-2) below.

[Chem. 245]

(C-1)

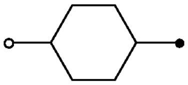

(C-2)

In formulae (C-1) to (C-2), a white dot represents a bond with $Z^{npii}$, and a black dot represents a bond with $R^{npii}$ or $Z^{npiii}$.

In general formulae (np-1) to (np-3), $Z^{npi}$, $Z^{npii}$ and $Z^{npiii}$ each independently represent a single bond or an alkylene group having 1 to 20 carbon atoms.

One or two or more $—CH_2—$'s in the alkylene group are each independently optionally substituted with —O—.

One or two or more $—CH_2—CH_2—$'s in the alkylene group are each independently optionally substituted with $—CH_2—CH(CH_3)—$, $—CH(CH_3)—CH_2—$, —CH=CH—, —CF=CF—, $—CH=C(CH_3)—$, $—C(CH_3)=CH—$, —CH=N—, —N=CH—, —N=N—, —C≡C—, —CO—O—, and/or —O—CO—.

One or two or more $—CH_2—CH_2—CH_2—$'s in the alkyl group are each independently optionally substituted with —O—CO—O—.

However, when the alkyl group having 1 to 10 carbon atoms is substituted with a predetermined group, oxygen atoms are not directly bonded to each other.

In terms of compound stability, it is preferable that sulfur atoms and sulfur atoms and/or oxygen atoms and sulfur atoms are not directly bonded to each other.

Specific examples of the alkylene group having 1 to 20 carbon atoms (including substituted ones) include groups represented by formulae ($Z^{npi/ii/iii}$-1) to ($Z^{npi/ii/iii}$-24).

[Chem. 246]

($Z^{npi/ii/iii}$-1)

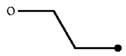

($Z^{npi/ii/iii}$-2)

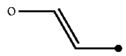

($Z^{npi/ii/iii}$-3)

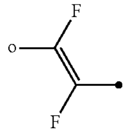

($Z^{npi/ii/iii}$-4)

($Z^{npi/ii/iii}$-5)

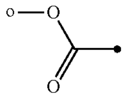

($Z^{npi/ii/iii}$-6)

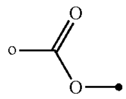

($Z^{npi/ii/iii}$-7)

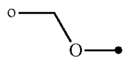

($Z^{npi/ii/iii}$-8)

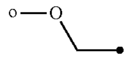

($Z^{npi/ii/iii}$-9)

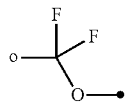

($Z^{npi/ii/iii}$-10)

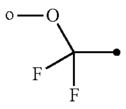

-continued ($Z^{npi/ii/iii}$-11)

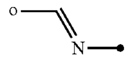

($Z^{npi/ii/iii}$-12)

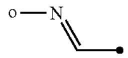

($Z^{npi/ii/iii}$-13)

($Z^{npi/ii/iii}$-14)

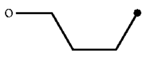

($Z^{npi/ii/iii}$-15)

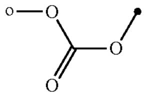

($Z^{npi/ii/iii}$-16)

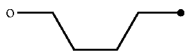

($Z^{npi/ii/iii}$-17)

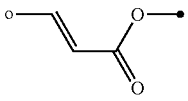

($Z^{npi/ii/iii}$-18)

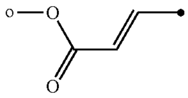

($Z^{npi/ii/iii}$-19)

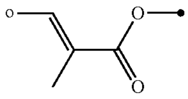

($Z^{npi/ii/iii}$-20)

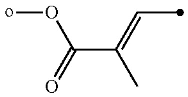

($Z^{npi/ii/iii}$-21)

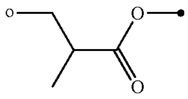

($Z^{npi/ii/iii}$-22)

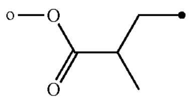

-continued ($Z^{npi/ii/iii}$-23)

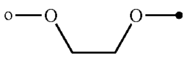

($Z^{npi/ii/iii}$-24)

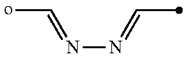

In formulae ($Z^{npi/ii/iii}$-1) to ($Z^{npi/ii/iii}$-24), a white dot represents a bond with the ring A, B, or C, and a black dot represents a bond with the ring B, C, or D.

In terms of Δn and/or $\Delta\varepsilon_r$, $Z^{npi}$, $Z^{npii}$, and $Z^{npiii}$ preferably each independently represent a single bond, —C≡C—, or —CO—O—.

However, in the compounds represented by general formulae (np-1) to (np-3), the compounds represented by general formulae (vi) and (vii) (including subordinate concepts) are excluded.

A compound represented by general formula (np-2) is preferably a compound represented by one of general formulae (np-2-1) to (np-2-2) below.

[Chem. 247]

(np-2-1)

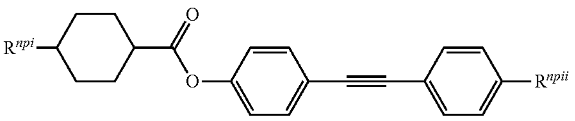

(np-2-2)

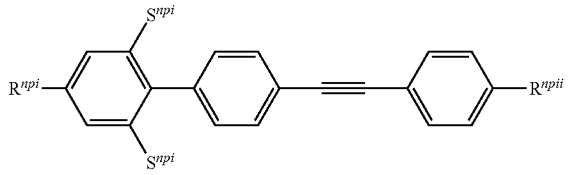

(np-2-3)

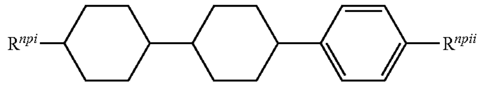

In general formulae (np-2-1) to (np-2-2), $R^{npi}$, $R^{npii}$, and $S^{npi}$ have the same meaning as $R^{npi}$, $R^{npii}$, and $S^{npi}$, respectively, in general formulae (np-1) to (np-3).

Specific examples of compounds represented by general formula (np-2-1) include a compound represented by structural formula (np-2-1.1) below.

[Chem. 248]

(np-2-1.1)

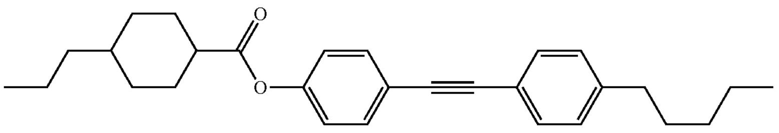

Specific examples of compounds represented by general formula (np-2-2) include compounds represented by structural formulae (np-2-2.1) to (np-2-2.5) below.

[Chem. 249]

(np-2-2.1)

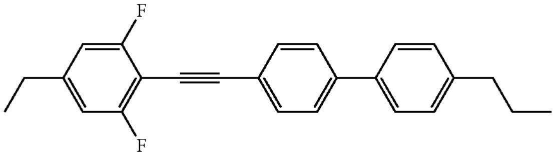

(np-2-2.2)

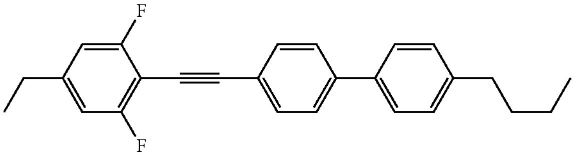

(np-2-2.3)

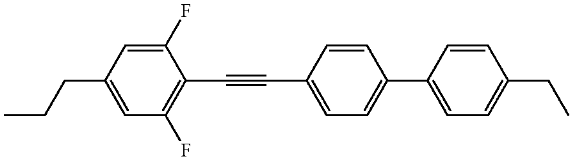

(np-2-2.4)

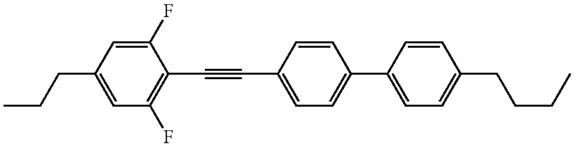

(np-2-2.5)

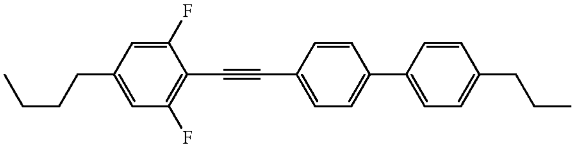

Specific examples of compounds represented by general formula (np-2-3) include compounds represented by structural formulae (np-2-3.1) to (np-2-3.5) below.

[Chem. 250]

(np-2-3.1)

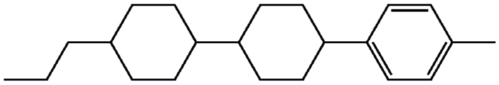

(np-2-3.2)

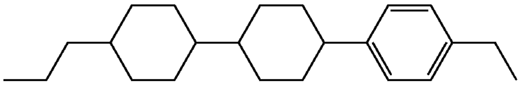

(np-2-3.3)

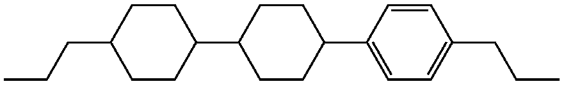

One or two or more, preferably 1 to 10, preferably 1 to 8, preferably 1 to 6, preferably 1 to 4, and preferably 1 to 2 of the compounds represented by general formulae (np-1) to (np-3), general formulae (np-2-1) to (np-2-3), structural formula (np-2-1.1), structural formulae (np-2-2.1) to (np-2-2.5), or structural formulae (np-2-3.1) to (np-2-3.3) are used in the liquid crystal composition.

The lower limit of the total content of the compound(s) represented by general formulae (np-1) to (np-3), general formulae (np-2-1) to (np-2-3), structural formula (np-2-1.1), structural formulae (np-2-2.1) to (np-2-2.5), or structural formulae (np-2-3.1) to (np-2-3.3) in 100% by mass of the liquid crystal composition is preferably 0.5% by mass, preferably 1% by mass, and preferably 3% by mass.

The upper limit of the total content of the compound(s) represented by general formulae (np-1) to (np-3), general formulae (np-2-1) to (np-2-3), structural formula (np-2-1.1), structural formulae (np-2-2.1) to (np-2-2.5), or structural formulae (np-2-3.1) to (np-2-3.3) in 100% by mass of the liquid crystal composition is preferably 45% by mass, preferably 35% by mass, and preferably 25% by mass.

The total content of the compound(s) represented by general formulae (np-1) to (np-3), general formulae (np-2-1) to (np-2-3), structural formula (np-2-1.1), structural formulae (np-2-2.1) to (np-2-2.5), or structural formulae (np-2-3.1) to (np-2-3.3) in 100% by mass of the liquid crystal composition is preferably 0.5 to 45% by mass, preferably 1 to 35% by mass, and preferably 3 to 25% by mass, in terms of solubility, Δn and/or $\Delta\varepsilon_r$.

The compounds represented by general formulae (np-1) to (np-3) (including subordinate concepts) can be produced using known methods.

(Liquid Crystal Composition)

The liquid crystal composition according to the present invention can be produced, for example, by mixing the compound(s) represented by general formula (i) above, and other compounds above and additives as necessary.

The additives include a stabilizer, a pigment compound, a polymerizable compound, and the like.

Examples of the stabilizer include hydroquinones, hydroquinone monoalkyl ethers, tertiary butyl catechols, pyrogallols, thiophenols, nitro compounds, R-naphthylamines, β-naphthols, nitroso compounds, hindered phenols, and hindered amines.

Examples of the hindered phenols include hindered phenol antioxidants represented by structural formulae (XX-1) to (XX-3) below.

[Chem. 251]

(XX-1)

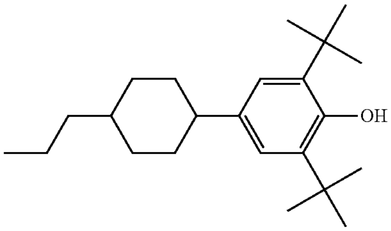

-continued (XX-2)

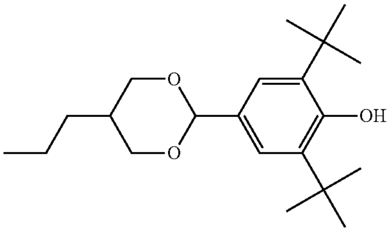

(XX-3)

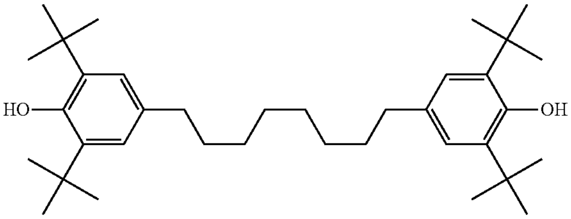

Examples of the hindered amines include hindered amine light stabilizers represented by structural formulae (YY-1) to (YY-2) below.

[Chem. 252]

(YY-1)

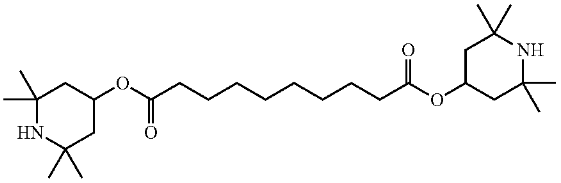

(YY-2)

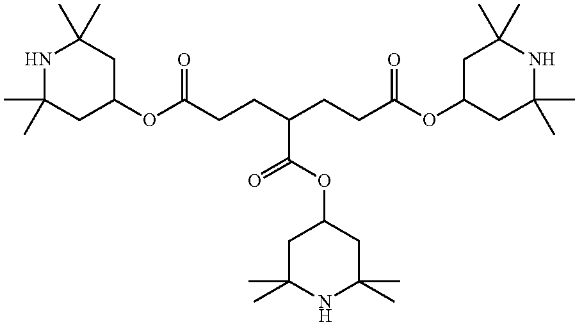

When a stabilizer is used, the total content of the stabilizer in 100% by mass of the liquid crystal composition is preferably 0.005 to 1% by mass, preferably 0.02 to 0.50% by mass, and preferably 0.03 to 0.35% by mass.

Preferable combinations of compounds for use in the liquid crystal composition in terms of solubility, Δn and/or $\Delta\varepsilon_r$ include 1) a combination of a compound(s) represented by general formula (i) (including subordinate concepts), a compound(s) represented by general formula (ii) (including subordinate concepts), a compound(s) represented by general formula (v) (including subordinate concepts), a compound(s) represented by general formula (vi) (including subordinate concepts), and a compound(s) represented by general formula (vii) (including subordinate concepts), 2) a combination of a compound(s) represented by general formula (i) (including subordinate concepts), a compound(s) represented by general formula (ii) (including subordinate concepts), a compound(s) represented by general formula (vi) (including subordinate concepts), and a compound(s) represented by general formula (vii) (including subordinate concepts), 3) a combination of a compound(s) represented by general formula (i) (including subordinate concepts) and a compound(s) represented by general formula (ii) (including subordinate concepts), 4) a combination of a compound(s) represented by general formula (i) (including subordinate concepts), a compound(s) represented by general formula (ii) (including subordinate concepts), a compound(s) represented by general formula (v) (including subordinate concepts), a compound(s) represented by general formula (vi) (including subordinate concepts), and a compound(s) represented by general formulae (np-1) to (np-3) (including subordinate concepts), and 5) a combination of a compound(s) represented by general formula (i) (including subordinate concepts) and a compound(s) represented by general formula (ii) (including subordinate concepts).

In terms of Δn and/or $\Delta\varepsilon_r$, the liquid crystal composition according to the present invention preferably contains one or two or more of compounds represented by general formula (i) (including subordinate concepts) and three or more of compounds represented by general formula (ii-6-27) (including subordinate concepts).

In terms of Δn and/or $\Delta\varepsilon_r$, the liquid crystal composition according to the present invention preferably contains one or two or more of compounds represented by general formula (i-2-11) (including subordinate concepts) and three or more of compounds represented by general formula (ii-6-27) (including subordinate concepts).

In terms of solubility, the liquid crystal composition according to the present invention preferably contains one or two or more of compounds represented by general formula (i) (including subordinate concepts), and three or more of compounds represented by general formula (ii-5-2) (including subordinate concepts) and/or compounds represented by general formula (ii-6-5) (including subordinate concepts).

In terms of low viscosity, it is preferable that the liquid crystal composition according to the present invention contains one or two or more of compounds represented by general formula (i) (including subordinate concepts) and one or two or more of compounds represented by general formulae (np-1) to (np-3) (including subordinate concepts), wherein the total content of the compound(s) represented by general formulae (np-1) to (np-3) (including subordinate concepts) in 100% by mass of the liquid crystal composition is preferably 1 to 30% by mass, more preferably 5 to 25% by mass.

<Characteristic Values of Liquid Crystal Composition>

The liquid crystal phase upper limit temperature ($T_{ni}$) is a temperature at which the liquid crystal composition exhibits a transition from the nematic phase to the isotropic phase.

$T_{ni}$ is measured by preparing a sample of the liquid crystal composition sandwiched between a microscope slide and a cover glass, and observing the sample under heating on a hot stage with a polarizing microscope.

$T_{ni}$ can also be measured by differential scanning calorimetry (DSC).

The unit is "° C.".

The higher $T_{ni}$, the wider the drive temperature range can be ensured since the nematic phase can be maintained at higher temperatures.

The liquid crystal phase upper limit temperature ($T_{ni}$) of the liquid crystal composition according to the present invention can be set as appropriate according to a case where the liquid crystal display element is used indoors or in a car where the external temperature of the liquid crystal display element can be controlled, or a case where it is used outdoors. In terms of the drive temperature range, the liquid crystal phase upper limit temperature is preferably 100° C. or higher, preferably 100 to 200° C., and preferably 110° C. to 180° C.

The liquid crystal phase lower limit temperature ($T_{\rightarrow n}$) is a temperature at which the liquid crystal composition exhibits a transition from another phase (glass, smectic, or crystalline phase) to the nematic phase.

$T_{\rightarrow n}$ is measured by filling a glass capillary with the liquid crystal composition, immersing it in a refrigerant at −70° C. to induce a phase transition of the liquid crystal composition to another phase, and observing the liquid crystal composition while increasing the temperature.

$T_{\rightarrow n}$ can also be measured by differential scanning calorimetry (DSC).

The unit is "° C.".

The lower $T_{\rightarrow n}$, the wider the drive temperature range can be ensured because the nematic phase can be maintained even at lower temperatures.

The liquid crystal phase lower limit temperature ($T_{\rightarrow n}$) of the liquid crystal composition according to the present invention is preferably 10° C. or lower, preferably −70 to 0° C., and preferably −40 to −5° C. in terms of the drive temperature.

The Δn (refractive index anisotropy) correlates with Δn in the near-infrared region used in the optical sensor described later.

The larger Δn is particularly suitable for optical sensors because the phase modulation power of light at the target wavelength is larger.

Δn at 25° C. and 589 nm is determined from the difference ($n_e-n_o$) between the extraordinary light refractive index ($n_e$) and the ordinary light refractive index ($n_o$) of the liquid crystal composition, using an Abbe refractometer.

Δn can also be determined by a phase difference measurement device.

The relation between the phase difference Re, the thickness of the liquid crystal layer d, and Δn is written as Δn=Re/d.

The liquid crystal composition is injected into a glass cell with a cell gap (d) of approximately 3.0 μm and a polyimide alignment film with anti-parallel rubbing treatment, and the in-plane Re is measured with a retardation film and optical material inspection system RETS-100 (Otsuka Electronics Co., Ltd.).

The measurement is performed at a temperature of 25° C. and 589 nm, with no units.

The liquid crystal composition according to the present invention preferably has Δn of 0.38 or higher at 25° C. and 589 nm, preferably 0.38 to 0.60, preferably 0.40 to 0.55, and preferably 0.40 to 0.50, in terms of phase modulation power of light at the wavelength.

The rotational viscosity ($\gamma_1$) is a viscosity related to the rotation of liquid crystal molecules.

The $\gamma_1$ can be measured by filling a glass cell with a cell gap of approximately 10 μm with the liquid crystal composition, and using LCM-2 (available from TOYO Corporation).

A horizontal alignment cell is used for a liquid crystal composition with positive dielectric constant anisotropy, and a vertical alignment cell is used for a liquid crystal composition with negative dielectric constant anisotropy.

The measurement is performed at a temperature of 25° C., and the unit of measurement used is mPa-s.

Smaller $\gamma_1$ is preferred for any liquid crystal display elements because the response speed of the liquid crystal composition is higher.

The liquid crystal composition according to the present invention preferably has a rotational viscosity ($\gamma_1$) of 150 to 2000 mPa·s at 25° C., preferably 200 to 1500 mPa·s, and preferably 250 to 1250 mPa·s in terms of response speed.

The threshold voltage ($V_{th}$) correlates with the drive voltage of the liquid crystal composition.

$V_{th}$ can be determined from the transmittance of a TN cell with a gap of 8.3 μm filled with the liquid crystal composition with a voltage applied.

The measurement is performed at a temperature of 25° C. and the unit of measurement used is "V".

Drive can be performed at lower temperature as $V_{th}$ is lower.

The liquid crystal composition according to the present invention preferably has $V_{th}$ of 3.0 V or lower at 25° C., preferably 0.3 to 3.0 V, preferably 0.5 to 2.7 V, preferably 0.7 to 2.5 V, preferably 0.9 to 2.3 V, preferably 1.1 to 2.1 V, and preferably 1.3 to 2.1 V, in terms of drive voltage.

Higher dielectric constant anisotropy in the high frequency region is preferred in particular for antenna applications because the phase modulation power is greater for radio waves in the target frequency band.

In antenna applications, smaller dissipation factor in the high-frequency region is preferred because the energy loss in the target frequency band is smaller.

In the liquid crystal composition according to the present invention, the dielectric constant anisotropy $\Delta\varepsilon_r$ and the average tan $\delta_{iso}$ of the dissipation factor at 10 GHz were measured to represent the characteristics in the high frequency region.

$$\Delta\varepsilon_r = (\varepsilon_{r//} - \varepsilon_{r\perp}),\ \text{and}\ \tan\delta_{iso} = (2\varepsilon_{r\perp}\tan\delta_{\perp} + \varepsilon_{r//}\tan\delta_{//})/(2\varepsilon_{r\perp} + \varepsilon_{r//}).$$

Here, "εr" is the dielectric constant, "tan δ" is the dissipation factor, and the subscripts "//" and "⊥" indicate a parallel component with respect to the liquid crystal orientation direction and a perpendicular component with respect to the liquid crystal orientation direction, respectively.

The $\Delta\varepsilon_r$ and tan $\delta_{iso}$ can be measured by the following method.

First, the liquid crystal composition is introduced into a polytetrafluoroethylene (PTFE) capillary tube.

The capillary tube used here has an inner radius of 0.80 mm and an outer radius of 0.835 mm, and has an effective length of 4.0 cm.

The capillary tube filled with the liquid crystal composition is introduced into the center of a cavity resonator (available from EM labs, Inc.) with a resonance frequency of 10 GHz.

This cavity resonator has an outer shape with a diameter of 30 mm and a width of 26 mm.

Signals are then input and the results of output signals are recorded using a network analyzer (available from Keysight Technologies).

The dielectric constant ($\varepsilon_r$) and the loss angle (δ) at 10 GHz are determined using the difference between the resonance frequency and the like of a PTFE capillary tube with no liquid crystal composition and the resonance frequency and the like of a PTFE capillary tube filled with the liquid crystal composition.

The tangent of the determined δ is the dissipation factor (tan δ).

The resonance frequency and the like obtained using the PTFE capillary tube filled with the liquid crystal composition are determined as values of characteristic components perpendicular to and parallel to the orientation direction of liquid crystal molecules by controlling the alignment of the liquid crystal molecules.

The magnetic field of a permanent magnet or an electromagnet is used to align the liquid crystal molecules in the perpendicular direction (perpendicular to the effective length direction) or in the parallel direction (parallel to the effective length direction) of the PTFE capillary tube.

For example, the magnetic field has a pole-to-pole distance of 45 mm, and the strength of the magnetic field near the center is 0.23 tesla.

The desired characteristic component is obtained by rotating the PTFE capillary tube filled with the liquid crystal composition parallel or perpendicularly to the magnetic field.

The measurement is performed at a temperature of 25° C., and $\Delta\varepsilon_r$ and tan $\delta_{iso}$ are expressed with no unit.

It is preferable that the liquid crystal composition according to the present invention has a larger $\Delta\varepsilon_r$ at 25° C. In terms of the phase modulation power in the GHz band, $\Delta\varepsilon_r$ is preferably 0.90 or more, preferably 0.90 to 1.40, preferably 0.95 to 1.40, and preferably 1.00 to 1.35.

It is preferable that the liquid crystal composition according to the present invention has a smaller tan $\delta_{iso}$ at 25° C. In terms of loss in the GHz band, tan $\delta_{iso}$ is preferably 0.025 or less, preferably 0.001 to 0.025, preferably 0.003 to 0.020, preferably 0.005 to 0.017, preferably 0.007 to 0.015, preferably 0.008 to 0.013, and preferably 0.009 to 0.012.

(Liquid Crystal Display Element, Sensor, Liquid Crystal Lens, Optical Communication Device, and Antenna)

A liquid crystal display element, a sensor, a liquid crystal lens, an optical communication device, and an antenna using the liquid crystal composition according to the present invention will be described below.

The liquid crystal display element according to the present invention uses the liquid crystal composition described above and is preferably driven by an active matrix system or a passive matrix system.

The liquid crystal display element according to the present invention is preferably a liquid crystal display element in which the dielectric constant is reversely switched by reversibly changing the orientation direction of liquid crystal molecules of the liquid crystal composition described above.

The sensor according to the present invention uses the liquid crystal composition described above. Examples of embodiments thereof include ranging sensors using electromagnetic waves, visible light, or infrared light, infrared sensors using temperature change, temperature sensors using reflected light wavelength change caused by pitch change of cholesteric liquid crystal, pressure sensors using reflected light wavelength change, UV sensors using reflected light wavelength change caused by compositional change, electrical sensors using temperature change caused by voltage or current, radiation sensors using temperature change involved with track of radiation particles, ultrasonic sensors using liquid crystal molecules' arrangement change caused by mechanical vibration of ultrasonic waves, and electromagnetic field sensors using reflected light wavelength change caused by temperature change or liquid crystal molecules' arrangement change caused by electric fields.

The ranging sensors are preferably for light detection and ranging (LiDAR) using a light source.

Preferred LiDAR applications are satellites, aircrafts, unmanned aerial vehicles (drones), automobiles, railroads, and ships.

For automobile applications, self-driving automobile applications are particularly preferred.

The light source is preferably an LED or a laser, and preferably a laser.

Light used for LiDAR is preferably infrared light and preferably has a wavelength of 800 to 2000 nm.

An infrared laser with a wavelength of 905 nm or 1550 nm is particularly preferred.

An infrared laser with 905 nm is preferred when the cost of photodetectors used and sensitivity in all weathers are important. An infrared laser with 1550 nm is preferred when safety of human vision is important.

The liquid crystal composition according to present invention exhibits a high $\Delta n$ and therefore can provide sensors with high phase modulation power in the visible light, infrared light, and electromagnetic wave regions and with high detection sensitivity.

The liquid crystal lens according to the present invention uses the liquid crystal composition described above and, for example, according to an embodiment, includes a first transparent electrode layer, a second transparent electrode layer, a liquid crystal layer containing the liquid crystal composition described above between the first transparent electrode layer and the second transparent electrode layer, an insulating layer between the second transparent electrode layer and the liquid crystal layer, and a high resistance layer between the insulating layer and the liquid crystal layer.

The liquid crystal lens according to the present invention is used, for example, as a 2D/3D switchable lens and a focusing lens for cameras.

The optical communication device according to the present invention uses the liquid crystal composition described above and, for example, according to an embodiment, includes a liquid crystal on silicon (LCOS) including a liquid crystal layer in which liquid crystals forming a plurality of pixels are arranged in two dimensions on a reflective layer (electrode).

The optical communication device according to the present invention is used, for example, as a spatial phase modulator.

The antenna according to the present invention uses the liquid crystal composition described above.

More specifically, the antenna according to the present invention includes a first substrate having a plurality of slots, a second substrate facing the first substrate and having a power feed section, a first dielectric layer provided between the first substrate and the second substrate, a plurality of patch electrodes disposed corresponding to the slots, a third substrate having the patch electrodes, and a liquid crystal layer provided between the first substrate and the third substrate, in which the liquid crystal layer contains the liquid crystal composition described above.

A liquid crystal composition containing one or two or more of compounds (including subordinate concepts) represented by general formula (i) having an alkynyl group and an isothiocyanate group (—NCS) can be used as the liquid crystal composition to provide an antenna with high reliability against external stimuli such as heat, because of its high $T_{ni}$, large $\Delta n$, low $V_{th}$, large $\Delta\varepsilon_r$, small tan $\delta_{iso}$, and satisfactory storability at low temperatures.

Thus, an antenna capable of greater phase control over electromagnetic waves in the microwave or millimeter wave range can be provided.

Preferably, the antenna according to the present invention operates in the Ka-band frequencies or K-band frequencies or the Ku-band frequencies used for satellite communications.

The antenna according to the present invention is preferably a combination of a radial line slot array and a patch antenna array.

As the structure of the antenna according to the present invention, for example, the details described in WO 2021/157189 can be referred to and applied.

EXAMPLES

The present invention will be described in more detail below with examples, but the present invention is not intended to be limited by the following examples.

The compositions of the following Examples and Comparative Examples contain the compounds in the proportions listed in the tables, and the amount contained is indicated by "% by mass".

The following abbreviations are used to describe the compounds. Compounds that can take cis and trans forms represent the trans form unless otherwise specified.

<Ring Structure>

[Chem. 253]

Cy

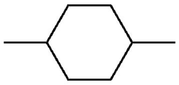

Cy1

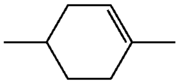

Cy2

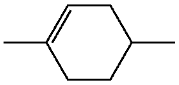

Py

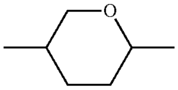

Py'

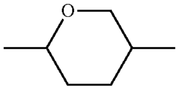

Oc

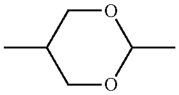

Oc'

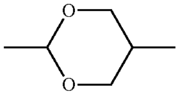

Ph

Ph1

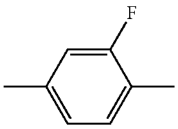

-continued

Ph2

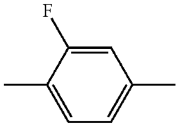

Ph3

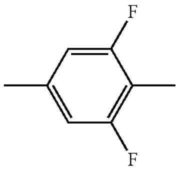

Ph4

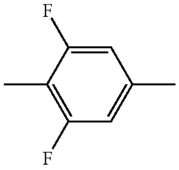

Ph5

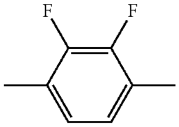

Pc1

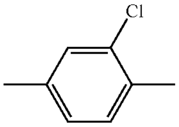

Pc2

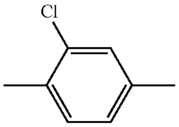

Pm1

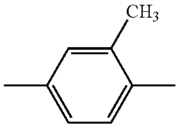

Pm2

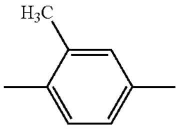

Pe1

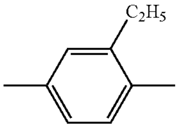

Pe2

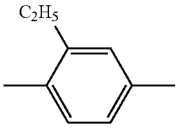

Th

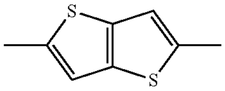

-continued

Ma

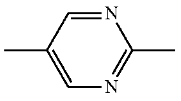

Mb

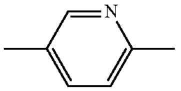

Np

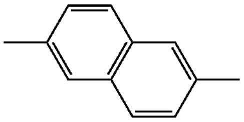

Np1

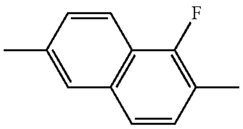

Np2

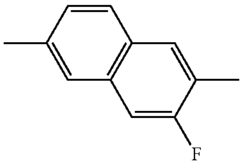

Np3

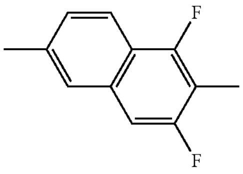

Np4

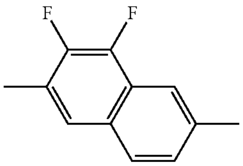

Np5

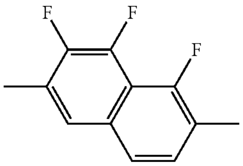

Tet3

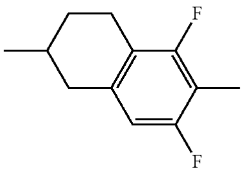

<End Structure>

TABLE 1

| Abbreviation | Chemical Structure |
|---|---|
| —n | —$C_nH_{2n+1}$ |
| n— | $C_nH_{2n+1}$— |
| —On | —O—$C_nH_{2n+1}$ |
| nO— | $C_nH_{2n+1}$—O— |

TABLE 1-continued

| Abbreviation | Chemical Structure |
|---|---|
| —Sn | —S—$C_nH_{2n+1}$ |
| nS— | $C_nH_{2n+1}$—S— |
| —V | —CH═$CH_2$ |
| V— | $CH_2$═CH— |
| —V1 | —CH═CH—$CH_3$ |
| 1V— | $CH_3$—CH═CH— |
| —2V | —$CH_2$—$CH_2$—CH═$CH_2$ |
| V2— | $CH_2$═CH—$CH_2$—$CH_2$— |
| —2V1 | —$CH_2$—$CH_2$—CH═CH—$CH_3$ |
| 1V2— | $CH_3$—CH═CH—$CH_2$—$CH_2$— |
| —OCF3 | —O—$CF_3$ |
| CF3O— | $CF_3$—O— |
| —H | —H |
| H— | H— |
| —CN | —CN |
| CN— | CN— |
| —NCS | —NCS |
| NCS— | NCS— |
| -(1)4 | —$CH_2CH_2CH(CH_3)CH_3$ |
| 4(1)- | $CH_3CH(CH_3)CH_2CH_2$— |

(Note that n in the table is a natural number.)

<Linking Structure>

TABLE 2

| Abbreviation | Chemical Structure |
|---|---|
| —n— | —$C_nH_{2n}$— |
| —nO— | —$C_nH_{2n}$—O— |
| —On— | —O—$C_nH_{2n}$— |
| —COO— | —C(═O)—O— |
| —OCO— | —O—C(═O)— |
| —V— | —CH═CH— |
| —nV— | —$C_nH_{2n}$—CH═CH— |
| —Vn— | —CH═CH—$C_nH_{2n}$— |
| —T— | —C≡C— |
| —CF2O— | —$CF_2$—O— |
| —OCF2— | —O—$CF_2$— |
| —Az— | —N═N— |

(Note that n in the table is a natural number.)

(Hindered Phenol Antioxidant)

[Chem. 254]

(XX-1)

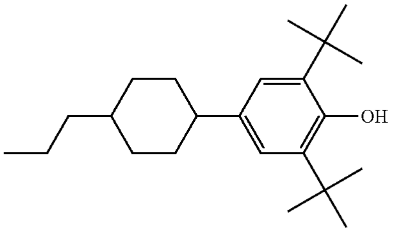

(XX-2)

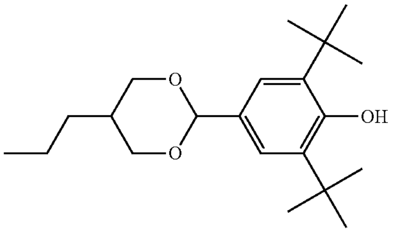

-continued (XX-3)

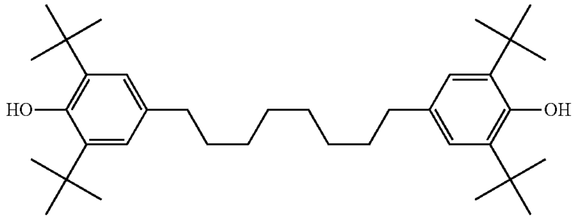

(Hindered Amine Light Stabilizer)

[Chem. 255]

(YY-1)

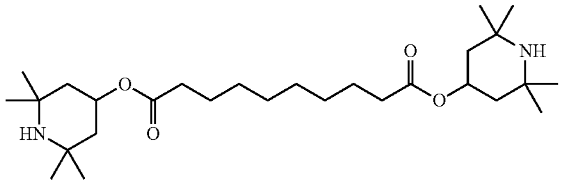

-continued (YY-2)

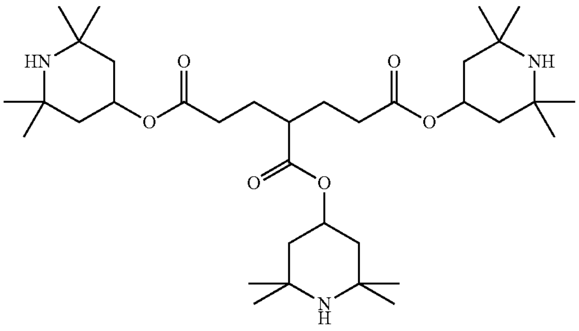

(Preparation of Liquid Crystal Compositions)

LC-A and LC-B and LC-01 to LC-09 listed in Tables 3 and 4 were prepared.

TABLE 3

| Table 3 | LC-A | LC-B | LC-01 | LC-02 | LC-03 | LC-04 |
|---|---|---|---|---|---|---|
| 4-T-Ph-T-Ph3-NCS | | | 5 | 10 | 10 | |
| 5-T-Ph-T-Ph3-NCS | | | 5 | | | |
| 4-T-Ph-Ph-T-Ph3-NCS | | | 12 | | | 7 |
| 4-T-Ph-T-Ph-Ph3-NCS | | | | | | |
| 4-T-Ph-T-Ph1-Ph3-NCS | | | | | | |
| 5-T-Ph-T-Ph-Ph3-NCS | | | | 10 | 10 | |
| 5-T-Ph-T-Ph1-Ph3-NCS | | | | | | |
| 6-T-Ph-T-Ph-Ph3-NCS | | | | | | |
| 4-T-Pm1-T-Th-Ph3-NCS | | | | | | |
| 5-T-Pm1-T-Th-Ph3-NCS | | | | | | |
| 3-Ph3-T-Ph-Ph3-NCS | | | 3 | 5 | 3 | 5 |
| 4-Ph3-T-Ph-Ph3-NCS | | | 10 | 10 | 8 | 10 |
| 5-Ph3-T-Ph-Ph3-NCS | | | 10 | 10 | 8 | 13 |
| 3-Cy-T-Ph-Ph3-NCS | | | | 6 | | 10 |
| 4-Cy-T-Ph-Ph3-NCS | | | | | | 5 |
| 5-Cy-T-Ph-Ph3-NCS | | | | | | |
| 3-Cy-T-Ph-T-Ph3-NCS | | | | | | |
| 4-Cy-T-Ph-T-Ph3-NCS | | | | | | |
| 5-Cy-Ph-NCS | 6 | | | | | |
| 4-Ph-T-Pc1-NCS | 11 | | | | | |
| 4O-Ph2-T-Ph-NCS | 5 | | | | | |
| 5O-Ph2-T-Ph-NCS | 5 | | | | | |
| 5-Ph-T-Ph1-NCS | 5 | | | | | |
| 3-Ph-T-Ph3-NCS | | 13 | 17 | 17 | 17 | 17 |
| 5-Ph-T-Ph3-NCS | | 11 | 12 | 12 | 12 | 5 |
| 2-Cy-Ph-Ph3-NCS | 12 | | | | | 14 |
| 4-Cy-Ph-Ph3-NCS | 12 | | | | | 14 |
| 4-Cy-Ph-T-Ph1-NCS | 16 | | | | | |
| 5-Cy-Ph-T-Ph1-NCS | 13 | | | | | |
| 4-Cy-Ph-T-Ph3-NCS | | 14 | | | | |
| 5-Cy-Ph-T-Ph3-NCS | | 20 | | | | |
| CF3O-Ph-Ph-Ph3-NCS | | 24 | | | | |
| 4-Ph-Ph-T-Ph3-NCS | | 6 | | | | |
| 5-Ph-Ph-T-Ph3-NCS | | 12 | | | | |
| 5-Ph-Ph5-T-Ph1-NCS | 15 | | | | | |
| 3-Ph-T-Ph1-Ph-CN | | | 6 | | 12 | |

TABLE 3-continued

| Table 3 | LC-A | LC-B | LC-01 | LC-02 | LC-03 | LC-04 |
|---|---|---|---|---|---|---|
| 4-Ph3-T-Pm1-T-Ph-S1 | | | 7 | 7 | 7 | |
| 2-Ph3-T-Ph-Az-Ph-2 | | | 5 | 5 | 5 | |
| 3-Ph3-T-Ph-Az-Ph-2 | | | 8 | 8 | 8 | |
| 3-Cy-Cy-Ph-1 | | | | | | |
| 3-Cy-Cy-Ph-2 | | | | | | |
| 3-Cy-Cy-Ph-3 | | | | | | |
| Total [% by mass] | 100 | 100 | 100 | 100 | 100 | 100 |

TABLE 4

| Table 4 | LC-05 | LC-06 | LC-07 | LC-08 | LC-09 |
|---|---|---|---|---|---|
| 4-T—Ph—T—Ph3—NCS | 5 | 5 | 5 | | |
| 5-T—Ph—T—Ph3—NCS | | 5 | 5 | | |
| 4-T—Ph—Ph—T—Ph3—NCS | 5 | 10 | 5 | 10 | 10 |
| 4-T—Ph—T—Ph—Ph3—NCS | 5 | | | | |
| 4-T—Ph—T—Ph1—Ph3—NCS | 5 | 10 | 7 | | |
| 5-T—Ph—T—Ph—Ph3—NCS | | 10 | 7 | | |
| 5-T—Ph—T—Ph1—Ph3—NCS | | 10 | 7 | | |
| 6-T—Ph—T—Ph—Ph3—NCS | | | 7 | | |
| 4-T—Pm1—T—Th—Ph3—NCS | | | 4 | | |
| 5-T—Pm1—T—Th—Ph3—NCS | | | 4 | | |
| 3-Ph3—T—Ph—Ph3—NCS | | 4 | 3 | 5 | 5 |
| 4-Ph3—T—Ph—Ph3—NCS | | 4 | 3 | 10 | 10 |
| 5-Ph3—T—Ph—Ph3—NCS | | 4 | 3 | 10 | 10 |
| 3-Cy—T—Ph—Ph3—NCS | | 3 | 3 | 5 | 5 |
| 4-Cy—T—Ph—Ph3—NCS | | 3 | 3 | 5 | 5 |
| 5-Cy—T—Ph—Ph3—NCS | | | 3 | 5 | |
| 3-Cy—T—Ph—T—Ph3—NCS | | | | 4 | 4 |
| 4-Cy—T—Ph—T—Ph3—NCS | | | | 5 | |
| 5-Cy—Ph—NCS | 3 | | | | |
| 4-Ph—T—Pc1—NCS | 6 | | | | |
| 4O—Ph2—T—Ph—NCS | 5 | | | | |
| 5O—Ph2—T—Ph—NCS | 5 | | | | |
| 5-Ph—T—Ph1—NCS | 5 | | | | |
| 3-Ph—T—Ph3—NCS | | 6 | 4 | 10 | 10 |
| 5-Ph—T—Ph3—NCS | | 6 | 4 | 10 | 10 |
| 2-Cy—Ph—Ph3—NCS | 6 | | 2 | | |
| 4-Cy—Ph—Ph3—NCS | 6 | | 2 | | |
| 4-Cy—Ph—T—Ph1—NCS | 16 | | | | |
| 5-Cy—Ph—T—Ph1—NCS | 13 | | | | |
| 4-Cy—Ph—T—Ph3—NCS | | | | | |
| 5-Cy—Ph—T—Ph3—NCS | | | | | |
| CF3O—Ph—Ph—Ph3—NCS | | | | | |
| 4-Ph—Ph—T—Ph3—NCS | | | | | |
| 5-Ph—Ph—T—Ph3—NCS | | | | | |
| 5-Ph—Ph5—T—Ph1—NCS | 15 | | | | |
| 3-Ph—T—Ph1—Ph—CN | | | | 8 | 8 |

TABLE 4-continued

| Table 4 | LC-05 | LC-06 | LC-07 | LC-08 | LC-09 |
|---|---|---|---|---|---|
| 4-Ph3—T—Pm1—T—Ph—S1 | | 7 | 6 | 8 | 8 |
| 2-Ph3—T—Ph—Az—Ph-2 | | 5 | 5 | | |
| 3-Ph3—T—Ph—Az—Ph-2 | | 8 | 8 | | |
| 3-Cy—Cy—Ph-1 | | | | 5 | 5 |
| 3-Cy—Cy—Ph-2 | | | | | 5 |
| 3-Cy—Cy—Ph-3 | | | | | 5 |
| Total [% by mass] | 100 | 100 | 100 | 100 | 100 |

Examples 1 to 39 and Comparative Examples 1 and 2

Liquid crystal compositions listed in Tables 5 to 11 were prepared using LC-A and LC-B and LC-01 to LC-09, hindered phenol antioxidants (XX-1) to (XX-3), and hindered amine light stabilizers (YY-1) to (YY-2), their physical properties were measured, and <Storability Test> was conducted. The results are listed in Tables 5 to 11. In Comparative Example 2, the high-frequency characteristics ($\Delta\varepsilon_r$ and tan $\delta_{iso}$) were not measured because the liquid crystal composition was crystallized at room temperature.

<Storability Test>

In a 1-mL sample bottle (available from Maruem Corporation), 0.5 g of a liquid crystal composition was weighed and defoamed by degassing at 150 to 250 Pa for 10 minutes. The bottle was then purged with dry nitrogen and covered with the attached lid. This was stored in a temperature-controlled thermostatic chamber (available from ESPEC CORP., SH-241) at 0° C. for two weeks, and the occurrence of crystallization of the liquid crystal composition was visually checked every week.

TABLE 5

| Table 5 | Comparative Example 1 | Comparative Example 2 | Example 1 | Example 2 | Example 3 | Example 4 |
|---|---|---|---|---|---|---|
| Liquid crystal composition | LC-A | LC-B | LC-01 | LC-02 | LC-03 | LC-04 |
| $T_{ni}$ [° C.] | 150 | 156 | 128 | 126 | 128 | 159 |
| $\Delta n$ | 0.368 | 0.413 | 0.453 | 0.449 | 0.446 | 0.405 |
| $\gamma_1$ [mPa · s] | 512 | 510 | 542 | 568 | 609 | 710 |
| $V_{th}$ [V] | 2.05 | 2.00 | 1.71 | 1.76 | 1.63 | 1.74 |
| $\Delta\varepsilon_r$ | 1.091 | — | 1.241 | 1.249 | 1.211 | 1.115 |
| tan$\delta_{iso}$ | 0.019 | — | 0.015 | 0.014 | 0.015 | 0.011 |
| Storability (0° C.) | No crystallization for 2 weeks | Crystalized at room temperature | No crystallization for 2 weeks | No crystallization for 2 weeks | No crystallization for 2 weeks | No crystallization for 2 weeks |

TABLE 6

| Table 6 | Example 5 | Example 6 | Example 7 | Example 8 | Example 9 |
|---|---|---|---|---|---|
| Liquid crystal composition | LC-05 | LC-06 | LC-07 | LC-08 | LC-09 |
| $T_{ni}$ [° C.] | 158 | 163 | 167 | 154 | 141 |
| Δn | 0.414 | 0.487 | 0.488 | 0.440 | 0.415 |
| $\gamma_1$ [mPa · s] | 550 | 780 | 800 | 776 | 665 |
| $V_{th}$ [V] | 1.99 | 1.87 | 1.86 | 2.05 | 1.95 |
| $\Delta\varepsilon_r$ | 1.115 | 1.290 | 1.290 | 1.111 | 1.105 |
| $\tan\delta_{iso}$ | 0.018 | 0.010 | 0.010 | 0.015 | 0.017 |
| Storability (0° C.) | No crystallization for 2 weeks | No crystallization for 2 weeks | No crystallization for 2 weeks | No crystallization for 2 weeks | No crystallization for 2 weeks |

TABLE 7

| Table 7 | | Example 10 | Example 11 | Example 12 | Example 13 | Example 14 | Example 15 |
|---|---|---|---|---|---|---|---|
| Liquid crystal composition [% by mass] | LC-01 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 127 | 127 | 127 | 127 | 127 | 127 |
| Δn | | 0.452 | 0.452 | 0.452 | 0.452 | 0.452 | 0.452 |
| $\gamma_1$ [mPa · s] | | 547 | 544 | 545 | 546 | 547 | 548 |
| $V_{th}$ [V] | | 1.71 | 1.71 | 1.71 | 1.71 | 1.71 | 1.71 |
| $\Delta\varepsilon_r$ | | 1.241 | 1.241 | 1.241 | 1.241 | 1.241 | 1.241 |
| $\tan\delta_{iso}$ | | 0.015 | 0.015 | 0.015 | 0.015 | 0.015 | 0.015 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 8

| Table 8 | | Example 16 | Example 17 | Example 18 | Example 19 | Example 20 | Example 21 |
|---|---|---|---|---|---|---|---|
| Liquid crystal composition [% by mass] | LC-04 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 158 | 158 | 158 | 158 | 158 | 158 |
| Δn | | 0.404 | 0.404 | 0.404 | 0.404 | 0.404 | 0.404 |
| $\gamma_1$ [mPa · s] | | 715 | 712 | 713 | 714 | 715 | 715 |
| $V_{th}$ [V] | | 1.74 | 1.74 | 1.74 | 1.74 | 1.74 | 1.74 |
| $\Delta\varepsilon_r$ | | 1.115 | 1.115 | 1.115 | 1.115 | 1.115 | 1.115 |
| $\tan\delta_{iso}$ | | 0.011 | 0.011 | 0.011 | 0.011 | 0.011 | 0.011 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 9

| Table 9 | | Example 22 | Example 23 | Example 24 | Example 25 | Example 26 | Example 27 |
|---|---|---|---|---|---|---|---|
| Liquid crystal composition [% by mass] | LC-06 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 162 | 162 | 162 | 162 | 162 | 162 |
| Δn | | 0.486 | 0.486 | 0.486 | 0.486 | 0.486 | 0.486 |
| $\gamma_1$ [mPa · s] | | 785 | 783 | 784 | 784 | 785 | 785 |
| $V_{th}$ [V] | | 1.87 | 1.87 | 1.87 | 1.87 | 1.87 | 1.87 |
| $\Delta\varepsilon_r$ | | 1.290 | 1.290 | 1.290 | 1.290 | 1.290 | 1.290 |
| $\tan\delta_{iso}$ | | 0.010 | 0.010 | 0.010 | 0.010 | 0.010 | 0.010 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 10

| Table 10 | | Example 28 | Example 29 | Example 30 | Example 31 | Example 32 | Example 33 |
|---|---|---|---|---|---|---|---|
| Liquid crystal composition [% by mass] | LC-07 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 166 | 167 | 167 | 167 | 166 | 166 |
| Δn | | 0.487 | 0.487 | 0.487 | 0.487 | 0.487 | 0.487 |
| $\gamma_1$ [mPa · s] | | 805 | 802 | 803 | 803 | 804 | 804 |
| $V_{th}$ [V] | | 1.86 | 1.86 | 1.86 | 1.86 | 1.86 | 1.86 |
| $\Delta\varepsilon_r$ | | 1.290 | 1.290 | 1.290 | 1.290 | 1.290 | 1.290 |
| $\tan\delta_{iso}$ | | 0.010 | 0.010 | 0.010 | 0.010 | 0.010 | 0.010 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 11

| Table 11 | | Example 34 | Example 35 | Example 36 | Example 37 | Example 38 | Example 39 |
|---|---|---|---|---|---|---|---|
| Liquid crystal composition [% by mass] | LC-08 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 153 | 154 | 154 | 154 | 153 | 153 |
| Δn | | 0.439 | 0.440 | 0.440 | 0.440 | 0.439 | 0.439 |
| $\gamma_1$ [mPa · s] | | 779 | 777 | 778 | 778 | 779 | 779 |
| $V_{th}$ [V] | | 2.05 | 2.05 | 2.05 | 2.05 | 2.05 | 2.05 |
| $\Delta\varepsilon_r$ | | 1.111 | 1.111 | 1.111 | 1.111 | 1.111 | 1.111 |
| $\tan\delta_{iso}$ | | 0.015 | 0.015 | 0.015 | 0.015 | 0.015 | 0.015 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

In Examples 1 to 9, the liquid crystal compositions using the compounds represented by general formula (i) had a high $T_{ni}$, a large $\Delta n$, a low $V_{th}$, a large $\Delta\varepsilon_r$, a small tan $\delta_{iso}$, and satisfactory storability at low temperatures.

In particular, Examples 1, 6, and 7 exhibited particularly large $\Delta n$ and $\Delta\varepsilon_r$.

On the other hand, in Comparative Examples 1 and 2, the liquid crystal compositions without the compounds represented by general formula (i) had $\Delta n$ of less than 0.38 or were crystallized at room temperature.

Furthermore, in Examples 10 to 39, even when a hindered phenol antioxidant and/or a hindered amine light stabilizer was used in combination, $T_{ni}$ was high, $\Delta n$ was large, $V_{th}$ was low, $\Delta\varepsilon_r$ was large, tan $\delta_{iso}$ was small, and the storability at low temperatures was satisfactory.

Examples 40 to 69

Furthermore, liquid crystal compositions listed in Tables 12 to 17 were prepared using LC-10 to LC-15, hindered phenol antioxidants (XX-1) to (XX-3), and hindered amine light stabilizers (YY-1) to (YY-2), their physical properties were measured, and <Storability Test> was conducted. Similar results were obtained. The results are listed in Tables 12 to 17.

TABLE 12

| Table 12 | LC-10 | LC-11 | LC-12 | LC-13 | LC-14 | LC-15 |
|---|---|---|---|---|---|---|
| 4-T-Ph-T-Ph3-NCS | | | | | | |
| 5-T-Ph-T-Ph3-NCS | | | | | | |
| 4-T-Ph-Ph-T-Ph3-NCS | | | | | | |
| 4-T-Ph-T-Ph-Ph3-NCS | | | | | | 5 |
| 4-T-Ph-T-Ph1-Ph3-NCS | | | | | | 5 |
| 5-T-Ph-T-Ph-Ph3-NCS | 5 | 5 | 5 | 4 | 5 | |
| 5-T-Ph-T-Ph1-Ph3-NCS | 3 | | 3 | | 3 | 5 |
| 6-T-Ph-T-Ph-Ph3-NCS | | | | | | |
| 4-T-Pm1-T-Th-Ph3-NCS | | | | | | |
| 5-T-Pm1-T-Th-Ph3-NCS | | | | | | |
| 4-T-Pm2-Ph-T-Ph3-NCS | 4 | 10 | | | | 10 |
| 4-T-Pm1-Ph-T-Ph3-NCS | | 5 | | | | |
| 4-T-Ph2-T-Ph-Ph3-NCS | | | 4 | | | |
| 4-T-Ph1-Ph-T-Ph3-NCS | | | | 4 | | 5 |
| 5-T-Ph1-Ph-T-Ph3-NCS | | | | 4 | | |
| 4(1)-T-Ph-Ph-T-Ph3-NCS | | | | | 4 | |
| 3-Ph3-T-Ph-Ph3-NCS | | | | | | |
| 4-Ph3-T-Ph-Ph3-NCS | | | | | | |
| 5-Ph3-T-Ph-Ph3-NCS | 10 | 10 | 10 | 10 | 10 | 10 |
| 3-Cy-T-Ph-Ph3-NCS | 15 | 15 | 15 | 15 | 15 | 10 |
| 4-Cy-T-Ph-Ph3-NCS | 15 | 15 | 15 | 15 | 15 | 6 |
| 5-Cy-T-Ph-Ph3-NCS | | | | | | |
| 3-Cy-T-Ph-T-Ph3-NCS | 6 | 4 | 6 | 6 | 6 | 6 |
| 4-Cy-T-Ph-T-Ph3-NCS | 6 | | 6 | 6 | 6 | 6 |
| 5-Cy-Ph-NCS | | | | | | |
| 4-Ph-T-Pc1-NCS | | | | | | |
| 4O-Ph2-T-Ph-NCS | | | | | | |
| 5O-Ph2-T-Ph-NCS | | | | | | |
| 5-Ph-T-Ph1-NCS | | | | | | |
| 3-Ph-T-Ph3-NCS | 11 | 11 | 11 | 11 | 11 | 12 |
| 5-Ph-T-Ph3-NCS | 10 | 10 | 10 | 10 | 10 | 10 |
| 2-Cy-Ph-Ph3-NCS | 8 | 8 | 8 | 8 | 8 | |
| 4-Cy-Ph-Ph3-NCS | 7 | 7 | 7 | 7 | 7 | |
| 4-Cy-Ph-T-Ph1-NCS | | | | | | |
| 5-Cy-Ph-T-Ph1-NCS | | | | | | |
| 4-Cy-Ph-T-Ph3-NCS | | | | | | |
| 5-Cy-Ph-T-Ph3-NCS | | | | | | |
| CF3O-Ph-Ph-Ph3-NCS | | | | | | |
| 4-Ph-Ph-T-Ph3-NCS | | | | | | |
| 5-Ph-Ph-T-Ph3-NCS | | | | | | |
| 5-Ph-Ph5-T-Ph1-NCS | | | | | | |
| 3-Tet3-T-Ph-T-Ph1-NCS | | | | | | 10 |
| 3-Ph-T-Ph1-Ph-CN | | | | | | |
| 4-Ph3-T-Pm1-T-Ph-S1 | | | | | | |
| 2-Ph3-T-Ph-Az-Ph-2 | | | | | | |
| 3-Ph3-T-Ph-Az-Ph-2 | | | | | | |
| 3-Cy-Cy-Ph-1 | | | | | | |
| 3-Cy-Cy-Ph-2 | | | | | | |
| 3-Cy-Cy-Ph-3 | | | | | | |
| Total [% by mass] | 100 | 100 | 100 | 100 | 100 | 100 |

TABLE 13

| Table 13 | Example 40 | Example 41 | Example 42 | Example 43 | Example 44 | Example 45 |
|---|---|---|---|---|---|---|
| Liquid crystal composition | LC-10 | LC-11 | LC-12 | LC-13 | LC-14 | LC-15 |
| $T_{ni}$ [° C.] | 160 | 154 | 161 | 160 | 161 | 172 |
| Δn | 0.404 | 0.406 | 0.404 | 0.402 | 0.405 | 0.464 |
| $\gamma_1$ [mPa · s] | 811 | 832 | 809 | 801 | 808 | 1120 |
| $V_{th}$ [V] | 1.95 | 1.97 | 1.95 | 1.93 | 1.95 | 1.70 |
| $\Delta\varepsilon_r$ | 1.099 | 1.099 | 1.099 | 1.099 | 1.099 | 1.256 |
| $\tan\delta_{iso}$ | 0.010 | 0.010 | 0.010 | 0.010 | 0.010 | 0.009 |
| Storability (0° C.) | No crystallization for 2 weeks | No crystallization for 2 weeks | No crystallization for 2 weeks | No crystallization for 2 weeks | No crystallization for 2 weeks | No crystallization for 2 weeks |

TABLE 14

| Table 14 | | Example 46 | Example 47 | Example 48 | Example 49 | Example 50 | Example 51 |
|---|---|---|---|---|---|---|---|
| Liquid crystal composition [% by mass] | LC-10 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 159 | 160 | 160 | 160 | 159 | 159 |
| Δn | | 0.403 | 0.404 | 0.404 | 0.404 | 0.403 | 0.403 |
| $\gamma_1$ [mPa · s] | | 816 | 814 | 815 | 815 | 816 | 816 |
| $V_{th}$ [V] | | 1.95 | 1.95 | 1.95 | 1.95 | 1.95 | 1.95 |
| $\Delta\varepsilon_r$ | | 1.099 | 1.099 | 1.099 | 1.099 | 1.099 | 1.099 |
| $\tan\delta_{iso}$ | | 0.010 | 0.010 | 0.010 | 0.010 | 0.010 | 0.010 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 15

| Table 15 | | Example 52 | Example 53 | Example 54 | Example 55 | Example 56 | Example 57 |
|---|---|---|---|---|---|---|---|
| Liquid crystal composition [% by mass] | LC-11 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 153 | 154 | 154 | 154 | 153 | 153 |
| Δn | | 0.405 | 0.406 | 0.406 | 0.406 | 0.405 | 0.405 |
| $\gamma_1$ [mPa · s] | | 837 | 835 | 836 | 836 | 837 | 837 |
| $V_{th}$ [V] | | 1.97 | 1.97 | 1.97 | 1.97 | 1.97 | 1.97 |
| $\Delta\varepsilon_r$ | | 1.099 | 1.099 | 1.099 | 1.099 | 1.099 | 1.099 |
| $\tan\delta_{iso}$ | | 0.010 | 0.010 | 0.010 | 0.010 | 0.010 | 0.010 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 16

| Table 16 | | Example 58 | Example 59 | Example 60 | Example 61 | Example 62 | Example 63 |
|---|---|---|---|---|---|---|---|
| Liquid crystal composition [% by mass] | LC-12 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 160 | 161 | 161 | 161 | 160 | 160 |
| $\Delta n$ | | 0.403 | 0.404 | 0.404 | 0.404 | 0.403 | 0.403 |
| $\gamma_1$ [mPa · s] | | 814 | 812 | 813 | 813 | 814 | 814 |
| $V_{th}$ [V] | | 1.95 | 1.95 | 1.95 | 1.95 | 1.95 | 1.95 |
| $\Delta\varepsilon_r$ | | 1.099 | 1.099 | 1.099 | 1.099 | 1.099 | 1.099 |
| $\tan\delta_{iso}$ | | 0.010 | 0.010 | 0.010 | 0.010 | 0.010 | 0.010 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

TABLE 17

| Table 17 | | Example 64 | Example 65 | Example 66 | Example 67 | Example 68 | Example 69 |
|---|---|---|---|---|---|---|---|
| Liquid crystal composition [% by mass] | LC-13 | 99.70 | 99.80 | 99.80 | 99.80 | 99.75 | 99.75 |
| Additive [% by mass] | XX-1 | | | 0.20 | | | |
| | XX-2 | | | | 0.20 | 0.20 | |
| | XX-3 | 0.30 | 0.15 | | | | 0.20 |
| | YY-1 | | | | | 0.05 | 0.05 |
| | YY-2 | | 0.05 | | | | |
| Total [% by mass] | | 100.00 | 100.00 | 100.00 | 100.00 | 100.00 | 100.00 |
| $T_{ni}$ [° C.] | | 159 | 160 | 160 | 160 | 159 | 159 |
| $\Delta n$ | | 0.401 | 0.402 | 0.402 | 0.402 | 0.401 | 0.401 |
| $\gamma_1$ [mPa · s] | | 806 | 803 | 804 | 804 | 805 | 806 |
| $V_{th}$ [V] | | 1.93 | 1.93 | 1.93 | 1.93 | 1.93 | 1.93 |
| $\Delta\varepsilon_r$ | | 1.099 | 1.099 | 1.099 | 1.099 | 1.099 | 1.099 |
| $\tan\delta_{iso}$ | | 0.010 | 0.010 | 0.010 | 0.010 | 0.010 | 0.010 |
| Storability (0° C.) | | No crystallization for 2 weeks | No crystallization for 2 weeks | No crystallization for 2 weeks | No crystallization for 2 weeks | No crystallization for 2 weeks | No crystallization for 2 weeks |

The synthesis of compounds represented by general formula (i) will be described below.

(Synthesis Example 1) Production of Compound Represented by Formula (I-1)

[Chem. 256]

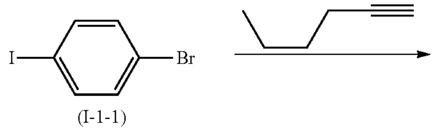

(I-1-1)

-continued

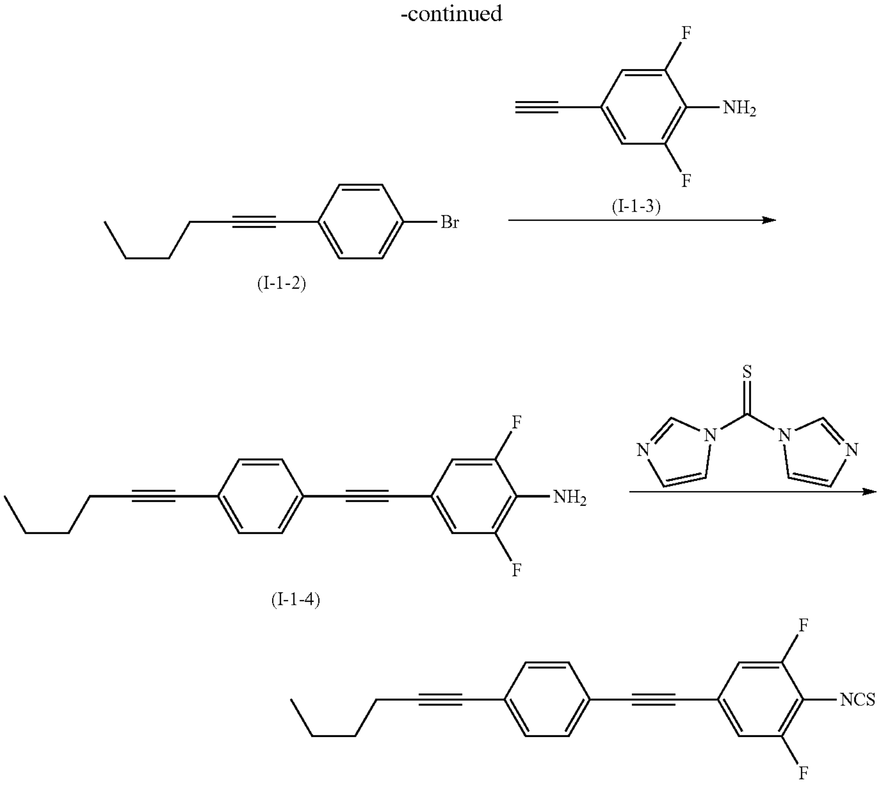

(I-1-2) (I-1-3) (I-1-4) (I-1)

In a nitrogen atmosphere, 150.0 g of the compound represented by formula (I-1-1), 4.0 g of copper(I) iodide, 7.4 g of bis(triphenylphosphine)palladium(II) dichloride, 222 mL of triethylamine, and 375 mL of tetrahydrofuran were added to a reaction vessel at room temperature. Subsequently, under stirring at room temperature, a solution of 52.3 g of 1-hexyne dissolved in 375 mL of tetrahydrofuran was added dropwise, and the mixture was stirred at room temperature for one hour. After the completion of the reaction, 10% by mass of hydrochloric acid was poured into the reaction solution, which was extracted with toluene. The organic layer was washed with saturated saline and then purified by column chromatography (silica gel, hexane) to yield 125.0 g of the compound represented by formula (I-1-2).

Subsequently, in a nitrogen atmosphere, 15.0 g of the compound represented by formula (I-1-2), 0.5 g of copper(I) iodide, 1.5 g of tetrakis(triphenylphosphine)palladium(0), 60 mL of triethylamine, and 30 mL of N,N-dimethylformamide were added to a reaction vessel at room temperature. Subsequently, with heating at 75° C., a solution of 11.6 g of the compound represented by formula (I-1-3) dissolved in 30 mL of N,N-dimethylformamide was added dropwise, and the mixture was stirred at 75° C. for two hours. After the completion of the reaction, a saturated ammonium chloride solution was poured into the reaction solution, which was extracted with toluene. The organic layer was washed with saturated saline and then purified by column chromatography (amino silica gel, toluene/hexane=1/9 to 1/1) followed by recrystallization (toluene/hexane=1/3) to yield 10.8 g of the compound represented by formula (I-1-4).

Subsequently, in a nitrogen atmosphere, 10.8 g of the compound represented by formula (I-1-4), 54 mL of dichloromethane, and 9.7 g of 1,1-thiocarbonyldiimidazole were added to a reaction vessel at room temperature and stirred at room temperature. After the completion of the reaction, the organic layer was washed with saturated saline and then purified by column chromatography (silica gel, toluene) followed by recrystallization (toluene/hexane=1/1) to yield 8.5 g of the compound represented by formula (I-1).

MS (EI): m/z=351

(Synthesis Example 2) Production of Compound Represented by Formula (I-2)

[Chem. 257]

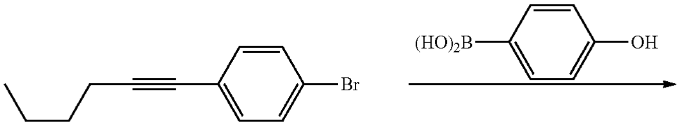

(I-2-1)

-continued

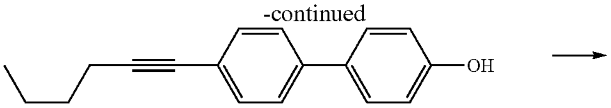

(I-2-2)

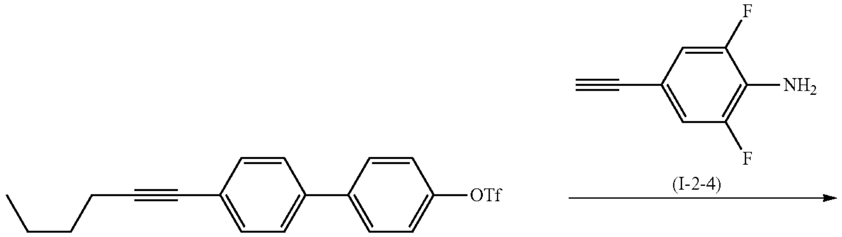

(I-2-4)

(I-2-3)

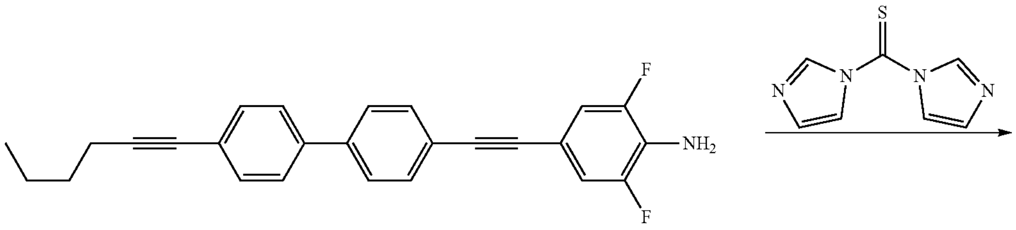

(I-2-5)

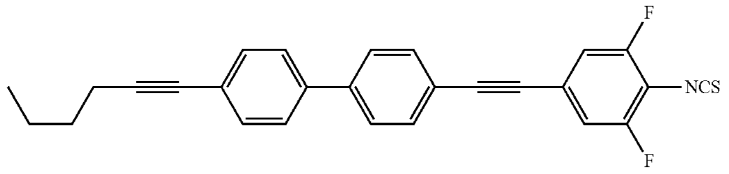

(I-2)

In a nitrogen atmosphere, 20.0 g of the compound represented by formula (I-2-1), 14.0 g of 4-hydroxyphenylboronic acid, 2.9 g of dichlorobis[di-tert-butyl(p-dimethylaminophenyl)phosphino]palladium(II), 26.8 g of sodium carbonate, 80 mL of ethanol, and 120 mL of water were added to a reaction vessel at room temperature, and the mixture was stirred at 70° C. After the completion of the reaction, 10% by mass of hydrochloric acid was poured into the reaction solution, which was extracted with ethyl acetate. The organic layer was washed with saturated saline and then purified by column chromatography (silica gel, hexane) to yield 21.0 g of the compound represented by formula (I-2-2).

Subsequently, in a nitrogen atmosphere, 21.0 g of the compound represented by formula (I-2-2), 13.3 g of pyridine, and 100 mL of dichloromethane were added to a reaction vessel at room temperature. Then, under stirring at 0° C., 28.6 g of trifluoromethanesulfonic anhydride was added dropwise, and the mixture was stirred at 0° C. for one hour. After the completion of the reaction, 10% by mass of hydrochloric acid was poured into the reaction solution, which was extracted with dichloromethane. The organic layer was washed with saturated saline and then purified by column chromatography (silica gel, dichloromethane) to yield 31.8 g of the compound represented by formula (I-2-3).

Subsequently, in a nitrogen atmosphere, 20.0 g of the compound represented by formula (I-2-3), 0.4 g of copper(I) iodide, 1.2 g of tetrakis(triphenylphosphine)palladium(0), 6.4 g of 2-aminoethanol, and 50 mL of N,N-dimethylformamide were added to a reaction vessel at room temperature. With heating at 75° C., a solution of 9.6 g of the compound represented by formula (I-2-4) dissolved in 50 mL of N,N-dimethylformamide was added dropwise, and the mixture was stirred at 75° C. for two hours. After the completion of the reaction, filtering and purification by column chromatography (amino silica gel, toluene) were performed to yield 9.8 g of the compound represented by formula (I-2-5).

Subsequently, in a nitrogen atmosphere, 9.8 g of the compound represented by formula (I-2-5), 50 mL of dichloromethane, and 7.0 g of 1,1-thiocarbonyldiimidazole were added to a reaction vessel at room temperature, the mixture was stirred at room temperature for one hour. After the completion of the reaction, filtering and purification by column chromatography (silica gel, toluene) followed by recrystallization (toluene/hexane=1/1) were performed to yield 3.7 g of the compound represented by formula (I-2).

MS(EI): m/z=427

(Synthesis Example 3) Production of Compound Represented by Formula (I-3)

[Chem. 258]

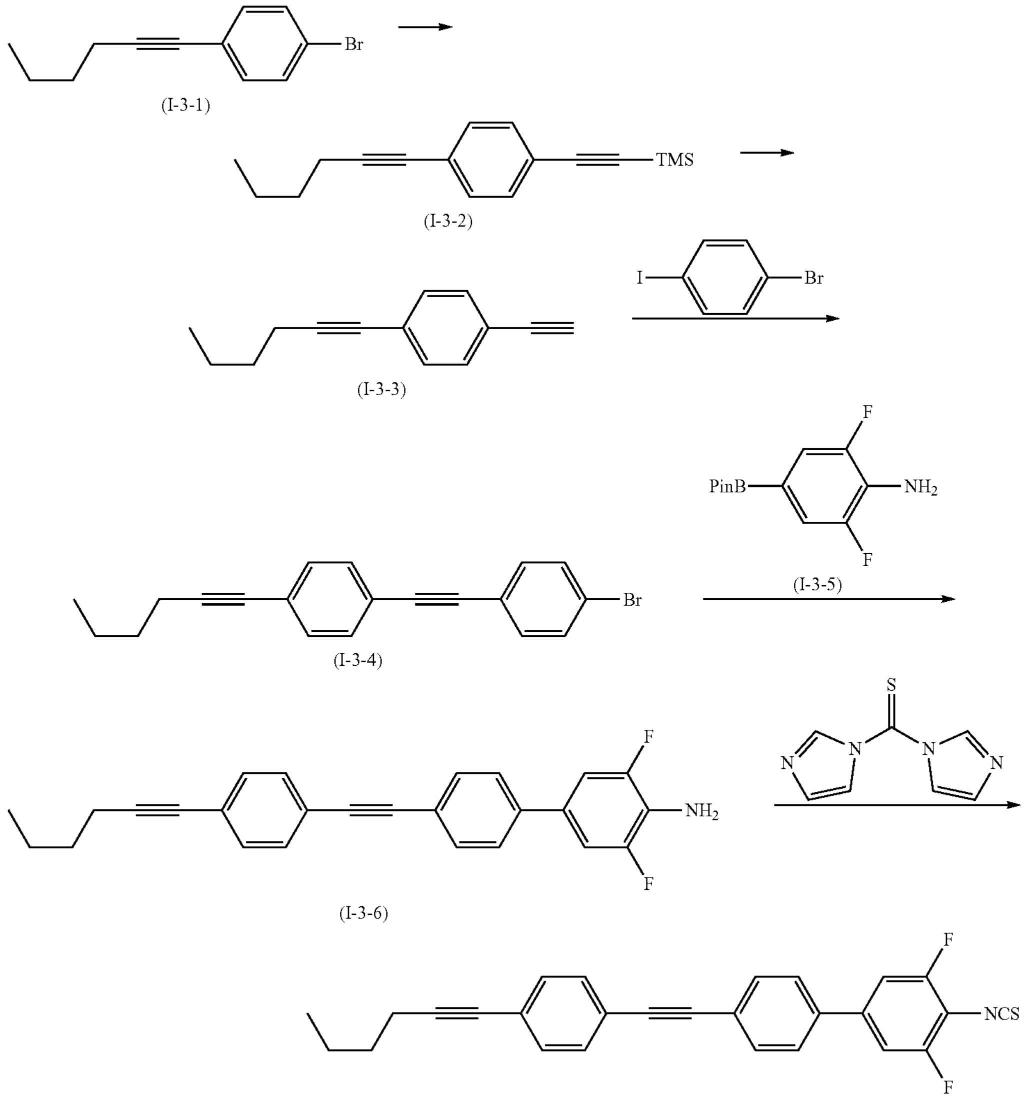

(I-3-1)

(I-3-2)

(I-3-3)

(I-3-5)

(I-3-4)

(I-3-6)

(I-3)

In a nitrogen atmosphere, 25.0 g of the compound represented by formula (I-3-1), 0.8 g of copper(I) iodide, 2.4 g of tetrakis(triphenylphosphine)palladium(0), 100 mL of triethylamine, and 50 mL of N,N-dimethylformamide were added to a reaction vessel at room temperature. With heating at 75° C., a solution of 12.4 g of trimethylsilylacetylene dissolved in 50 mL of N,N-dimethylformamide was added dropwise, and the mixture was stirred at 75° C. for two hours. After the completion of the reaction, 10% by mass of hydrochloric acid was poured into the reaction solution, which was extracted with toluene. The organic layer was washed with saturated saline and then purified by column chromatography (silica gel, toluene/hexane=0/1 to 1/9) to yield 26.3 g of the compound represented by formula (I-3-2).

Subsequently, 26.3 g of the compound represented by formula (I-3-2), 125 mL of methanol, and 4.7 g of potassium carbonate were added to a reaction vessel at room temperature, and the mixture was stirred at room temperature. After the completion of the reaction, purification was performed by column chromatography (silica gel, dichloromethane) to yield 18.0 g of the compound represented by formula (I-3-3).

Subsequently, in a nitrogen atmosphere, 25.0 g of 4-bromoiodobenzene, 0.7 g of copper(I) iodide, 1.2 g of bis (triphenylphosphine)palladium(II) dichloride, 44.7 g of triethylamine, and 62 mL of tetrahydrofuran were added to a reaction vessel at room temperature. Under stirring at room temperature, a solution of 18.0 g of the compound represented by formula (I-3-3) dissolved in 62 mL of tetrahydrofuran was added dropwise, and the mixture was stirred at room temperature for one hour. Ten percent by mass of hydrochloric acid was poured into the reaction solution, which extracted with toluene. The organic layer was washed with saturated saline and then purified by column chromatography (silica gel, toluene/hexane=0/1 to 1/9) to yield 24.4 g of the compound represented by formula (I-3-4).

Subsequently, in a nitrogen atmosphere, 9.0 g of the compound represented by formula (I-3-4), 7.1 g of the compound represented by formula (I-3-5), 94 mg of dichlorobis[di-tert-butyl(p-dimethylaminophenyl)phosphino]palladium(II), 4.2 g of sodium carbonate, 40 mL of tetrahydrofuran, and 20 mL of water were added to a reaction vessel at room temperature, and the mixture was stirred at 75° C. for two hours. After the completion of the reaction, filtering and purification by column chromatography (amino silica gel, toluene) were performed to yield 7.3 g of the compound represented by formula (I-3-6).

Subsequently, in a nitrogen atmosphere, 7.3 g of the compound represented by formula (I-3-6), 35 mL of dichloromethane, and 4.1 g of 1,1-thiocarbonyldiimidazole were added to a reaction vessel at room temperature, and the mixture was stirred at room temperature for one hour. After the completion of the reaction, filtering and purification by column chromatography (silica gel, toluene) followed by recrystallization (toluene/hexane=1/1) were performed to yield 5.6 g of the compound represented by formula (I-3).

MS (EI): m/z=427

(Synthesis Example 4) Production of Compound Represented by Formula (I-4)

[Chem. 259]

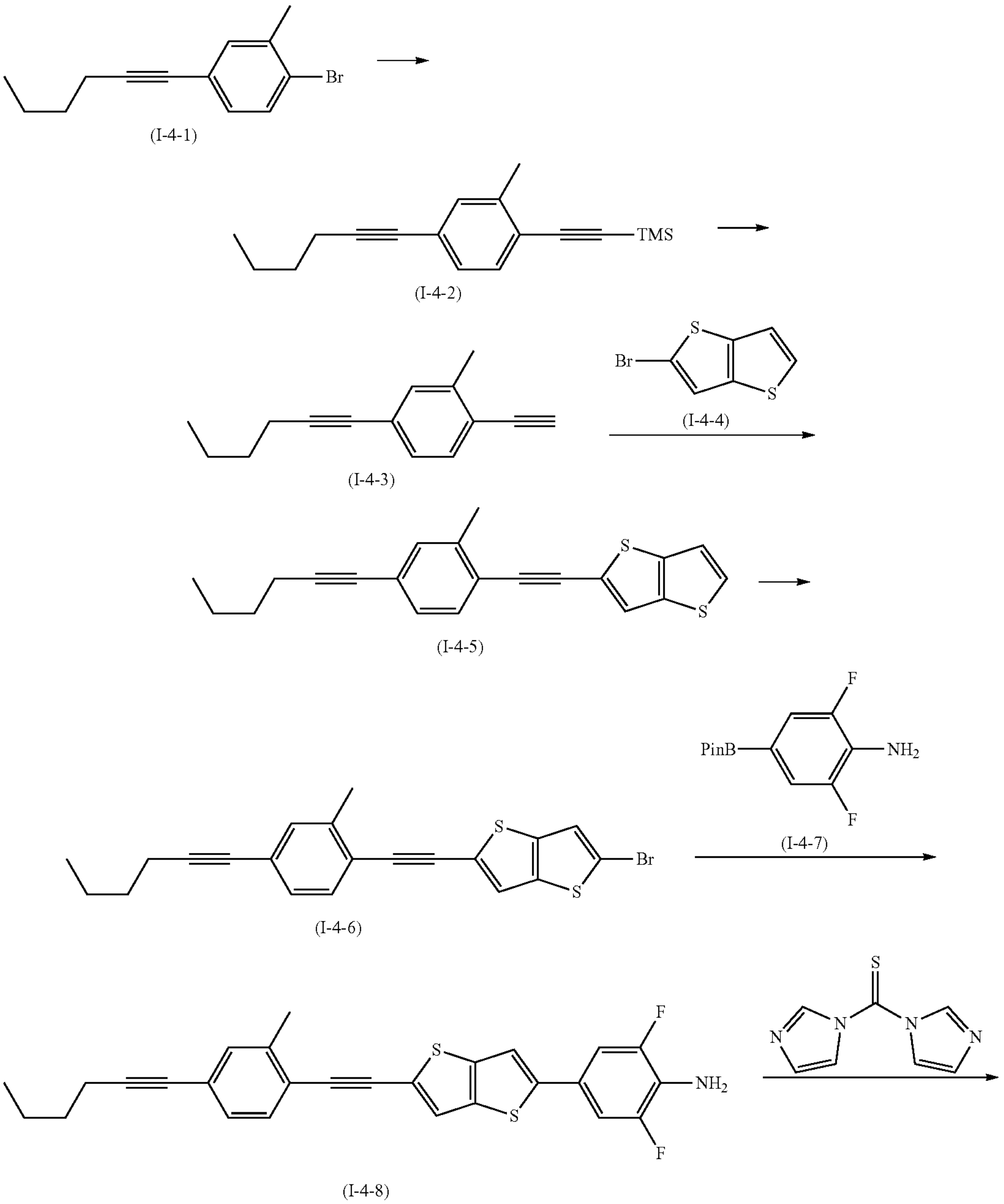

(I-4-1)

(I-4-2)

(I-4-3)

(I-4-4)

(I-4-5)

(I-4-6)

(I-4-7)

(I-4-8)

-continued

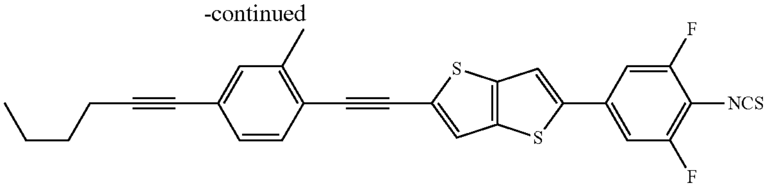

(I-4)

In a nitrogen atmosphere, 10.0 g of the compound represented by formula (I-4-1), 0.3 g of copper(I) iodide, 0.9 g of tetrakis(triphenylphosphine)palladium(0), 40 mL of triethylamine, and 20 mL of N,N-dimethylformamide were added to a reaction vessel at room temperature. With heating at 75° C., a solution of 4.7 g of trimethylsilylacetylene dissolved in 20 mL of N,N-dimethylformamide was added dropwise, and the mixture was stirred at 75° C. for two hours. After the completion of the reaction, 10% by mass of hydrochloric acid was poured into the reaction solution, which was extracted with toluene. The organic layer was washed with saturated saline and then purified by column chromatography (silica gel, toluene/hexane=0/1 to 1/9) to yield 8.1 g of the compound represented by formula (I-4-2). Subsequently, 8.1 g of the compound represented by formula (I-4-2), 40 mL of methanol, and 1.4 g of potassium carbonate were added to a reaction vessel at room temperature, and the mixture was stirred at room temperature. After the completion of the reaction, purification was performed by column chromatography (silica gel, dichloromethane) to yield 5.1 g of the compound represented by formula (I-4-3).

Subsequently, in a nitrogen atmosphere, 4.7 g of the compound represented by formula (I-4-4), 0.2 g of copper(I) iodide, 0.5 g of tetrakis(triphenylphosphine)palladium(0), 20 mL of triethylamine, and 10 mL of N,N-dimethylformamide were added to a reaction vessel at room temperature. With heating at 75° C., a solution of 5.1 g of the compound represented by formula (I-4-3) dissolved in 10 mL of N,N-dimethylformamide was added dropwise, and the mixture was stirred at 75° C. for two hours. After the completion of the reaction, 10% by mass of hydrochloric acid was poured into the reaction solution, which was extracted with toluene. The organic layer was washed with saturated saline and then purified by column chromatography (silica gel, toluene/hexane=1/9 to 1/4) to yield 6.2 g of the compound represented by formula (I-4-5).

Subsequently, in a nitrogen atmosphere, 6.2 g of the compound represented by formula (I-4-5) and 70 mL of dichloromethane were added to a reaction vessel at room temperature. With cooling in ice, 4.2 g of N-bromosuccinimide was added in small quantities, and the mixture was stirred at room temperature for five hours. After the completion of the reaction, the reaction solution was poured into water and separated. The organic layer was washed with saturated saline and purified by column chromatography (silica gel, dichloromethane/hexane=1/9 to 1/4) to yield 6.5 g of the compound represented by formula (I-4-6).

Subsequently, in a nitrogen atmosphere, 6.5 g of the compound represented by formula (I-4-6), 4.2 g of the compound represented by formula (I-4-7), 0.1 g of dichlorobis[di-tert-butyl(p-dimethylaminophenyl)phosphino]palladium(II), 3.3 g of sodium carbonate, 30 mL of tetrahydrofuran, and 15 mL of water were added to a reaction vessel at room temperature, and the mixture was stirred at 75° C. for two hours. After the completion of the reaction, filtering and purification by column chromatography (amino silica gel, toluene) were performed to yield 5.2 g of the compound represented by formula (I-4-8).

Subsequently, in a nitrogen atmosphere, 5.2 g of the compound represented by formula (I-4-8), 25 mL of dichloromethane, and 2.4 g of 1,1-thiocarbonyldiimidazole were added to a reaction vessel at room temperature, and the mixture was stirred at room temperature for one hour. After the completion of the reaction, filtering and purification by column chromatography (silica gel, toluene) followed by recrystallization (toluene/hexane=1/1) were performed to yield 3.2 g of the compound represented by formula (I-4).

MS (EI): m/z=503

(Synthesis Example 5) Production of Compound Represented by Formula (I-5)

[Chem. 260]

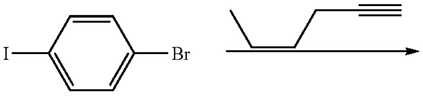

(I-5-1)

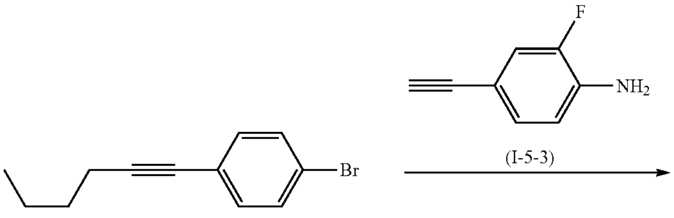

(I-5-3)

(I-5-2)

-continued
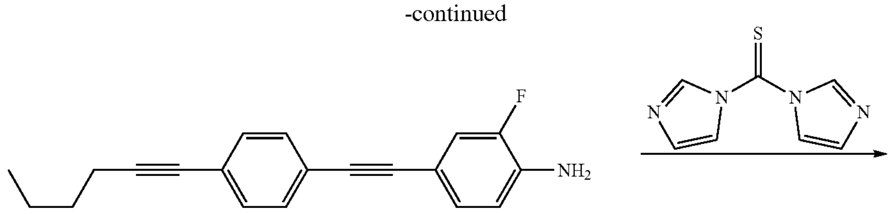
(I-5-4)
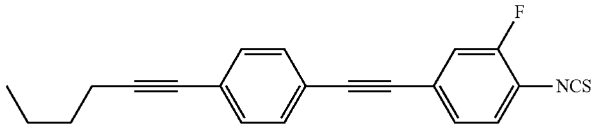
(I-5)
The compound represented by formula (I-5) was produced by the same method as in Synthesis Example 1, except that the compound represented by formula (I-1-3) was replaced by the compound represented by formula (I-5-3).
MS (EI): m/z=333
(Synthesis Example 6) Production of Compound Represented by Formula (1-6)
[Chem. 261]
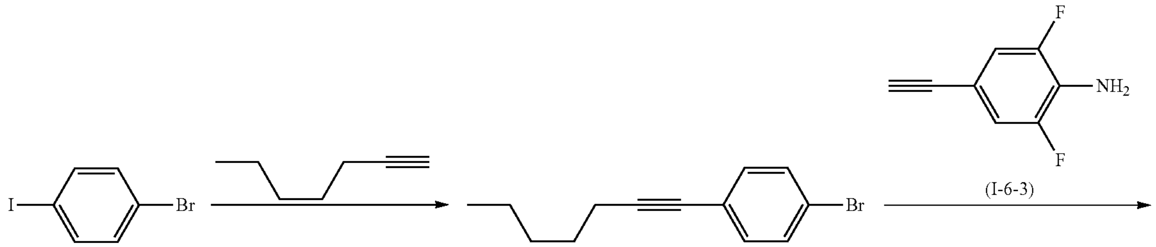
(I-6-3)
(I-6-1) (I-6-2)
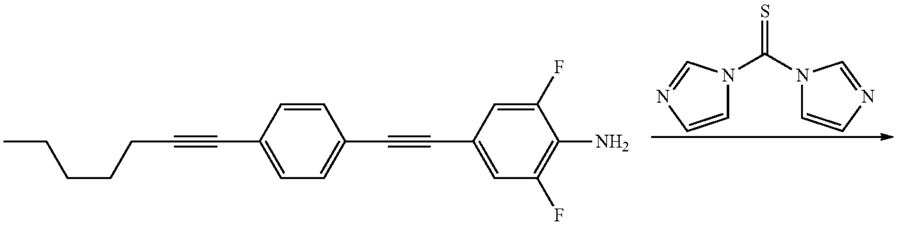
(I-6-4)
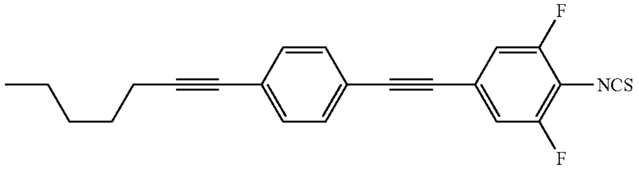
(I-6)

The compound represented by formula (I-6) was produced by the same method as in Synthesis Example 1, except that 1-hexyne was replaced by 1-heptyne.
MS (EI): m/z=365
(Synthesis Example 7) Production of Compound Represented by Formula (I-7)
[Chem. 262]
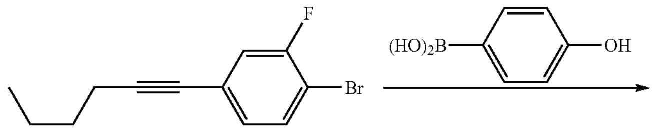
(I-7-1)
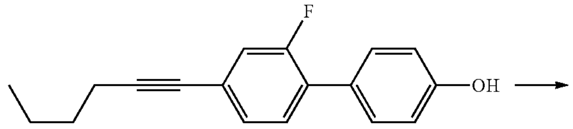
(I-7-2)
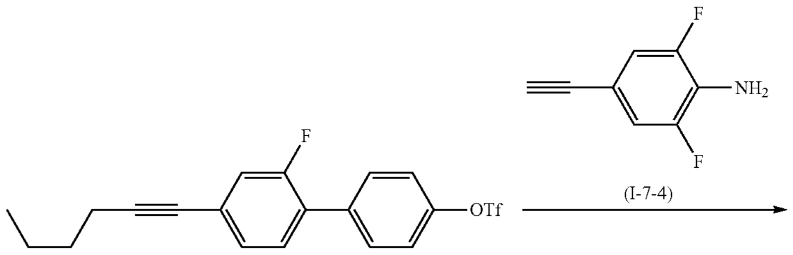
(I-7-4)
(I-7-3)
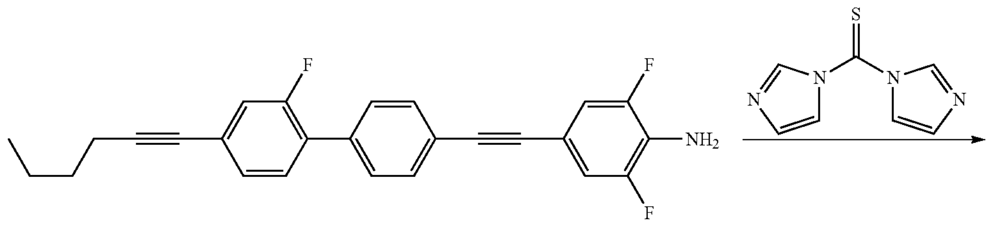
(I-7-5)
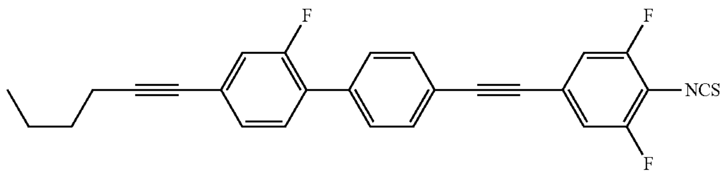
(I-7)

The compound represented by formula (I-7) was produced by the same method as in Synthesis Example 2, except that the compound represented by formula (I-2-1) was replaced by the compound represented by formula (I-7-1).
MS (EI): m/z=445
(Synthesis Example 8) Production of Compound Represented by Formula (I-8)
[Chem. 263]
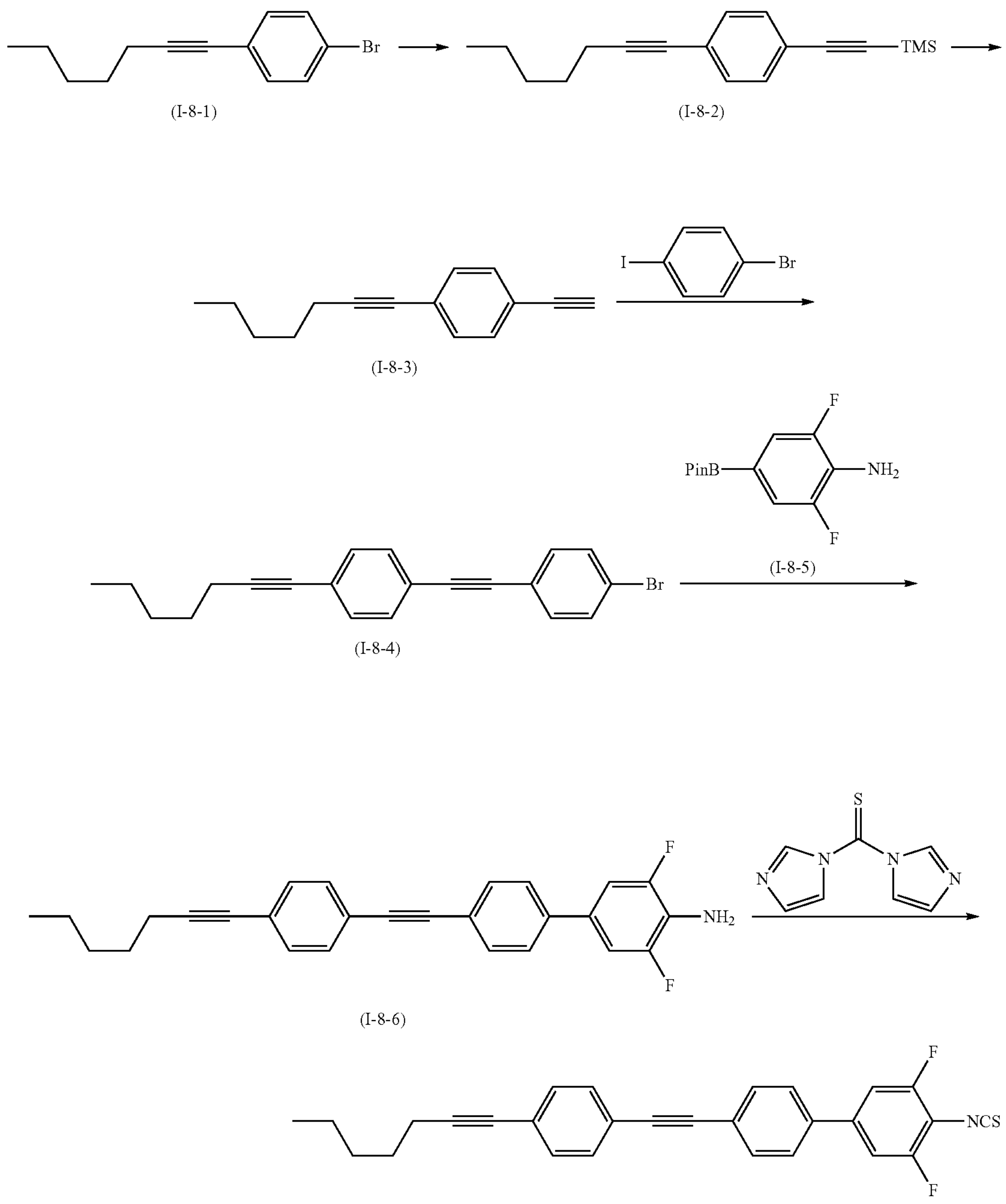
(I-8-1) (I-8-2) (I-8-3) (I-8-5) (I-8-4) (I-8-6) (I-8)

The compound represented by formula (I-8) was produced by the same method as in Synthesis Example 3, except that the compound represented by formula (I-3-1) was replaced by the compound represented by formula (I-8-1).
MS (EI): m/z=441
(Synthesis Example 9) Production of Compound Represented by Formula (I-9)
[Chem. 264]
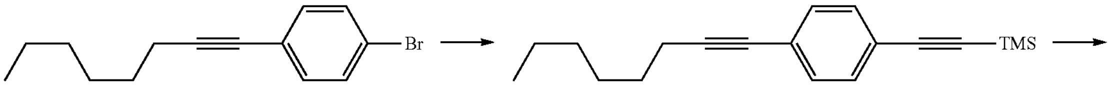
(I-9-1) (I-9-2)
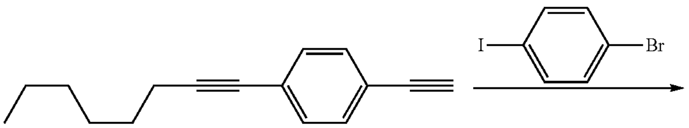
(I-9-3)
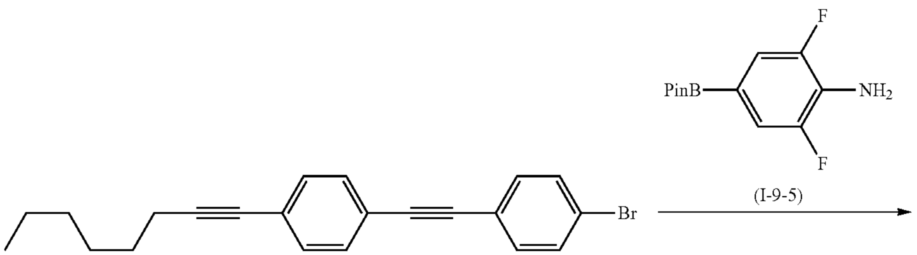
(I-9-5)
(I-9-4)
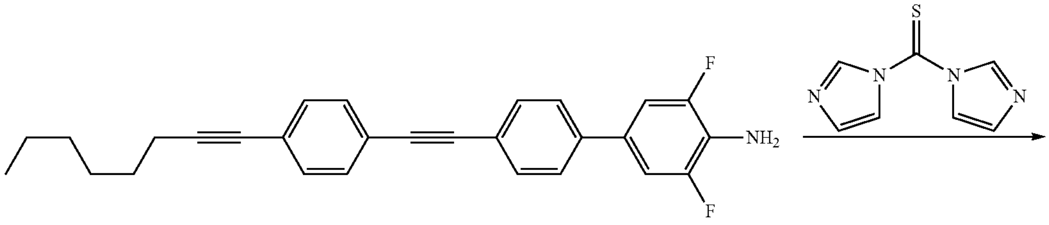
(I-9-6)
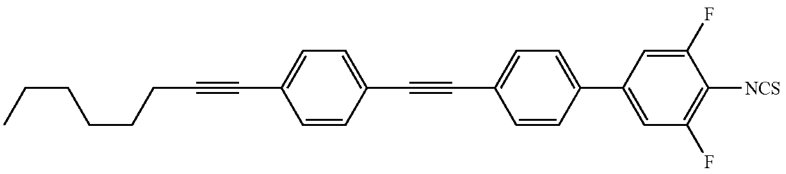
(I-9)

The compound represented by formula (I-9) was produced by the same method as in Synthesis Example 3, except that the compound represented by formula (I-3-1) was replaced by the compound represented by formula (I-9-1).
MS (EI): m/z=455
(Synthesis Example 10) Production of Compound Represented by Formula (I-10)
[Chem. 265]
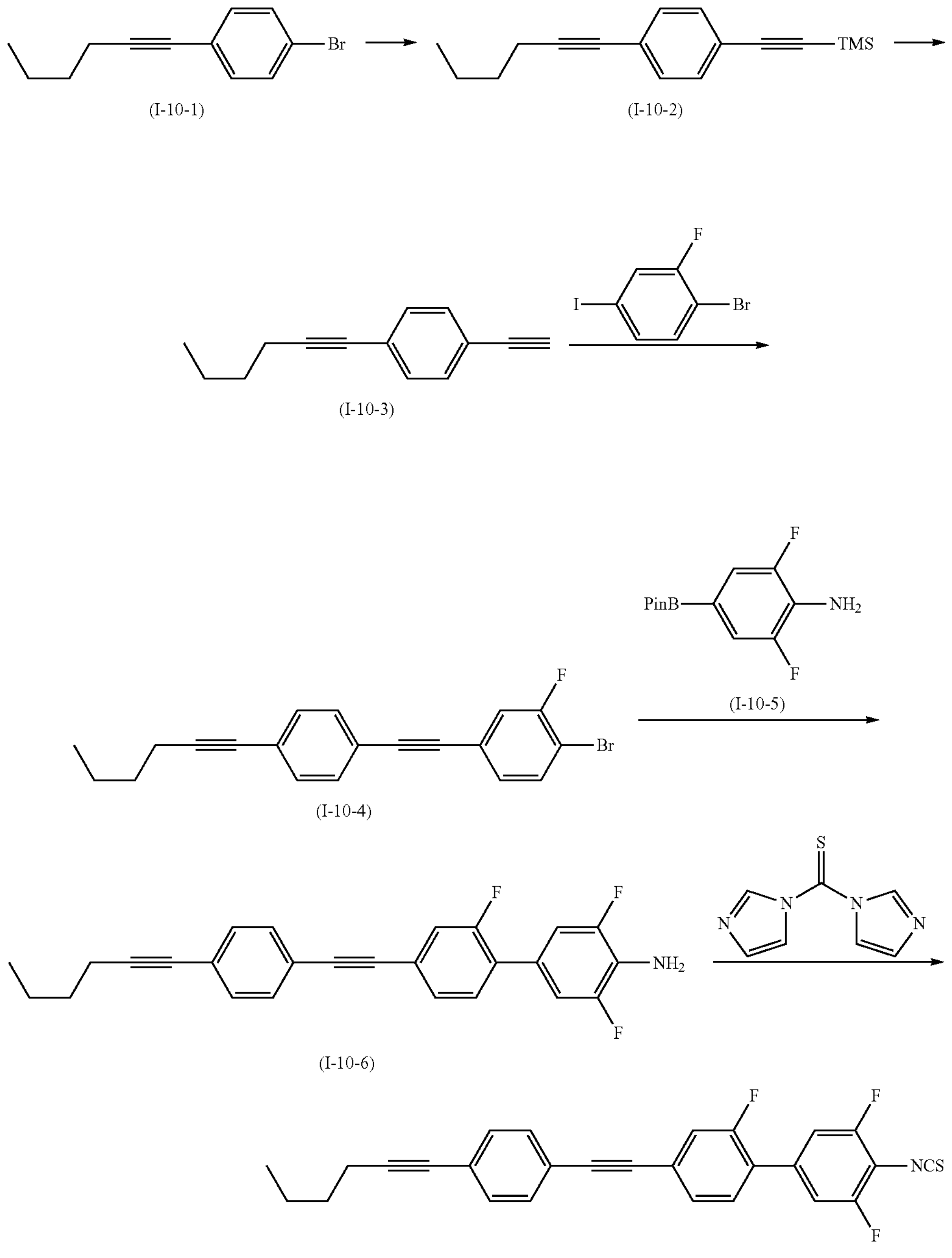
(I-10-1)
(I-10-2)
(I-10-3)
(I-10-5)
(I-10-4)
(I-10-6)
(I-10)

The compound represented by formula (I-10) was produced by the same method as in Synthesis Example 3, except that 4-bromoiodobenzene was replaced by 1-bromo-2-fluoro-4-iodobenzene.
MS (EI): m/z=445
(Synthesis Example 11) Production of Compound Represented by Formula (I-11)
[Chem. 266]
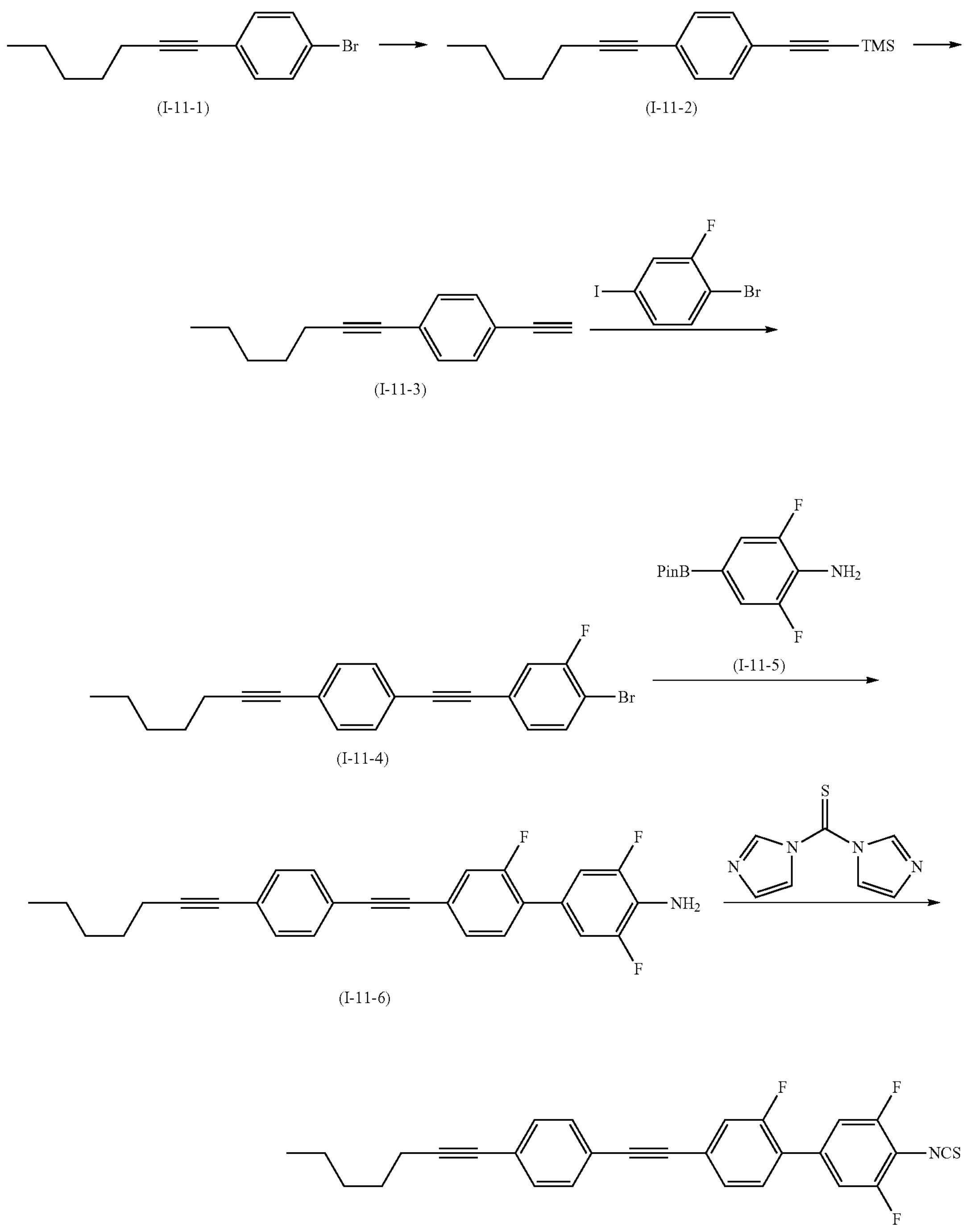
(I-11-1)
(I-11-2)
(I-11-3)
(I-11-5)
(I-11-4)
(I-11-6)
(I-11)

The compound represented by formula (I-11) was produced by the same method as in Synthesis Example 10, except that the compound represented by formula (I-10-1) was replaced by the compound represented by formula (I-11-1).

MS (EI): m/z=459

(Synthesis Example 12) Production of Compound Represented by Formula (I-12)

[Chem. 267]

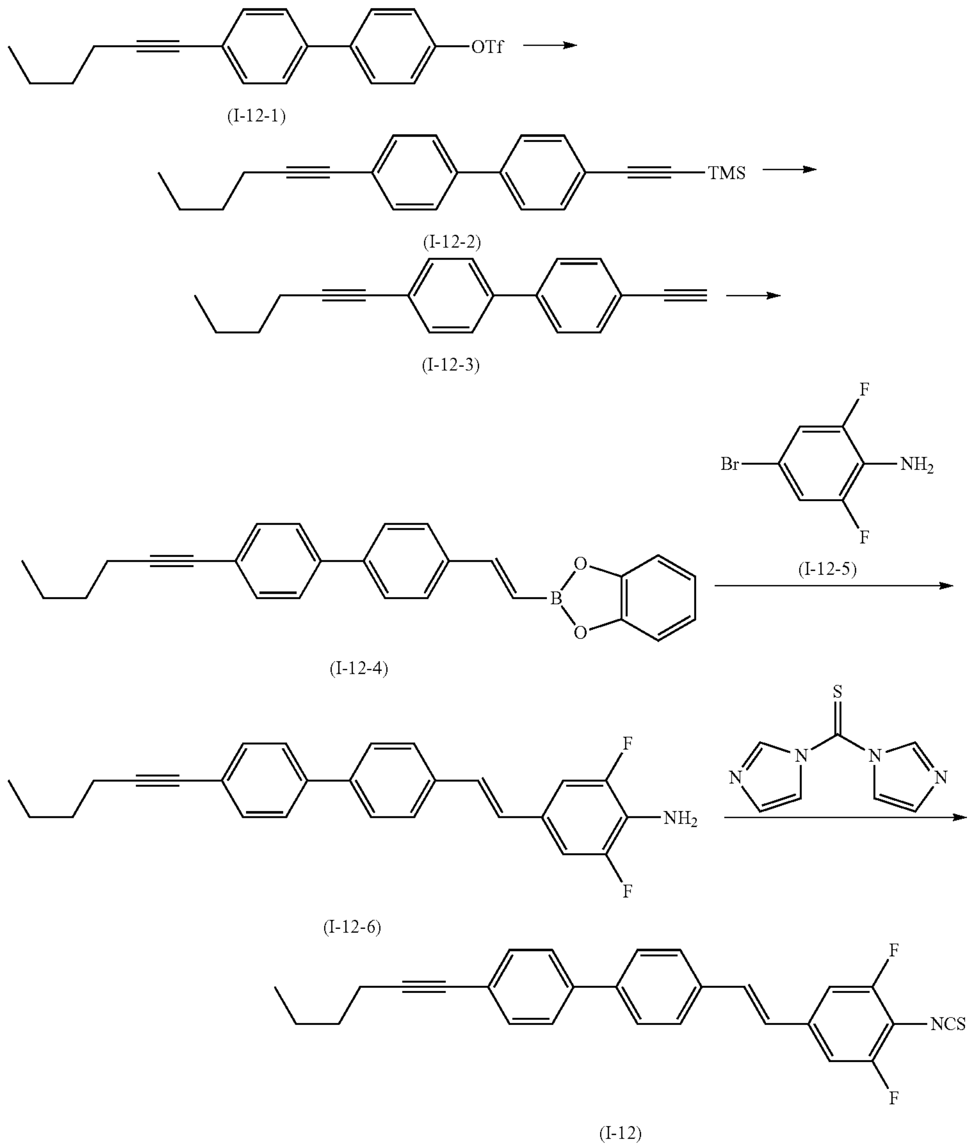

(I-12-1)

(I-12-2)

(I-12-3)

(I-12-5)

(I-12-4)

(I-12-6)

(I-12)

In a nitrogen atmosphere, 15.0 g of the compound represented by formula (I-12-1), 0.3 g of copper(I) iodide, 0.9 g of tetrakis(triphenylphosphine)palladium(0), 4.8 g of 2-aminoethanol, and 30 mL of N,N-dimethylformamide were added to a reaction vessel at room temperature. With heating at 75° C., a solution of 4.6 g of trimethylsilylacetylene dissolved in 30 mL of N,N-dimethylformamide was added dropwise, and the mixture was stirred at 75° C. for two hours. After the completion of the reaction, filtering and purification by column chromatography (silica gel, toluene/hexane=0/1 to 1/9) were performed to yield 11.7 g of the compound represented by formula (I-12-2).

Subsequently, 11.7 g of the compound represented by formula (I-12-2), 60 mL of methanol, and 1.6 g of potassium carbonate were added to a reaction vessel at room temperature, and the mixture was stirred at room temperature. After the completion of the reaction, purification was performed by column chromatography (silica gel, dichloromethane) to yield 8.4 g of the compound represented by formula (I-12-3).

Subsequently, in a nitrogen atmosphere, 8.4 g of the compound represented by formula (I-12-3), 3.9 g of catecholborane, 2.3 g of bis(triphenylphosphine)palladium(II) dichloride, and 80 mL of tetrahydrofuran were added to a reaction vessel at room temperature and heated under reflux to react for three hours. After the completion of the reaction, the reaction product was post-treated with water and extracted with ethyl acetate. The organic layer was concentrated to yield 8.2 g of the compound represented by formula (I-12-4).

Subsequently, in a nitrogen atmosphere, 8.2 g of the compound represented by formula (I-12-4), 4.3 g of the compound represented by formula (I-12-5), 0.1 g of dichlorobis[di-tert-butyl(p-dimethylaminophenyl)phosphino]palladium(II), 4.4 g of sodium carbonate, 20 mL of tetrahydrofuran, and 20 mL of water were added to a reaction vessel at room temperature, and the mixture was stirred at 75° C. for two hours. After the completion of the reaction, filtering and purification by column chromatography (silica gel, toluene) were performed to yield 6.2 g of the compound represented by formula (I-12-6).

Subsequently, in a nitrogen atmosphere, 6.2 g of the compound represented by formula (I-12-6), 30 mL of dichloromethane, and 3.0 g of 1,1-thiocarbonyldiimidazole were added to a reaction vessel at room temperature, and the mixture was stirred at room temperature for one hour. After the completion of the reaction, filtering and purification by column chromatography (silica gel, toluene) followed by recrystallization (toluene/hexane=1/1) were performed to yield 4.6 g of the compound represented by formula (I-12).

MS (EI): m/z=429

(Synthesis Example 13) Production of Compound Represented by Formula (I-13)

[Chem. 268]

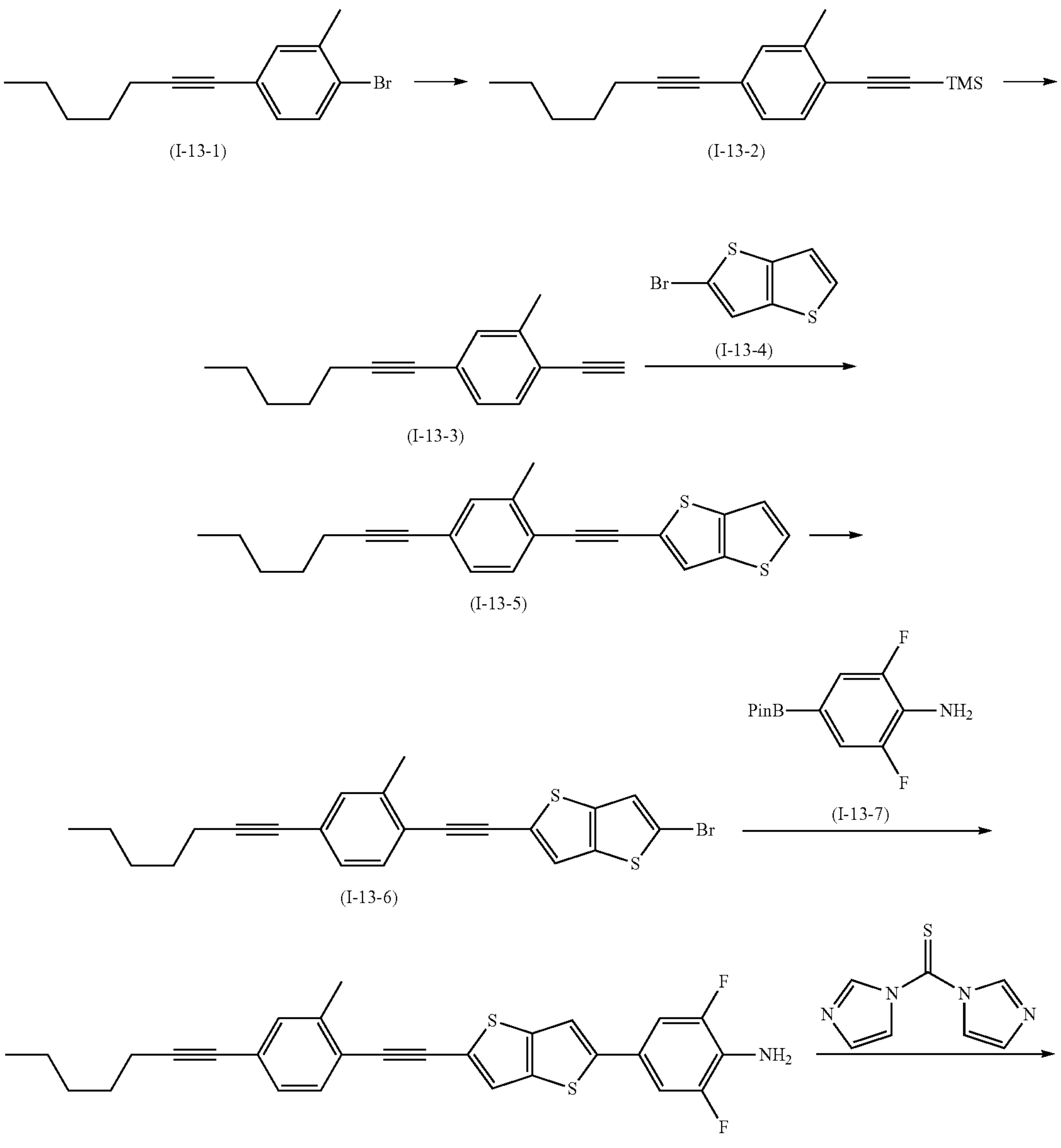

(I-13-1)

(I-13-2)

(I-13-4)

(I-13-3)

(I-13-5)

(I-13-7)

(I-13-6)

(I-13-8)

-continued
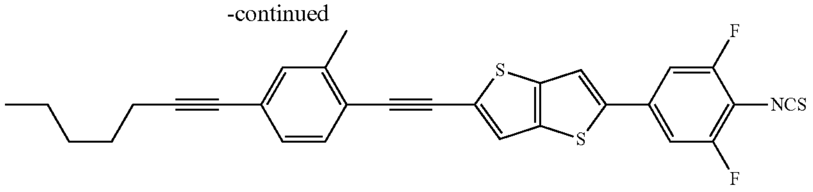
(I-13)
The compound represented by formula (I-13) was produced by the same method as in Synthesis Example 4, except that the compound represented by formula (I-4-1) was replaced by the compound represented by formula (I-13-1).
MS (EI): m/z=517
(Synthesis Example 14) Production of Compound Represented by Formula (I-14)
[Chem. 269]
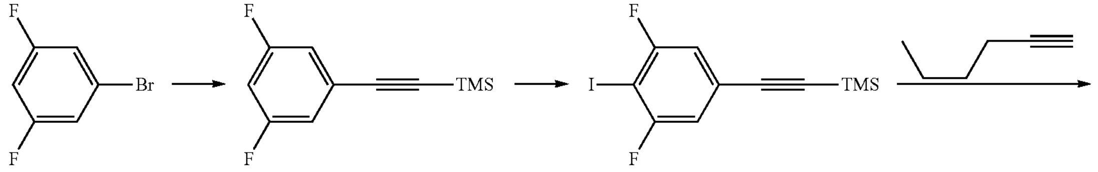
(I-14-1) (I-14-2) (I-14-3)
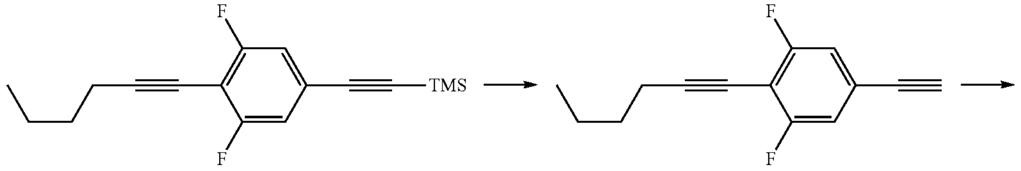
(I-14-4) (I-14-5)
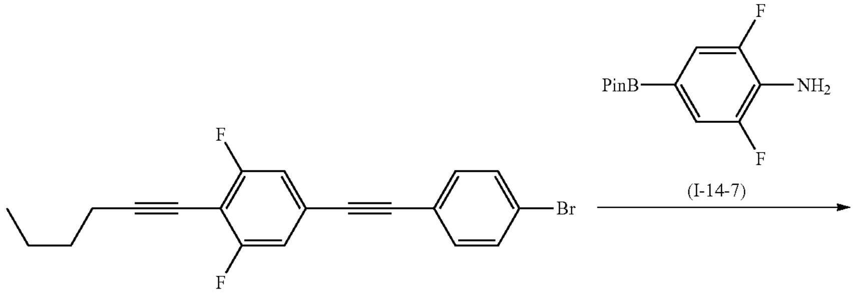
(I-14-7)
(I-14-6)
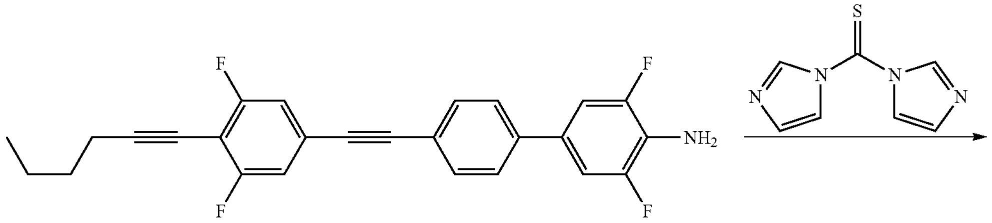
(I-14-8)

-continued

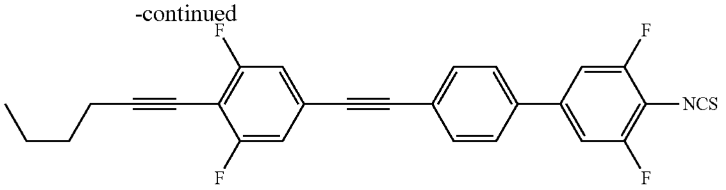

(I-14)

In a nitrogen atmosphere, 50.0 g of the compound represented by formula (I-14-1), 2.0 g of copper(I) iodide, 6.0 g of tetrakis(triphenylphosphine)palladium(0), 200 mL of triethylamine, and 100 mL of N,N-dimethylformamide were added to a reaction vessel at room temperature. Subsequently, with heating at 75° C., a solution of 30.5 g of trimethylsilylacetylene dissolved in 100 mL of N,N-dimethylformamide was added dropwise, and the mixture was stirred at 75° C. for two hours. After the completion of the reaction, a saturated ammonium chloride solution was poured into the reaction solution, which was extracted with hexane. The organic layer was washed with saturated saline and then purified by column chromatography (silica gel, ethyl acetate/hexane=0/1 to 1/9) to yield 54.1 g of the compound represented by formula (I-14-2).

Subsequently, in a nitrogen atmosphere, 10.0 g of the compound represented by formula (I-14-2) and 100 mL of tetrahydrofuran were added to a reaction vessel at room temperature. Subsequently, 22 mL of n-butyl lithium (2.6 mol/L of n-hexane solution) was added dropwise while being cooled to −78° C., and the mixture was stirred at −78° C. for one hour. Subsequently, a solution of 15.7 g of iodine dissolved in 32 mL of tetrahydrofuran was added dropwise, and the mixture was stirred at −78° C. for one hour and then stirred at room temperature for one hour. After the completion of the reaction, 10% by mass of hydrochloric acid was poured into the reaction solution, which was extracted with hexane. The organic layer was washed with saturated saline and then purified by column chromatography (silica gel, ethyl acetate/hexane=0/1 to 1/9) to yield 13.3 g of the compound represented by formula (I-14-3).

Subsequently, in a nitrogen atmosphere, 13.3 g of the compound represented by formula (I-14-3), 0.3 g of copper (I) iodide, 0.9 g of bis(triphenylphosphine)palladium(II) dichloride, 20.0 g of triethylamine, and 33 mL of tetrahydrofuran were added to a reaction vessel at room temperature. Subsequently, under stirring at 60° C., a solution of 4.9 g of 1-hexyne dissolved in 33 mL of tetrahydrofuran was added dropwise, and the mixture was stirred at 75° C. for 10 hours. After the completion of the reaction, 10% by mass of hydrochloric acid was poured into the reaction solution, which was extracted with toluene. The organic layer was washed with saturated saline and then purified by column chromatography (silica gel, ethyl acetate/hexane=0/1 to 1/9) to yield 10.3 g of the compound represented by formula (I-14-4).

Subsequently, 10.3 g of the compound represented by formula (I-14-4), 52 mL of methanol, and 1.6 g of potassium carbonate were added to a reaction vessel at room temperature, and the mixture was stirred at room temperature. After the completion of the reaction, purification was performed by column chromatography (silica gel, dichloromethane) to yield 7.0 g of the compound represented by formula (I-14-5).

Subsequently, in a nitrogen atmosphere, 5.0 g of 1-bromo-4-iodobenzene, 0.1 g of copper(I) iodide, 0.2 g of bis (triphenylphosphine)palladium(II) dichloride, 8.9 g of triethylamine, and 13 mL of tetrahydrofuran were added to a reaction vessel at room temperature. Subsequently, under stirring at room temperature, a solution of 4.2 g of the compound represented by formula (I-14-5) dissolved in 13 mL of tetrahydrofuran was added dropwise, and the mixture was stirred at room temperature for one hour. After the completion of the reaction, 10% by mass of hydrochloric acid was poured into the reaction solution, which was extracted with toluene. The organic layer was washed with saturated saline and then purified by column chromatography (silica gel, toluene/hexane=0/1 to 1/7) to yield 6.6 g of the compound represented by formula (I-14-6).

Subsequently, in a nitrogen atmosphere, 6.6 g of the compound represented by formula (I-14-6), 4.8 g of the compound represented by formula (I-14-7), 0.7 g of bis (triphenylphosphine)palladium(II) dichloride, 3.8 g of sodium carbonate, 35 mL of tetrahydrofuran, and 18 mL of water were added to a reaction vessel at room temperature, and the mixture was stirred at 75° C. for two hours. After the completion of the reaction, filtering and purification by column chromatography (amino silica gel, toluene) were performed to yield 5.3 g of the compound represented by formula (I-14-8).

Subsequently, in a nitrogen atmosphere, 5.3 g of the compound represented by formula (I-14-8), 30 mL of dichloromethane, and 2.7 g of 1,1-thiocarbonyldiimidazole were added to a reaction vessel at room temperature, and the mixture was stirred at room temperature. After the completion of the reaction, the organic layer was washed with saturated saline and purified by column chromatography (silica gel, toluene) followed by recrystallization (toluene/hexane=1/1) to yield 3.3 g of the compound represented by formula (I-14).

MS (EI): m/z=463

(Synthesis Example 15) Production of Compound Represented by Formula (I-15)
[Chem. 270]
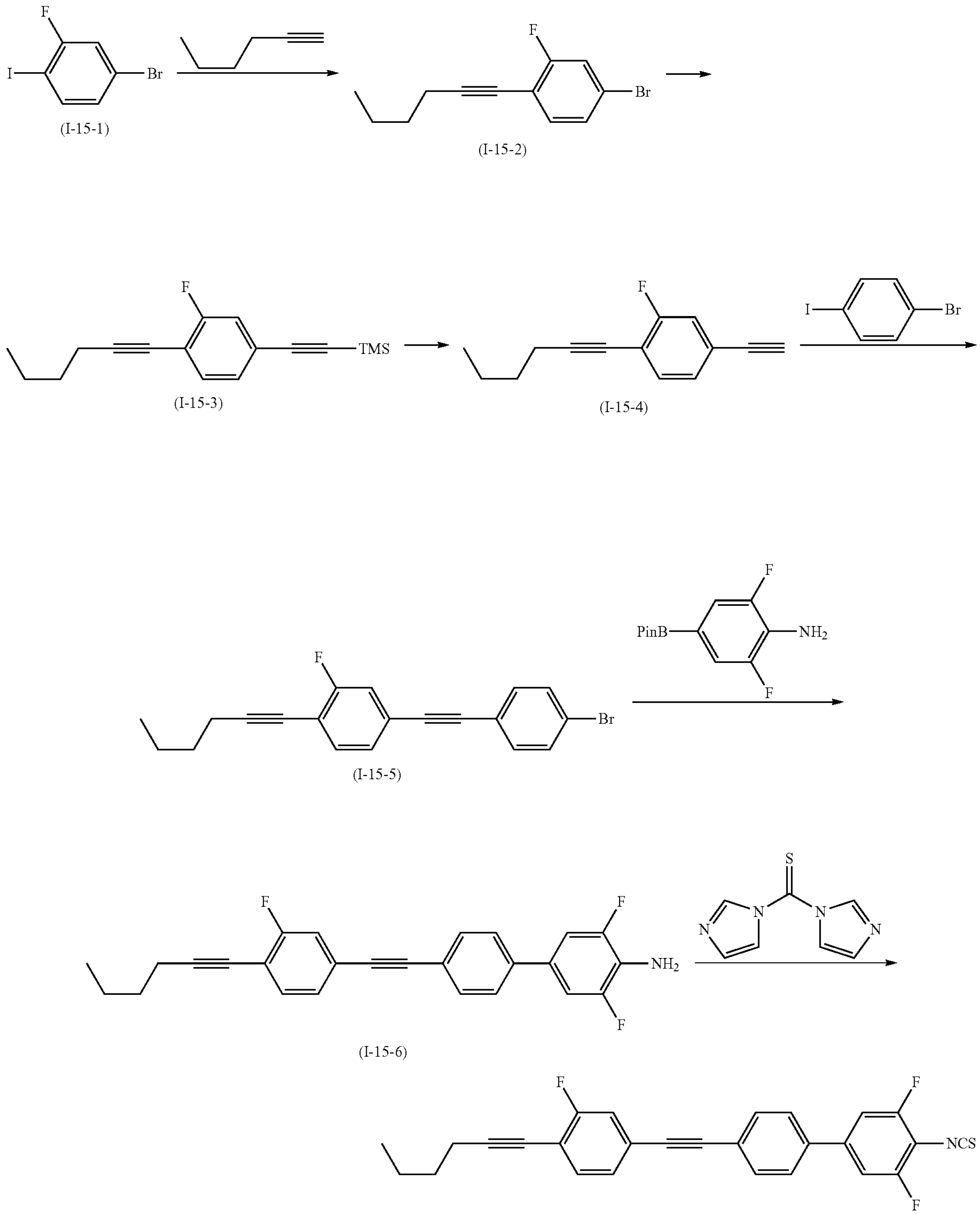
(I-15-1)
(I-15-2)
(I-15-3)
(I-15-4)
(I-15-5)
(I-15-6)
(I-15)

The compound represented by formula (I-15-2) was produced by the same method as in Synthesis Example 1, except that the compound represented by formula (I-1-1) was replaced by the compound represented by formula (I-15-1).

Subsequently, the compound represented by formula (I-15) was produced by the same method as in Synthesis Example 3, except that the compound represented by formula (I-3-1) was replaced by the compound represented by formula (I-15-2).

MS (EI): m/z=445

(Synthesis Example 16) Production of Compound Represented by Formula (I-16)

[Chem. 271]

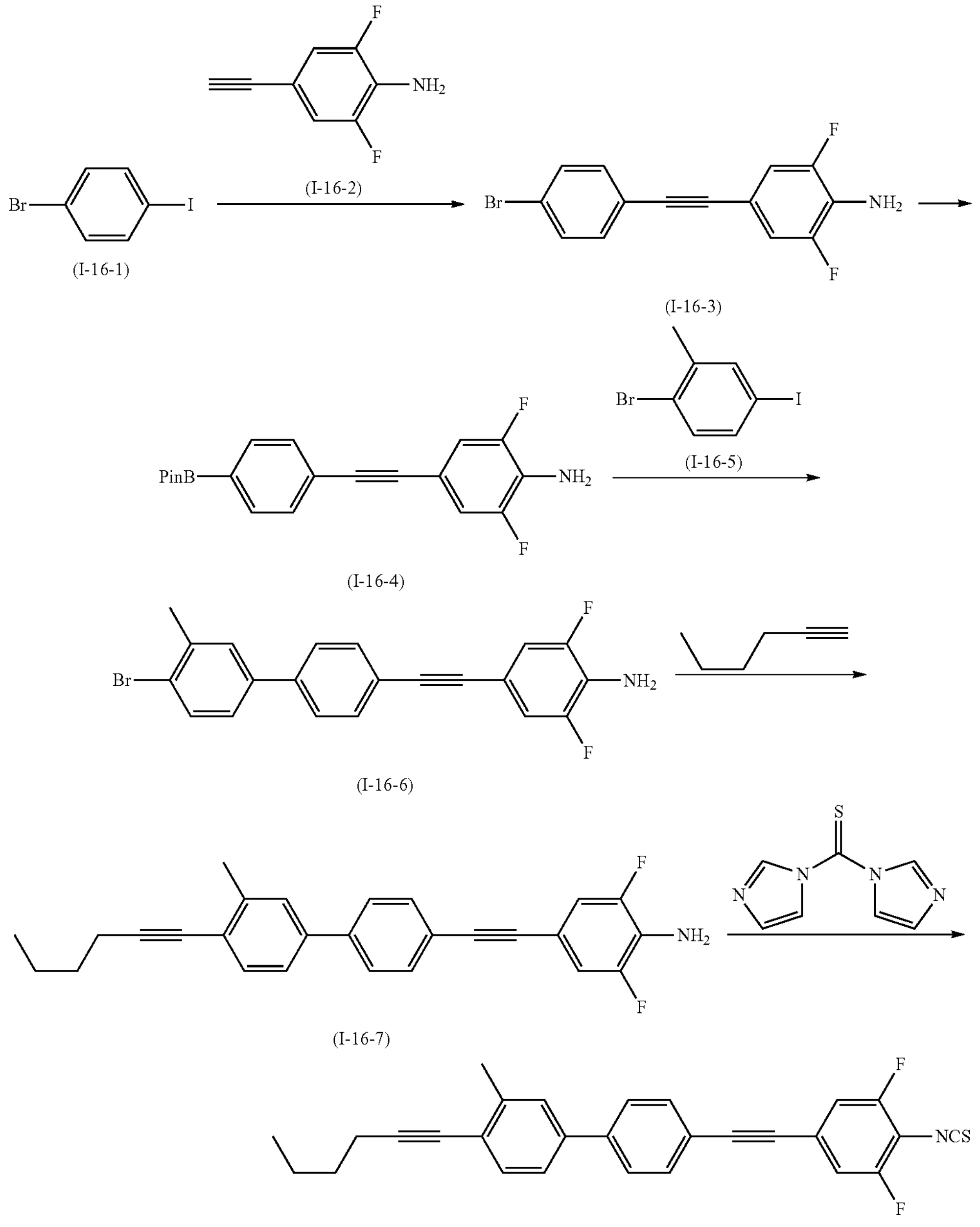

(I-16-1) (I-16-2) (I-16-3) (I-16-4) (I-16-5) (I-16-6) (I-16-7) (I-16)

In a nitrogen atmosphere, 50 g of the compound represented by formula (I-16-1), 1.4 g of copper(I) iodide, 2.5 g of bis(triphenylphosphine)palladium(II) dichloride, 53.7 g of triethylamine, and 125 mL of tetrahydrofuran were added to a reaction vessel at room temperature. Subsequently, under stirring at room temperature, a solution of 30.0 g of the compound represented by formula (I-16-2) dissolved in 125 mL of tetrahydrofuran was added dropwise, and the mixture was stirred at room temperature for one hour. After the completion of the reaction, a saturated ammonium chloride solution was poured into the reaction solution, which was extracted with toluene. The organic layer was washed with saturated saline and then purified by column chromatography (amino silica gel, toluene/hexane=1/8 to 1/0) to yield 50.3 g of the compound represented by formula (I-16-3).

Subsequently, in a nitrogen atmosphere, 42.0 g of the compound represented by formula (I-16-3), 36.3 g of bis(pinacolato)diboron, 40.1 g of potassium acetate, 2.2 g of [1,1'-bis(diphenylphosphino)ferrocene]palladium(II) dichloride dichloromethane adduct, and 420 mL of dimethyl sulfoxide were added to a reaction vessel at room temperature, and the mixture was stirred at 90° C. After the completion of the reaction, a saturated ammonium chloride solution was poured into the reaction solution, which was extracted with toluene. The organic layer was washed with saturated saline and then purified by column chromatography (alumina silica gel, toluene) to yield 36.6 g of the compound represented by formula (I-16-4).

Subsequently, in a nitrogen atmosphere, 6 g of the compound represented by formula (I-16-5), 7.5 g of the compound represented by formula (I-16-4), 0.1 g of bis(triphenylphosphine)palladium(II) dichloride, 4.3 g of sodium carbonate, 30 mL of tetrahydrofuran, and 20 mL of water were added to a reaction vessel at room temperature, and the mixture was stirred at 75° C. for two hours. After the completion of the reaction, filtering and purification by column chromatography (amino silica gel, toluene/hexane=2/3 to 1/0) were performed to yield 4.1 g of the compound represented by formula (I-16-6).

Subsequently, in a nitrogen atmosphere, 4.0 g of the compound represented by formula (I-16-6), 76 mg of copper (I) iodide, 0.2 g of tetrakis(triphenylphosphine)palladium (0), 1.2 g of 2-aminoethanol, and 10 mL of tetrahydrofuran were added to a reaction vessel at room temperature. Subsequently, with heating at 75° C., a solution of 1.2 g of 1-hexyne dissolved in 10 mL of tetrahydrofuran was added dropwise, and the mixture was stirred at 75° C. for two hours. After the completion of the reaction, a saturated ammonium chloride solution was poured into the reaction solution, which was extracted with toluene. The organic layer was washed with saturated saline and then purified by column chromatography (amino silica gel, toluene/hexane=0/1 to 1/1) to yield 3.3 g of the compound represented by formula (I-16-7).

Subsequently, in a nitrogen atmosphere, 3.3 g of the compound represented by formula (I-16-7), 17 mL of dichloromethane, and 1.8 g of 1,1-thiocarbonyldiimidazole were added to a reaction vessel at room temperature, and the mixture was stirred at room temperature. After the completion of the reaction, the organic layer was washed with saturated saline and purified by column chromatography (silica gel, toluene) followed by recrystallization (toluene/hexane=1/1) to yield 1.4 g of the compound represented by formula (I-16).

MS (EI): m/z=441

(Synthesis Example 17) Production of Compound Represented by Formula (I-17)

[Chem. 272]

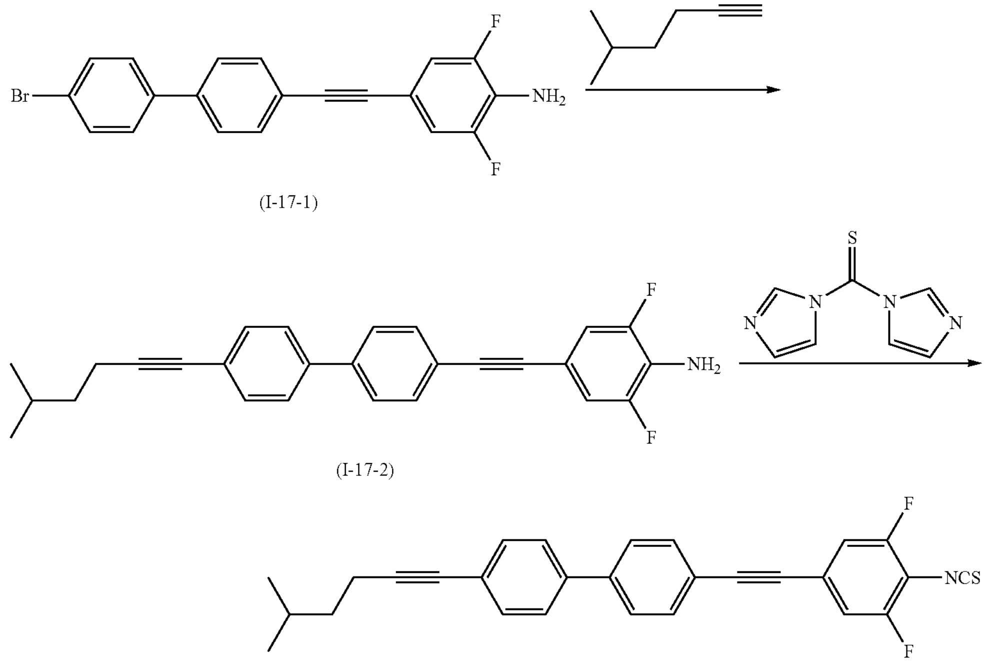

(I-17-1) (I-17-2) (I-17)

The same method was performed using 5.7 g of 1-bromo-4-iodobenzene instead of 6 g of the compound represented by formula (I-16-5) in Synthesis Example 16 to yield 3.8 g of the compound represented by formula (I-17-1).

Subsequently, in a nitrogen atmosphere, 3.8 g of the compound represented by formula (I-17-1), 76 mg of copper (I) iodide, 0.2 g of tetrakis(triphenylphosphine)palladium (0), 1.2 g of 2-aminoethanol, and 10 mL of tetrahydrofuran were added to a reaction vessel at room temperature. With heating at 75° C., a solution of 1.4 g of 5-methyl-hexyne dissolved in 10 mL of tetrahydrofuran was added dropwise, and the mixture was stirred at 75° C. for two hours. After the completion of the reaction, a saturated ammonium chloride solution was poured into the reaction solution, which was extracted with toluene. The organic layer was washed with saturated saline and then purified by column chromatography (amino silica gel, toluene/hexane=0/1 to 1/1) to yield 2.8 g of the compound represented by formula (I-17-2).

Subsequently, in a nitrogen atmosphere, 2.8 g of the compound represented by formula (I-17-2), 17 mL of dichloromethane, and 1.5 g of 1,1-thiocarbonyldiimidazole were added to a reaction vessel at room temperature, and the mixture was stirred at room temperature. After the completion of the reaction, the organic layer was washed with saturated saline and purified by column chromatography (silica gel, toluene) followed by recrystallization (toluene/hexane=1/1) to yield 2.2 g of the compound represented by formula (I-17).

MS(EI): m/z=441

(Synthesis Example 18) Production of Compound Represented by Formula (I-18)

[Chem. 273]

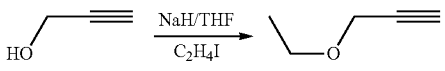

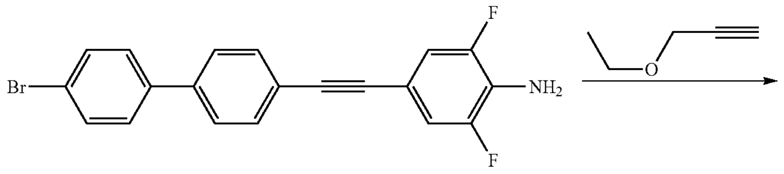

(I-18-1)

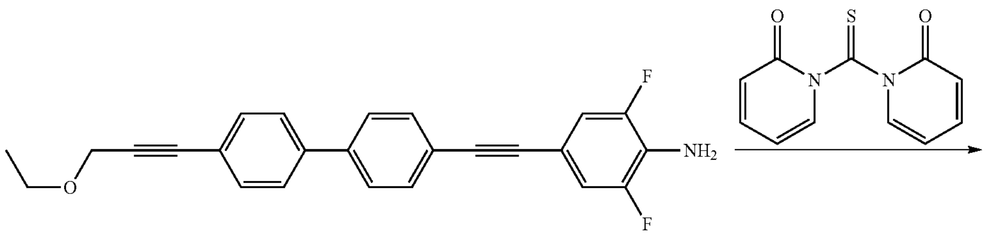

(I-18-2)

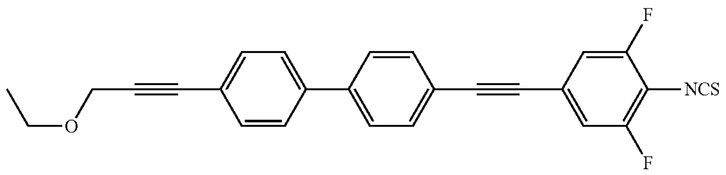

(I-18)

In a nitrogen atmosphere, 2.4 g of sodium hydride and 40 mL of tetrahydrofuran were added, and the reaction vessel was kept at 10° C. or lower. Next, a 10-mL solution of 5.6-g propargyl alcohol in tetrahydrofuran was slowly added dropwise, and after dropping was completed, the reaction was allowed at a temperature kept at 10° C. or lower for one hour. A 30-mL solution of 20-g ethyl iodide in tetrahydrofuran was further slowly added dropwise. After dropping was completed, the reaction vessel was brought back to room temperature and the reaction was allowed for two hours. Subsequently, with the reaction vessel kept at 10° C. or lower, 50 mL of 5% by mass hydrochloric acid was slowly added dropwise for neutralization. The reaction solution was extracted with ethyl acetate and the organic layer was washed with water and saturated saline, and then the organic solvent was removed to yield 8 g of 3-ethoxyprop-1-yne.

Then, 3.8 g of the compound represented by formula (I-18-1) was produced by the same method using 5.7 g of 4-iodo-1-bromobenzene instead of 6 g of the compound represented by formula (I-16-5) in Synthesis Example 16.

Subsequently, in a nitrogen atmosphere, 3.8 g of the compound represented by formula (I-18-1), 76 mg of copper (I) iodide, 0.2 g of tetrakis(triphenylphosphine)palladium (0), 1.2 g of 2-aminoethanol, and 10 mL of tetrahydrofuran were added to a reaction vessel at room temperature. Subsequently, with heating at 75° C., a solution of 1.1 g of 3-ethoxyprop-1-yne dissolved in 10 mL of tetrahydrofuran was added dropwise, and the mixture was stirred at 75° C. for two hours. After the completion of the reaction, a saturated ammonium chloride solution was poured into the reaction solution, which was extracted with toluene. The organic layer was washed with saturated saline and then purified by column chromatography (amino silica gel, toluene/hexane=0/1 to 1/1) to yield 2.3 g of the compound represented by formula (I-18-2).

Subsequently, in a nitrogen atmosphere, 2.3 g of the compound represented by formula (I-18-2), 17 mL of dichloromethane, and 1.7 g of 1,1'-thiocarbonyl-di-2(1H)-pyridone were added to a reaction vessel at room temperature, and the mixture was stirred at room temperature. After the completion of the reaction, the organic layer was washed with saturated saline and purified by column chromatography (silica gel, toluene) followed by recrystallization (toluene/hexane=1/1) to yield 2.0 g of the compound represented by formula (I-18).

MS(EI): m/z=429

(Synthesis Example 19) Production of Compound Represented by Formula (I-19)

[Chem. 274]

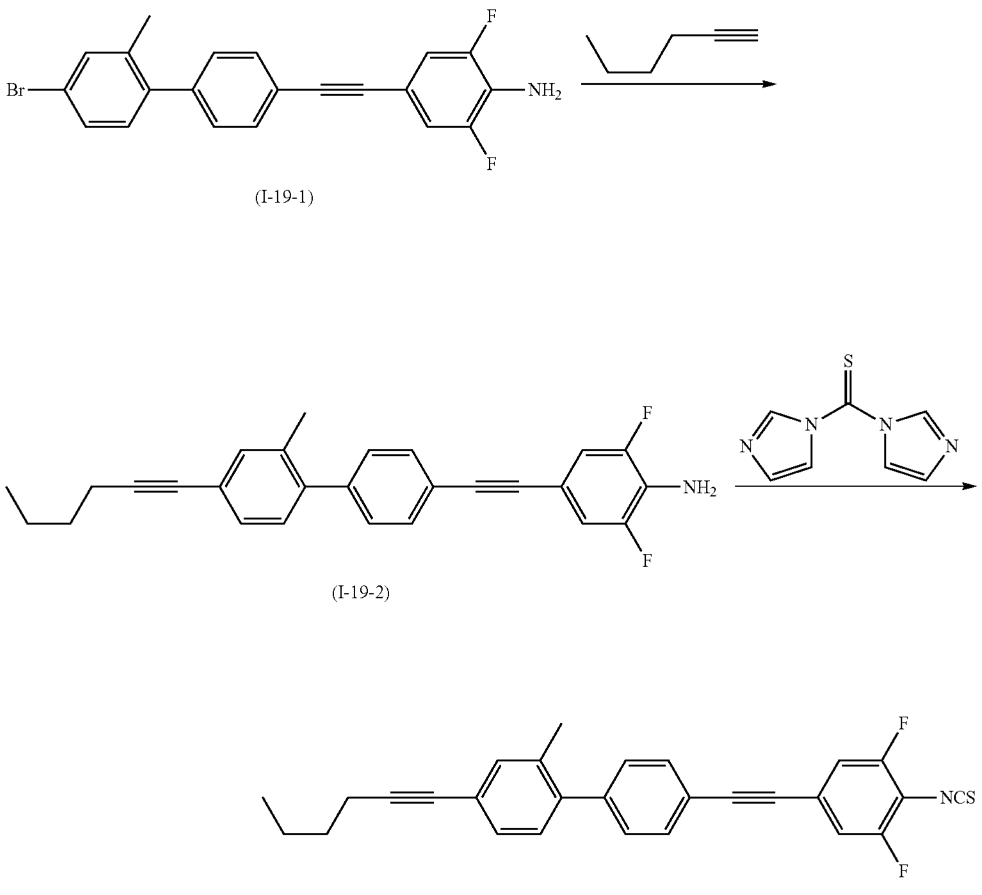

(I-19-1)

(I-19-2)

(I-19)

The same method was performed using 6 g of 4-bromo-1-iodo-2-methylbenzene instead of 6 g of (I-16-5) in Synthesis Example 16 to yield 3.5 g of the compound represented by formula (I-19-1).

Subsequently, in a nitrogen atmosphere, 3.5 g of the compound represented by formula (I-17-1), 76 mg of copper (I) iodide, 0.2 g of tetrakis(triphenylphosphine)palladium (0), 1.1 g of 2-aminoethanol, and 10 mL of tetrahydrofuran were added to a reaction vessel at room temperature. Subsequently, with heating at 75° C., a solution of 1.3 g of 5-methyl-hexyne dissolved in 10 mL of tetrahydrofuran was added dropwise, and the mixture was stirred at 75° C. for two hours. After the completion of the reaction, a saturated ammonium chloride solution was poured into the reaction solution, which was extracted with toluene. The organic layer was washed with saturated saline and then purified by column chromatography (amino silica gel, toluene/hexane=0/1 to 1/1) to yield 2.6 g of the compound represented by formula (I-19-2).

Subsequently, in a nitrogen atmosphere, 2.6 g of the compound represented by formula (I-19-2), 17 mL of dichloromethane, and 1.5 g of 1,1-thiocarbonyldiimidazole were added to a reaction vessel at room temperature, and the mixture was stirred at room temperature. After the completion of the reaction, the organic layer was washed with saturated saline and purified by column chromatography (silica gel, toluene) followed by recrystallization (toluene/hexane=1/1) to yield 2.0 g of the compound represented by formula (I-19).

MS(EI): m/z=441

(Synthesis Example 20) Production of Compound Represented by Formula (I-20)

[Chem. 275]

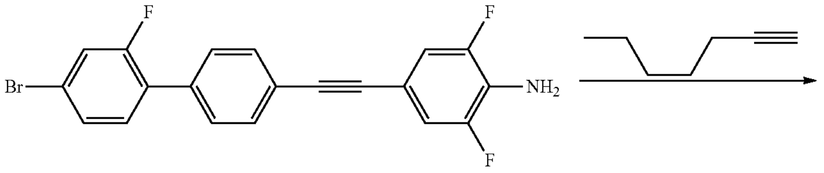

(I-20-1)

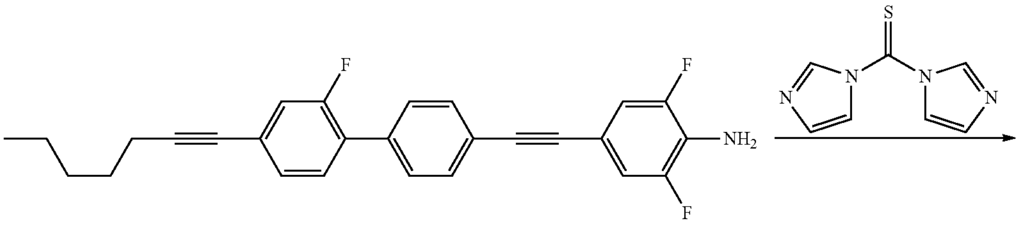

(I-20-2)

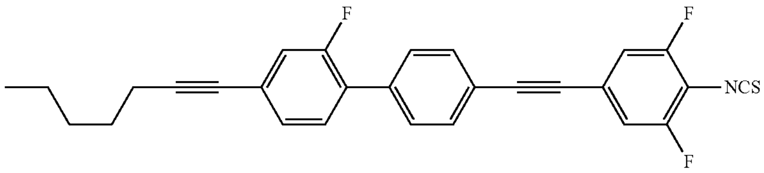

(I-20)

The same method was performed using 6.2 g of 4-bromo-2-fluoro-1-iodobenzene instead of 6 g of the compound represented by formula (I-16-5) in Synthesis Example 16 to yield 4.3 g of the compound represented by formula (I-20-1).

Subsequently, in a nitrogen atmosphere, 4.3 g of the compound represented by formula (I-20-1), 76 mg of copper (I) iodide, 0.2 g of tetrakis(triphenylphosphine)palladium (0), 1.2 g of 2-aminoethanol, and 10 mL of tetrahydrofuran were added to a reaction vessel at room temperature. Subsequently, with heating at 75° C., a solution of 1.5 g of 1-heptyne dissolved in 10 mL of tetrahydrofuran was added dropwise, and the mixture was stirred at 75° C. for two hours. After the completion of the reaction, a saturated ammonium chloride solution was poured into the reaction solution, which was extracted with toluene. The organic layer was washed with saturated saline and then purified by column chromatography (amino silica gel, toluene/hexane=0/1 to 1/1) to yield 3.4 g of the compound represented by formula (I-20-2).

Subsequently, in a nitrogen atmosphere, 3.4 g of the compound represented by formula (I-20-2), 17 mL of dichloromethane, and 1.9 g of 1,1-thiocarbonyldiimidazole were added to a reaction vessel at room temperature, and the mixture was stirred at room temperature. After the completion of the reaction, the organic layer was washed with saturated saline and purified by column chromatography (silica gel, toluene) followed by recrystallization (toluene/hexane=1/1) to yield 1.6 g of the compound represented by formula (I-20).

MS (EI): m/z=459

INDUSTRIAL APPLICABILITY

The compounds and the liquid crystal composition of the present invention can be used for liquid crystal display elements, sensors, liquid crystal lenses, optical communication devices, and antennas.

The invention claimed is:

1. A liquid crystal composition comprising at least one compound represented by general formula (i):

$$R^{i1}-A^{i1}-Z^{i1}-A^{i2}\left(Z^{i2}-A^{i3}\right)_{n^{i1}}NCS \qquad (i)$$

in general formula (i), $R^{i1}$ represents an alkynyl group represented by formula ($R^{i1}$-A):

($R^{i1}$-A)

in general formula ($R^{i1}$-A), $R^{i1A}$ represents an alkyl group having 1 to 18 carbon atoms, at least one —$CH_2$— in the alkyl group is optionally substituted with —O—, —S—, —CO—, and/or —CS—, at least one —$CH_2$—$CH_2$— in the alkyl group is optionally substituted with —CO—O—, —O—CO—, —CO—S—, —S—CO—, —CO—NH—, —NH—CO—, —CH═CH—, —CF═CF—, and/or —C≡C—, at least one —$CH_2$—$CH_2$—$CH_2$— in the alkyl group is optionally substituted with —O—CO—O—, and at least one hydrogen atom in the alkyl group is optionally substituted with a halogen atom, where oxygen atoms are not directly bonded to each other, and black dot represents a bond with $A^{i1}$, $A^{i1}$ represents a group selected from the group consisting of the following groups (b), (c), and (d):

(b) a 1,4-phenylene group, wherein one —CH═ or two or more —CH═'s in this group are optionally substituted with —N═, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group, wherein one —CH═ or two or more non-adjacent —CH═'s in this group are optionally substituted with —N═, $A^{i2}$ and $A^{i3}$ each independently represent a group selected from the group consisting of the following groups (a), (b), (c), and (d):

(a) a 1,4-cyclohexylene group, wherein one —$CH_2$— or two or more non-adjacent —$CH_2$—'s in this group are optionally substituted with —O— and/or —S—, (b) a 1,4-phenylene group, wherein one —CH═ or two or more —CH═'s in this group are optionally substituted with —N═, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group, wherein one —CH═ or two or more non-adjacent —CH═'s in this group are optionally substituted with —N═, wherein at least one hydrogen atom in $A^{i1}$, $A^{i2}$, and $A^{i3}$ is optionally substituted with a substituent $S^{i1}$, the substituent $S^{i1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, at least one $—CH_2—$ in the alkyl group is optionally substituted with —O—, —S—, and/or —CO—, at least one $—CH_2—CH_2—$ in the alkyl group is optionally substituted with —CH═CH—, —CF═CF—, —C≡C—, —CO—O—, —O—CO—, —CO—S—, —S—CO—, —CO—NH—, and/or —NH—CO—, at least one $—CH_2—CH_2—CH_2—$ in the alkyl group is optionally substituted with —O—CO—O—, and at least one hydrogen atom in the alkyl group is optionally substituted with a halogen atom, where oxygen atoms are not directly bonded to each other, a plurality of substituents $S^{i1}$, if present, are optionally the same or different, and $Z^{i1}$ and $Z^{i2}$ each independently represent a single bond or an alkylene group having 1 to 20 carbon atoms, wherein at least one $—CH_2—$ in the alkylene group is optionally substituted with —O—, $—CF_2—$, and/or —CO—, and at least one $—CH_2—CH_2—$ in the alkylene group is optionally substituted with $—CH_2—CH(CH_3)—$, $—CH(CH_3)—CH_2—$, —CH═CH—, —CF═CF—, $—CH═C(CH_3)—$, $—C(CH_3)═CH—$, —CH═N—, —N═CH—, —N═N—, —C≡C—, —CO—O—, and/or —O—CO—, where oxygen atoms are not directly bonded to each other, and $n^{i1}$ represents an integer of 1.

2. The liquid crystal composition according to claim 1, wherein the compound represented by general formula (i) is selected from the group consisting of compounds represented by general formulae (i-2) to (i-5):

$$R^{i1}-A^{i1}-C\equiv C-A^{i2}-A^{i3}-NCS \quad \text{(i-2)}$$

$$R^{i1}-A^{i1}-A^{i2}-C\equiv C-A^{i3}-NCS \quad \text{(i-3)}$$

$$R^{i1}-A^{i1}-C\equiv C-A^{i2}-C\equiv C-A^{i3}-NCS \quad \text{(i-4)}$$

$$R^{i1}-A^{i1}-A^{i2}-C\equiv C-A^{i3}-NCS \quad \text{(i-5)}$$

in general formulae (i-2) to (i-5), $R^{i1}$, $A^{i1}$, $A^{i2}$, and $A^{i3}$ have the same meaning as $R^{i1}$, $A^{i1}$, $A^{i2}$, and $A^{i3}$, respectively, in general formula (i).

3. The liquid crystal composition according to claim 2, further comprising at least one compound represented by general formula (ii):

$$R^{ii1}-\left(A^{ii1}-Z^{ii1}\right)_{n^{ii1}}-A^{ii2}-NCS \quad \text{(ii)}$$

in general formula (ii), $R^{ii1}$ represents an alkyl group having 1 to 20 carbon atoms, wherein at least one $—CH_2—$ in the alkyl group is optionally substituted with —O—, —S—, —CO—, and/or —CS—, at least one $—CH_2—CH_2—$ in the alkyl group is optionally substituted with —CH═CH—, —CO—O—, —O—CO—, —CO—S—, —S—CO—, —CO—NH—, —NH—CO—, and/or —CF═CF—, at least one $—CH_2—CH_2—CH_2—$ in the alkyl group is optionally substituted with —O—CO—O—, and at least one hydrogen atom in the alkyl group is optionally substituted with a halogen atom, where oxygen atoms are not directly bonded to each other, and $A^{ii1}$ and $A^{ii2}$ each independently represent a group selected from the group consisting of the following groups (a), (b), (c), and (d):

(a) a 1,4-cyclohexylene group, wherein one $—CH_2—$ or two or more non-adjacent $—CH_2—$'s in this group are optionally substituted with —O— and/or —S—, (b) a 1,4-phenylene group, wherein one —CH═ or two or more —CH═'s in this group are optionally substituted with —N═, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group, wherein one —CH═ or two or more —CH═'s in this group are optionally substituted with —N═, wherein at least one hydrogen atom in $A^{ii1}$ and $A^{ii2}$ is optionally substituted with a substituent $S^{ii1}$, the substituent $S^{ii1}$ represents a halogen atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, at least one $—CH_2—$ in the alkyl group is optionally substituted with —O—, —S—, —CO—, and/or —CS—, at least one $—CH_2—CH_2—$ in the alkyl group is optionally substituted with —CO—O—, —O—CO—, —CO—S—, —S—CO—, —CO—NH—, —NH—CO—, —CH═CH—, and/or —CF═CF—, at least one $—CH_2—CH_2—CH_2—$ in the alkyl group is optionally substituted with —O—CO—O—, and at least one hydrogen atom in the alkyl group a is optionally substituted with a halogen atom, where oxygen atoms are not directly bonded to each other, a plurality of substituents $S^{ii1}$, if present, are optionally the same or different, and $Z^{ii1}$ represents a single bond or an alkylene group having 1 to 20 carbon atoms, wherein at least one —$CH_2$— in the alkylene group is optionally substituted with —O—, at least one —$CH_2$—$CH_2$— in the alkylene group is optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—, at least one —$CH_2$—$CH_2$—$CH_2$— in the alkylene group is optionally substituted with —O—CO—O—, oxygen atoms are not directly bonded to each other, $n^{ii1}$ represents an integer of 1 to 2, and a plurality of $A^{ii1}$s and $Z^{ii1}$s, if present, are optionally the same or different from each other.

4. The liquid crystal composition according to claim 3, wherein the compound represented by general formula (ii) is selected from the group consisting of compounds represented by general formulae (ii-1) to (ii-7):

$$R^{ii1}-A^{ii1}-\equiv-A^{ii2}-NCS \quad \text{(ii-1)}$$

$$R^{ii1}-A^{ii1}-\equiv-A^{ii2}-NCS \quad \text{(ii-2)}$$

$$R^{ii1}-A^{ii1}-A^{ii1\text{-}2}-\equiv-A^{ii2}-NCS \quad \text{(ii-3)}$$

$$R^{ii1}-A^{ii1}-\equiv-A^{ii1\text{-}2}-\equiv-A^{ii2}-NCS \quad \text{(ii-4)}$$

$$R^{ii1}-A^{ii1}-A^{ii1\text{-}2}-A^{ii2}-NCS \quad \text{(ii-5)}$$

$$R^{ii1}-A^{ii1}-\equiv-A^{ii1\text{-}2}-A^{ii2}-NCS \quad \text{(ii-6)}$$

$$R^{ii1}-A^{ii1}-\equiv-A^{ii1\text{-}2}-=-A^{ii2}-NCS \quad \text{(ii-7)}$$

in general formulae (ii-1) to (ii-7), $R^{ii1}$, $A^{ii1}$, and $A^{ii2}$ have the same meaning as $R^{ii1}$, $A^{ii1}$, and $A^{ii2}$, respectively, in general formula (ii), and in general formulae (ii-3) to (ii-7), the definition of $A^{ii1\text{-}22}$ is the same as the definition of $A^{ii1}$ in general formula (ii).

5. The liquid crystal composition according to claim 1, further comprising at least one compound represented by general formula (vi):

$$R^{vi1}-A^{vi1}-\equiv-A^{vi2}-\left[Z^{vi1}-A^{vi3}\right]_{n^{vi1}}-R^{vi2} \quad \text{(vi)}$$

in general formula (vi), $R^{vi1}$ represents a hydrogen atom or an alkyl group having 1 to 20 carbon atoms, wherein at least one —$CH_2$— in the alkyl group is optionally substituted with —O—, —S—, —CO—, and/or —CS—, at least one —$CH_2$—$CH_2$— in the alkyl group is optionally substituted with —CO—O—, —O—CO—, —CO—S—, —S—CO—, —CO—NH—, —NH—CO—, —CH═CH—, —CF═CF—, and/or —C≡C—, at least one —$CH_2$—$CH_2$—$CH_2$— in the alkyl group is optionally substituted with —O—CO—O—, and at least one hydrogen atom in the alkyl group is optionally substituted with a halogen atom, where oxygen atoms are not directly bonded to each other, and $R^{vi2}$ represents a hydrogen atom, a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, or an alkyl group having 1 to 20 carbon atoms, wherein at least one —$CH_2$— in the alkyl group is optionally substituted with —O—, —S—, —CO—, and/or —CS—, at least one —$CH_2$—$CH_2$— in the alkyl group is optionally substituted with —CO—O—, —O—CO—, —CO—S—, —S—CO—, —CO—NH—, —NH—CO—, —CH═CH—, —CF═CF—, and/or —C≡C—, at least one —$CH_2$—$CH_2$—$CH_2$— in the alkyl group is optionally substituted with —O—CO—O—, and at least one hydrogen atom in the alkyl group is optionally substituted with a halogen atom, where oxygen atoms are not directly bonded to each other, and $A^{vi1}$, $A^{vi2}$, and $A^{vi3}$ each independently represent a hydrocarbon ring having 3 to 16 carbon atoms or a hetero ring having 3 to 16 carbon atoms, wherein at least one hydrogen atom in $A^{vi1}$, $A^{vi2}$, and $A^{vi3}$ is optionally substituted with a substituent $S^{vi1}$, the substituent $S^{vi1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, at least one —$CH_2$— in the alkyl group is optionally substituted with —O—, —S—, and/or —CO—, at least one —$CH_2$—$CH_2$— in the alkyl group is optionally substituted with —CH═CH—, —CF═CF—, —C≡C—, —CO—O—, —O—CO—, —CO—S—, —S—CO—, —CO—NH—, and/or —NH—CO—, at least one —$CH_2$—$CH_2$—$CH_2$— in the alkyl group is optionally substituted with —O—CO—O—, and at least one hydrogen atom in the alkyl group is optionally substituted with a halogen atom, where oxygen atoms are not directly bonded to each other, a plurality of substituents $S^{vi1}$, if present, are optionally the same or different, and $Z^{vi1}$ each independently represents a single bond or an alkylene group having 1 to 20 carbon atoms, wherein at least one —$CH_2$— in the alkylene group is optionally substituted with —O—, —$CF_2$—, and/or —CO—, at least one —$CH_2$—$CH_2$— in the alkylene group is optionally substituted with —$CH_2$—$CH(CH_3)$—, —$CH(CH_3)$—$CH_2$—, —CH═CH—, —CF═CF—, —CH═$C(CH_3)$—, —$C(CH_3)$═CH—, —CH═N—, —N═CH—, —N═N—, —C≡C—, —CO—O—, and/or —O—CO—, and at least one —$CH_2$—$CH_2$—$CH_2$— in the alkylene group is optionally substituted with —O—CO—O—, where oxygen atoms are not directly bonded to each other, $n^{vi1}$ represents an integer of 1 to 3, and a plurality of $A^{vi1}$s and $Z^{vi1}$s, if present, are optionally the same or different from each other.

6. The liquid crystal composition according to claim 1, further comprising at least one compound represented by general formula (vii):

$$R^{vii1}-A^{vii1}-C\equiv C-A^{vii2}-N=N-A^{vii3}-R^{vii2} \quad \text{(vii)}$$

in general formula (vii), $R^{vii1}$ and $R^{vii2}$ each independently represent a halogen atom, a cyano group, or an alkyl group having 1 to 20 carbon atoms, wherein at least one —$CH_2$— in the alkyl group is optionally substituted with —O—, —S—, —CO—, and/or —CS—, at least one —$CH_2$—$CH_2$— in the alkyl group is optionally substituted with —CO—O—, —O—CO—, —CO—S—, —S—CO—, —CO—NH—, —NH—CO—, —CH═CH—, —CF═CF—, and/or —C≡C—, at least one —$CH_2$—$CH_2$—$CH_2$— in the alkyl group is optionally substituted with —O—CO—O—, and at least one hydrogen atom in the alkyl group is optionally substituted with a halogen atom, where oxygen atoms are not directly bonded to each other, $A^{vii1}$, $A^{vii2}$, and $A^{vii3}$ each independently represent a group selected from the group consisting of the following groups (a), (b), and (c):

(a) a 1,4-cyclohexylene group, wherein one —$CH_2$— or two or more non-adjacent —$CH_2$—'s in this group are optionally substituted with —O—, (b) a 1,4-phenylene group, wherein one —CH═ or two or more —CH═'s in this group are optionally substituted with —N═, and (c) a naphthalene-1,4-diyl group, a naphthalene-2,6-diyl group, a 1,2,3,4-tetrahydronaphthalene-2,6-diyl group, or a decahydronaphthalene-2,6-diyl group, wherein one —CH═ or two or more —CH═'s in the naphthalene-1,4-diyl group, naphthalene-2,6-diyl group, or 1,2,3,4-tetrahydronaphthalene-2,6-diyl group are optionally substituted with —N═, wherein at least one hydrogen atom in the groups (a), (b), and (c) is optionally substituted with a halogen atom, a cyano group, or an alkyl group having 1 to 6 carbon atoms.

7. The liquid crystal composition according to claim 1, further comprising at least one compound represented by general formula (v):

$$R^{v1}-\left[A^{v1}-Z^{v1}\right]_{n^{v1}}-A^{v2}-CN \quad \text{(v)}$$

in general formula (v), $R^{v1}$ represents an alkyl group having 1 to 20 carbon atoms, wherein at least one —$CH_2$— in the alkyl group is optionally substituted with —O—, —S—, —CO—, and/or —CS—, at least one —$CH_2$—$CH_2$— in the alkyl group is optionally substituted with —CH═CH—, —CO—O—, —O—CO—, and/or —C≡C—, and at least one hydrogen atom in the alkyl group is optionally substituted with a halogen atom, where oxygen atoms are not directly bonded to each other, $A^{v1}$ and $A^{v2}$ each independently represent a group selected from the group consisting of the following groups (a), (b), (c), and (d):

(a) a 1,4-cyclohexylene group, wherein one —$CH_2$— or two or more non-adjacent —$CH_2$—'s in this group are optionally substituted with —O— and/or —S—, (b) a 1,4-phenylene group, wherein one —CH═ or two or more —CH═'s in this group are optionally substituted with —N═, (c) a naphthalene-2,6-diyl group, a 1,2,3,4-tetrahydronaphthalene-2,6-diyl group, or a decahydronaphthalene-2,6-diyl group, wherein one —CH═ or two or more —CH═'s in the naphthalene-2,6-diyl group or 1,2,3,4-tetrahydronaphthalene-2,6-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, wherein one —CH═ or two or more —CH═'s in this group are optionally substituted with —N═, wherein at least one hydrogen atom in $A^{v1}$ and $A^{v2}$ is optionally substituted with a substituent $S^{v1}$, the substituent $S^{v1}$ represents a halogen atom, a cyano group, or an alkyl group having 1 to 6 carbon atoms, at least one —$CH_2$— in the alkyl group is optionally substituted with —O—, —S—, —CO—, and/or —CS—, and at least one hydrogen atom in the alkyl group is optionally substituted with a halogen atom, where oxygen atoms are not directly bonded to each other, a plurality of substituents $S^{v1}$, if present, are optionally the same or different, and $Z^{v1}$ represents a single bond, —C═C—, —CH═CH—, or —CF═CF—, where at least one of $Z^{v1}$ represents —C≡C—, $n^{v1}$ represents an integer of 1 to 2, and a plurality of $A^{v1}$s and $Z^{v1}$s, if present, are optionally the same or different from each other.

8. The liquid crystal composition according to claim 1, comprising at least one compound represented by general formulae (np-1) to (np-3):

(np-1)

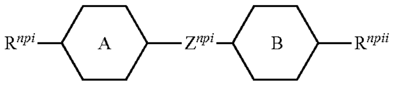

(np-2)

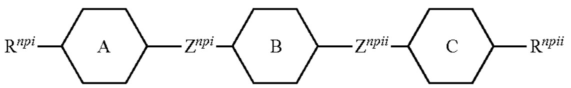

(np-3)

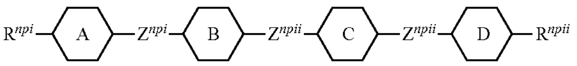

in general formulae (np-1) to (np-3), $R^{npi}$ and $R^{npii}$ each independently represent an alkyl group having 1 to 20 carbon atoms or a halogen atom, wherein at least one —$CH_2$— in the alkyl group is optionally substituted with —O—, —S—, —CO—, and/or —CS—, at least one $-CH_2-CH_2-$ in the alkyl group is optionally substituted with $-CO-O-$, $-O-CO-$, $-CO-S-$, $-S-CO-$, $-CO-NH-$, $-NH-CO-$, $-CH{=}CH-$, $-CF{=}CF-$, and/or $-C{\equiv}C-$, at least one $-CH_2-CH_2-CH_2-$ in the alkyl group is optionally substituted with $-O-CO-O-$, and at least one hydrogen atom in the alkyl group is optionally substituted with a halogen atom, where oxygen atoms are not directly bonded to each other, rings A, B, C, and D each independently represent a group selected from the group consisting of the following groups (a), (b), (c), and (d):

(a) a 1,4-cyclohexylene group, wherein one $-CH_2-$ or two or more non-adjacent $-CH_2-$'s in this group are optionally substituted with $-O-$, (b) a 1,4-phenylene group, wherein one $-CH{=}$ or two or more $-CH{=}$'s in this group are optionally substituted with $-N{=}$, (c) a naphthalene-2,6-diyl group, a 1,2,3,4-tetrahydronaphthalene-2,6-diyl group, or a decahydronaphthalene-2,6-diyl group, wherein one $-CH{=}$ or two or more $-CH{=}$'s in the naphthalene-2,6-diyl group or 1,2,3,4-tetrahydronaphthalene-2,6-diyl group are optionally substituted with $-N{=}$, and (d) a 1,4-cyclohexenylene group, a 1,3-dioxane-trans-2,5-diyl group, a pyrimidine-2,5-diyl group, or a pyridine-2,5-diyl group, wherein at least one hydrogen atom in the rings A, B, C, and D is optionally substituted with a substituent $S^{npi1}$, the substituent $S^{npi1}$ represents a halogen atom, a cyano group, or an alkyl group having 1 to 20 carbon atoms, at least one $-CH_2-$ in the alkyl group is optionally substitute with $-O-$, $-S-$, $-CO-$, and/or $-CS-$, at least one $-CH_2-CH_2-$ in the alkyl group is optionally substituted with $-CO-O-$, $-O-CO-$, $-CO-S-$, $-S-CO-$, $-CO-NH-$, $-NH-CO-$, $-CH{=}CH-$, $-CF{=}CF-$, and/or $-C{\equiv}C-$, at least one $-CH_2-CH_2-CH_2-$ in the alkyl group is optionally substituted with $-O-CO-O-$, and at least one hydrogen atom in the alkyl group is optionally substituted with a halogen atom, where oxygen atoms are not directly bonded to each other, a plurality of substituents $S^{npi1}$, if present, are optionally the same or different, and $Z^{npi}$, $Z^{npii}$ and $Z^{npiii}$ each independently represent a single bond or an alkylene group having 1 to 20 carbon atoms, wherein at least one $-CH_2-$ in the alkylene group is optionally substituted with $-O-$, at least one $-CH_2-CH_2-$ in the alkylene group is optionally substituted with $-CH_2-CH(CH_3)-$, $-CH(CH_3)-CH_2-$, $-CH{=}CH-$, $-CF{=}CF-$, $-CH{=}C(CH_3)-$, $-C(CH_3){=}CH-$, $-CH{=}N-$, $-N{=}CH-$, $-N{=}N-$, $-C{\equiv}C-$, $-CO-O-$, and/or $-O-CO-$, and at least one $-CH_2-CH_2-CH_2-$ in the alkylene group is optionally substituted with $-O-CO-O-$, where oxygen atoms are not directly bonded to each other.

9. The liquid crystal composition according to claim 1, wherein Δn at 25° C. and 589 nm is 0.38 or larger.

10. A liquid crystal display element using the liquid crystal composition according to claim 1.

11. The liquid crystal display element according to claim 10, wherein the liquid crystal display element is driven by an active matrix system or a passive matrix system.

12. A liquid crystal display element wherein a dielectric constant is reversely switched by reversely changing an orientation direction of liquid crystal molecules of the liquid crystal composition according to claim 1.

13. A sensor using the liquid crystal composition according to claim 1.

14. A liquid crystal lens using the liquid crystal composition according to claim 1.

15. An optical communication device using the liquid crystal composition according to claim 1.

16. An antenna using the liquid crystal composition according to claim 1.

17. The antenna according to claim 16, comprising:

a first substrate having a plurality of slots;

a second substrate facing the first substrate and having a power feed section;

a first dielectric layer provided between the first substrate and the second substrate;

a plurality of patch electrodes disposed corresponding to the slots;

a third substrate having the patch electrodes; and a liquid crystal layer provided between the first substrate and the third substrate, wherein the liquid crystal layer contains the liquid crystal composition.

18. A compound represented by general formula (i):

$$R^{i1}-A^{i1}-Z^{i1}-A^{i2}-\left(Z^{i2}-A^{i3}\right)_{n^{i1}}-NCS \quad (i)$$

in general formula (i), $R^{i1}$ represents an alkynyl group represented by formula ($R^{i1}$-A):

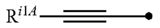

($R^{i1}$-A)

in general formula ($R^{i1}$-A) $R^{i1A}$ represents an alkyl group having 1 to 18 carbon atoms, at least one $-CH_2-$ in the alkyl group is optionally substituted with $-O-$, $-S-$, $-CO-$, and/or $-CS-$, at least one $-CH_2-CH_2-$ in the alkyl group is optionally substituted with $-CO-O-$, $-O-CO-$, $-CO-S-$, $-S-CO-$, $-CO-NH-$, $-NH-CO-$, $-CH{=}CH-$, $-CF{=}CF-$, and/or $-C{\equiv}C-$, at least one $-CH_2-CH_2-CH_2-$ in the alkyl group is optionally substituted with $-O-CO-O-$, and at least one hydrogen atom in the alkyl group is optionally substituted with a halogen atom, where oxygen atoms are not directly bonded to each other, and black dot represents a bond with $A^{i1}$, $A^{i1}$ represents a group selected from the group consisting of the following groups (b), (c), and (d):

(b) a 1,4-phenylene group, wherein one $-CH{=}$ or two or more $-CH{=}$'s in this group are optionally substituted with $-N{=}$, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group, wherein one —CH═ or two or more non-adjacent —CH═'s in this group are optionally substituted with —N═, $A^{i2}$ and $A^{i3}$ each independently represent a group selected from the group consisting of the following groups (a), (b), (c), and (d):

(a) a 1,4-cyclohexylene group, wherein one $—CH_2—$ or two or more non-adjacent $—CH_2—$'s in this group are optionally substituted with —O— and/or —S—, (b) a 1,4-phenylene group, wherein one —CH═ or two or more —CH═'s in this group are optionally substituted with —N═, (c) a 1,4-cyclohexenylene group, a bicyclo[2.2.2]octane-1,4-diyl group, a naphthalene-2,6-diyl group, a naphthalene-1,4-diyl group, a 1,2,3,4-tetrahydronaphthalene-2,6-diyl group, a 5,6,7,8-tetrahydronaphthalene-1,4-diyl group, a decahydronaphthalene-2,6-diyl group, an anthracene-2,6-diyl group, an anthracene-1,4-diyl group, an anthracene-9,10-diyl group, a phenanthrene-2,7-diyl group, wherein one —CH═ or two or more —CH═'s in the naphthalene-2,6-diyl group, naphthalene-1,4-diyl group, 1,2,3,4-tetrahydronaphthalene-2,6-diyl group, 5,6,7,8-tetrahydronaphthalene-1,4-diyl group, anthracene-2,6-diyl group, anthracene-1,4-diyl group, anthracene-9,10-diyl group, or phenanthrene-2,7-diyl group are optionally substituted with —N═, and (d) a thiophene-2,5-diyl group, a benzothiophene-2,5-diyl group, a benzothiophene-2,6-diyl group, a dibenzothiophene-3,7-diyl group, a dibenzothiophene-2,6-diyl group, a thieno[3,2-b]thiophene-2,5-diyl group, a benzo[1,2-b:4,5-b']dithiophene-2,6-diyl group, wherein one —CH═ or two or more non-adjacent —CH═'s in this group are optionally substituted with —N═, wherein at least one hydrogen atom in $A^{i1}$, $A^{i2}$, and $A^{i3}$ is optionally substituted with a substituent $S^{i1}$, the substituent $S^{i1}$ represents a fluorine atom, a chlorine atom, a bromine atom, an iodine atom, a pentafluorosulfanyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or an alkyl group having 1 to 20 carbon atoms, at least one $—CH_2—$ in the alkyl group is optionally substituted with —O—, —S—, and/or —CO—, at least one $—CH_2—CH_2—$ in the alkyl group is optionally substituted with —CH═CH—, —CF═CF—, —C≡C—, —CO—O—, —O—CO—, —CO—S—, —S—CO—, —CO—NH—, and/or —NH—CO—, at least one $—CH_2—CH_2—CH_2—$ in the alkyl group is optionally substituted with —O—CO—O—, and at least one hydrogen atom in the alkyl group is optionally substituted with a halogen atom, where oxygen atoms are not directly bonded to each other, a plurality of substituents $S^{i1}$, if present, are optionally the same or different, and $Z^{i1}$ and $Z^{i2}$ each independently represent a single bond or an alkylene group having 1 to 20 carbon atoms, wherein at least one $—CH_2—$ in the alkylene group is optionally substituted with —O—, $—CF_2—$, and/or —CO—, and at least one $—CH_2—CH_2—$ in the alkylene group is optionally substituted with $—CH_2—CH(CH_3)—$, $—CH(CH_3)—CH_2—$, —CH═CH—, —CF═CF—, $—CH═C(CH_3)—$, $—C(CH_3)═CH—$, —CH═N—, —N═CH—, —N═N—, —C≡C—, —CO—O—, and/or —O—CO—, where oxygen atoms are not directly bonded to each other, and $n^{i1}$ represents an integer of 1.

* * * * *